US012801613B2

(12) United States Patent
Gladwin et al.

(10) Patent No.: US 12,801,613 B2
(45) Date of Patent: Nov. 17, 2026

(54) ENFORCEMENT OF A MAXIMUM RESULT SET SIZE RULE FOR QUERIES REQUESTED FOR EXECUTION AGAINST A DATABASE SYSTEM

(71) Applicant: Ocient Holdings LLC, Chicago, IL (US)

(72) Inventors: S. Christopher Gladwin, Chicago, IL (US); Andrew D. Baptist, Mt. Pleasant, WI (US); George Kondiles, Chicago, IL (US); Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/057,272

(22) Filed: Feb. 19, 2025

(65) Prior Publication Data

US 2025/0190439 A1 Jun. 12, 2025

Related U.S. Application Data

(63) Continuation of application No. 18/532,167, filed on Dec. 7, 2023, now Pat. No. 12,271,384, which is a continuation of application No. 17/651,914, filed on Feb. 22, 2022, now Pat. No. 11,874,841, which is a continuation of application No. 17/443,066, filed on Jul. 20, 2021, now Pat. No. 11,734,283, which is a continuation of application No. 16/668,402, filed on Oct. 30, 2019, now Pat. No. 11,106,679.

(51) Int. Cl.

| | |
|---|---|
| ***G06F 16/2455*** | (2019.01) |
| ***G06F 16/242*** | (2019.01) |
| ***G06F 16/248*** | (2019.01) |

(52) U.S. Cl.

CPC .... *G06F 16/24564* (2019.01); *G06F 16/2428* (2019.01); *G06F 16/248* (2019.01)

(58) Field of Classification Search

CPC .......... G06F 16/24564; G06F 16/2428; G06F 16/248

USPC .......... 707/694

See application file for complete search history.

(56) References Cited

U.S. PATENT DOCUMENTS

| | | | | |
|---|---|---|---|---|
| 10,152,522 | B1 * | 12/2018 | van Rotterdam | H04L 63/102 |
| 10,275,776 | B1 * | 4/2019 | Watson | G06F 11/3604 |
| 2012/0036162 | A1 * | 2/2012 | Gimbel | G06F 16/2455 707/783 |
| 2015/0310067 | A1 * | 10/2015 | Svoboda | G06F 21/6218 707/781 |

* cited by examiner

*Primary Examiner* — Joshua Bullock

(74) *Attorney, Agent, or Firm* — Garlick & Markison; Timothy W. Markison

(57) ABSTRACT

A query processing system is operable to determine a set of query rules that includes a maximum result set size rule. A size of a result set is determined for a query received from a requesting entity, and compliance data is generated based on determining whether the size of the result set complies with the maximum result set size rule. When the compliance data indicates the size of the result set complies with the maximum result set size rule, a query result for the query is generated based on the result set and the query result is transmitted to the requesting entity. When the compliance data indicates the size of the result set does not comply with the maximum result set size rule, transmission of the query result to the requesting entity is foregone.

12 Claims, 50 Drawing Sheets

ENFORCEMENT OF A MAXIMUM RESULT SET SIZE RULE FOR QUERIES REQUESTED FOR EXECUTION AGAINST A DATABASE SYSTEM

CROSS-REFERENCE TO RELATED APPLICATIONS

The present U.S. Utility Patent Application claims priority pursuant to 35 U.S.C. § 120 as a continuation of U.S. Utility application Ser. No. 18/532,167, entitled "ENFORCEMENT OF A MINIMUM RESULT SET SIZE RULE FOR QUERIES REQUESTED FOR EXECUTION AGAINST A DATABASE SYSTEM", filed Dec. 7, 2023, which is a continuation of U.S. Utility application Ser. No. 17/651,914, entitled "ENFORCEMENT OF QUERY RULES FOR ACCESS TO DATA IN A DATABASE SYSTEM", filed Feb. 22, 2022, issued as U.S. Pat. No. 11,874,841 on Jan. 16, 2024, which is a continuation of U.S. Utility application Ser. No. 17/443,066, entitled "ENFORCEMENT OF A SET OF QUERY RULES FOR ACCESS TO DATA SUPPLIED BY AT LEAST ONE DATA PROVIDER", filed Jul. 20, 2021, issued as U.S. Pat. No. 11,734,283 on Aug. 22, 2023, which is a continuation of U.S. Utility application Ser. No. 16/668,402, entitled "ENFORCEMENT OF SETS OF QUERY RULES FOR ACCESS TO DATA SUPPLIED BY A PLURALITY OF DATA PROVIDERS", filed Oct. 30, 2019, issued as U.S. Pat. No. 11,106,679 on Aug. 31, 2021, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to database systems.

BRIEF DESCRIPTION OF THE SEVERAL VIEWS OF THE DRAWING(S)

DETAILED DESCRIPTION OF THE INVENTION

Figure 1:
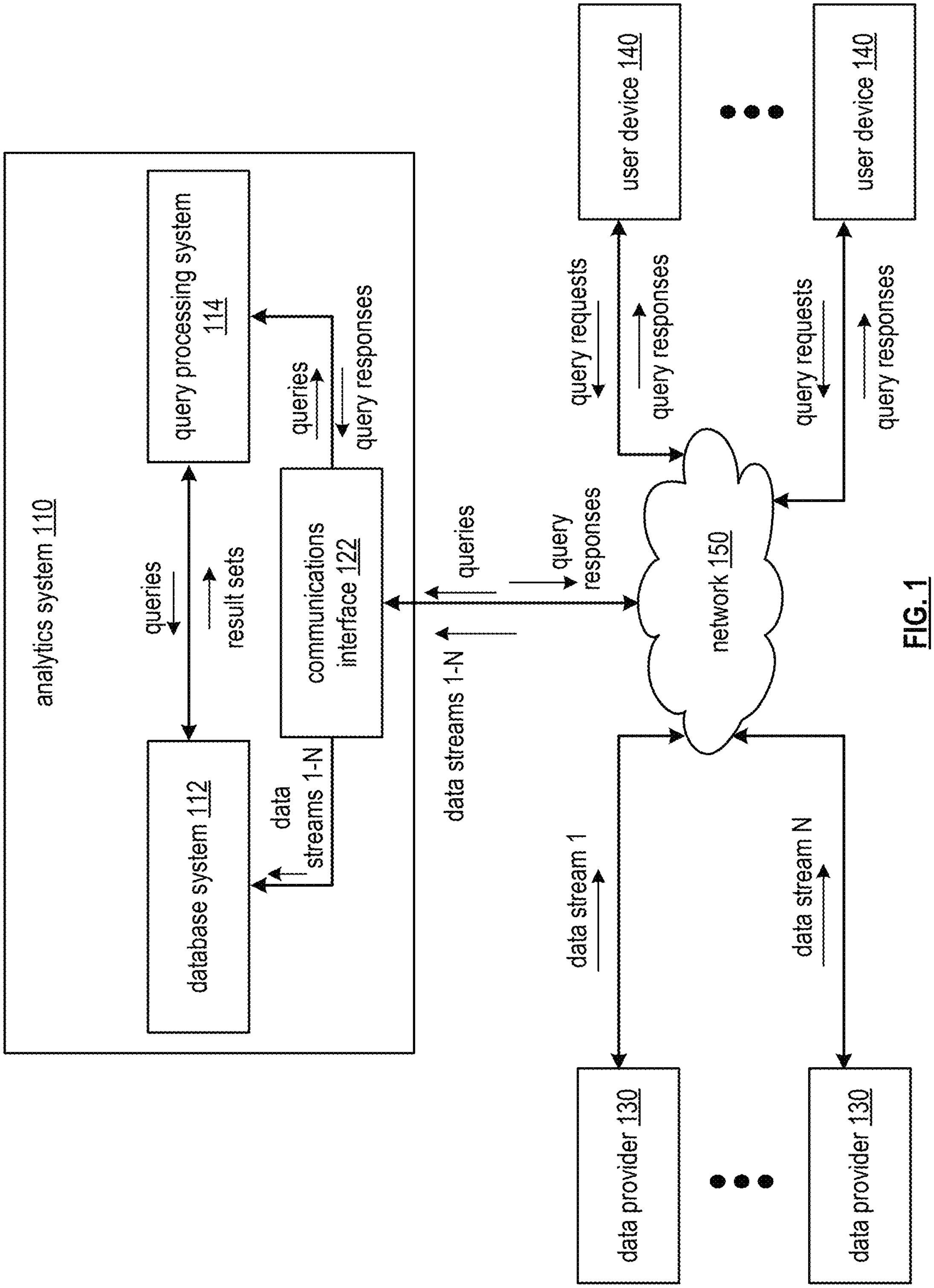
FIG. 1 is a schematic block diagram of an embodiment of an analytics system in accordance with various embodiments of the present invention.

FIG. 1 illustrates an embodiment of an analytics system 110. The analytics system 110 can be operable to store data received from multiple data providers 130 in at least one database system 112. The data can be received as data streams from each data provider, and can correspond to raw or processed data collected by the data provider, such as a stream of time-series data. One or more communication interfaces 122 of the analytics system 110 can be operable to receive the data streams via a network 150. The received data streams 1-N can be optionally cleaned and/or standardized by the analytics system 110 to generate multiple entries that populate the database system 112.

This data can be utilized by one or more end users via one or more user devices 140 corresponding to various end users of the analytics system 110. Each user device can transmit query requests to the analytics system 110 via the same or different network 150. The same or different communication interface 122 can receive these query requests, and the analytics system 110 can utilize a query processing module to execute queries of the query requests against the database system 112. The result sets generated in executing these queries can be utilized to generate a query response for transmission back to the corresponding user device 140. This enables end users to perform various analytics on data collected from multiple data providers via queries to the database system.

Figure 2A:
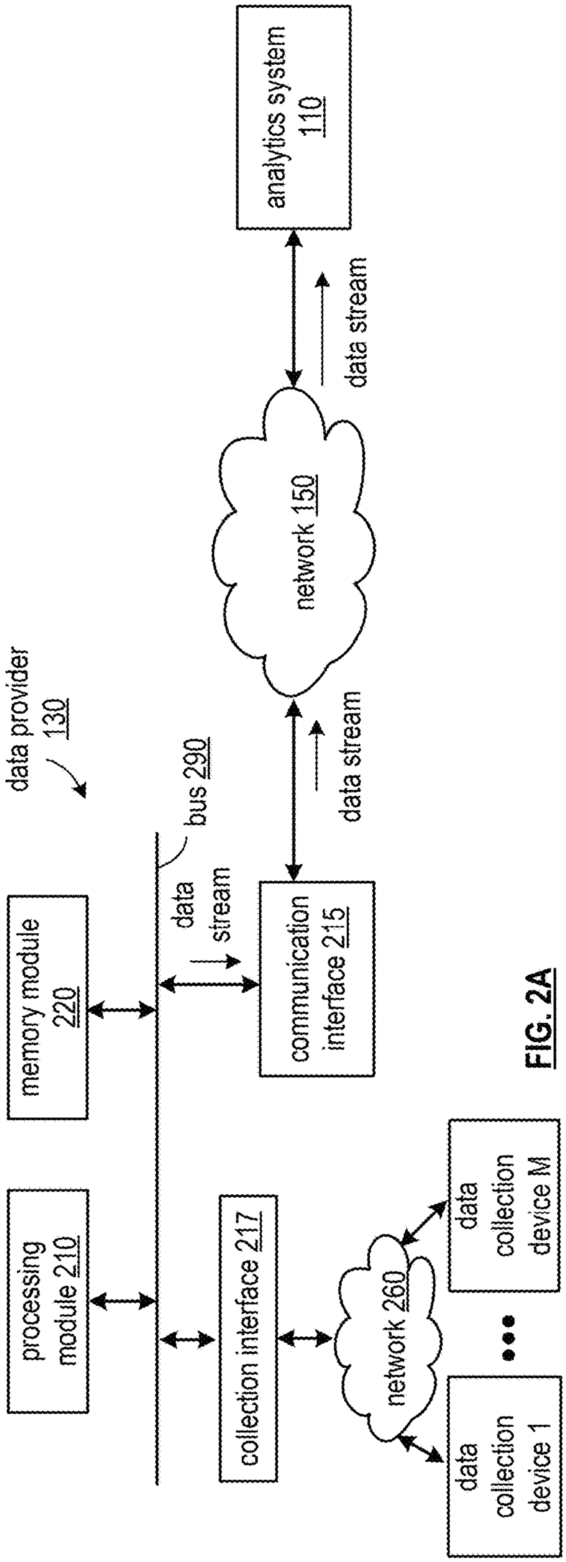
FIG. 2A is a schematic block diagram of an embodiment of a data provider in accordance with various embodiments of the present invention.

FIG. 2A illustrates an embodiment of a data provider 130. Data provider 130 can be implemented utilizing at least one processing module 210 at least one memory module 220, at least one communication interface 215, and/or at least one collection interface 217, all connected via bus 290. The bus 290 can be implemented via a wired and/or wireless connection, where the processing module 210, at least one memory module 220, and/or at least one communication interface 215 are coupled to a single device via short range connections and/or are dispersed across multiple devices within a same system via a wired and/or wireless network. The memory module 220 can store operational instructions that, when executed by the processing module 210, cause the processing module 210 to execute the functionality of a data provider 130 as discussed herein.

The data provider 130 utilize collection interface 217 to collect one or more types of data via a single data collection device and/or a plurality of data collection devices 1-M as illustrated in FIG. 2A. Collection interface 217 can be implemented utilizing one or more communication interfaces operable to receive data from one or more data collection devices via the same or different communication medium and/or communication protocol. The data provider 130 can process the collected data to generate one or more data streams, which can include a stream of time-series data collected via data collection devices 1-M and/or can otherwise include data for transmission the analytics system for entry in database system 112. The communication interface 215 can enable communication via the network 150. For example, as illustrated in FIG. 2A, communication interface 215 can be utilized to transmit one or more data streams to the analytics system 110 via network 150.

A data provider 130 can be implemented via a server system, data collection system, database system, and/or other memory operable to receive, store, and/or process data from a plurality of data collection devices 1-M. In such embodiments, the plurality of data collection devices 1-M can include such as a plurality of personal computers, mobile devices, cellular devices, wearable devices, vehicles, sensor devices, client devices, and/or computing devices. In such embodiments, the collected data is received from the data collection devices 1-M via a network 260. The collection interface 217 can be operable to receive data via a connection with network 260. The network 260 can be the same and/or different from network 150. For example, the network 150 can be utilized to facilitate collection of data from data collection devices 1-M, for example, via the same or different communication interface 215.

Alternatively or in addition, data provider 130 can correspond to a device, such as a personal computer, mobile device, wearable device, vehicle, sensor device, and/or client device. In such embodiments, the data collection devices 1-M can include sensor devices such as geolocation devices, cameras, microphones, and/or other user input devices or sensor devices coupled to the device and/or communicating with the device. For example, these data collection devices 1-M can be coupled to the device via bus 290, can communicate with the device via collection interface 217, and/or can communicate via another wired and/or wireless connection. In some cases, some or all such data providers 130 can be implemented by utilizing the provider device 230 of FIG. 2B and/or the user device 140 of FIG. 3.

Each data provider 130 can be affiliated with a particular data provider entity, such as a company that facilitates, manages, and/or controls collection of the data from the data collection devices 1-M. In some cases, the data provider entity manufactures one or more corresponding data providers 130, and/or manufactures one or more data collection devices 1-M that communicate with one or more corresponding data providers 130. Alternatively or in addition, a data provider entity can be affiliated with the network 260, where the data provider entity maintains and/or manages network 260. Alternatively or in addition, the data provider entity services and/or manages a mobile application, browser application, and/or website that collects data from data collection devices 1-M and/or data providers 130 implemented as client devices operated by users accessing the mobile application, browser application, and/or website, for example, via the Internet.

For example, a data provider 130 can be affiliated with a telecommunications company, where the plurality of data collection devices 1-M are a plurality of cellular devices communicating via a cellular network associated with the telecommunications company. For example, network 260 can be implemented utilizing the cellular network of the telecommunications company. In such cases, the data provider 130 can be implemented via a server system or other memory of the telecommunications company, where the data stream includes data collected via sensors of the plurality of cellular devices 1-M and/or data collected by the plurality of cellular devices 1-M via their own connection to the cellular network, the Internet, or a different network.

Alternatively or in addition, a set of data providers 130 can be implemented by this plurality of cellular devices themselves, where each cellular device in the set is affiliated with the telecommunications company, but is responsible to transmission of its collected data directly to the analytics system in its own data stream. Sim Here, the analytics system receives the data collected from the plurality of cellular devices as a plurality of individual data streams received from the cellular devices directly, rather than receiving this data in a single data stream. In either case, the analytics system can populate the database system with database entries indicating data collected by the plurality of cellular devices of the telecommunications company.

As another example, a data providing entity corresponding to a mobile device manufacturing company that manufactured a plurality of mobile devices can configure these mobile devices to send their collected data to their own server system, where the mobile devices are implemented as data collection devices 1-M and/or where the server system is implemented as a data provider 130.

As another example, a data provider 130 can be affiliated with a particular automobile company. The plurality of data collection devices 1-M can correspond to a plurality of cars or other automobiles manufactured by the automobile company that send their geolocation sensor data or other vehicle sensor data to a server system or other memory of the automobile company. Alternatively, a plurality of data providers 130 can each be implemented utilizing an individual car manufactured by the automobile company, where each car sends its sensor data directly to the analytics system. In either case, the analytics system can populate the database system with database entries indicating data collected by the plurality of cars of the automobile company.

Figure 2B:
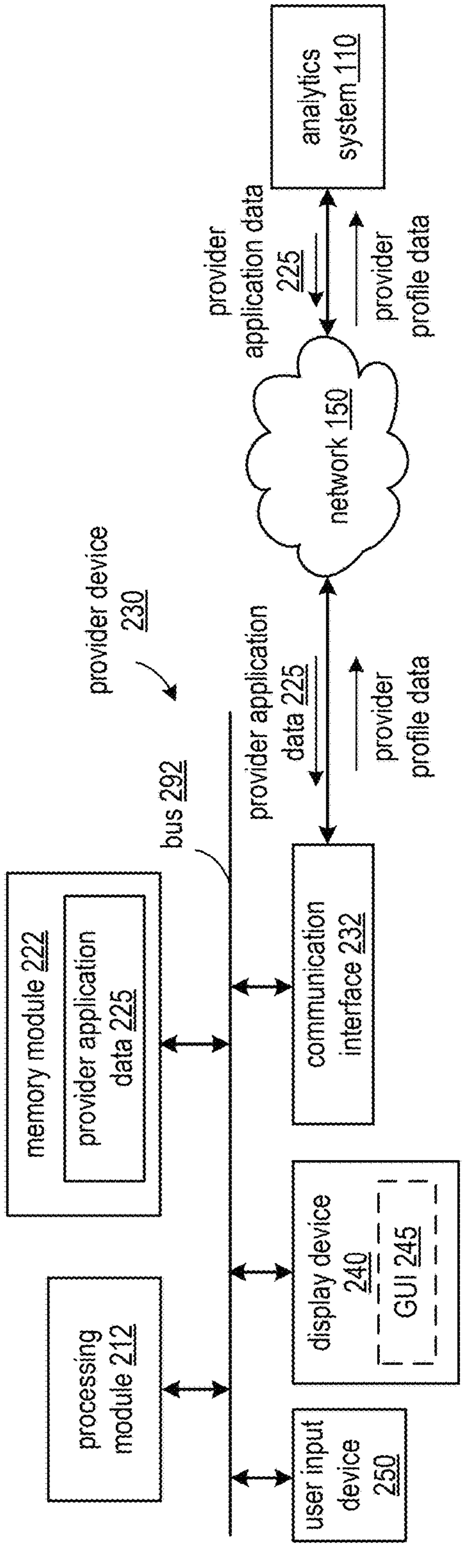
FIG. 2B is a schematic block diagram of an embodiment of a provider device in accordance with various embodiments of the present invention.

FIG. 2B illustrates an example of a provider device 230. The provider device 230 can correspond to a personal computer, mobile device, computing device, and/or other device that includes at least one processing module 212, at least one memory module 222, and/or at least one communication interface 232, all connected via bus 292. The bus 292 can be implemented via a wired and/or wireless connection, where the processing module 212, at least one memory module 222, and/or at least one communication interface 232 communicate via short range connections and/or by utilizing a wired and/or wireless network. The memory module 222 can store operational instructions that, when executed by the processing module 212, cause the processing module 212 to execute the functionality of a provider device 230 as discussed herein. In particular, the provider device 230 can be utilized to enable one or more users and/or administrators associated with a corresponding data provider 130 and/or corresponding affiliated data providing entity to view and/or customize a corresponding account managing the streaming and/or usage of data provided by the data provider. Alternatively or in addition, the provider device 230 can be utilized by an administrator of the analytics system 110 to enable an administrator to configure settings for one or more different providers and/or to configure settings for usage of the analytics system 110 as a whole.

To enable this user interaction by data provider entities, the provider device 230 can further include at least one display device 240 and/or at least one user input device 250. In particular, the user input device 250 can include a keyboard, microphone, mouse, touchscreen of display device 240, and/or mechanism configured to enable a user of the provider device to provide user input in response to prompts displayed by a graphical user interface (GUI) 245 displayed on display device 240. The GUI 245 can be displayed in accordance with the execution, via the processing module 212, of provider application data 225. The provider application data 225 can be received from the analytics system 110, and/or stored in memory module 222. For example, the provider application data 225 can correspond to a browser application accessible via network 150 and/or an application installed by the provider device. User interaction with the GUI can enable the user to provide provider profile data, which can be transmitted to the analytics system 110 for usage by the analytics system 110 as discussed in further detail herein.

In some embodiments, a provider device 230 can utilized to implement a corresponding data provider 130, where a device and/or set of devices 230 are utilized to collect and/or transmit of data streams for a data providing entity, and where this device and/or set of devices 230 are also utilized to collect and transmit provider profile data and/or to execute the provider application data for the same data provider entity. Alternatively, a first set of one or more devices such as a server system can be utilized to collect and/or transmit of data streams for a data providing entity, while a distinct, second set of one or more devices such as a personal computer and/or mobile device are utilized to collect and transmit provider profile data and/or to execute the provider application data for the same data provider entity.

Figure 3:
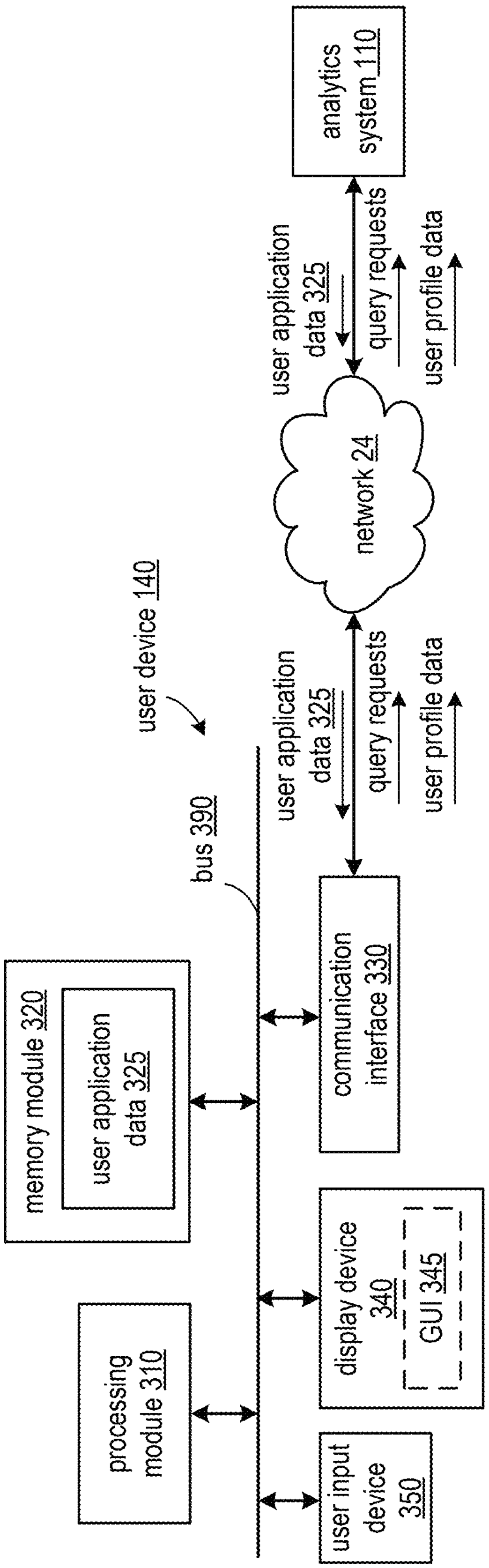
FIG. 3 is a schematic block diagram of an embodiment of a user device in accordance with various embodiments of the present invention.

FIG. 3 illustrates an example embodiment of a user device 140. The user device 140 can correspond to a personal computer, mobile device, and/or other device that includes at least one processing module 310, at least one memory module 320, and/or at least one communication interface 330, all connected via bus 292. The bus 390 can be implemented via a wired and/or wireless connection, where the processing module 310, at least one memory module 320, and/or at least one communication interface 330 communicate via short range connections and/or by utilizing a wired and/or wireless network. The memory module 320 can store operational instructions that, when executed by the processing module 310, cause the processing module 310 to execute the functionality of a user device 140 as discussed herein. In particular, the user device 140 can be utilized to enable one or more end users of the analytics system 110 to view, perform analysis upon, and/or otherwise query data stored in database system 112.

To enable this user interaction by end users of the analytics system 110, the user device 140 can further include at least one display device 340 and/or at least one user input device 350. In particular, the user input device 350 can include a keyboard, microphone, mouse, touchscreen of display device 340, and/or other mechanism configured to enable a user of the user device to provide user input in response to prompts displayed by a GUI 345 displayed on display device 340. The GUI 345 can be displayed in accordance with the execution, via the processing module 212, of user application data 325. User application data 325 can be received from the analytics system 110 and/or stored in memory module 320. For example, the user application data 325 can correspond to a browser application accessible via network 150 and/or an application installed by the user device. User interaction with the GUI can enable the user to enter queries and/or other data analytics commands, which can be transmitted to the analytics system as a query requests for execution against the database system 112. Alternatively or in addition, the GUI can enable the user to enter user profile data, which can be transmitted to the analytics system 110 for usage by the analytics system 110 as discussed in further detail herein.

Network 150 can be implemented utilizing one or more communication mediums that enable the analytics system 110 to bidirectionally communicate with data providers 130, provider devices 230, and/or user devices 140. Network 150 can be implemented utilizing one or more wireless and/or wire lined communication systems; one or more non-public intranet systems and/or public internet systems; one or more satellite communication systems; one or more fiber optic communication systems; and/or one or more local area networks (LAN) and/or wide area networks (WAN). Network 150 can be utilized via any communication network operable to enable data providers 130 to upload and/or continuously stream data for storage by the analytics system in database system 112. The network 150 can further facilitate other communication between the analytics system 110 and data providers 130 as discussed herein. The network 150 can further be operable to enable user devices 140 to send query requests to and/or receive query responses from the analytics system 110. The network 150 can further facilitate other communication between the analytics system 110 and user devices 140 as discussed herein. The network 150 can further be operable to enable provider devices 230 to send provider profile data to and/or receive audit logs from the analytics system 110. The network 150 can further facilitate other communication between the analytics system 110 and provider devices 230 as discussed herein.

Figure 4B:
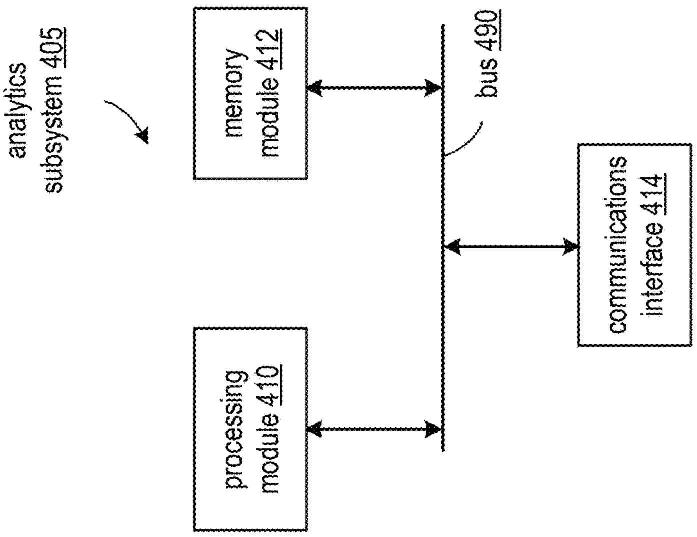
FIG. 4B is a schematic block diagram of an embodiment of an analytics subsystem in accordance with various embodiments of the present invention.
Figure 4A:
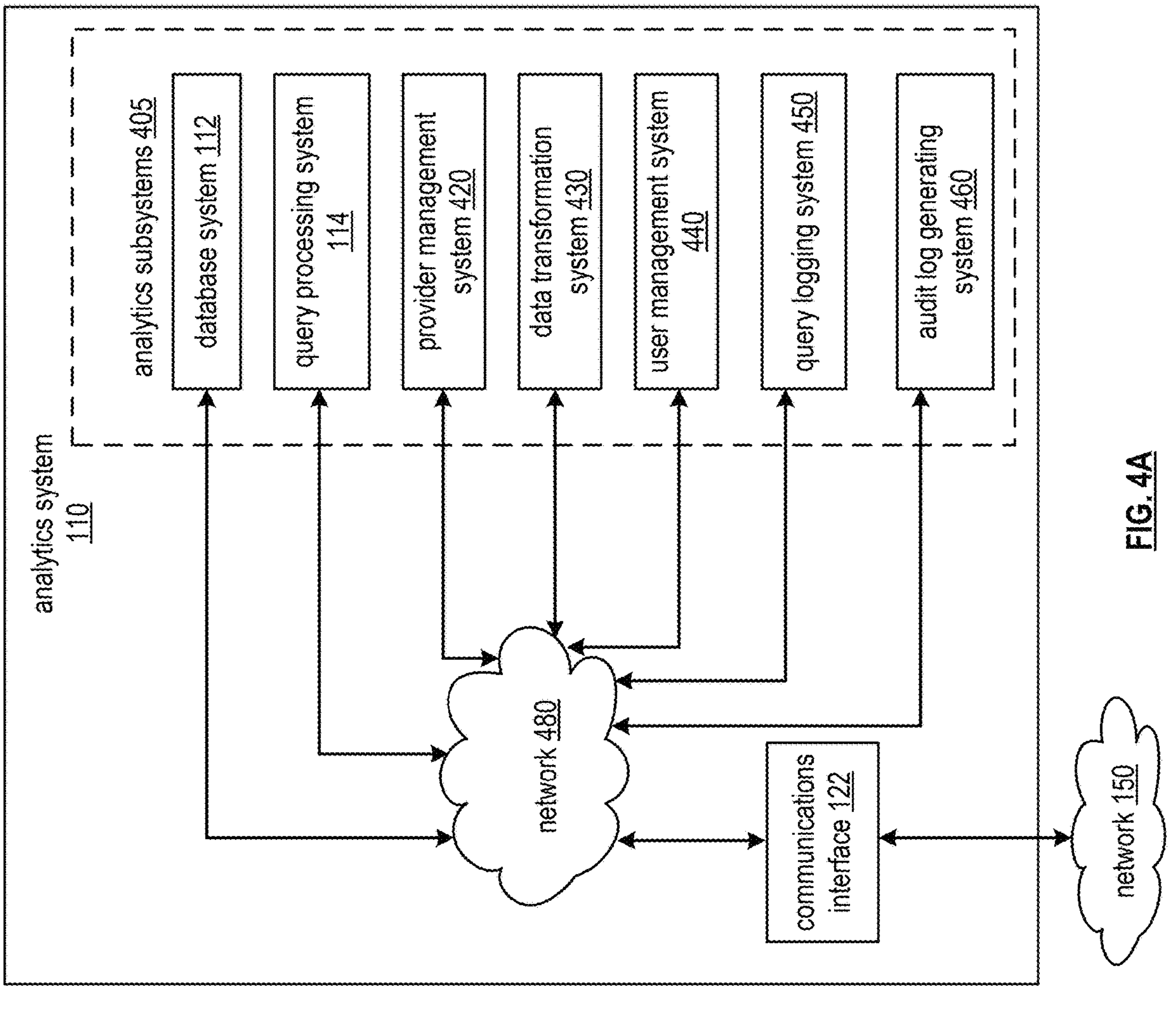
FIG. 4A is a schematic block diagram of an embodiment of an analytics system in accordance with various embodiments of the present invention.

FIGS. 4A-4I include various embodiments of the analytics system 110, illustrating various functionality of the analytics system 110. This various functionality can be implemented utilizing one or more analytics subsystems 405 of the analytics system 110. As illustrated in FIG. 4A, the analytics subsystems 405 can include the database system 112 of FIG. 1, the query processing system 114 of FIG. 1, a provider management system 420, a data transformation system 430, a user management system 440, a query logging system 450, and/or an audit log generating system 460.

FIG. 4B illustrates an example of an individual analytics subsystem 405. Each of the analytics subsystems 405 can be implemented by utilizing its own processing module 410, memory module 412, and/or communications interface 414, connected via a bus 490. Bus 490 can facilitate communication between the processing module 410, memory module 412, and/or communications interface 414 via a short-range connection and/or via a wired and/or wireless network. The memory module 412 for a particular analytics subsystem 405 can store executable instructions that, when executed by the processing module 410, cause the processing module 410 to execute the functionality of the particular analytics subsystem 405 as discussed herein.

The independent analytics subsystems 405 can communicate with each other via a wired and/or wireless network 480 of the analytics system 110. Each independent analytics subsystem 405 can include a communication interface 414 that enables the analytics subsystem to communicate bidirectionally with network 480. As illustrated in FIG. 4A, this communication can enable the transfer of data between various subsystems 405 via network 480, between subsystems 405 and the database system 112 via network 480, and/or between the subsystems 405 and communication interface 122 via network 480.

The network 480 can implemented utilizing the network 150, and/or can be distinct from network 150. For example, network 480 can be implemented by an internal network of the analytics system 110 that is separate from the network 150. Network 480 can be implemented utilizing one or more communication mediums that enable the analytics subsystems 405 to bidirectionally communicate with each other and/or with network 150 via communications interface 122. Network 480 can be implemented utilizing one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

As illustrated in FIG. 4A, each analytics subsystem 405 can be distinct with its own processing module 410 and/or memory module 412. For example, each analytics subsystem can be implemented utilizing its own set of devices and/or set of servers. Alternatively, the same processing module 410, memory module 412, and/or communication interface 414 can be utilized to implement multiple analytics subsystems 405 in other embodiments. In particular, one or more analytics subsystems 405 can be coupled, can be implemented utilizing a same device or set of devices, can be implemented utilizing a set of shared servers, can share data stored in the same memory, and/or can implement their corresponding functionality in tandem. Alternatively or in addition, multiple processing modules 410, memory modules 412, and/or communication interfaces 414 on the same or different device in the same or different location can communicate via network 480 and can be utilized to implement a single analytics subsystems 405. In some embodiments, one or more analytics subsystems 405 can be implemented utilizing the provider device 230 and/or the user device 140, for example, in conjunction with execution of the provider application data and/or the user application data.

Figure 4C:
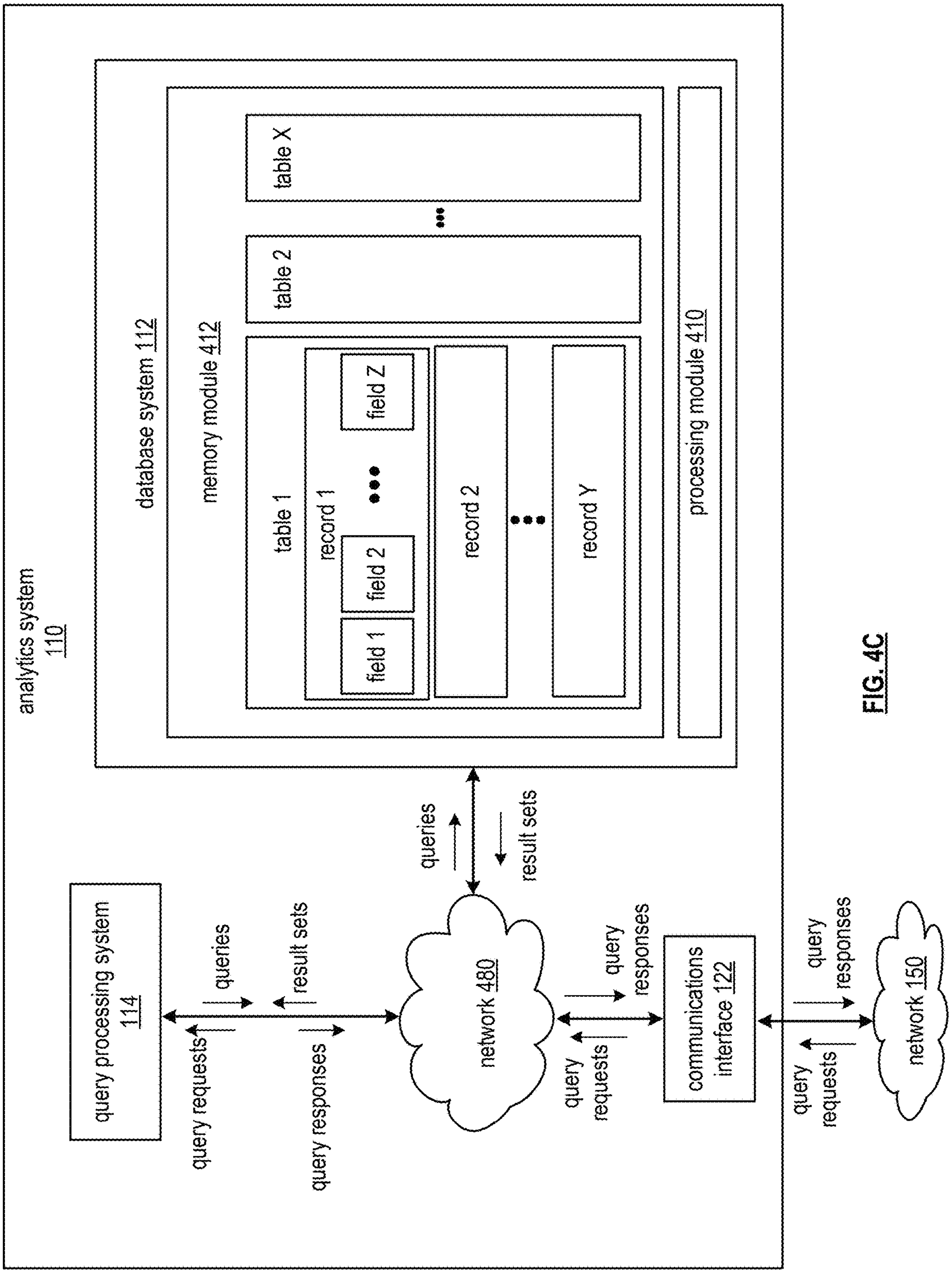
FIG. 4C is a schematic block diagram of an embodiment of an analytics system that utilizes a query processing system in accordance with various embodiments of the present invention.

FIG. 4C illustrates an embodiment of database system 112. The memory module 412 of database system 112 can store one or more databases as a plurality of tables 1-X, for example, in accordance with a relational database system. Each table can store a set of records 1-Y. Each table can have a designated set of fields 1-Z, where data for each record 1-Y includes values populating at least one of the set of fields 1-Z. Each table 1-X can store the same or different number of records utilizing the same or different number of fields. While a relational database system is illustrated in FIG. 4C and discussed herein, the database system 112 can store records in accordance with at least one non-relational structure. In such embodiments, fields and records of a non-relational database structure can similarly be utilized as discussed herein.

The processing module 410 can be utilized to parse raw and/or pre-processed data streams received from the data providers and/or to load record entries into the tables 1-X. For example, a data stream of time-series records received from a data provider can be written to one or more tables by the processing module 410. In such embodiments, one or more tables can include a timestamp field indicating a time and/or temporal period the corresponding data was originally collected by the data provider 130, indicating a time and/or temporal period the data was received by the analytics system 110, and/or indicating a time and/or temporal period that the corresponding record was added to the database system 112.

A record can include other information populating other fields of one or more tables, such as: a device identifier or other device data fields indicating and/or describing a data collection device that collected the record or is otherwise associated with the record; location data for one or more location fields indicating and/or describing a location from which the data corresponding to the record was collected by the corresponding data collection device and/or a location that is otherwise associated with the record; other user input and/or sensor data collected by the data collection device associated with the record and/or collected within the temporal period indicated by the timestamp of the record; a person identifier or other demographic data fields indicating and/or describing a person associated with the data collection device and/or otherwise associated with the record; a provider identifier or other provider data fields indicating and/or describing a data provider entity associated with the data provider 130 that collected the record and/or transmitted the data stream that indicated the record to the analytics system; and/or other data pertinent to collection of user input and/or sensor data populating one or more fields of the record.

The values populating the various fields of a single record of a table can be extracted from a single record and/or other data segment received in a data stream from a data provider.

The extracted fields of a single record can be utilized to populate a record of a single table and/or a record of multiple tables. For example, values for fields of a same record can be dispersed across multiple tables. These corresponding entries across the multiple tables can be keyed by a same record identifier, a same timestamp, a same person identifier, a same device identifier, a same provider identifier, and/or a set of other key and/or unique fields of the multiple tables. As used herein, a record can designate an entry to a single table and/or a set of entries to multiple tables that correspond to a same data segment received from a data provider.

Some or all tables 1-X can be designated for data provided by a particular data provider, where all records of these tables are derived from data streams received from a same, single data provider. Alternatively or in addition, some or all tables 1-X can include records for data provided by multiple data providers. In such embodiments, these tables can include records for data provided by multiple data providers corresponding to a same type of data provider entity and/or otherwise corresponding to a same type of data, albeit collected via different data provider entities. For example, one or more tables can include records indicating cellular data received from multiple telecommunications companies. As another example, one or more tables can include transportation data received from multiple car companies. As yet another example, one or more tables can include geolocation data populated by data supplied by one or more telecommunications companies based on geolocation data collected by cellular devices, as well as data supplied by one or more car companies based on geolocation data collected by cars. In such embodiments, a provider identifier can be indicated in the record and/or can be otherwise mapped to the record to distinguish which data provider and/or data provider entity supplied the corresponding entry.

As a particular example, a first table can include records for geolocation data received from one or more telecommunications companies based on geolocation data collected by cellular devices, as well as data supplied by one or more car companies based on geolocation data collected by cars. These records can include fields populated by the supplied data, which can include: GPS data, coordinate data, or other location data indicated by the geolocation data; a device identifier identifying a particular car, cellular device, or other device that collected the geolocation data; a timestamp indicating when the geolocation data was collected by the corresponding device; and/or a provider identifier indicating which car company, telecommunications company, or other data provider entity supplied this data used to populate the entry. One or more other tables can indicate details regarding each device that collects geolocation data, for example, keyed by the device identifier. These other tables can include model number of the device, age of the device, venue that sold the device, a person identifier or other demographic information for a person that owns the device, etc. Another one or more tables can indicate details regarding different physical addresses or bounded geographic regions that can be indicated by the coordinate data and/or that the coordinate data can fall within, for example, indicating coordinates for boundaries of the bounded geographic region, identifying one or more particular establishments, venues and/or retailer that are located in the bounded geographic region, describing sales and/or other various aspects of the one or more particular establishments, venues and/or retailer, etc.

In some embodiments, these tables describing establishments at various locations can include data supplied by entirely different data providers, yet this data can be used in tandem with the geolocation data supplied by the car companies and/or telecommunications companies, for example, to generate analytics data indicating the patterns of establishments different types of people visit, the amount of time different types of people visit various types of establishments, etc. As a further example, another one or more tables can indicate credit card data supplied by one or more credit card companies, which can indicate transactional data for different people, indicated by person identifiers, at various establishments. This can be further utilized in tandem with the other data to generate analytics data that further indicates patterns in the amount of money and/or types of products purchased by different types of people at various establishments; correlations between purchase behavior across different establishments for certain types of people; how far different types of people are willing pay at one or more establishments as a function of how far these people drove from their home to the one or more establishments; and/or other analytically derived information utilizing data across these multiple tables.

This analytics data can be generated based on queries performed against the database system 112 by the query processing system 114, for example, in response to query requests received from user devices 140 based on user input by end users to GUI 345. The processing module 410 of the database system 112 can be utilized to execute such queries against the database system and/or to otherwise generate result sets and/or query output for received queries based on the tables 1-X. These resulting patterns or raw data of records generated based on execution of requested queries be delivered to these requesting end users devices and/or to different end users as query responses, for example, for display via GUI 345.

Figure 4D:
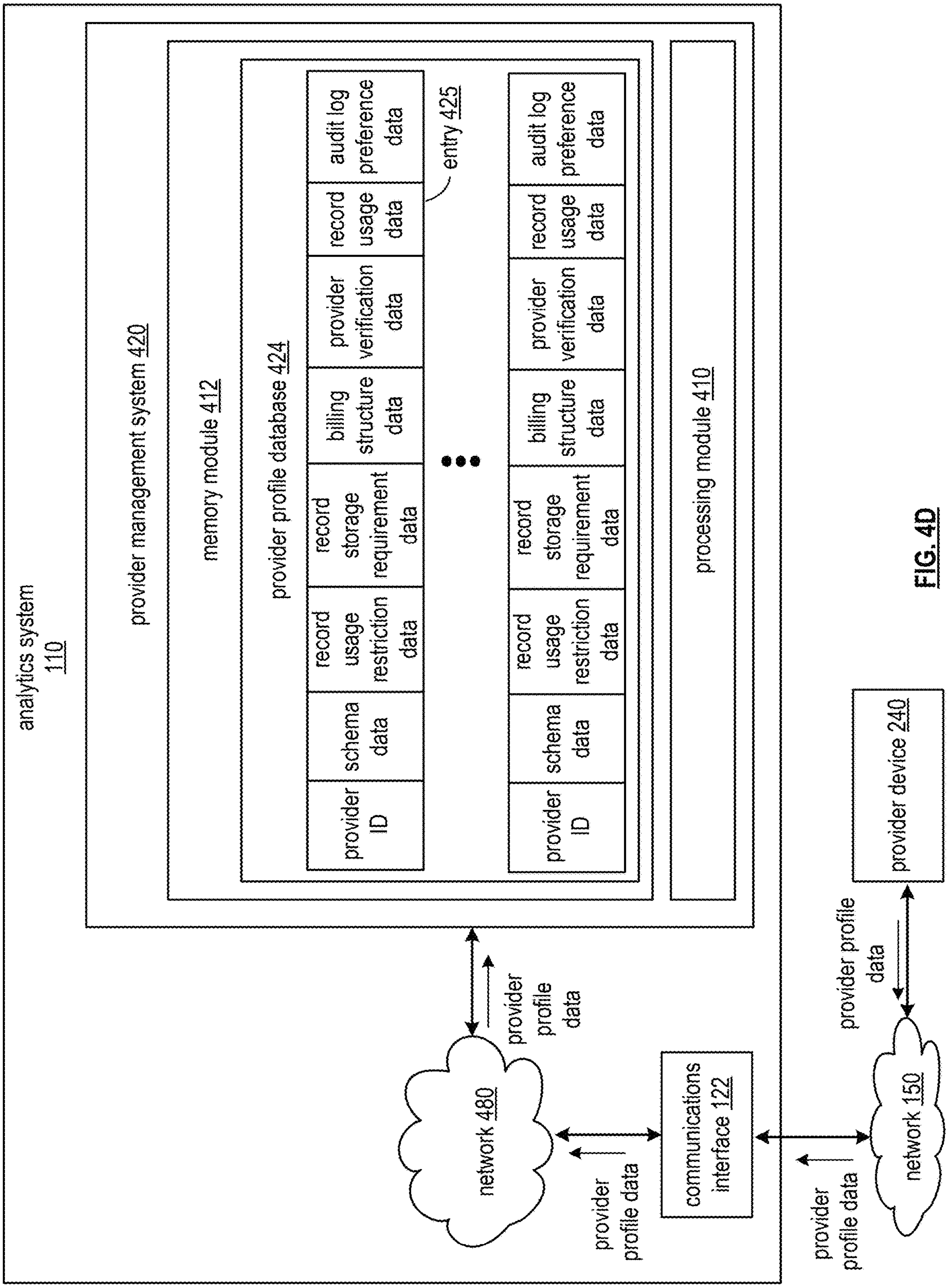
FIG. 4D is a schematic block diagram of an embodiment of an analytics system that utilizes a provider management system in accordance with various embodiments of the present invention.

FIG. 4D illustrates an example embodiment of provider management system 420. The provider management system 420 can store a provider profile database 424 that stores various provider profile data for one or more data providers. Each entry 425 to the provider profile database 424 can indicate information for a corresponding data provider entity, data provider 130, one or more data collection devices 1-M, and/or provider device 230, for example, keyed by a corresponding provider ID.

Some or all of the fields of an entry 425 can be populated based on provider profile data received from a provider device 230, for example, based on user input by a user associated with the corresponding data provider entity to GUI 245. Alternatively or in addition, some or all of the fields of an entry 425 can be populated by data generated automatically by the analytics system 110. While one embodiment of an entry 425 is shown, different embodiments may not include all of the fields illustrated in FIG. 4D and/or can include additional fields in entries 425 to provide additional information corresponding to the data provider entity.

Some or all of this provider profile data can be stored as a relational database. In some embodiments, the database system 112 is implemented to store the provider profile database 424 in at least one of the tables 1-X, and/or the provider ID can be mapped to records of the database system 112 whose data is supplied by the corresponding data provider.

An entry 425 for a particular provider can include schema data, which can indicate a data format of records included in one or more data streams transmitted by the corresponding data provider 130. This schema data can be utilized by the analytics system 110 to segment a data stream into data segments corresponding to individual records, to determine the types and/or formatting of one or more fields included in the data stream for each individual record, and/or to extract the values utilized populate fields of a record from corresponding data segments of a data stream.

An entry 425 for a particular provider can include record usage restriction data. Unrestricted access of the database system 112 by end users can lead to privacy concerns and licensing concerns for data providers. Furthermore, data providers may be required to adhere to data privacy requirements set by regulatory entities. To resolve these concerns, data providers can select and/or customize record usage restriction data, which can indicate a particular set of rules or other restrictions on the usage of their data by end users. As discussed in further detail herein, the record usage restriction data can be utilized by the query processing system 114 to ensure that data that was supplied by the data provider is queried and accessed in adherence with the rules administered by the data provider.

An entry 425 for a particular provider can include record storage requirement data. The encryption of data and/or geographic location of stored data can be of concern to data providers, especially if the data is particularly sensitive, is particularly valuable, and/or if the data providers are required to adhere to data privacy requirements set by regulatory entities. Data providers can select and/or customize record storage requirement data, which can indicate how and/or where different types of records and/or different types of fields supplied by the data provider are stored by the database system 112. The record storage requirement data can be utilized to write records supplied by the data provider to the database system, for example, by dictating how these records are encrypted and/or where these records are physically located.

An entry 425 for a particular provider can include billing structure data. Data providers can be incentivized to share their collected data with the analytics system via payments for usage of the data by particular end users and/or by the analytics system 110 as a whole. Data providers can select and/or customize a billing structure for the usage of their data. In particular, the billing structure data can indicate costs to end users and/or the analytics system for different numbers and/or types of queries performed on different types and/or numbers of fields for different types and/or numbers of records. For example, cost of a query can be a function of the number of records used in an aggregation and/or returned in a result set; can be a function of whether or not raw and/or aggregated data is returned; can be a function of the fields and/or combination of fields used and/or returned. The billing structure data can dictate costs and/or requirements for various subscription levels for end users, for example, where end users are granted greater access and/or querying capabilities on data supplied by the data provider if they have a higher level and/or higher cost subscription plan. Some or all of this billing structure data can be indicated in the set of rules indicated in the record usage restriction data, indicating the restriction of data usage as a function of cost and/or subscription level. The billing structure data can be utilized by the analytics system 110 to facilitate payments to the data provider entity, to charge end users based on their subscription level and/or usage of the data supplied by different providers, and/or to ensure that data that was supplied by the data provider is queried, accessed, and billed for in adherence with the billing structure and corresponding usage restrictions configured by the data provider.

An entry 425 for a particular provider can include provider verification data. The provider verification data can indicate provider account credentials, encryption key data, and/or verification requirements set by the provider in the provider profile data and/or generated by the analytics system as a requirement of the analytics system to verify providers. In particular, the provider verification data can be utilized by the analytics system 110 to verify that data streams were indeed collected by the corresponding data provider entity; that these data streams were not corrupted in their transmission from the data provider 130 and/or in transmission from their original data collection device; and/or that data streams were not fabricated and/or by a faux providing entity seeking payment from end users for falsified data and/or maliciously obtained data from a true providing entity. This can increase the integrity of the data stored in database system 112, helping to ensure that end users are accessing authentic data that was actually supplied by a verified data provider, and further helping to ensure that only verified data providers are allowed to benefit from supplying their own data.

An entry 425 for a particular provider can include record usage data. This can indicate various metrics indicating amount and/or type of usage of various records provided by the data provider over time and/or within a current timeframe. This can further indicate and/or be generated based on particular records accessed by particular users over time. This can be utilized to determine billing by particular end users and/or by the analytics system 110 as a function of amount and/or type of queries performed on data, for example, in each of a series of billing periods.

An entry 425 for a particular provider can include audit log preference data. This can indicate customized preferences regarding generation of audit logs for the provider, as discussed in conjunction with FIG. 4I and/or FIG. 9C. The audit log preference data can indicate frequency of generation and/or transmission of audit logs; filtering parameters indicating which types of usage log entries should be included in audit logs; device identifiers and/or account identifiers for particular recipients for the audit logs; summary metric preferences indicating one or more aggregating functions to be performed on usage log entries to generate the audit logs; and/or other formatting, layout, and/or viewing preferences for audit logs.

Figure 4E:
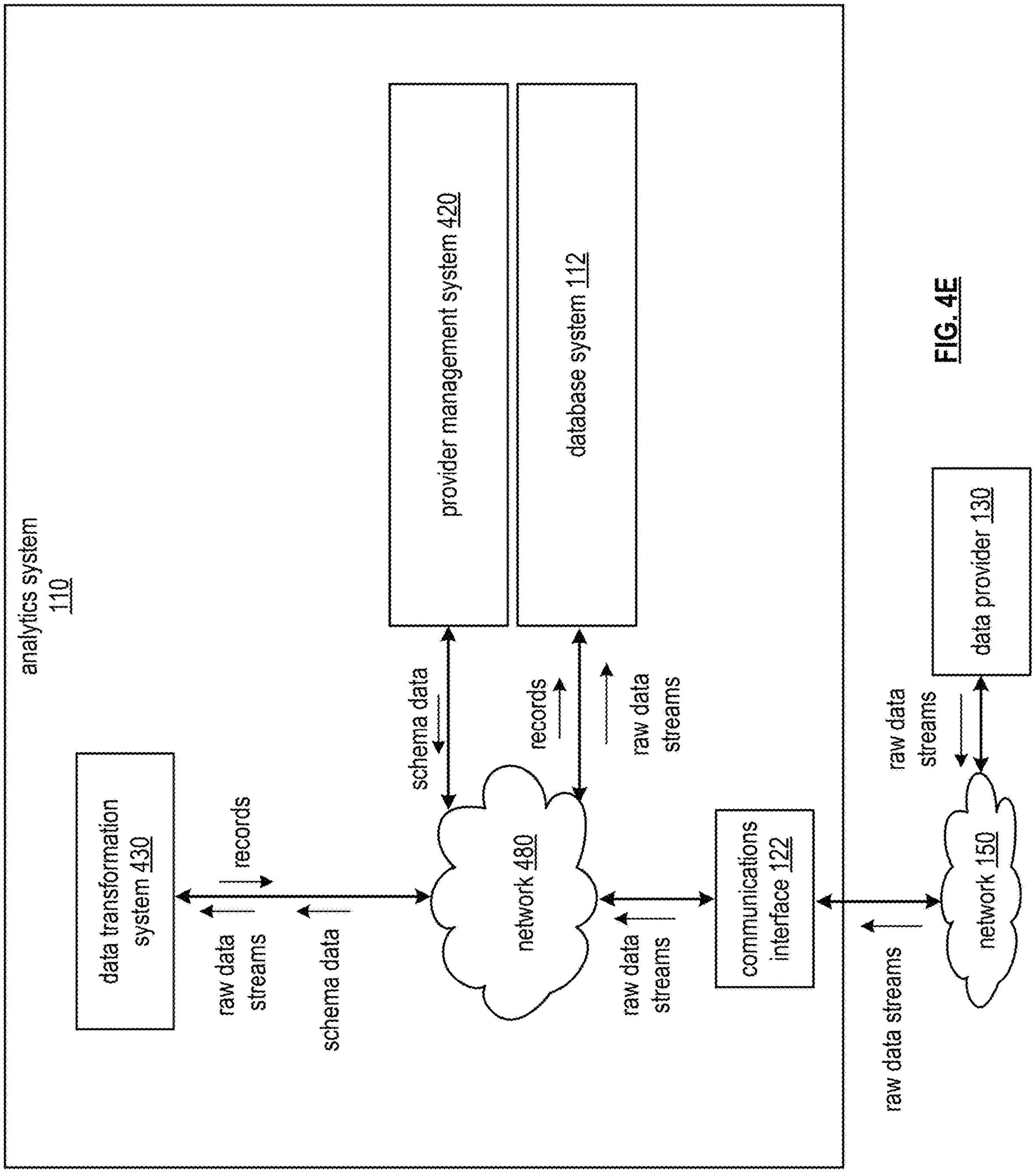
FIG. 4E is a schematic block diagram of an embodiment of an analytics system that utilizes a data transformation system in accordance with various embodiments of the present invention.

FIG. 4E illustrates an embodiment of data transformation system 430. Data transformation system 430 can be utilized by the analytics system to process raw data received from data providers 130. In particular the data transformation system 430 can parse, clean, normalize, aggregate, and/or standardize some or all incoming data streams from some or all data providers to generate some or all of the records stored in the database system 112. In some embodiments, schema data utilized by the data providers is known to the data transformation system and/or accessed from provider profiled data stored in the provider management system 420. The data transformation system can utilize the schema data to process the data streams into records accordingly.

In some embodiments, the schema data for multiple providers providing data for records in the same set of tables is consolidated by the data transformation system to generate standard schema data, for example, to most broadly capture the type and granularity of fields collected across multiple data providers for the same type of data and/or to optimize storage of the data. In some embodiments, record usage history can be utilized by the data transformation system to optimize a storage scheme for the data across multiple tables based on optimizing access of the records in the future.

In some embodiments, multiple distinct records derived from the same data are generated by the data transformation system to populate the database system 112. In such embodiments, a cleaned and/or otherwise derived record generated from a raw record by the data transformation system can augment a raw record in the database system 112, where both the cleaned record and the raw record are stored. Alternatively, a cleaned record can be stored instead of a raw record. In some embodiments, a cleaned record can be generated as a function of multiple raw records, representing summary data and/or an aggregation of data supplied in multiple records.

In some embodiments, the data transformation system is implemented by some or all data providers 130. In such embodiments, standard schema data can be transmitted to the data providers 130 to dictate how the data streams should be formatted by the data provider 130.

Figure 4F:
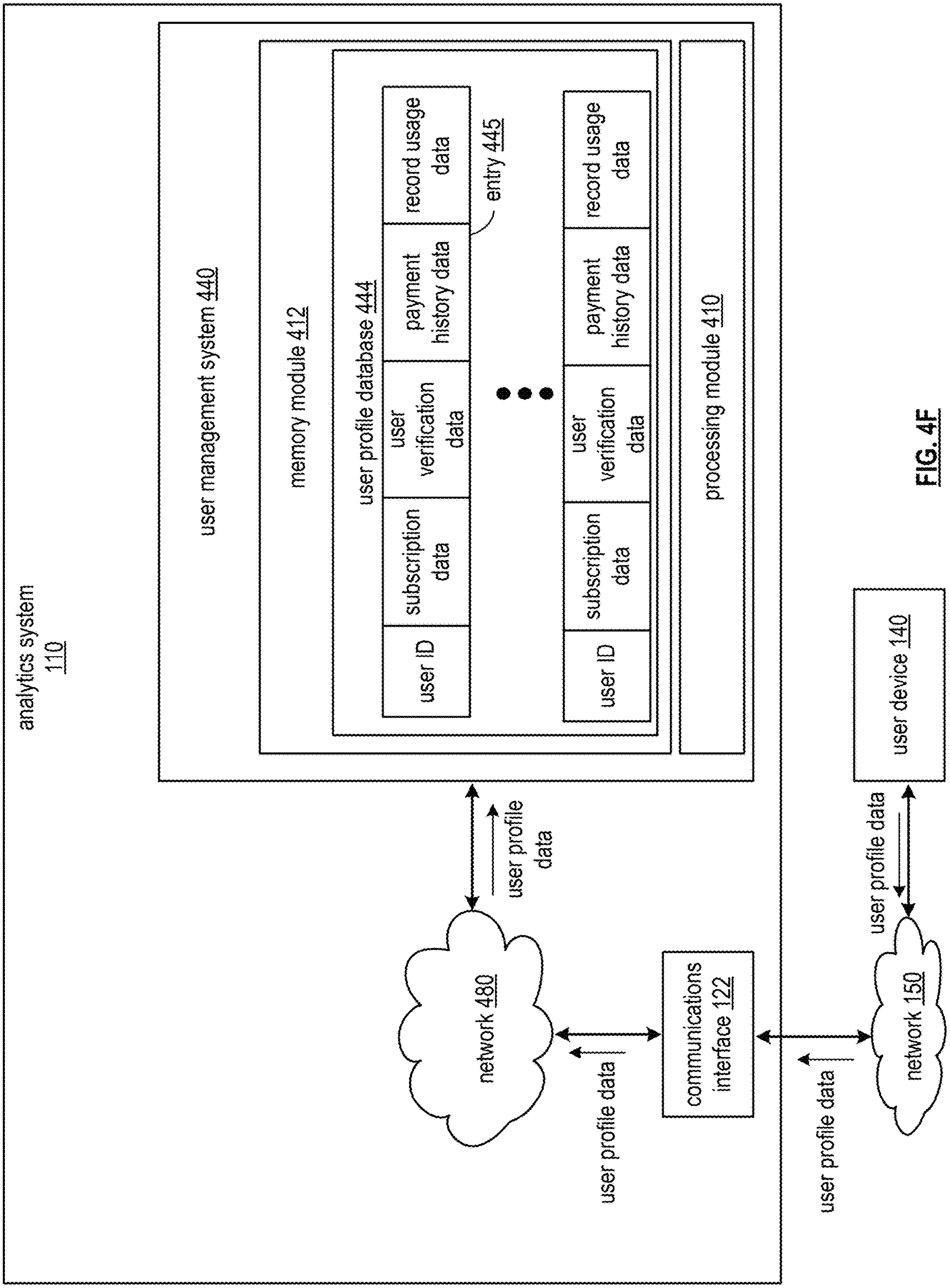
FIG. 4F is a schematic block diagram of an embodiment of an analytics system that utilizes a user management system in accordance with various embodiments of the present invention.

FIG. 4F illustrates an example embodiment of a user management system 440. The user management system 440 can store a user profile database 444 that stores various user profile data for one or more end users of the analytics system 110. As used herein, an end user can correspond to a single person and/or single account holder that uses and/or owns one or more corresponding user devices 140. An end user can alternatively or additionally correspond to an entity, such as a company that accesses the data of database system 112. In such embodiments, one or more individual users of one or more user devices 140 can query the database system 112 and/or otherwise interact with the analytics system 110 via GUI 345 as discussed herein on behalf of the entity. An entry to the user profile database 444 can thus detail profile data for an end user corresponding to an individual person and/or an entity as a whole.

Each entry 445 to the user profile database 444 can indicate information for a corresponding end user, for example, keyed by a user ID. Some or all of the fields of an entry 445 can be populated based on user profile data received from a user device 140, for example, based on user input by an end user to GUI 345. Alternatively or in addition, some or all of the fields of an entry 425 can be populated by data generated automatically by the analytics system 110. While one embodiment of an entry 445 is shown, different embodiments may not include all of the fields illustrated in FIG. 4F and/or can include additional fields in entries 445 to provide additional information corresponding to the end user.

Some or all of this user profile data can be stored as a relational database. In some embodiments, the database system 112 is implemented to store the user profile database system 444 in at least one of the tables 1-X, and/or the user ID can be mapped to records of the database system 112 accessed by the end user and/or associated with the end user.

An entry 445 for a particular end user can include subscription data. This can indicate which subscription level the user is subscribed to for one or more different data provider entities and/or which subscription level for which the user has met billing requirements for one or more different data provider entities. In such embodiments, the end user can select and/or provide payment for their desired subscription level, which can be the same or different for different data providers. Alternatively or in addition, the subscription data can be automatically populated to indicate which subscription level has been reached by the user, determined automatically by the analytics system 110 based on the end user's usage of data in a most recent billing period and/or over time. This can require that the end user provide payment in response to reaching the corresponding subscription level in a given billing period.

An entry 445 for a particular end user can include user verification data. The user verification data can indicate provider account credentials and/or encryption key data utilized by the analytics system 110 to verify that user devices transmitting query requests were indeed sent by a verified end user that is authorized to and/or has sufficient subscription level to receive the resulting result set in a query response. This can further be utilized to track which queries were performed for each of a plurality of end users.

An entry 445 for a particular end user can include payment history data. This can indicate payments the user has made in a billing period or across multiple billing periods to the analytics system and/or for designation to individual data provider entities. This can be utilized by the analytics system 110 to automatically determine which subscription level the user has paid for, and thus can set the subscription level of the subscription data of the entry 445 automatically for one or more data providers and/or for the analytics system as a whole. This can further be utilized to track payment by the user in accordance costs of performing individual queries set by the billing structure data of one or more data providers.

An entry 445 for a particular end user can include record usage data. This can indicate various metrics indicating amount and/or type of usage by the end user of various records, provided by one or more particular data providers, over time and/or within a current timeframe. This can be utilized to determine billing and/or subscription level of the end users and/or by the analytics system 110 as a function of amount and/or type of queries performed on data, for example, in each of a series of billing periods. This can further be utilized in determining whether any threshold maximum usage set by particular providing entities in their record usage restriction data has been reached by the user within a current timeframe and/or over time.

Figure 4G:
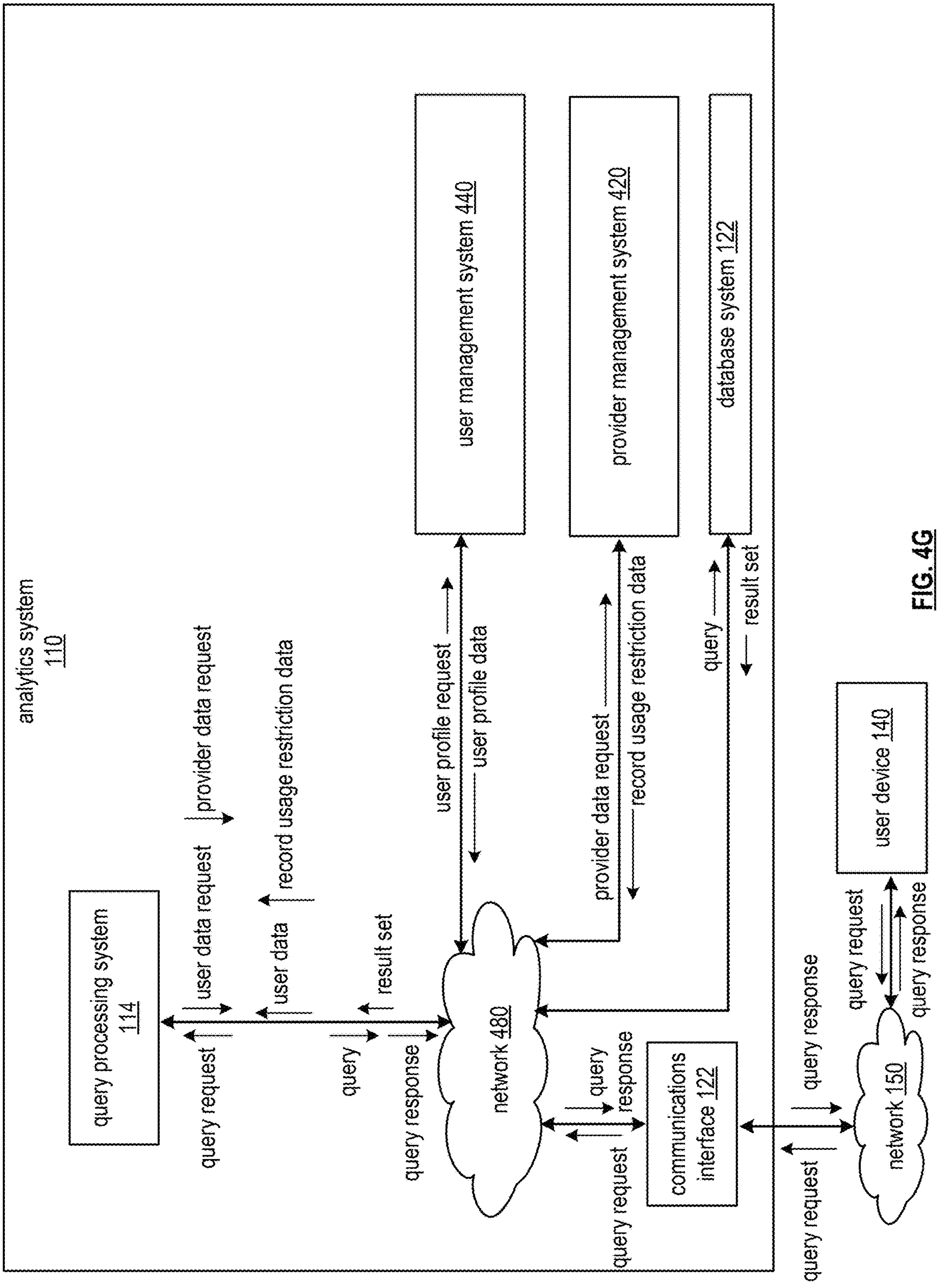
FIG. 4G is a schematic block diagram of an embodiment of an analytics system that utilizes a query processing system that communicates with a user management system and/or a provider management system in accordance with various embodiments of the present invention.

FIG. 4G illustrates an example embodiment of a query processing system 114 that utilizes user profile data from the user management system 440 and/or provider profile data from the provider management system 420 to evaluate queries and/or result sets. As will be discussed in further detail herein, the query processing system can evaluate whether or not to execute a query against the database system 112 based on processing of this information, and/or can evaluate whether or not to return a resulting result set to an end user based on processing of this information.

The query processing system 114 can retrieve provider data such as rules indicated in record usage restriction data from the provider management system 420. This can include sending a provider data request to the provider management system 420 and receiving record usage restriction data or other provider profile data for one or more data providers in response. This can further include indicating a particular provider identifier in the provider data request in response to receiving a query request that involves usage of data supplied by a data provider associated with the provider identifier and/or in response receiving a result set that includes and/or is derived from data supplied by a data provider associated with the provider identifier. In response, the provider management system 420 can send record usage restriction data for the identified data provider entity to the query processing system 114. The query processing system can utilize the record usage subscription data for a particular provider to evaluate the query of this query request and/or this corresponding result set generated by executing the query against the database system 112. Alternatively or in addition, record usage restriction data for multiple data providers can be retrieved and stored locally for usage by the query processing system in evaluating future queries and/or result sets. For example, record usage restriction data can be sent to the query processing system in response to being updated in provider profile data by the data provider entity.

The query processing system 114 can retrieve user data such as a subscription data and/or record usage data from the user management system 440. This can include sending a user data request to the user management system 440 and receiving subscription data, record usage data, or other user profile data for one or more end users in response. This can further include indicating a particular user identifier in the user data request in response to receiving a query request from a corresponding end user. In response, the user management system 440 can send subscription data and/or record usage data for the identified end user to the query processing system 114. Furthermore, a particular provider identifier can be indicated in response to the query request involving usage of data supplied by a data provider associated with the provider identifier and/or in response receiving a result set that includes and/or is derived from data supplied by a data provider associated with the provider identifier. In response, the user management system 440 can send record usage data for identified end user, specific to data supplied by the data provider, to the query processing system 114. Similarly, the user management system 440 can subscription data for the identified end user, specific to their subscription with the specified data provider, to the query processing system 114. The query processing system can utilize the subscription data and/or record usage data for a particular end user to evaluate the query of the query request received from the end user and/or the corresponding result set generated by executing the query against the database system 112.

Alternatively or in addition, subscription data and/or record usage data for multiple users can be retrieved and stored locally for usage by the query processing system in evaluating future queries and/or result sets. For example, subscription data can be automatically sent to the query processing system by the user management system 440 in response to being updated in user profile data by the end user and/or by an automatic determination. As another example, record usage data can be sent to the query processing system by the user management system 440 in response to being updated in user profile data based recent usage of records of the database system 112.

Figure 4H:
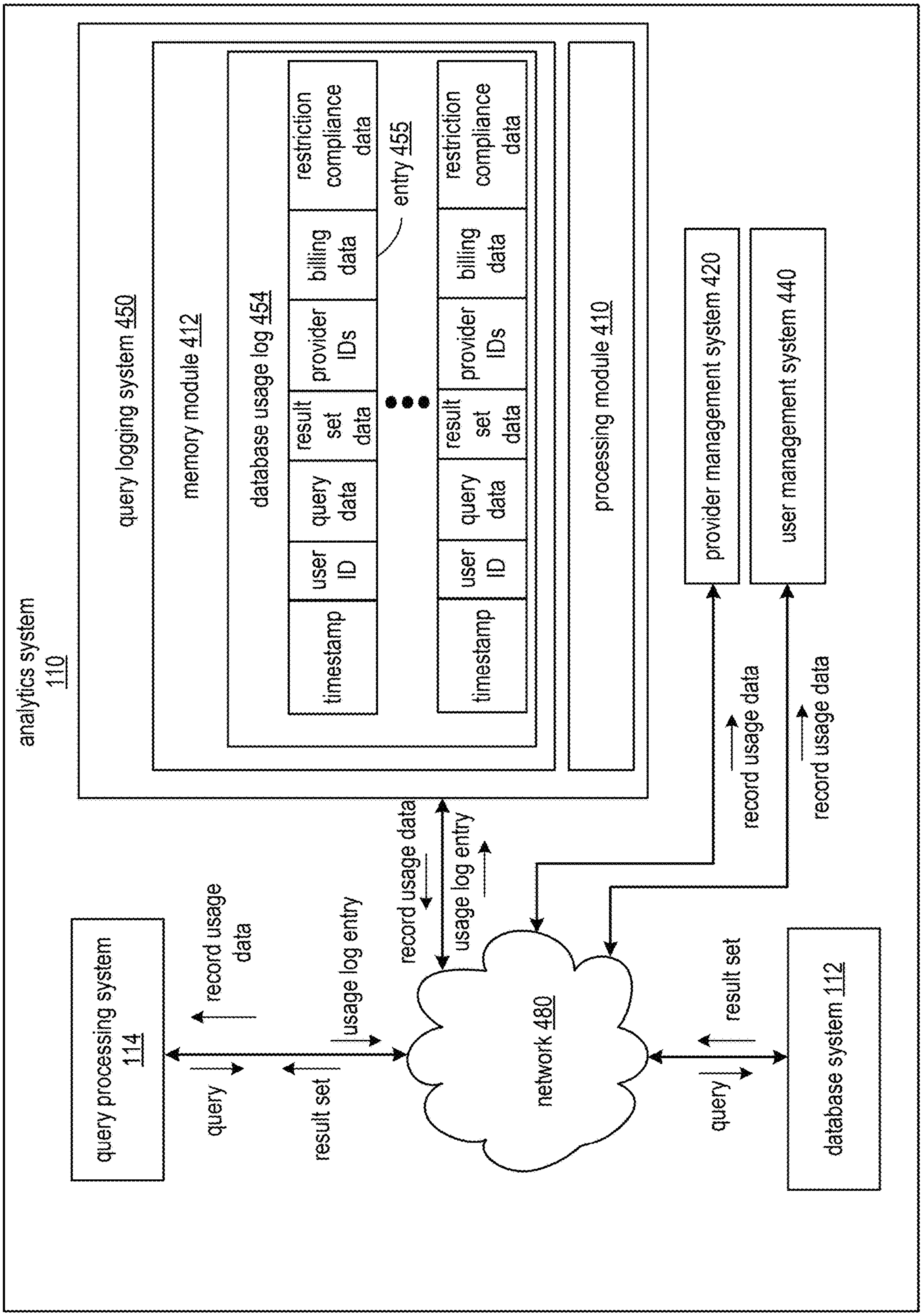
FIG. 4H is a schematic block diagram of an embodiment of an analytics system that utilizes a query logging system in accordance with various embodiments of the present invention.

FIG. 4H illustrates an example embodiment of a query logging system 450. The query logging system 450 can store a database usage log 454 that stores a plurality entries 455 logging some or all queries to the database system 112 over time. As used herein, a query with a corresponding entry 455 can correspond to a query that executed against the database system, where a result of the query was transmitted to the requesting end user. In some cases, a query with a corresponding entry 455 can correspond to a query that was partially and/or fully executed against the database system where the result of the query was determined not to be transmitted to the requesting end user. In some cases, a query with a corresponding entry 455 can correspond to a query that was received in a query request, but was determined not to be executed against the database system. As used herein, a query can correspond to a single query and/or can correspond to a plurality of queries in a same transaction, for example, where the transaction including the multiple queries was received from a same user device 140 in a single query request or in a series of query requests.

An entry 455 for a particular query can include a timestamp, indicating a time and/or temporal period at which the query was received by the analytics system 110, a time and/or temporal period at which the execution of the query against the database system 112 commenced, and/or a time and/or temporal period at which the execution of the query against the database system 112 was completed. Alternatively or in addition, the entry 455 can include a unique query identifier and/or an identifier indicating an ordering at which the query was executed relative to other queries logged in the database usage log.

An entry 455 for a particular query can include a user ID, indicating an identifier of a particular end user that generated and/or transmitted the query request that included the query. This user ID can thus map to a corresponding entry 445 in the user management system 440.

An entry 455 for a particular query can include query data, indicating information about the query itself. This can include some or all of the original query request and/or some or all of the query executed against the database system 112. This can include identifiers indicating one or more query functions included in the query and/or can include domain data indicating one or more tables, fields, and or records involved in the query.

An entry 455 for a particular query can include result set data. This can include the output that resulting from execution of the query against the database system 112 at the time of the query. This can include intermediate values and/or intermediate result sets generated in executing the query. This can indicate a number of records included in the result set and/or record identifiers for records included in the result set. This can indicate a number of records utilized in an aggregation and/or other query function utilized to produce the result set. This can indicate whether or not the result set included raw values of one or more fields. This can indicate a number of fields included in the result set as raw or derived values and/or identifiers for a set of fields included in the result set as raw or derived values.

An entry 455 can include one or more provider IDs. This can include provider IDs responsible for providing the data for any records that were utilized in executing the query. This can include provider IDs for any records included in the result set. In some cases, each provider ID can each be mapped to corresponding records indicated in the result set data of the entry.

An entry 455 can include billing data. The billing data can indicate line item and/or total costs for execution of the query. The billing data can indicate multiple costs corresponding to multiple subscription levels and or can indicate the costs for a particular subscription level for the end user that sent the query request. The billing data can subdivide costs for each of a plurality of data provider entities associated with the request, for example, denoted by their corresponding provider IDs. The billing data can be generated automatically by the query logging system and/or can be generated and received from another subsystem 405, such as the query processing system 114.

An entry 455 can include restriction compliance data. This can include information regarding whether or not the query and/or result set met one or more requirements of the record usage restriction data for one or more corresponding providers. This can further include an indication of whether or not the query was executed and/or whether or not the result set was transmitted back to the end user. This can further include indications of one or more reasons that the corresponding query was not executed. For example, one or more particular rules of the record usage restriction data that were not adhered to in the query can be indicated and/or one or more portions of the query that did not adhere to one or more corresponding rules of the record usage restriction data can be indicated. Similarly, one or more particular rules of the record usage restriction data that were not adhered to in the final result set and/or in intermediate results can be indicated and/or one or more portions of the final result set and/or in intermediate results that did not adhere to one or more corresponding rules of the record usage restriction data can be indicated. This can further indicate which providers, such as a single provider or proper subset of providers involved in the query, had rules that were adhered to and/or had rules that were not adhered to in the query and/or result set.

Some or all of this query usage information can be stored as a relational database. In some cases, the database system 112 can store the database usage log 454 in at least one of the tables 1-X. An entry for a query of the database usage log 454 can be otherwise mapped to record identifiers in the database system 112 for records involved in the corresponding query; can be otherwise mapped to a user identifier in the user management system 440 for an end user that requested the corresponding query; and/or can be otherwise mapped to one or more provider identifiers in the management system 420 for providers that supplied records utilized in the corresponding query. While one embodiment of an entry 455 is shown, different embodiments may not include all of the fields illustrated in FIG. 4H and/or can include additional fields in entries 455 to provide additional information corresponding a query.

The entries 455 of the query logging system 450 can be accessed and/or processed, for example, by the query processing system 114, to determine and/or summarize previous usage of records in the database system by various end users. This can be utilized to determine previous usage data for individual end users. This can further be utilized to determine the value and/or demand of various records and/or fields, based on determining which particular records, which types of records, and/or which fields individually and/or in tandem are most frequently accessed by particular types of end users and/or across all end users. This can be utilized to track rates of compliance with various rules indicated in the record usage restriction data, for particular end users or across all end users, based on the restriction compliance data for queries logged over time.

As illustrated in FIG. 4H, the usage log entries 455 can be generated automatically by the analytics system 110, for example, by the query processing system 114. In particular, the query processing system 114 can determine values and/or other information for some or all of the fields of an entry 455, for example, in response to receiving a query request from a user device 140, in response to initiating execution of a query against the database system 112, and/or in response to receiving a result set in response to execution of a query. Information regarding the query request, query, and/or result set can be utilized to generate the corresponding usage log entry, and the usage log entry can be sent to the query logging system 450 for storage. Alternatively or in addition, other subsystems 405 can automatically determine when query requests have been received and/or when queries have been executed, and some or all of the information of a usage log entries 455 can be generated automatically by these other subsystems 405.

Information regarding usage log entries can also be sent to the provider management system 420 and/or the user management system 440 as record usage data. Some or all record usage data can be sent automatically, for example in response to being received for storage in the database usage log 454; in predefined intervals; in response to receipt of a corresponding request from the provider management system 420 and/or the user management system 440. For example, the provider management system 420 can request record usage data derived from usage log entries 455 indicating one or more particular data providers, denoted by their corresponding provider IDs. Similarly, the user management system 440 can request record usage data derived from usage log entries 455 indicating one or more particular end users, denoted by their corresponding user IDs.

The record usage data sent by query logging system can include values of one or more fields of one or more usage log entries. Alternatively or in addition, the record usage data sent by query logging system can include log identifiers that identify particular entries 455 of the database usage log 454. Alternatively or in addition, the query logging system can aggregate one or more usage log entries, for example, within a particular time period for one or more particular end users and/or for one or more particular providers. For example, the provider management system 420 and/or user management system 440 can send a query to the query logging system 450, and can receive raw and/or aggregated usage log entries based on the query logging system executing the query against the database usage log 454. The received record usage data can be stored by the provider management system 420 in corresponding entries 425 and/or can be stored by the by the user management system 440 in corresponding entries 445, respectively.

Figure 4I:
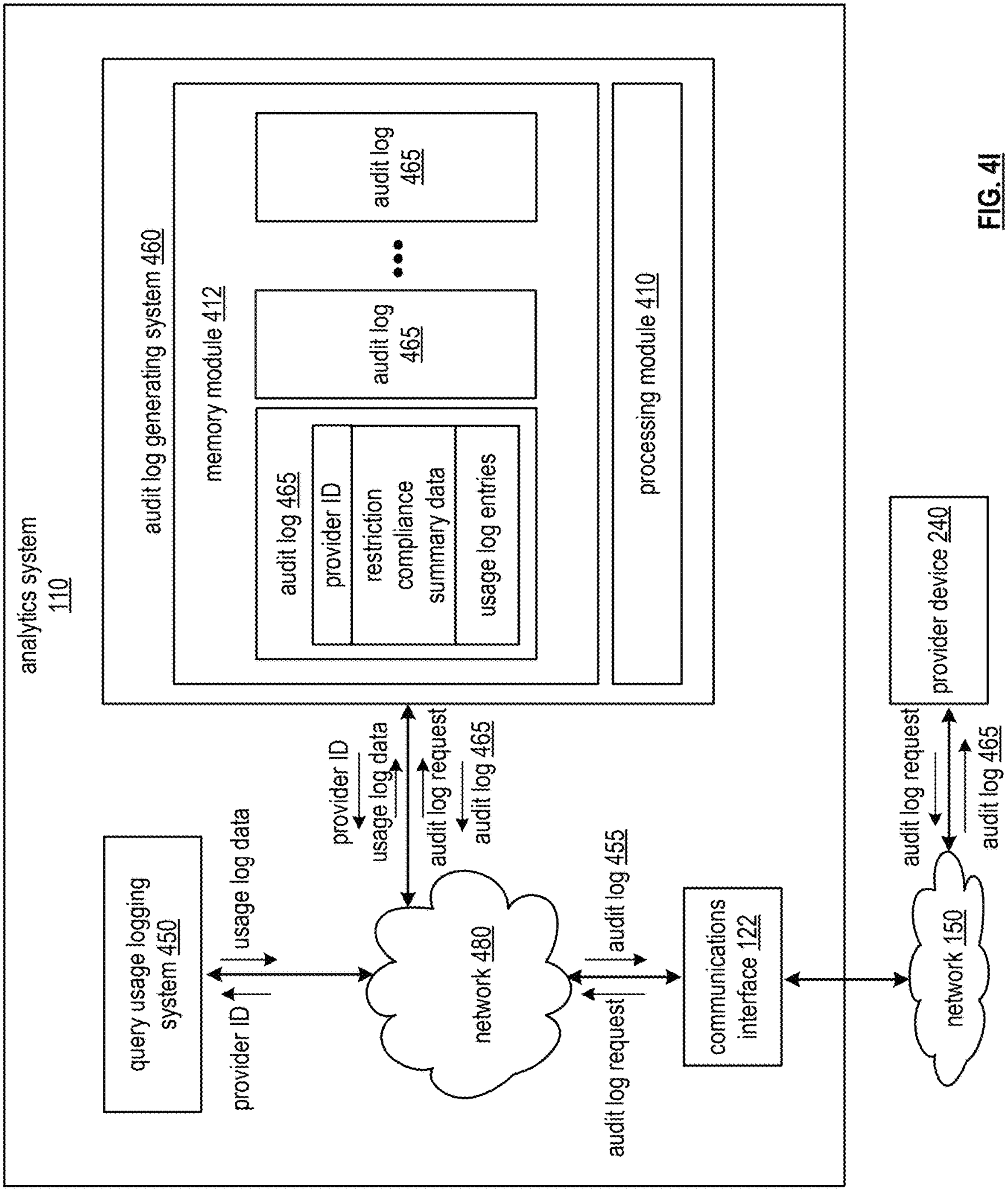
FIG. 4I is a schematic block diagram of an embodiment of an analytics system that utilizes an audit log generating system in accordance with various embodiments of the present invention.

FIG. 4I illustrates an example embodiment of an audit log generating system 460. The audit log generating system 460 can generate audit logs 465 based on usage log entries received from the query logging system 450 and/or based on record usage data received from the provider management system 420 and/or the user management system 440. These audit logs can indicate individual and/or aggregate restriction compliance data of a plurality of usage log entries 455, for example, for a particular provider within a particular timeframe. These audit logs 465 can be automatically generated by the audit log generating system, for example, in predefined intervals; in response to at least a threshold number of new queries for a particular provider and/or overall being logged in the query logging system; based on audit log preference data of an entry 425 of the provider management system, and/or in response to receiving an audit log request requesting an audit log, for example, from a provider device 230. The resulting audit log 465 can be transmitted to a corresponding provider device 230, for example, for display by via GUI 245. Audit logs can be requested by and/or transmitted to particular data providers, overarching regulatory entities, and/or administrators of the analytics system 110.

As illustrated in FIG. 4I, an audit log 465 can indicate a provider ID for which the audit log pertains. An audit log 465 can further include regulatory compliance summary data, which can include aggregated and/or other summary information derived from the restriction compliance data of one or more usage log entries 455. For example, the audit log can indicate a number and/or percentage of queries and/or result sets determined to comply with each of a set of rules of the record usage restriction data, for example, from a proper subset of all queries that invoked the each of the set of rules. Alternatively or in addition, the audit log 465 can include raw and/or line item restriction compliance data for a plurality of individual usage log entries.

In some embodiments, an audit log request can indicate a particular provider, one or more particular users, a particular timeframe; a particular subset of rules of record usage restriction data; an indication of whether to include queries that passed and/or queries that failed; aggregation functions to be performed on usage log entries 455 to generating the audit log 465; and/or other information regarding which information should be included in the audit log and/or how the information should be processed to generate the audit log. In some cases, the audit log request can indicate a query to be performed by the audit log generating system 460 against the database usage log 454, user management system 440, and/or provider management system 420 to generate the audit log 465. The audit log generating system 460 can extract the requirements specified in the audit log request for usage in generating a corresponding audit log 465 accordingly.

For example, an audit log request can indicate that only usage log entries 455 for provider X that were processed within the last month and that failed to adhere to a particular rule invoked by the restriction usage restriction data of provider X. Alternatively or in addition, the audit log generating system can automatically determine the query to be performed against the database usage log 454, user management system 440, and/or provider management system 420, for example, based on the audit log preference data included in an entry 425 of a corresponding provider in the provider profile database 424, based on other predefined audit log configurations, and/or based on another determination made by the audit log generating system 460. For example, the audit log generating system 460 can receive the audit log preference data for one or more providers from the provider management system 420, and can generate the audit logs for each provider in accordance with their audit log preference data.

In some embodiments, audit logs can be requested from and/or transmitted to other entities, such as client devices associated with regulatory entities that oversee usage of data by data provider entities and/or the analytics system 110. In such embodiments, an audit log can contain information pertaining to multiple providers, such as all of the providers that supply data to the database system 112.

These analytics subsystems 405 of FIGS. 4A-4I enable the analytics system 110 to perform various requested queries on data received from multiple data providers, while ensuring that individual data usage requirements set by different data providers are adhered to in each query. Furthermore, each data provider can be assured that their individual data usage requirements are enforced by the analytics system 110 via the automatic generation of customizable audit logs detailing how the analytics system has accepted and/or rejected various queries based on whether they adhere to the requirements set by each provider.

At least these features present improvements over existing systems by: enabling individual data providers to customize their own set of rules restricting usage of their data; enabling enforcement of different sets of rules for queries upon data supplied by different data providers; logging this enforcement of usage restrictions for each query over time; and/or aggregating the logged enforcement of usage restrictions as customizable audit logs for transmission back to data providers and/or regulatory entities. These improvements are advantageous because they can: increase data privacy in analytics systems; enhance a data providers' ability to license various usage of their data at different costs and/or at differing subscription levels; enable differentiation in stringency of usage restrictions for differing query functions performed upon data of differing volume and/or sensitivities, supplied by differing providers, by users at differing subscription levels; and/or increase opacity of enforcement of usage restrictions via the generation and transmission of audit logs.

Figure 5A:
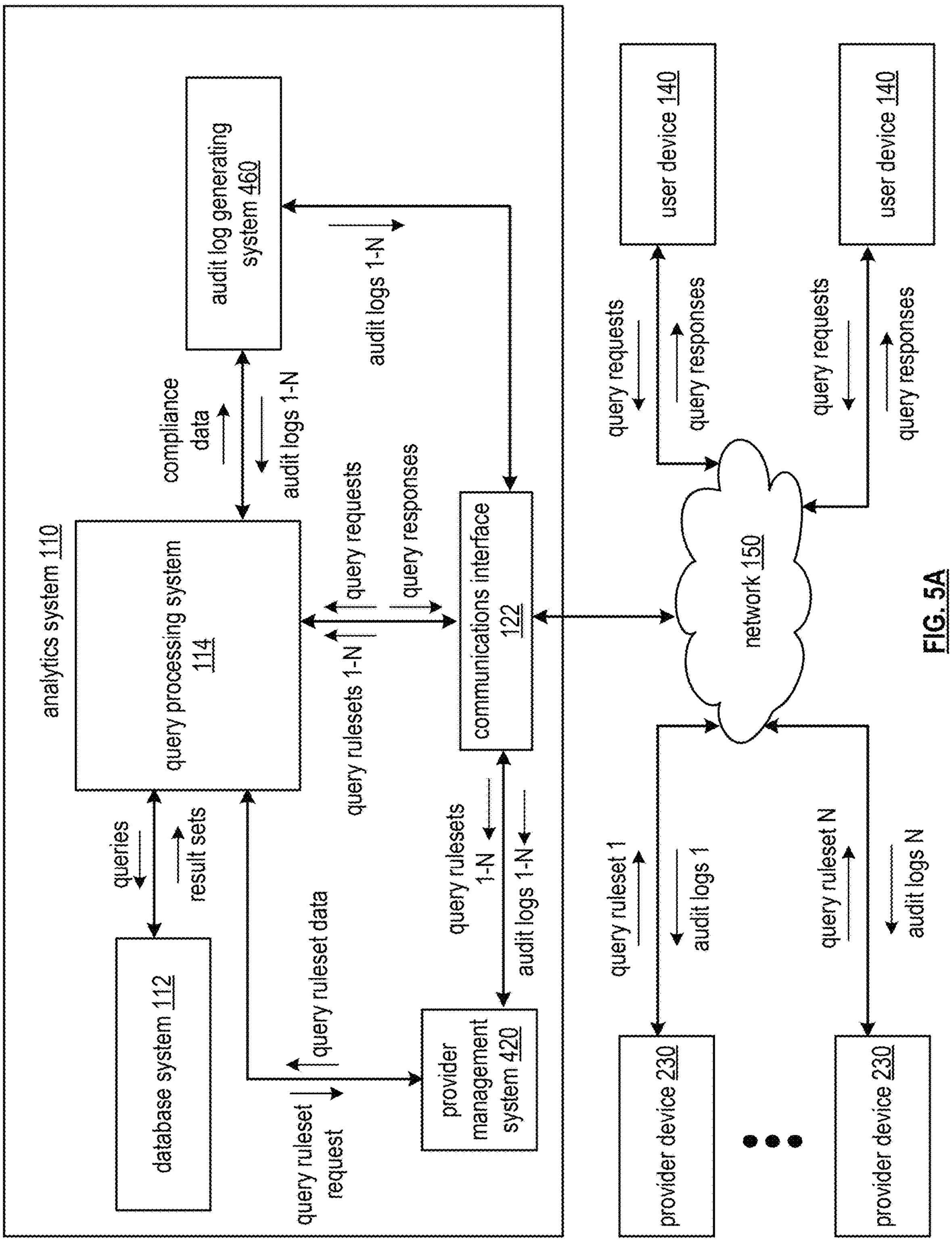
FIG. 5A is a schematic block diagram of an embodiment of an analytics system in accordance with various embodiments of the present invention.

FIG. 5A illustrates an example embodiment of an analytics system 110 operable to function with this enhanced functionality. A plurality of provider devices 230 associated with a plurality of data provider entities 1-N can each generate, via GUI 245, record usage restriction data that includes a query ruleset. These query rulesets 1-N can be transmitted to the analytics system 110 for storage by the provider management system 420 and/or for usage by query processing system 114. A plurality of user devices 140 can send query requests to the analytics system 110, and the query processing system can process each query request in conjunction with the query rulesets 1-N in querying the database system 112 and processing the corresponding result set to generate a query response, which can include the result set or can indicate that the query did not comply with at least one rule of the query rulesets 1-N. The query response can be sent back to the corresponding user device 140. Furthermore, compliance data generated in comparing the query and/or result set to some or all of the query rulesets 1-N can be sent to the audit log generating system 460 directly, and/or can be sent to the audit log generating system 460 as restriction compliance data retrieved from a usage log entry for the query in database usage log 454. The audit log generating system 460 can utilize compliance data generated across multiple queries sent by multiple users to generate an audit log for each of the data provider entities 1-N. These audit logs 1-N can be transmitted to the corresponding provider devices 230 for display via GUI 245 and/or can be stored by the provider management system 420 in corresponding provider profile entries for subsequent access by the corresponding data provider entity.

Figure 5B:
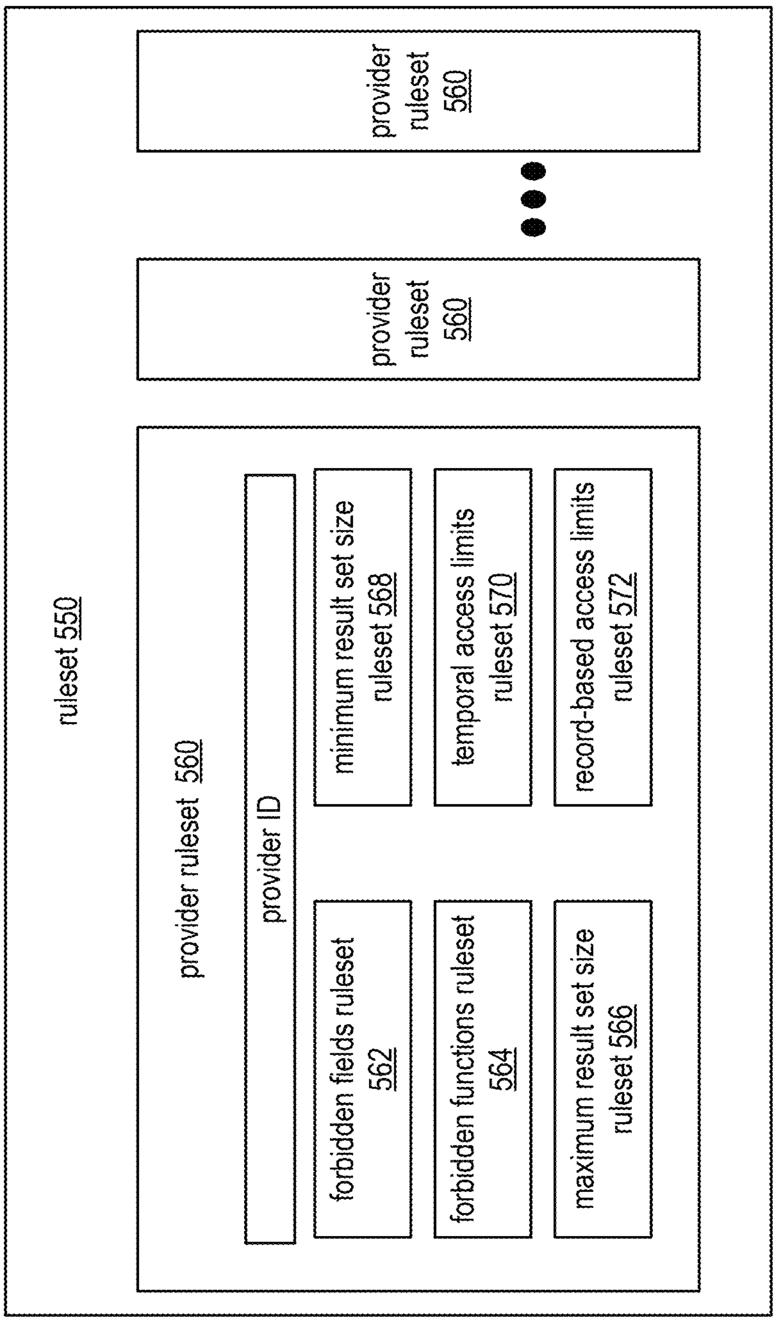
FIG. 5B illustrates an example embodiment of a ruleset in accordance with various embodiments of the present invention.

FIG. 5B illustrates an embodiment of a ruleset 550 that can be stored by the analytics system 110 for utilization by the query processing system 114. The ruleset 550 can include a plurality of provider rulesets 560, for example, where each of the query rulesets 1-N of FIG. 5A are implemented utilizing provider ruleset 560 and/or where the record usage restriction data of an entry 425 of provider profile database 424 indicates and/or maps to the provider ruleset 560 for the corresponding provider. A provider ruleset 560 can indicate and/or be mapped to a provider ID of the data provider that generated the rules and/or for which the provider ruleset 560 otherwise applies.

A provider ruleset 560 can include a plurality of different types of rulesets. A provider ruleset 560 can include a forbidden fields ruleset 562; a forbidden functions ruleset 564; a maximum result set size ruleset 566; a minimum result set size ruleset 568; a temporal access limits ruleset 570; a record-based access limits ruleset 572; and/or additional rulesets that indicate requirements for usage of their data by end users. Each of these rulesets can include one or more rules for the particular provider.

While not depicted in FIG. 5B, the ruleset 550 can indicate a forbidden fields ruleset 562; a forbidden functions ruleset 564; a maximum result set size ruleset 566; a minimum result set size ruleset 568; a temporal access limits ruleset 570; a record-based access limits ruleset 572, where each of these rulesets includes corresponding provider rules provided across some or all providers. As used herein, the forbidden fields ruleset 562; a forbidden functions ruleset 564; a maximum result set size ruleset 566; a minimum result set size ruleset 568; a temporal access limits ruleset 570; a record-based access limits ruleset 572 can each include rules corresponding to a particular provider, and/or can include rules for multiple providers.

Figure 5C:
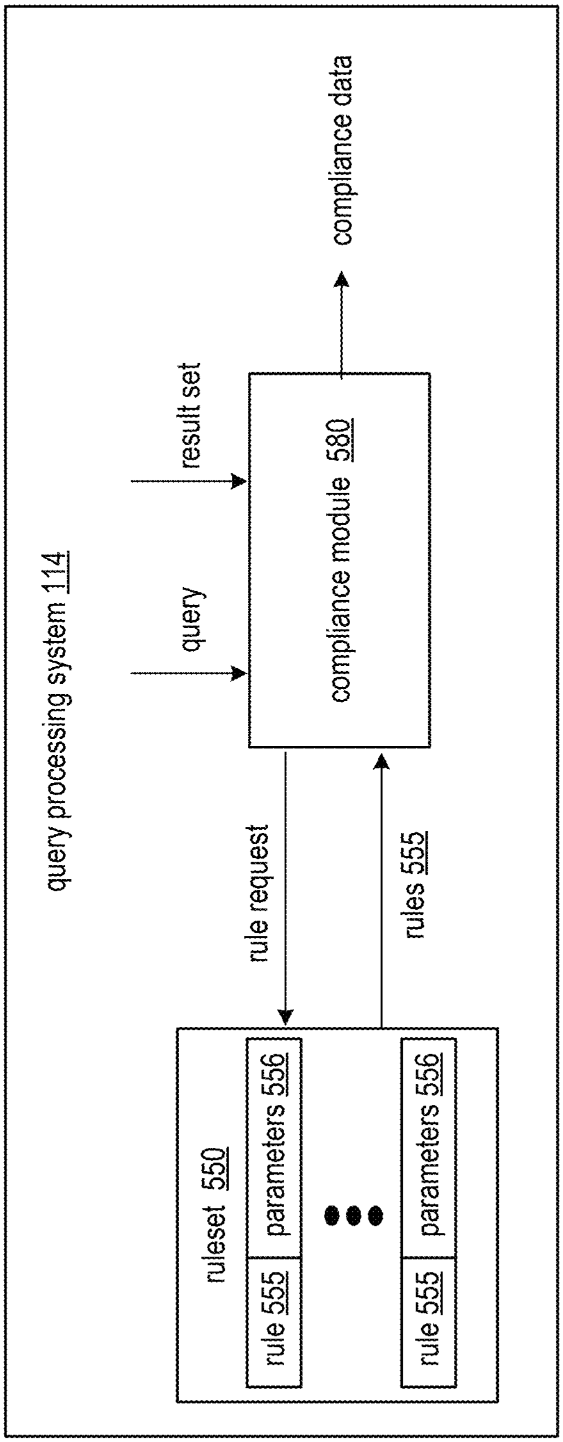
FIG. 5C is a schematic block diagram of an embodiment of a query processing system in accordance with various embodiments of the present invention.

FIG. 5C illustrates an example embodiment of query processing system 114 that utilizes a compliance module 580 to evaluate queries and/or result sets based on the ruleset 550. The compliance module 580 can utilize processing module 410 or a different processing module to execute operational instructions stored by memory module 412 or a different memory module to implement the functionality of the compliance module 580 discussed herein.

In response to receiving a given query and/or result set, the compliance module 580 can access ruleset 550 in local storage and/or via network 480. For example, the compliance module 580 can request all rules 555 of the ruleset 550, can request rules 555 for a particular provider as a provider ruleset 560, and/or can request only rules 555 that meet particular criteria determined by the compliance module 580 based on corresponding features of the query and/or the result set. In particular, the compliance module 580 can request only a proper subset of rules 555 in the ruleset 550 that are deemed by the compliance module 580 as relevant to the given query and/or given result set.

In such embodiments, some or all rules 555 in the ruleset 550 can have one or more corresponding parameters 556 indicating conditions in which the rule 555 is applicable to a given query and/or result set. For example, a parameter 556 can indicate a particular provider's data to which the rule applies and/or a particular field to which the rule applies. These parameters 556 can be sent to the compliance module 580 in conjunction with the requested rules. Alternatively or in addition, the request for rules can indicate parameters determined by the compliance module 580 that are indicative of features for the given query and/or result set, and only rules 555 with parameters 556 that match and/or otherwise compare favorably to all of the parameters sent in the rules request are returned to the compliance module for application to the given query and/or result set. For example, the compliance module 580 can determine which one or more provider's records are involved in the query and/or included in the result set, and can indicate one or more corresponding provider IDs in the rules request to retrieve only rules 555 for these one or more providers whose data is involved in the query and/or included in the result set. Alternatively, the compliance module 580 can compare every query and/or result set to a same, entire set of rules 555 in ruleset 550, for example, by performing a same compliance function on every query and/or on every result set.

The compliance module 580 can compare the retrieved rules 555 to a query received in a query request that has yet to be executed and/or a result set resulting from execution of the query. The compliance module can generate compliance data indicating whether or not the query and/or result data adhered to each applicable rule 555 individually, and/or indicating whether or not the query and/or result set adhered to every rule 555. In some cases, the compliance data can indicate which individual rules were adhered to and/or which individual rules were not adhered to.

In some cases, the compliance data can be further generated to indicate a query and/or result set complied with a subset of rules 555 in ruleset 550 that were to be non-applicable, based on the query and/or result set comparing unfavorably to the corresponding parameters 556. Alternatively or in addition, the compliance data can be generated to indicate a subset of rules 555 deemed non-applicable based on the parameters 556. For example, the compliance data can indicate a first subset of rules 555 in the ruleset 550 that were adhered to, a second first subset of rules 555 in the ruleset 550 that were not adhered to, and/or a third subset of rules 555 in the ruleset 550 that were not applicable, where the first subset, second subset, and third subset are mutually exclusive and collectively exhaustive with respect to the ruleset 550. Alternatively, the third subset of rules 555 are instead included in the first subset of rules 555, as these non-applicable rules can be considered adhered to as a result of being non-applicable.

Figure 6A:
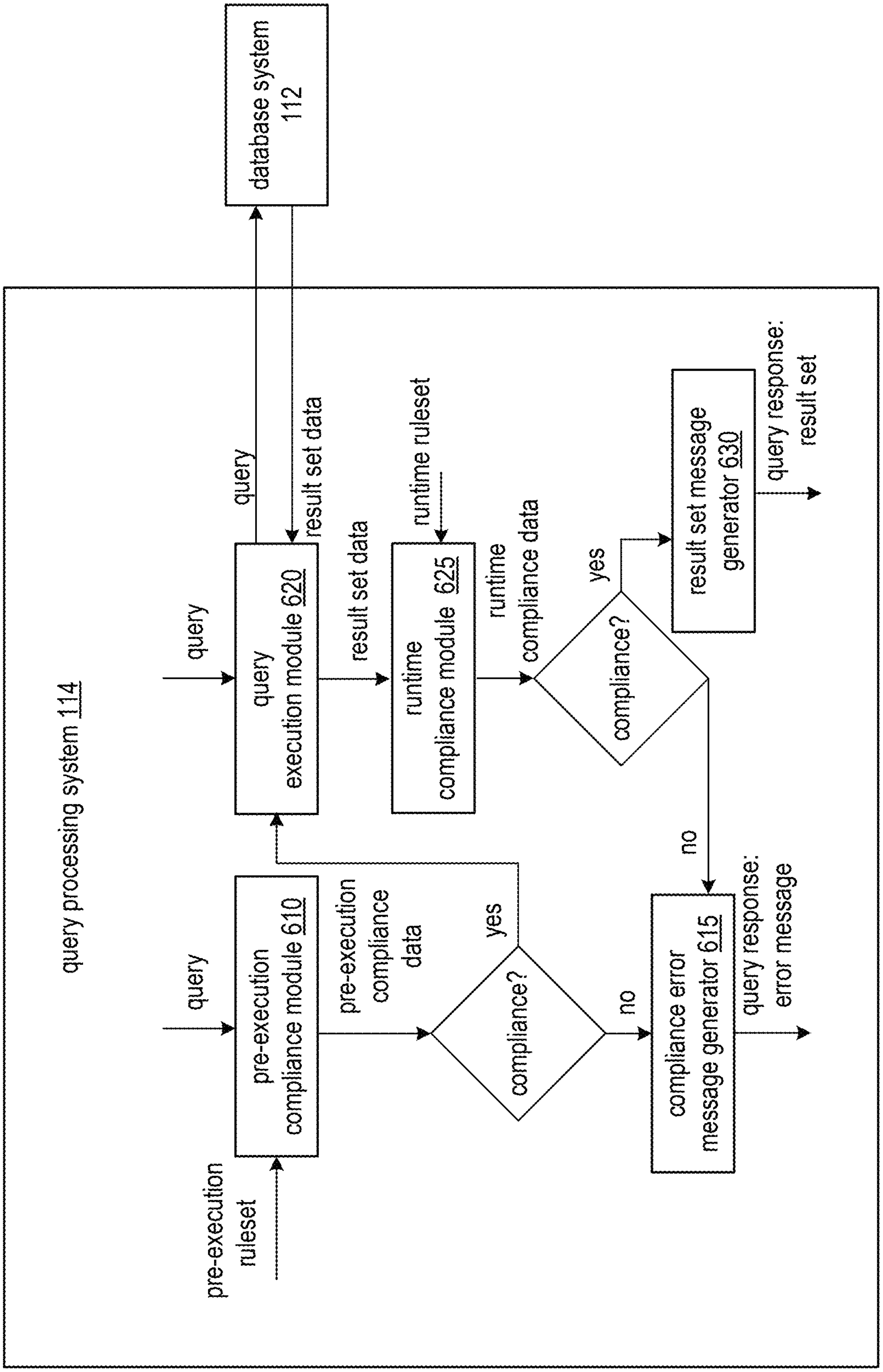
FIG. 6A is a flow diagram illustrating an embodiment of a query processing system that utilizes a pre-execution compliance module and/or a runtime compliance module in accordance with various embodiments of the present invention.

FIG. 6A illustrates an example embodiment of a query processing system 114 that separately evaluates a query prior to its execution and a result set after a queries execution. The query processing system 114 can be operable to implement a pre-execution compliance module 610, a compliance error message generator 615, a query execution module 620, a runtime compliance module 625 and/or a result set message generator 630, for example, by utilizing the processing module 410 to execute operational instructions stored by the memory module 412 that causes the processing module 410 to execute the functionality of the pre-execution compliance module 610, the compliance error message generator 615, the query execution module 620, the runtime compliance module 625 and/or the result set message generator 630. In some embodiments, the pre-execution compliance module 610 and/or the runtime compliance module 625 are utilized to implement the compliance module 580 of FIG. 5C.

A subset of the ruleset 550 can correspond to a pre-execution ruleset that can be applied to a query itself prior to execution. For example, the pre-execution ruleset can include restrictions relating to operations allowed to be performed on particular fields, can include restrictions relating to whether or not records and/or fields indicated in the query can be returned as raw values, and/or can include other rules that can be checked based on the query itself, prior to any execution. The pre-execution compliance module 610 can compare the query to the pre-execution ruleset to generate pre-execution compliance data indicating whether or not each rule in the pre-execution ruleset was adhered to.

The query processing system 114 can then determine whether or not the pre-execution compliance data indicates compliance with all of the rules in the pre-execution ruleset. If not, the compliance error message generator 615 can be utilized to generate an error message, for example, as the query response transmitted back to the user device that generated the query request. The error message can indicate that the query did not comply with the ruleset, can specify which one or more rules of the pre-execution ruleset with which the query failed to comply, and/or can indicate which portions of the query failed to comply with one or more rules of the pre-execution ruleset. For example, the error message can be displayed via GUI 345 to indicate that the query was not executed and/or to indicate why the query did not comply with the ruleset 550 and was thus not executed. In this case, the query processing system 114 can forego execution of the query as a result of the query not complying with the pre-execution ruleset.

If the query processing system 114 determines that the pre-execution compliance data indicates the query complies with every rule in the pre-execution ruleset, the query can be executed by utilizing query execution module 620. In particular, the query can be parsed, formatted into one or more coded query commands readable by the database system 112, and/or can otherwise be sent to the database system 112 for execution. The database system 112 can send to the query processing system result set data generated by executing some or all of the query functions indicated in the query. This result set data can include a final result set or records and/or a final value alone. This result set data can include one or more intermediate result sets and/or intermediate values generated via partial execution of the query.

A second subset of rules can correspond to a runtime ruleset that can be applied to a final result set, final value, intermediate result sets, and/or intermediate values of the result set data after execution of the query. The runtime ruleset can include rules where adherence cannot be determined based on the query alone, and can only be evaluated after execution of the query has commenced and/or once execution of the query has completed. For example, the runtime ruleset can include rules relating to whether or not particular records can be utilized and/or included in an intermediate and/or final result set, and/or can indicate a maximum and/or minimum number of particular records can be utilized and/or included in an intermediate and/or final result set. The runtime compliance module 625 can compare the result set to the runtime ruleset to generate runtime compliance data indicating whether or not each rule in the runtime ruleset was adhered to.

The query processing system 114 can be operable to determine whether or not runtime execution compliance data generated by the runtime compliance module 625 indicates compliance with all of the rules in the runtime ruleset. If not, the compliance error message generator 615 can be utilized to generate an error message, for example, as the query response transmitted back to the user device that generated the query request. The error message can indicate that the result set data did not comply with the ruleset, and/or can specify which one or more rules of the runtime ruleset with which the result set data failed to comply. For example, the error message can be displayed via GUI 345 to indicate that the result set of the query did not comply with the ruleset and/or to indicate why the result set did not comply with the ruleset. In this case, the query processing system 114 can forego transmission of the result set to the end user as a result of the result set data not complying with the pre-execution ruleset.

In some embodiments, the pre-execution compliance module 610 is utilized by query processing system 114, but the runtime compliance module 625 is not. In such embodiments, if the pre-execution compliance data indicates compliance with the pre-execution ruleset, the query can be executed, and the result set can be transmitted as the query response without any evaluation of the result set and/or intermediate results. In other embodiments, the runtime compliance module 625 is utilized by query processing system 114, but the pre-execution compliance module 610 is not. In such embodiments, the query and/or result set data is utilized to determine if compliance is achieved after a query has commenced and/or completed execution, where queries are executed upon receipt without any prior evaluation of the queries themselves.

Figure 6B:
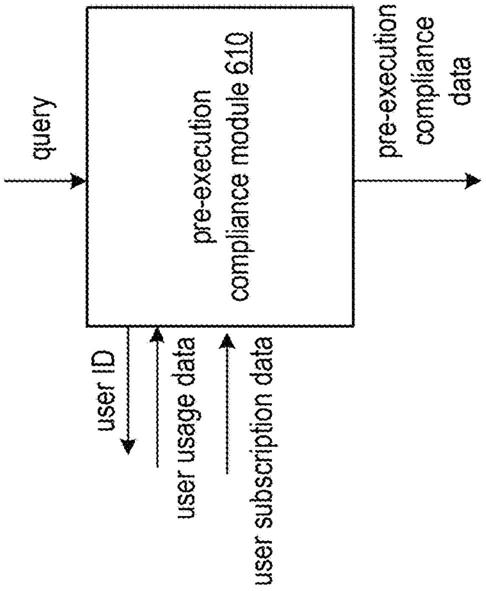
FIG. 6B is a schematic block diagram of an embodiment of a pre-execution compliance module in accordance with various embodiments of the present invention.
Figure 6C:
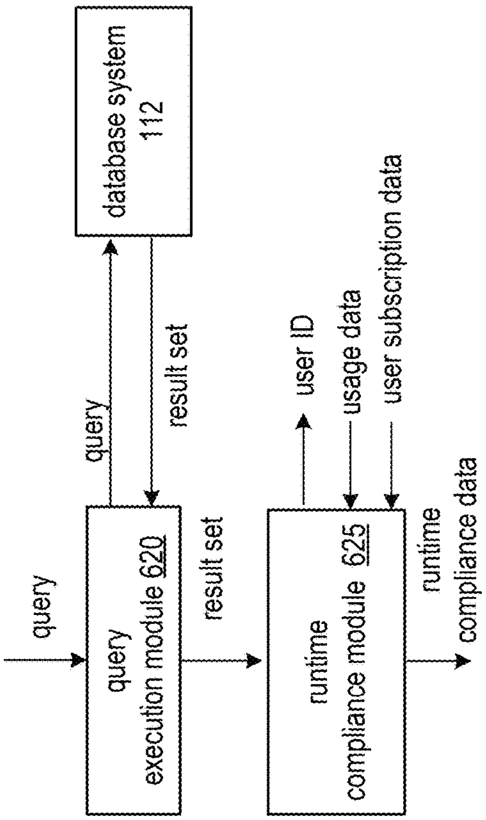
FIG. 6C is a schematic block diagram of an embodiment of a runtime compliance module in accordance with various embodiments of the present invention.

As illustrated in FIGS. 6B-6C, the pre-execution compliance module 610 and/or the runtime compliance module 625 can utilize additional data to determine whether a query complies with the pre-execution ruleset, and/or to determine whether result set data complies with the runtime ruleset, respectively. As illustrated in FIG. 6B, user usage data and/or user subscription data can be received for usage by the pre-execution compliance module 610. For example, the pre-execution compliance module 610 can generate a request for transmission to the user management system 440 indicating a user ID corresponding to the end user that generated and/or transmitted the query to be evaluated, and record usage data and/or subscription data for that particular end user can be transmitted by the user management system for use by the pre-execution compliance module 610 in response. Alternatively or in addition, the pre-execution compliance module 610 can generate a request for transmission to the query logging system 450 indicating the user ID and/or one or more provider IDs associated with the query, and/or a temporal period indicated by one or more pre-execution rules, where the usage logging system send the usage data for the user, within the temporal period and/or for usage of records supplied by the indicated provider, as data from one or more usage log entries. Alternatively or in addition, the pre-execution compliance module 610 can receive user usage data and/or user subscription data automatically; can access previously received usage data and/or subscription data for the user; and/or can access locally stored user usage data and/or user subscription data for the user.

The pre-execution compliance module 610 can utilize the received user subscription data to determine if a subscription level of the user for one or more providers meets subscription level requirements for pre-execution rules applicable to the query. The pre-execution compliance module 610 can utilize the received user usage data to determine if historical and/or recent record usage by user meets usage restrictions for pre-execution rules applicable to the query. In some cases, this information is compared to parameters 556 relating to user subscription level and/or user usage data to determine a proper subset of a set of pre-execution rules that are applicable to query.

As illustrated in FIG. 6C, the runtime compliance module 625 can similarly utilize user usage data and/or user subscription data to determine whether result set data complies with the pre-execution ruleset. The runtime compliance module 625 can similarly generate a request for transmission to the user management system 440 and/or usage logging indicating a user ID corresponding to the end user that generated and/or transmitted the query to be evaluated, and record usage data and/or subscription data for that particular end user can be transmitted by the user management system for use by the runtime compliance module 625 in response. Alternatively or in addition, the runtime compliance module 625 can generate a request for transmission to the query logging system 450 indicating the user ID, one or more provider IDs that supplied records included in the result set data, and/or a temporal period indicated by one or more runtime rules, where the usage logging system send the usage data for the user as data from one or more usage log entries, for usage of data within the temporal period and/or for usage of records supplied by the one or more indicated providers. Alternatively or in addition, the runtime compliance module 625 can receive user usage data and/or user subscription data automatically; can access previously received usage data and/or subscription data for the user; and/or can access locally stored user usage data and/or user subscription data for the user.

The runtime compliance module 625 can utilize the received user subscription data to determine if a subscription level of the user for one or more providers meets subscription level requirements for runtime rules applicable to the result set. The runtime compliance module 625 can utilize the received user usage data to determine if historical and/or recent record usage by user meets usage history requirements for runtime rules applicable to the result set. In some cases, this information is compared to parameters 556 relating to user subscription level and/or user usage data to determine a proper subset of a set of rules that are applicable to result set.

Figure 6D:
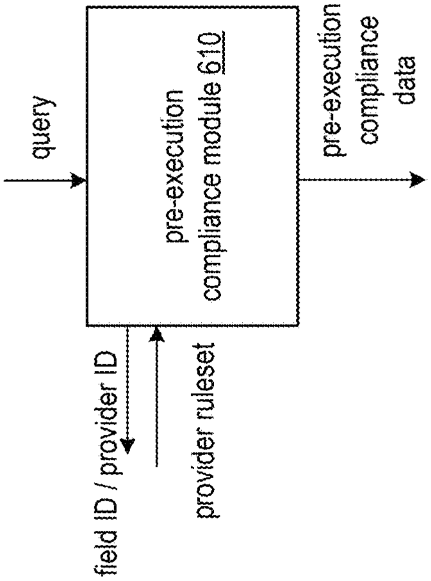
FIG. 6D is a schematic block diagram of an embodiment of a pre-execution compliance module in accordance with various embodiments of the present invention.
Figure 6E:
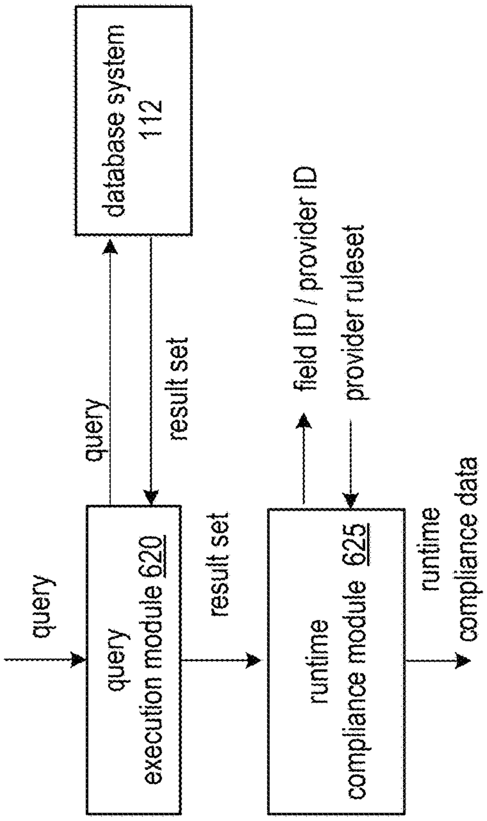
FIG. 6E is a schematic block diagram of an embodiment of a runtime compliance module in accordance with various embodiments of the present invention.

As illustrated in FIGS. 6D-6E, the pre-execution compliance module 610 and/or the runtime compliance module 625 can filter the rulesets that are applied to utilize only rulesets set by for applicable providers and/or fields to determine whether a query complies with the pre-execution ruleset, and/or to determine whether result set data complies with the runtime ruleset, respectively.

As illustrated in FIG. 6D, one or more field IDs and/or provider IDs can be utilized to determine pre-execution rulesets for a particular provider and/or pertaining to particular fields. For example, the pre-execution compliance module 610 can determine a subset of providers that supplied the data involved in the query, and/or can determine a subset of fields and/or tables that are involved in the query. The pre-execution compliance module 610 can generate a request for transmission to the provider management system 420 and/or ruleset 550 that indicates this subset of provider IDs, subset of tables, and/or subset of fields. Rules for the particular provider and/or relating to the particular field can be transmitted in response for use by the pre-execution compliance module 610. For example, rules with parameters 556 that match and/or include one or more of the subset of provider IDs, subset of tables, and/or subset of fields indicated in the request sent by the pre-execution compliance module 610 are retrieved. Alternatively or in addition, the pre-execution compliance module 610 can receive provider rulesets; can access previously received rulesets for the provider and/or one or more fields; and/or can access locally stored user provider rulesets. In such embodiments, the query processing system 114 can reduce utilization of resources by retrieving, and/or utilizing in the comparison, only the rulesets set by the provider IDs that supplies records to one or more fields involved in a particular query being evaluated, and/or only the rules that pertain to particular fields involved in the particular query being evaluated.

As illustrated in FIG. 6E, one or more field IDs and/or provider IDs can be utilized to determine runtime rulesets for a particular provider and/or pertaining to particular fields. For example, the runtime compliance module 625 can determine a subset of providers that supplied the data included in the result set data, and/or can determine a subset of fields and/or tables included in the result set data. The runtime compliance module 625 can generate a request for transmission to the provider management system 420 and/or ruleset 550 that indicates this subset of provider IDs, subset of tables, and/or subset of fields. Rules for the particular provider and/or relating to the particular field can be transmitted in response for use by the runtime compliance module 625. For example, rules with parameters 556 that match and/or include one or more of the subset of provider IDs, subset of tables, and/or subset of fields indicated in the request sent by the runtime compliance module 625 are retrieved. Alternatively or in addition, the runtime compliance module 625 can receive provider rulesets; can access previously received rulesets for the provider and/or one or more fields; and/or can access locally stored user provider rulesets. In such embodiments, the query processing system 114 can reduce utilization of resources by retrieving, and/or utilizing in the comparison, only the rulesets set by the provider IDs that supplies records in a particular result set being evaluated, and/or only the rules that pertain to particular fields involved in the particular result set being evaluated.

Figure 6F:
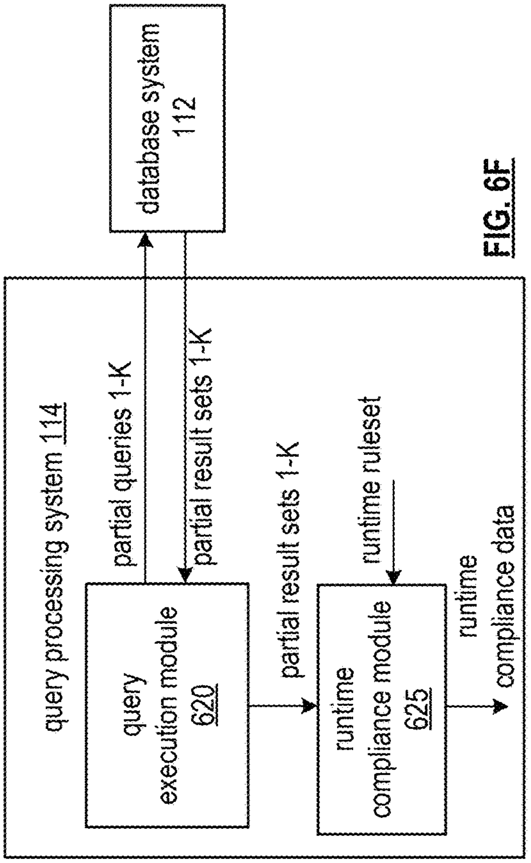
FIG. 6F is a schematic block diagram of an embodiment of a query processing system that utilizes a runtime compliance module in accordance with various embodiments of the present invention.
Figure 6G:
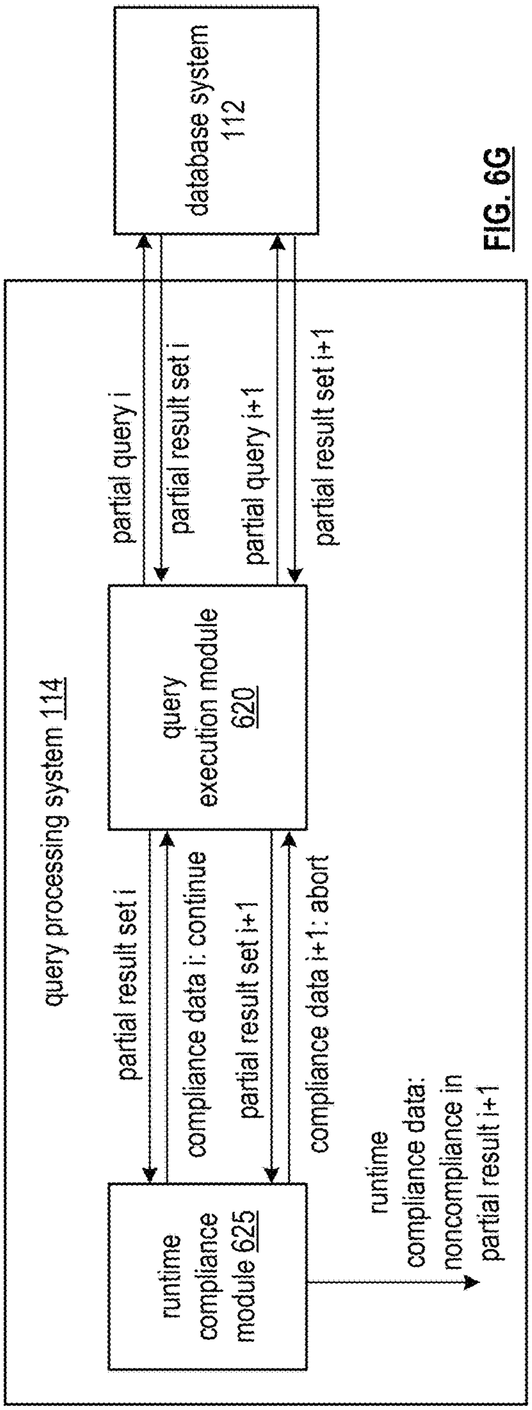
FIG. 6G is a schematic block diagram of an embodiment of a query processing system that utilizes a runtime compliance module in accordance with various embodiments of the present invention.

FIGS. 6F-6G illustrate embodiments where the query processing module utilizes intermediate results and/or values generated in executing a query to determine whether compliance is achieved. In particular, one or more rules of the runtime ruleset can pertain to rules specific to intermediate result sets and/or values, which may not be derivable from a final result of the query. For example, a runtime rule can require that an aggregation, such as an average, must be performed upon at least a threshold minimum number of records. The number of records utilized to generate the resulting average cannot be derived from the value of the average itself. Thus, an intermediate result, corresponding to the set of records utilized to generate the average, must be evaluated to determine if the number of records in this set meets or exceeds the threshold minimum number of records.

As illustrated in FIG. 6F, the runtime compliance module 625 can receive a plurality of partial result sets 1-K, which can each correspond to a set of records or a value generated in sequence and/or in parallel by the database system to ultimately arrive at the final result set and/or final value. In some embodiments, the query execution module 620 can parse the query itself into a plurality of partial queries 1-K, where the partial results 1-K are received in response. In some embodiments, the partial queries 1-K are generated and transmitted one at a time in sequence, where each partial query is generated in response to receiving a response to a previous query. In some embodiments, some of the partial queries are performed by the query execution module 620 locally. For example, the query execution module 620 can query the database system for particular fields of records that meet particular criteria as a partial request of the averaging query discussed above, and the partial result set received in response includes the requested fields of the records that meet the requested criteria. The query execution module 620 can then locally perform the averaging function over one or more particular fields of the records included in this partial result set to generate the next partial result. The query execution module can also evaluate the received partial result set itself to determine if the partial result set complies with the runtime ruleset.

As illustrated in FIG. 6G, the runtime compliance module 625 can evaluate each partial result generated by the database system 112 and/or generated locally by the query execution module 620, prior to performing a next partial query. While each partial result set complies with the runtime ruleset, subsequent partial queries are executed. However, once any of the partial results do not comply with the applicable rules in the runtime ruleset, the query execution module can forego execution of the remaining ones of the partial queries.

For example, as illustrated in FIG. 6G, the query execution module facilitates execution of partial query i to determine partial result set i, for example, as a result of partial queries 1 to (i−1) having already been performed and their corresponding partial results sets 1 to (i−1) having already been determined to comply with the runtime rules. The runtime compliance module evaluates partial result set i to generate compliance data i. In this case, the compliance data indicates the runtime rules are adhered to, and thus the query execution module is instructed to continue processing the query. In response, the query execution module can facilitate execution of partial query i to determine partial result set (i+1). The runtime compliance module evaluates partial result set (i+1) to generate compliance data (i+1). In this case, the compliance data indicates at least one runtime rule was not adhered to, and thus the query execution module is instructed to abort further processing of the query. The runtime compliance data can indicate that the compliance failed with partial result (i+1).

The error message returned to the user can include the partial query (i+1) itself or can include other information regarding the particular partial query (i+1) that caused the noncompliance via partial result (i+1). The error message can alternatively or additionally include information indicating which rule of the runtime ruleset failed. However, the error message can be generated to omit the partial query result set (i+1), as this partial query result set (i+1) may be too private and/or may not be assessable by the user given their subscription level, as indicated in the failure of the partial query result set (i+1) to comply with the runtime ruleset. In some embodiments, partial queries 1-*i* and/or information regarding their corresponding result sets 1-*i* can be returned to the user in the error message, as these result sets did comply with the runtime ruleset.

Because compliance can be separately evaluated prior to execution and once execution has commenced as discussed in conjunction with FIGS. 6A-6G, queries can be evaluated for adherence with pre-execution rules before they are transmitted to the query processing module. In some embodiments, user devices 140 can be operable to perform some or all of the functionality of the pre-execution compliance module 610 discussed herein for proposed queries generated by end users via GUI 345. For example, the pre-execution compliance module 610 can be implemented as a complier running on user device 140, enabling a user to generate proposed queries for evaluation, where only queries that are deemed to comply with the pre-execution ruleset are transmitted to the query processing module for execution.

Figure 7A:
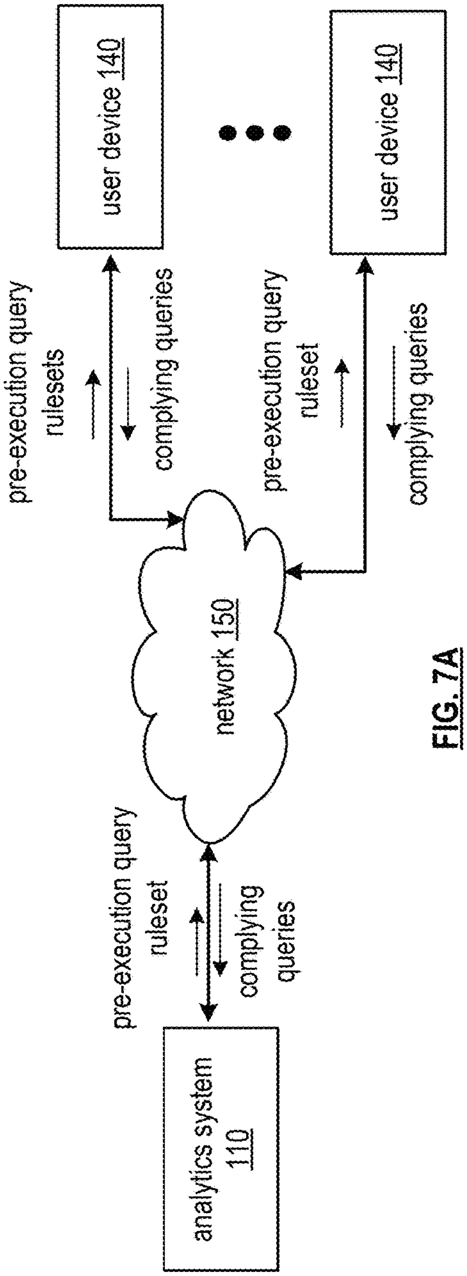
FIG. 7A is a schematic block diagram of an embodiment of an analytics system in accordance with various embodiments of the present invention.

Such embodiments are illustrated in FIGS. 7A-7E. As illustrated in FIG. 7A, a pre-execution query ruleset, such as some or all of the pre-execution query rulesets 1-N corresponding to rules that can be utilized to evaluate a query prior to execution for data provider entities 1-N, can be sent to some or all user devices 140. For example, the user application data 325 can include this pre-execution query ruleset, as well as instructions to implement the pre-execution compliance module 610.

In other cases, requested rules of pre-execution query ruleset can be received by the user device 140 in response to a request sent by the user device 140, for example, sent in response to a corresponding query being entered to the user device 140 by the user via GUI 345. In particular, applicable rules given parameters 556 determined by the user device 140 for a given query entered by the user can be requested, and a filtered pre-execution query ruleset applicable to a given query can be received in response.

A user can interact with the GUI 345 to enter proposed queries for processing, and queries are sent to the analytics system 110 only if they comply with all of the applicable rules of the pre-execution ruleset received by and/or stored by the user device 140. In some cases, the query processing system 114 of the analytics system 110 can also implement its own pre-execution compliance module 610 on received queries as illustrated in FIG. 6A, for example, to perform additional checks for additional rules that may not be sent to and/or may not otherwise be known to the pre-execution compliance module.

Figure 7B:
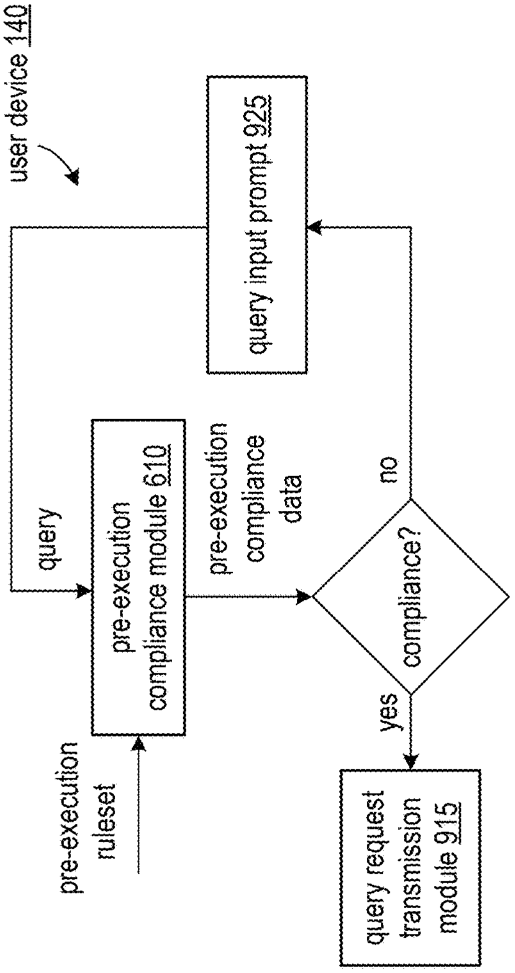
FIG. 7B is a flow diagram illustrating an embodiment of a user device in accordance with various embodiments of the present invention.

FIG. 7B illustrates a flowchart diagram illustrating the functionality of a user device 140 that implements the pre-execution compliance module 610, for example, in conjunction with execution of user application data 325. A query input prompt 925 can be displayed by GUI 345, and the user can input a query in response. The pre-execution compliance module 610 can utilize the pre-execution ruleset stored by the user device 140 and/or can retrieve the pre-execution ruleset from the analytics system 110 based on the query entered by the user. Pre-execution compliance data can be generated for the query, and if the pre-execution compliance data indicates compliance, a query request transmission module 915 can facilitate transmission of the query by the user device 140 as a query request to the analytics system 110. If the pre-execution compliance data indicates the query does not comply, the query input prompt can again be displayed, for example, indicating compliance errors indicated in the pre-execution compliance data for the query entered by the user, and/or prompting the user to enter a new query.

Figure 7C:
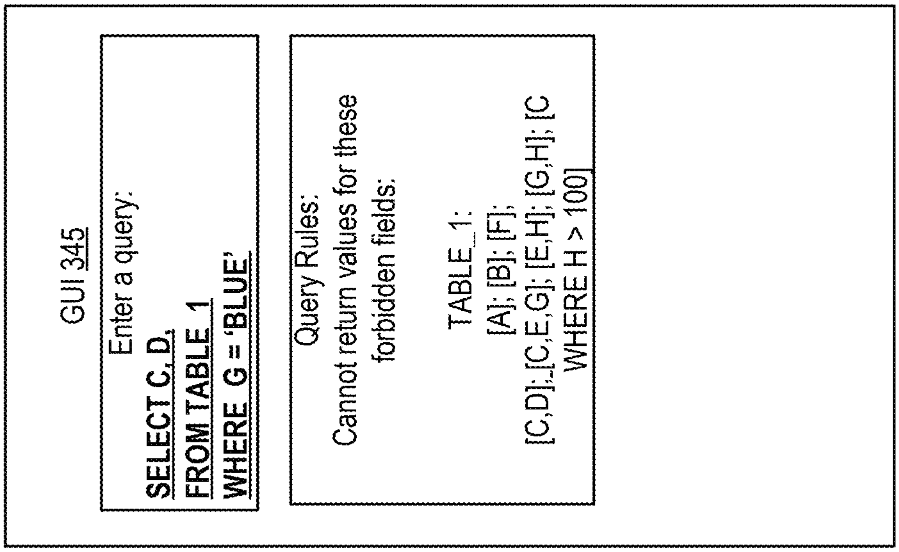
FIGS. 7C-7E illustrate example embodiments of a GUI displayed via a user device in accordance with various embodiments of the present invention.
Figure 7D:
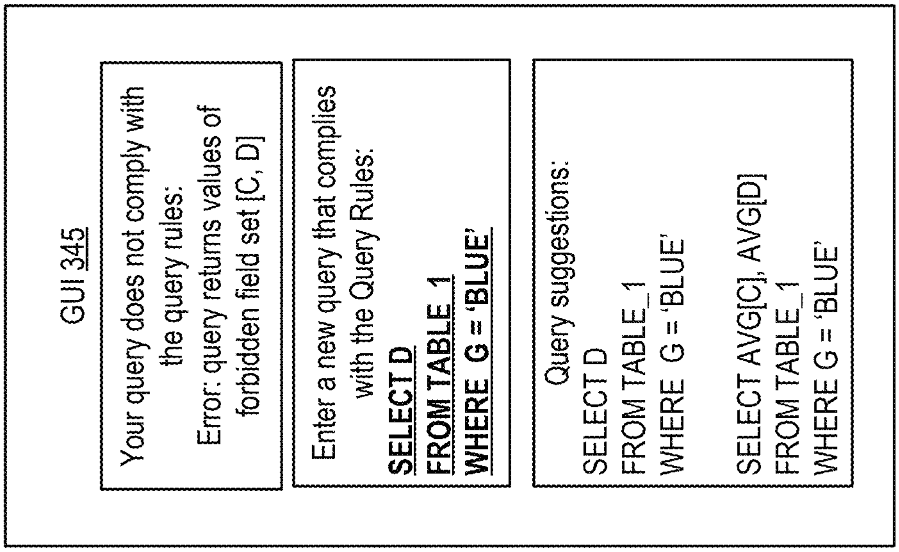
Figure 7E:
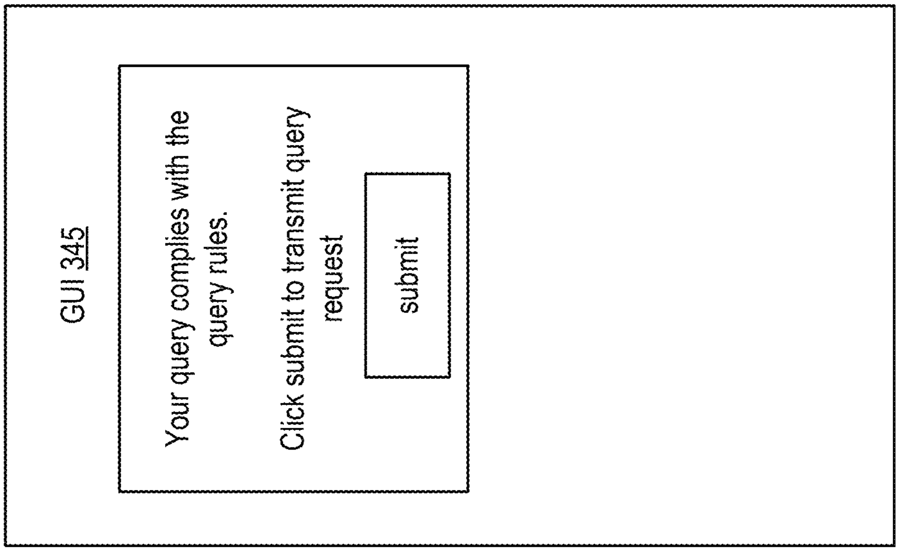

FIGS. 7C-7E illustrate example embodiments of GUI 345 displayed by user device 140 in conjunction with implementing the pre-execution compliance module 610. As illustrated in FIGS. 7C-7E, underlined and bolded text denotes user input, such as text that was selected and/or entered by the user in response to the displayed prompt. In the particular example illustrated in FIGS. 7C-7E, a table TABLE_1 of the database system 112 includes fields with labels A, B, C, D, E, F, G, and H.

As illustrated in FIG. 7C, GUI 345 can display a prompt to enter a query. In the example illustrated in FIG. 7C, the user enters the query SELECT D FROM TABLE_1 WHERE G='BLUE'. While the embodiment of FIG. 7C illustrates the entered query in SQL, another query language can be utilized and/or other query commands indicating the query to be executed against the database system 112 can be utilized. The database system 112 and/or an intermediate translator implemented by the user device 140 and/or the analytics system 110 can process the query as entered by the user to generate query commands that are readable and executable by the query processing system 114 and/or the database system 112.

In some embodiments, the GUI 345 can provide an option to view the pre-execution rules and/or can display these rules automatically. This display of the query rules can aid the user in supplying a query that adheres to the rules. In some embodiments, the user device stores the subscription data and/or record usage data for the user, for example, where this data is received from the analytics system 110 via assess to the corresponding user profile entry 445 and/or the query logging system 450 given the user ID of the corresponding end user. In such embodiments, the GUI can optionally display only the query rules for the user's subscription level for one or more providers, and can forego display of query rules for other subscription levels. In such embodiments, the GUI can optionally display rules pertinent to the user's record usage data, for example, by displaying a remaining number of queries to a particular table that the user has access to for the remainder of the month.

In the example illustrated in FIG. 7C, the query rules indicate a plurality of forbidden fields that cannot be returned as raw values. This includes fields A, B, and F of TABLE_1. This also includes sets of fields that cannot be returned together as raw values: the combination of field C and D; C, E, and G; E and H; or G and H cannot be returned together as raw values. This also includes fields that cannot be returned given a condition of other fields: field C of a record cannot be returned as a raw value when the value of field H of the same record is greater than 100. For example, these rules can correspond to the forbidden fields rules entered by a provider responsible for populating records of TABLE_1 via a GUI 245 of their provider device in the example discussed in conjunction with FIG. 10B.

FIG. 7D illustrates an embodiment of GUI 345 displayed in response to implementing the pre-execution compliance module 610 upon the query entered by the user in FIG. 7C. This query was determined by the pre-execution compliance module 610 to fail to comply with the pre-execution ruleset. In particular, the query of FIG. 7C is determined to fail by failing to comply with the query rule restricting the combination of fields C, D from being returned together. As illustrated in FIG. 7D, the GUI can indicate the noncompliance of the entered query and can optionally indicate one or more particular aspects of the query that did not comply with one or more particular rules. In this example, the GUI 345 indicates that the reason for noncompliance was caused by the entered query returning values of all fields in the forbidden field set that includes fields C and D.

As illustrated in FIG. 7D, the user can be prompted to enter a new query, and can be provided with an option to review the query rules as illustrated in FIG. 7C. The GUI can further provide one or more query suggestions, which can be automatically generated in executing the user application data based on the query that was entered by the user and based on the query ruleset. The query suggestions can correspond to queries with minor modifications from the entered query that render the query suggestions as compliant with the query rules, and/or can be determined based on the query logging system 450 indicating similar, compliant queries that are popular and/or highly requested by other users. For example, the query suggestion can propose returning averages or other aggregations of one or more of the fields in the forbidden field set and/or can propose returning a subset of the forbidden field set that is not forbidden.

In the example illustrated in FIG. 345, the user elects to modify their query by selecting the first query suggestion: SELECT D FROM TABLE1 WHERE G='BLUE'. FIG. 7E illustrates an embodiment of GUI 345 displayed in response to implementing the pre-execution compliance module 610 upon this modified query entered by the user in FIG. 7D. This query was determined by the pre-execution compliance module 610 to comply with the pre-execution ruleset. The compliance of this query can be displayed to the user, and the user can elect to transmit this complying query. Alternatively, the query can be automatically transmitted by the user device upon determining that the query complies with the pre-execution ruleset.

Figure 8A:
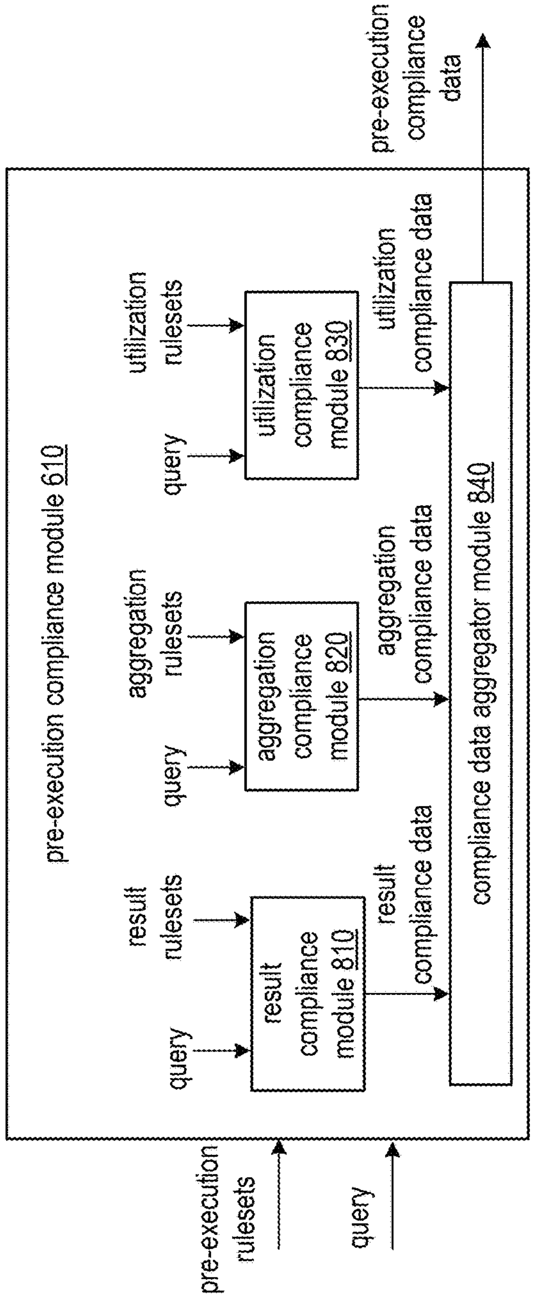
FIG. 8A is a schematic block diagram of an embodiment of a pre-execution compliance module in accordance with various embodiments of the present invention.
Figure 8B:
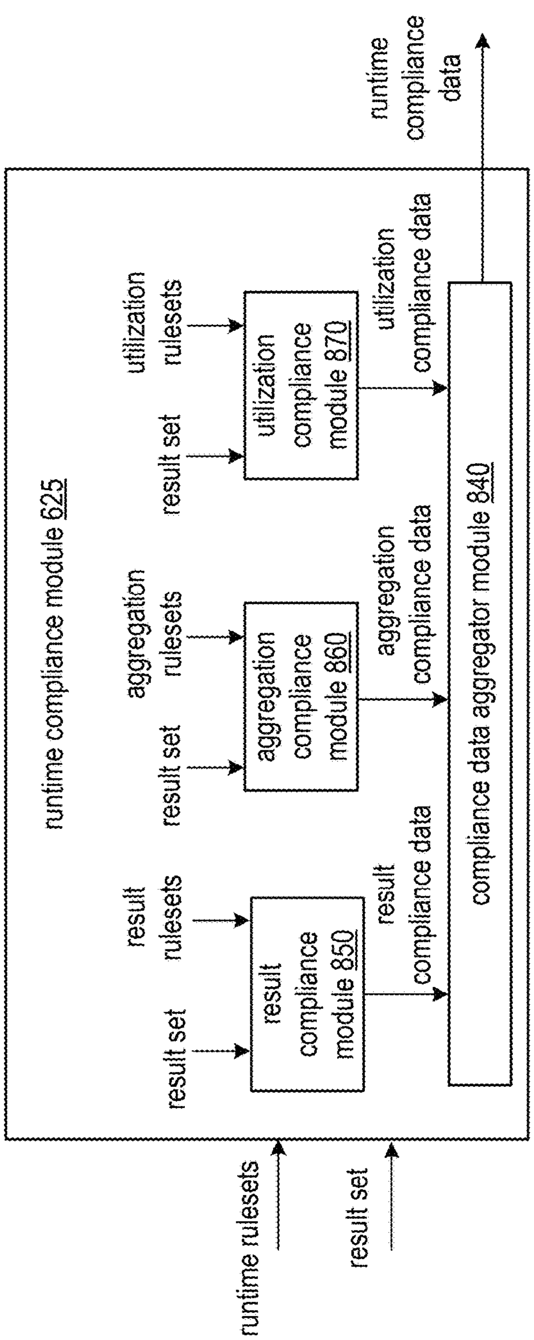
FIG. 8B is a schematic block diagram of an embodiment of a runtime compliance module in accordance with various embodiments of the present invention.

FIGS. 8A and 8B illustrate a pre-execution compliance module 610 and a runtime compliance module 625, respectively, that separately evaluate result rulesets, aggregation rulesets, and/or utilization rulesets. Alternatively, these different types of rulesets can collectively be evaluated by the pre-execution compliance module 610 and/or a runtime compliance module 625, and/or can otherwise be separately or collectively evaluated by the query processing system 114 and/or a user device 140 as discussed in conjunction with FIGS. 7A-7E.

Result rulesets can correspond to rules regarding results that are be returned by a query, such as forbidden fields rulesets or other rulesets regarding whether the particular records and/or number of records returned in execution of a query are allowed. The pre-execution module 610 can implement a result compliance module 810, which can compare a query to pre-execution rules that correspond to this result ruleset. The result compliance module 810 can evaluate the given query based on the requested values to be returned in the query, for example, by determining whether or not a forbidden field and/or set of forbidden fields of the result ruleset are requested to be returned as raw values. Alternatively or in addition, the runtime compliance module 625 can implement a result compliance module 850 which can compare the final query result of the result set data to runtime rules that correspond to this result ruleset. The result compliance module 850 can evaluate the returned final result, for example, by determining whether or not a forbidden field and/or set of forbidden fields indicated the result ruleset have corresponding raw values returned in the final result set; by determining whether a number of results returned in the final result set exceed a predetermined maximum number of records indicated in the result ruleset; by determining whether particular records returned in the final result set cannot be included for example, due to being included in result sets for other queries requested by the same user; and/or by making determinations for other rules relating to the final result set based on other corresponding factors indicated in the final result set.

Aggregation rulesets can correspond to rules regarding aggregations performed on a set of records. For example, the aggregation rulesets can indicate whether particular aggregation functions are allowed to be performed on particular sets of records given their size, provider that supplied the records, and/or particular set of fields that are aggregated upon. As used herein, aggregation functions can include: count functions that return a count of records in a given set of records; sum functions that return a sum of values in one or more fields of records in a given set of records; average functions; average functions that return an average of values in one or more fields of records in a given set of records; minimum functions that return a raw value corresponding to a minimum value over values in one or more fields of records in a given set of records; maximum functions that return a raw value corresponding to a maximum value over values in one or more fields of records in a given set of records; and/or other functions that return an aggregate result or other value for a given set of records.

The pre-execution module 610 can implement an aggregation compliance module 820, which can compare a query to pre-execution rules that correspond to this aggregation ruleset. The aggregation compliance module 820 can evaluate the given query based on the requested aggregation to be performed in the query, for example, by determining whether or not a forbidden field and/or set of forbidden fields of the result ruleset are utilized in an aggregation and/or by determining whether a forbidden type of aggregation function is performed. Alternatively or in addition, the runtime compliance module 625 can implement an aggregation compliance module 860 which can utilize the result of an aggregation returned as the final result, the result of an aggregation utilized as an intermediate result in execution of the query, and/or an intermediate result set corresponding to a set of records that are utilized to perform an aggregation. This information can be indicated in the result set data and can be compared to corresponding rules of the aggregation ruleset.

For example, aggregation compliance module 860 can evaluate the intermediate result sets utilized to perform the aggregation, for example, by determining whether or not a forbidden field and/or set of forbidden fields indicated in the aggregation ruleset are included in this intermediate result set utilized in the aggregation; by determining whether a number of results included in this intermediate result set utilized to perform an aggregation do not meet a predetermined minimum number of intermediate results indicated in the of the aggregation ruleset; by determining whether particular records included in the in the intermediate result set utilized to perform an aggregation cannot be utilized in an aggregation for example, due to being utilized in other aggregations for other queries requested by the same user; and/or based on other factors indicated by the intermediate result set. As another example, the values returned by an aggregate as an intermediate result or the final result can be evaluated. For example, a raw value and/or record returned by a maximum or minimum function can be evaluated based on whether or not this field and/or record can be utilized and/or returned as a raw value. These various rules for evaluating intermediate result sets can be the same or different for different types of aggregation functions performed on these intermediate result set, and thus an intermediate result set can be compared to a particular set of rules dictated by the particular aggregation function performed on the intermediate result set.

Utilization rulesets can correspond to rules regarding any other utilization of records in executing the query, for example, utilized in any intermediate result sets and/or utilized to filter or otherwise determine any intermediate or final values or sets of records. For example, the utilization ruleset can include rules that apply to filtering a set of records via the WHERE clause and/or via another filtering mechanism. In particular, conditioning a particular field in the WHERE clause may be restricted, as this condition can indicate private information and/or may otherwise be forbidden. For example, consider the set of rules presented in conjunction with FIGS. 7C-7E, where field A is a forbidden field. Thus, a query such as SELECT C FROM TABLE_1 WHERE A='MARRIED' can be determined to be non-compliant by the utilization ruleset, as the filtering of the results to include records where A is a particular value or within a particular range of values because the result set indirectly returns the values of both A and C in the resulting set of records. This, utilization rulesets can indicate forbidden fields or sets of records to be used in WHERE clauses and/or to be otherwise used in filtering sets of records in any capacity; restrictions on values, sets of values, and/or ranges for one or more fields that can be used in WHERE clauses and/or to be otherwise used in filtering sets of records; and/or other restrictions on the type of filtering and/or level of filtering that can be applied in filtering sets of records.

The pre-execution compliance module 610 can implement a utilization compliance module 830, which can compare a query to pre-execution rules that correspond to this utilization ruleset. The utilization compliance module 830 can evaluate the given query based on a WHERE clause or other requested filtering to be applied in generating intermediate and/or final results, and/or can otherwise evaluate fields and/or records that are otherwise involved in the query. Alternatively or in addition, the runtime compliance module 625 can implement a utilization compliance module 870 which can evaluate the particular records and/or fields included in intermediate sets of records and/or the final set or record, and/or can evaluate particular records and/or fields that were utilized in determining any intermediate results and/or the final result. This information can be indicated in the result set data and can be compared to corresponding rules of the utilization ruleset.

In some embodiments, for a given query, not all of the modules 810, 820, and 830 are applied by the pre-execution compliance module 610. For example, if the query includes no aggregation, the pre-execution compliance module 610 can automatically forego application of the aggregation compliance module 820 upon the query. As another example, if query requests a result set for a particular provider that did not provide a result ruleset, the pre-execution compliance module 610 can automatically forego application of the result compliance module 810 upon the query. Similarly, for a given result set, not all of the modules 850, 860, 870 are applied by the runtime compliance module 625 for similar reasons automatically determined by the runtime compliance module 625.

Figure 9B:
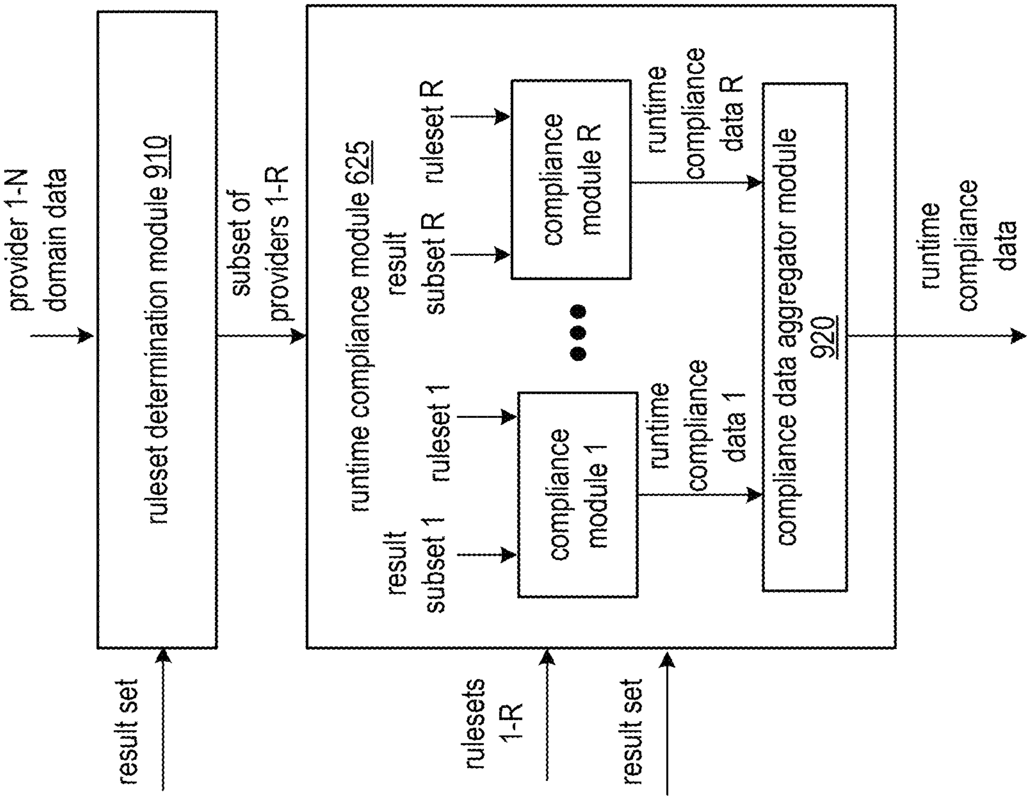
FIG. 9B is a schematic block diagram of an embodiment of a runtime compliance module in accordance with various embodiments of the present invention.
Figure 9A:
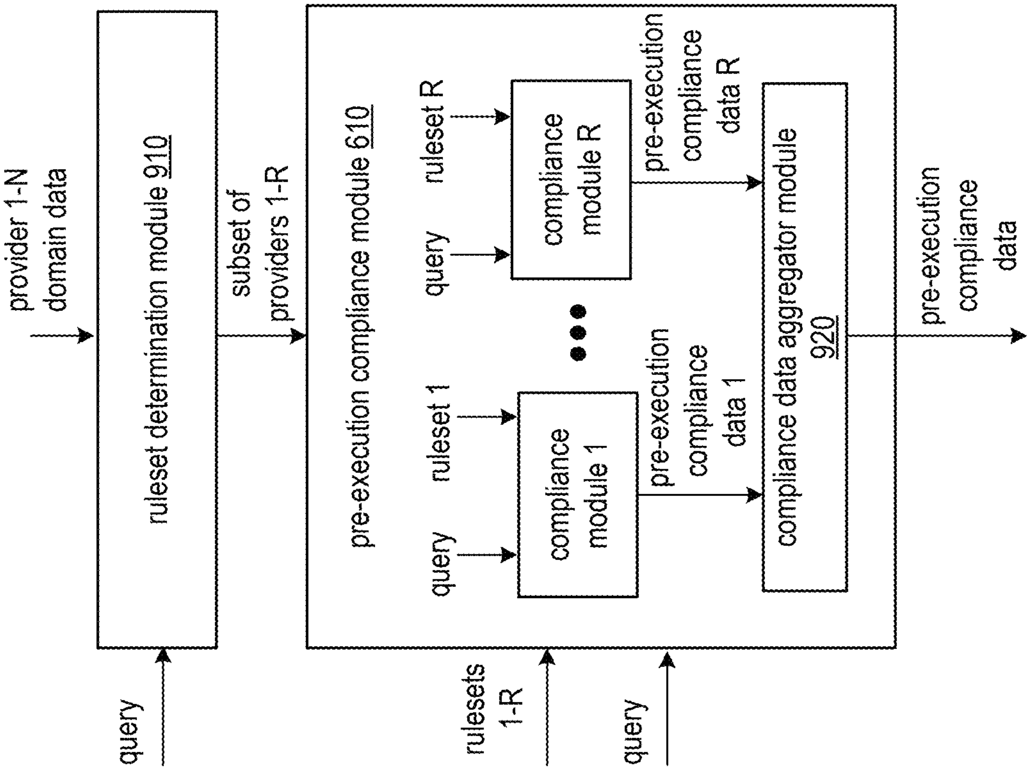
FIG. 9A is a schematic block diagram of an embodiment of a pre-execution compliance module in accordance with various embodiments of the present invention.

FIGS. 9A and 9B illustrate embodiments of a pre-execution compliance module 610 and a runtime compliance module 625, respectively, that apply some or all of the received rulesets 1-N to given queries and/or result sets. As illustrated in FIGS. 9A and 9B, a subset of the provider rulesets to be applied can be first selected via a ruleset determination module 910. For example, the ruleset determination module 910 can be implemented by utilizing processing module 410 and/or memory module 412 of the query processing system 114 for implementation in conjunction with the pre-execution compliance module 610 and/or the runtime compliance module 625.

The ruleset determination module 910 can receive and/or determine provider domain data for some or all data providers 1-N. The provider domain data can indicate which subset of tables of the database system and/or particular records stored by the database system 112 are generated via data supplied by a particular provider. This can be determined by the ruleset determination module 910 based on a known configuration of the database system 112, based on information in entries 425 of the provider profile database 424 indicating which tables and/or records contain information supplied by the corresponding provider, and/or based on another determination.

The provider domain data can be compared to an incoming query, as illustrated in FIG. 9A, prior to processing by the pre-execution compliance module 610. In particular, only tables called by the query and/or only tables with fields being returned by the query can be extracted from the query for comparison to the provider domain data. This comparison is utilized to determine a subset of providers 1-R that supply data involved in the query and/or that supply data that will be returned by the query.

A determined subset of providers 1-R outputted by the ruleset determination module 910 can include a single provider, can include a proper subset of the set of providers 1-N, and/or can include all of the providers 1-N. For example, this output can include provider IDs of providers 1-R can be indicated by the ruleset determination module. The output can be sent to the pre-execution compliance module 610 as illustrated in FIG. 9A, when the determination is made based on the query prior to execution. The output can be sent to the runtime compliance module 625 as illustrated in FIG. 9B when the determination is made based on result set data such as intermediate and/or final result sets or values, prior to execution.

Once the subset of providers 1-R are received as output from the ruleset determination module 910, the pre-execution compliance module 610 and/or runtime compliance module 625 can then retrieve and/or utilize only the rulesets 1-R for these relevant providers 1-R. For example, the identifiers of the indicated providers 1-R can be utilized to retrieve and/or locally access the corresponding rulesets as discussed in conjunction with FIGS. 6D and 6E. Alternatively or in addition, the rulesets 1-R for the determined subset of providers 1-R can be determined by the ruleset determination module 910 for inclusion in its output to the pre-execution compliance module 610 and/or runtime compliance module 625. Alternatively or in addition, the pre-execution compliance module 610 and/or runtime compliance module 625 retrieves and/or utilizes rulesets for all of the providers 1-N, where the ruleset determination module 910 is not utilized and where every ruleset 1-N is applied in the fashion described with respect to the application of rulesets 1-R.

In some cases, the determined subset of providers 1-R outputted by the ruleset determination module 910 based on a given query as illustrated in FIG. 9A corresponds to providers that could possibly be included in a final or intermediate result set or could possibly be otherwise utilized in execution of the query, but will not necessarily be included in the final or intermediate result set and/or will not be otherwise utilized in execution of the query. For example, if a table that will be utilized in execution of query includes records generated based on data supplied by multiple telecommunication companies, the set of providers 1-R can include every telecommunication company that supplies data to the table, even if the final result set is ultimately generated without utilizing any records of one or more of the set of providers 1-R. Thus, the pre-execution rulesets for every one of these providers can be utilized by the pre-execution compliance module for comparison to the query.

In some embodiments, when this mechanism of applying rulesets of all possible providers is applied, a given query can be executed by the query execution module 620 regardless of whether or not compliance was met for every pre-execution ruleset for every one of the providers. In particular, a pre-execution ruleset of a particular data provider that indicates noncompliance of the query should not prohibit a query from being executed, if execution of the query ultimately does not result in any access or return of records supplied by this particular data provider. To resolve this issue, when a pre-execution ruleset for at least one of the providers that supplies records to a table indicated in the query indicates compliance is met, the query is still executed by query execution module 620, even when at least one pre-execution ruleset for at least one of the other providers that supplies records to a table indicated in the query is not complied with by the query. The actual set of providers that provided records utilized by the query can be determined based on the result set data or other information regarding the execution of the query. This actual set of providers may be a proper subset of the possible set of providers indicated by the ruleset determination module 910 prior to execution of the query. In particular, if a proper subset of possible providers determined to have pre-execution rulesets that were not complied with by the query, and if the intersection between this proper subset of possible providers and the actual set of providers determined after execution of the query is null, the query can retroactively be determined to have complied with all of the relevant pre-execution rulesets, and thus the result set can proceed to be evaluated by the runtime compliance module 625.

In cases where the pre-execution compliance module 610 is implemented on user device 140, the GUI 345 can present a warning that the given query may not comply with rulesets of the possible providers. This can prompt the user to change their query, for example, if it is probable that records of the possible providers will indeed be utilized and/or returned, to avoid the time and/or potential monetary cost the end user to execute the end query and ultimately determine that the result set cannot be returned to the user due to non-compliance with these rules.

Alternatively, to avoid this retroactive redaction of indication of non-compliance, the determined subset of providers 1-R outputted by the ruleset determination module 910 based on a given query as illustrated in FIG. 9A can instead correspond only to the providers that will certainly be included in a final or intermediate result set. For example, if a table is accessed that includes records supplied by only a single provider and/or if it is certain that at least one result will be returned, the corresponding single provider can be indicated in the set of providers 1-R. As another example, if a table is accessed that includes records supplied by multiple providers, but the query includes filtering parameters indicating use of only the records supplied by a single provider, the corresponding single provider can be indicated in the set of providers 1-R. As another example, if a table is accessed that includes records supplied by multiple providers and if it is known that at least one record will be accessed and/or returned for each one of the multiple providers and/or a proper subset of the multiple providers, the corresponding multiple providers or subset of the multiple providers can be indicated in the set of providers 1-R. In some cases, such determinations can be made based on cached results of other recent queries, based on known characteristics of records stored in the table by the multiple providers, and/or other information.

In such embodiments, if any uncertainty is reached by the ruleset determination module 910 with regards to which providers supply records that will actually be accessed and/or returned by the query, the ruleset determination module can abstain from indicating any possible providers that have only a possibility of supplying records that will be utilized and/or returned in execution of the query. In such cases, evaluation of the corresponding pre-execution rules set by the corresponding possible providers can be delayed, where these pre-execution rules are evaluated after the query has been executed, and are only evaluated if the query was determined to utilize and/or return records supplied by these corresponding possible providers. For example, these pre-execution rules, such as a forbidden fields ruleset dictated by a possible provider, can be retrieved and/or utilized by the runtime compliance module 625 for evaluation based on the original query and/or the result set data. In particular, the ruleset determination module 910 can indicate that both the pre-execution rulesets and runtime rulesets be evaluated by the runtime compliance module 625 for the previously deemed possible providers that were determined after execution to be actual providers. Alternatively or in addition, the ruleset determination module 910 can indicate that both the pre-execution rulesets and runtime rulesets be evaluated for every provider determined to supply data utilized and/or returned in execution of the query. In some cases, only the runtime compliance module 625 is utilized, where queries and/or the result sets are only evaluated during and/or after execution, and where both the pre-execution rulesets and the runtime rulesets are evaluated by the runtime compliance module during and/or after execution.

Once the individual rulesets 1-R that apply to the query are determined and/or retrieved, the pre-execution module 610 can evaluate whether the query complies with each ruleset 1-R, for example, by separately comparing each ruleset 1-R to the query as illustrated in FIG. 6A via each of a set of corresponding compliance modules 1-R. For example, each compliance module 1-R can be implemented utilizing the processing module 410 and/or memory module 412 of the query processing module. Each compliance module 1-R and can function to evaluate in the same fashion as any embodiment of the pre-execution compliance module 610 discussed herein to evaluate a query's compliance with a given pre-execution ruleset, where the given pre-execution ruleset includes some or all of the rules for the corresponding provider. Thus, each compliance module 1-R can generate its own compliance data indicating whether the query adhered to the ruleset of the given provider.

A compliance data aggregator module 920 can generate the final pre-execution compliance data indicating whether or not compliance is met, given the compliance data 1-R. For example, the pre-execution compliance data indicates compliance is met if and only if every one of the compliance data 1-R generated by the corresponding compliance modules 1-R indicates the query complied with the corresponding ruleset. In the case of non-compliance, the pre-execution compliance data can indicate which ones of the rulesets 1-R resulted in the non-compliance, based on which ones of the compliance data 1-R indicated non-compliance. Furthermore, compliance data outputted by a compliance module can indicate which portions of the query failed to comply and/or can indicate which rules in the corresponding ruleset of the corresponding provider the query failed to comply with. The pre-execution compliance data can thus further indicate particular portions of the query and/or particular rules in one or more provider rulesets with which the query failed to comply.

As depicted in FIG. 9B, the runtime execution module can implement a set of compliance modules 1-R and/or a compliance data aggregator module 920 in a similar fashion as discussed with regards to FIG. 9A. This can include determining providers of individual records in a result set, for example as indicated by the provider domain data, to identify the subset of providers 1-R. Once the individual rulesets 1-R that apply to a result set are determined and/or retrieved, the pre-execution module 625 can evaluate whether the result set and/or original query complies with each ruleset 1-R, for example, by separately comparing each ruleset 1-R to the result set as discussed in conjunction with FIG. 6B via each of the same or different set of corresponding compliance modules 1-R. Each of these compliance modules 1-R and can function to evaluate in the same fashion as any embodiment of the runtime compliance module 625 discussed herein to evaluate a query's compliance with a given runtime ruleset, where the given runtime ruleset includes some or all of the rules for the corresponding provider. Thus, each compliance module 1-R can generate its own compliance data indicating whether the result set adhered to the ruleset of the given provider.

Figure 9C:
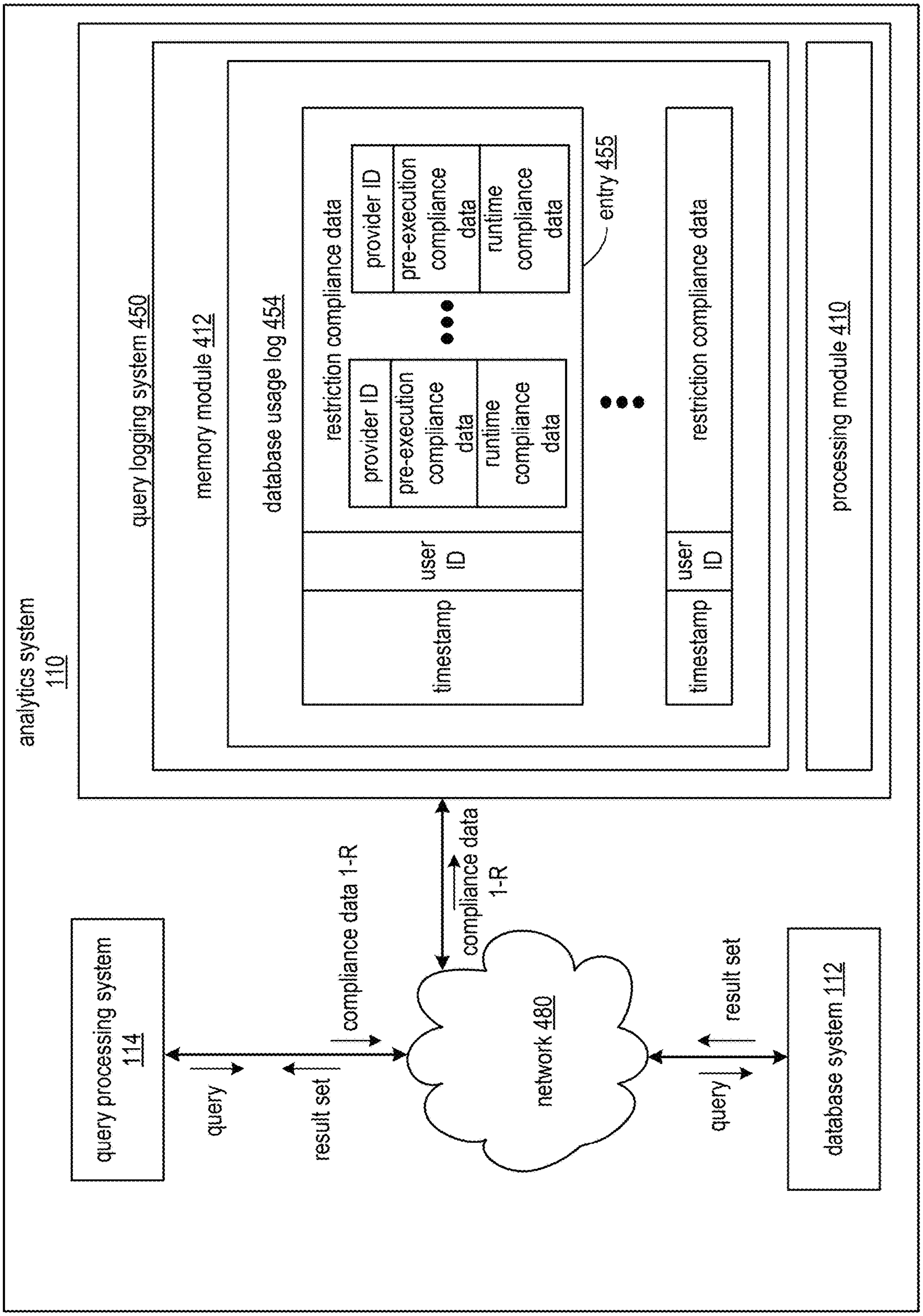
FIG. 9C is a schematic block diagram of an embodiment of an analytics system module in accordance with various embodiments of the present invention.

As illustrated in FIG. 9C, the result set itself can be divided into a plurality of result subsets 1-R. Each result subset can include only the data supplied by the corresponding provider, and thus each compliance module compares rules only to portions of the result set that the rule is applicable to. For example, if a particular result set includes more than a maximum number of records indicated by a particular provider's rule, the rule may only be applied to the subset of records in the result set that were supplied by the provider. In this case, the subset may include less than the maximum number of records, and thus the result set would comply with this provider's rule.

The same or different compliance data aggregator module 920 can generate the final runtime compliance data indicating whether or not compliance is met, given the compliance data 1-R. For example, the runtime compliance data indicates compliance is met if and only if every one of the compliance data 1-R generated by the corresponding compliance modules 1-R indicates the result set complied with the corresponding ruleset. In the case of non-compliance, the runtime compliance data can indicate which ones of the rulesets 1-R resulted in the non-compliance, based on which ones of the compliance data 1-R indicated non-compliance. Furthermore, compliance data outputted by a compliance module can indicate which records and/or features of the result set data and/or intermediate results failed to comply and/or can indicate which rules in the corresponding ruleset of the corresponding provider the result set data failed to comply with. The pre-execution compliance data can thus further indicate particular portions of the query and/or particular rules in one or more provider rulesets with which the result set data failed to comply.

In some embodiments, each compliance module 1-R of the pre-execution compliance module 610 implements a result compliance module 810, aggregation compliance module 820, and/or utilization compliance module 830 of FIG. 8A. Alternatively, a result compliance module 810, aggregation compliance module 820, and/or utilization compliance module 830 of FIG. 8A can each implement their own compliance modules 1-R, where the compliance modules 1-R are each specific to result rulesets, aggregation rulesets, and/or utilization rulesets of each provider ruleset 1-R depending on whether they are implemented by the result compliance module 810, aggregation compliance module 820, and/or utilization compliance module 830, respectively. In such embodiments, the number of compliance modules in each of the result compliance module 810, aggregation compliance module 820, and/or utilization compliance module 830 can differ, for example, where a compliance module for one particular provider in the set of providers 1-R is implemented by the result compliance module 810, but not the aggregation compliance module 820, as a result of the particular provider having a result ruleset but not an aggregation ruleset.

Similarly, each compliance module 1-R of the pre-execution compliance module 625 can implement a result compliance module 850, aggregation compliance module 860, and/or utilization compliance module 870 of FIG. 8B. Alternatively, a result compliance module 850, aggregation compliance module 860, and/or utilization compliance module 870 of FIG. 8B can each implement their own compliance modules 1-R, where the compliance modules 1-R are each specific to result rulesets, aggregation rulesets, and/or utilization rulesets of each provider ruleset 1-R depending on whether they are implemented by the result compliance module 850, aggregation compliance module 860, and/or utilization compliance module 870, respectively. In such embodiments, the number of compliance modules in each of the result compliance module 850, aggregation compliance module 860, and/or utilization compliance module 870 can differ, for example, where a compliance module for one particular provider in the set of providers 1-R is implemented by the result compliance module 850, but not the aggregation compliance module 860, as a result of the particular provider having a result ruleset but not an aggregation ruleset.

As depicted in FIGS. 9A and 9B the application of compliance modules 1-R can be performed in parallel, where compliance modules 1-R are applied, for example simultaneously and/or in an overlapping timeframe utilizing distinct and/or overlapping resources. Compliance modules 1-R can otherwise be distinctly applied, in series or in parallel, for example, without influence by the resulting compliance data of other compliance modules. This independent application of provider rulesets depicted in FIGS. 9A and 9B can be favorable in embodiments that utilize audit log generating system 460. In particular, this mechanism requires that each relevant ruleset be applied to a query and/or result set, regardless of whether or not a different ruleset already indicated non-compliance.

Alternatively, the compliance modules of FIGS. 9A and 9B can be applied in sequence, for example, where subsequent ones of the compliance modules are applied only if the previous compliance modules outputted compliance data indicating compliance. Once any one of the compliance modules indicates non-compliance, further processing of the query and/or result set can be aborted, where the query processing system automatically foregoes application the remaining compliance modules as non-compliance is already determined. Such embodiments can be favorable in cases where efficiency is preferred, as queries can be processed for compliance more quickly.

In some embodiments, an ordering of the application of compliance modules 1-R is automatically determined by the query processing system 114. This ordering of the application of compliance modules 1-R can be determined based on, for example, a historical rate of non-compliance, for example indicated by the database usage log 454, an expected rate of non-compliance, and/or an automatically determined strictness score for the corresponding set of rules. In particular, ones of the compliance modules with rulesets corresponding to highest historical rates of non-compliance, highest expected rates of non-compliance, and/or strictest strictness scores can be applied first, as they are deemed most likely to result in non-compliance. Ones of the compliance modules with rulesets corresponding to lower historical rates of non-compliance, lower expected rates of non-compliance, and/or less-strict strictness scores can be subsequently applied, with compliance modules that deemed less likely to result in non-compliance being subsequently applied in the ordering. Application of such an ordering can further increase efficiency by increasing the probability that non-compliance will be determined via the application of fewer compliance modules. This ordering of the compliance modules 1-R can be determined in conjunction with determination of the rule hierarchy discussed in conjunction with FIGS. 16A-16F.

Each individual provider's compliance data, whether processed in sequence or in parallel, can be indicated in the aggregated compliance data generated by the pre-execution module and/or the runtime module. The individual compliance data for each provider can thus be logged in the usage log entry for the query as separate restriction compliance data for each provider. This distinct logging of different provider's compliance data is depicted in FIG. 9C. Compliance data 1-R that is generated as pre-execution compliance data and/or runtime compliance data for each ruleset 1-R can be sent to the query logging system 450, for example, in a usage log entry 455 generated by the query processing system and/or to otherwise populate a usage log entry 455 for a corresponding query as restriction compliance data. The restriction compliance data in a usage log entry can separately indicate pre-execution compliance data and/or runtime compliance data for different providers 1-R, denoted by their provider IDs, based on the received compliance data 1-R.

The audit log generating system 460 can maintain this separation of compliance data for different providers in generating audit logs for different providers by including only the pre-execution compliance data and/or runtime compliance data for the corresponding provider. This separation can be favorable in maintaining each provider's privacy, ensuring that different providers cannot discover each other's rulesets and/or usage data. In particular, the audit log for a particular provider can indicate and/or be derived based on only the set of queries that invoked rulesets for that provider, ensuring that queries and/or other usage of data involving other providers is kept private. Furthermore, if single query invoked rulesets 1-R for providers 1-R, an audit log for a particular provider can provide information regarding only the portion of the query that involved the data supplied by the provider to further ensure privacy for data usage between providers. Furthermore, the runtime compliance data indicated in the audit log can indicate only information regarding records in corresponding provider's result subset of the result set, maintaining the privacy of other provider's records and/or maintaining privacy of a user's usage of other provider's records.

In embodiments where a compliance module for every one of the provider rulesets 1-N, is utilized, the restriction compliance data in every usage log entry can include compliance data for every provider. This can be useful in providing data to each provider in their audit logs that shows that every single query was checked for compliance with the rules dictated by each provider, aiding in convincing each provider that their rules were adhered to in the execution of every query received by the analytics system 110. In such embodiments, the compliance data of a query and/or result set that did not invoke a provider's ruleset can indicate compliance with these rulesets that were not applicable to the given query and/or result set. Alternatively, in cases where only rulesets 1-R are applied as illustrated in FIGS. 9A and 9B, compliance data can still be provided for the remaining providers with rulesets that were not invoked. This compliance data can indicate that the provider ruleset was not invoked for a given query, can indicate that the given query did not involve data supplied by the provider, and/or can otherwise indicate that the rulesets were not applicable to the query. In some embodiments, data generated by the ruleset determination module 910 can be included and/or utilized to generate the compliance data for these remaining providers in the usage log entry 455, for example, to show the checks and/or other means in which the provider's ruleset was determined to not be applicable to the query and/or result set.

FIGS. 10A-10D relate to customization and enforcement of rules of a forbidden fields ruleset 562, which designate individual forbidden fields and/or sets of forbidden fields that cannot be returned to end users as raw data. The customization and enforcement of forbidden fields as discussed in conjunction with FIGS. 10A-10D present favorable improvements to existing technologies for licensing data and/or maintaining anonymity of data by restricting access to raw values of particular fields or combinations of fields based on various, configurable criteria.

In particular, different forbidden fields can be customized and enforced for data supplied by different providers. In some cases, different forbidden fields within a same total set of fields of a standardized record type that populates one or more same tables can be customized for different providers. Different forbidden fields can be customized and enforced for data accessed by users at differing subscription levels. Alternatively or in addition, the analytics system 110 can otherwise determine forbidden fields for different subscription levels automatically as a function of the cost of the subscription level, as a function of the favorability of the subscription level, and/or as a function of the value or demand for raw values of individual and/or combinations of forbidden fields. For example, subscription levels corresponding to a higher recurring payment, higher cost, and/or otherwise more favorable subscription levels can be granted access to raw data of individual fields and/or combinations of fields that are denoted as forbidden fields for less favorable subscription levels to enhance the experience for the users at increasingly more favorable subscription levels. Alternatively, as some fields and/or combinations of fields may contain sensitive information and/or can be susceptible for use in identify matching, some or all forbidden fields can be dictated regardless of subscription level.

Figure 10A:
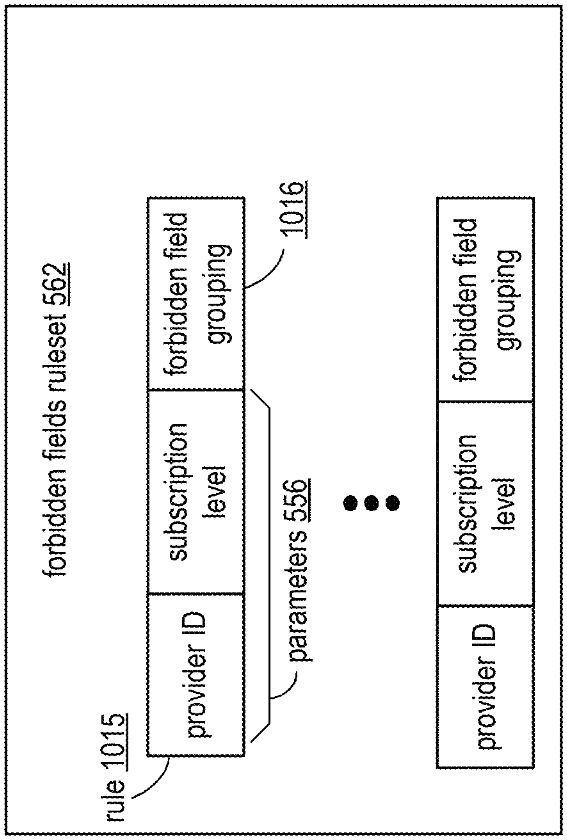
FIG. 10A illustrates an example embodiment of a forbidden fields ruleset in accordance with various embodiments of the present invention.

FIG. 10A presents an embodiment of the forbidden fields ruleset 562, which can include a plurality of rules 1015. Each rule 1015 can indicate a forbidden fields grouping 1016, which can indicate one or more fields to be enforced by the query processing system 114 as a grouping of forbidden fields for result sets of queries received by the query processing system 114. For example, a forbidden fields grouping 1016 can indicate a field identifier for a single field that can never be returned as raw data in a result set, or multiple field identifiers for a particular grouping of fields that can never be returned as raw data in tandem for a same record. Each rule 1015 can further indicate one or more rule parameters 556, denoting the conditions under which this particular forbidden fields grouping 1016 is applicable to a given query and/or given result set, as discussed in conjunction with FIG. 5C. For example, the query processing system 114 can determine to retrieve and or utilize a given forbidden fields grouping 1016, and/or can otherwise determine a given forbidden fields grouping 1016 is applicable to a given query or result set, based on determining that the corresponding parameters 556 compare favorably to corresponding parameters determined by the query processing system 114 for the given query and/or result set.

The parameters 556 of a rule 1015 can include at least one provider ID, denoting which provider from which the rule 1215 was received in a corresponding provider ruleset 560 and/or otherwise denoting the corresponding forbidden fields grouping 1016 applies to data supplied by the corresponding at least one provider. The parameters 556 of a rule 1215 can include one or more subscription levels, denoting the forbidden fields grouping 1016 applies to queries received from users at a corresponding subscription level indicated in the one or more subscription levels. For example, a particular rule 1015 can indicate that records supplied by provider X returned in queries cannot include the combination of fields C and D for users at subscription level I. Some rules 1215 can include fewer parameters 556 and/or can include additional parameters 556 not indicated in FIG. 12A. In some cases, each listed parameter 556 must be met for the corresponding forbidden fields grouping 1016 to be retrieved, checked, and/or applied by the query processing system for the given query. In some cases, the query processing system 114 must determine the conditions of each listed parameter 556 of a rule 1015 match or otherwise compare favorably to those of a given query or result set for a determination of non-compliance with rule 1015 to be possible.

Figure 10B:
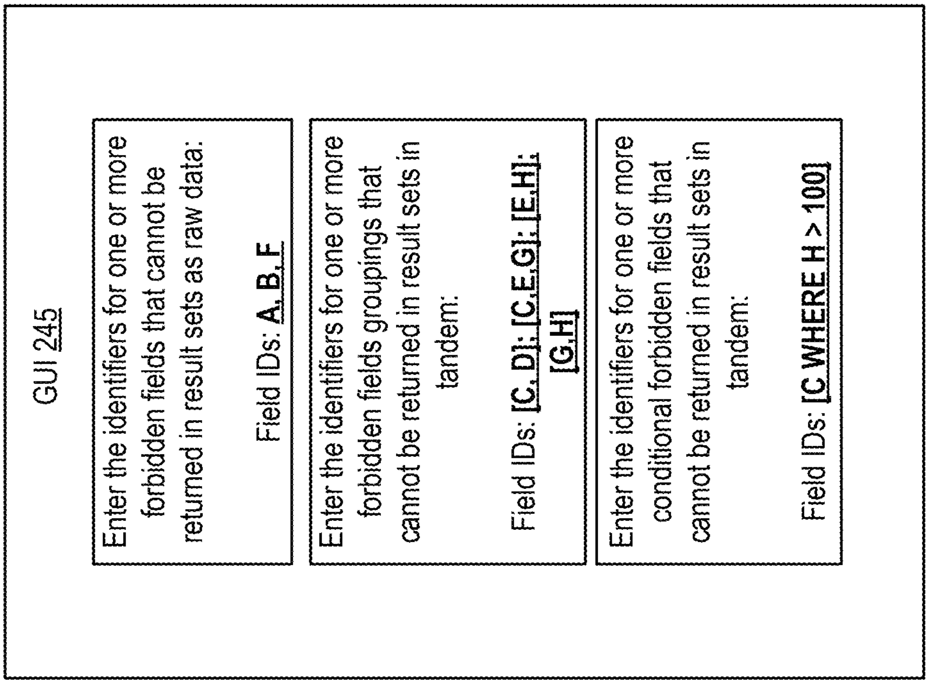
FIG. 10B illustrates an example embodiment of GUI displayed via a provider device in accordance with various embodiments of the present invention.

FIG. 10B, as well as FIGS. 11B, 12B, 13B, 14B, and 15B, illustrate example embodiments of GUI 245 displayed via a provider device 230 in conjunction with enabling the user input utilized to generate rules for a provider's query ruleset transmitted to the analytics system 110. Consider an example where a provider supplies data for records that include values for some or all of a plurality of fields with labels A, B, C, D, E, F, G, and H. This provider also offers two subscription levels to its users: subscription levels I and II. As illustrated in FIGS. 10B, 11B, 12B, 13B, 14B, and 15B, the provider can enter various rules restricting usage for different fields A-H in user queries, where some or all of these restrictions can differ for the two different subscription levels I and II.

In other embodiments, some or all of the rules entered via user input as illustrated in FIGS. 10B, 11B, 12B, 13B, 14B, and 15B can be automatically generated by the analytics system 110, for example, where the user of GUI 245 can override an automatically determined ruleset of preset rules. In such embodiments, a user may only be allowed to further restrict rules in such a predetermined set of rules by only increasing the conditions for non-compliance in the predetermined set of rules. In particular, a predetermined set of rules configured by a regulating entity and/or administrator may be set at a threshold minimum level of strictness for rules relating to privacy and/or identity matching.

As illustrated in FIGS. 10B, 11B, 12B, 13B, 14B, and 15B, underlined and bolded text denotes user input, such as text that was selected and/or entered by the user in response to the displayed prompt. The GUI 245 illustrated in FIGS. 10B, 11B, 12B, 13B, 14B, and 15B are non-limiting examples that serve to illustrate different types of rules that a provider can enter via user input. Different prompts and/or different configurations of the prompts to enter the same and/or different types of rules can be implemented in other embodiments of GUI 245. The prompts depicted in FIGS. 10B, 11B, 12B, 13B, 14B, and 15B can be presented in a single view and/or in multiple views. Any additional prompts to enter any of the types of rules discussed herein can further be presented via GUI 245 in other embodiments.

FIG. 10B illustrates an example embodiment for a GUI 245 enabling configuration of forbidden fields groupings 1016 and/or corresponding parameters 556 for one or more rules 1015 of the forbidden fields ruleset 562. The GUI 245 can present a prompt to enter identifiers for forbidden fields that cannot be returned in result sets as raw data. In the example illustrated in FIG. 5D, the user indicates that values of fields A, B, and F cannot be returned as raw data. The GUI can further present a prompt to enter identifiers for forbidden fields groupings that cannot be returned in result sets in tandem. In the example illustrated in FIG. 5D, the user indicates the following field groupings that cannot be returned as raw data in tandem for the same records: fields C and D; fields C, E and G; fields E and H, and fields G and H.

The GUI can further present a prompt to enter identifiers for fields that are forbidden to be returned as raw data under particular conditions. In the example illustrated in FIG. 5D, the user indicates that field C of a record cannot be returned as raw data when the value of field H for the same record is greater than 100. However, field C can be returned when the value of field H is less than or equal to 100, so long as field C is still not returned in tandem with D, or in tandem with the combination of fields E and G. Such conditionals can involve one or more fields within the forbidden fields grouping and/or can involve one or more other fields, as illustrated in FIG. 10B. This conditional information indicating one or more conditioned fields and the corresponding condition for which the rule is applicable, while not illustrated in FIG. 10A, can be further included as one or more additional parameters 556.

While these forbidden fields may be selected for privacy reasons that apply regardless of an end user's subscription level, in other embodiments, the user can indicate different forbidden fields for different subscription levels, for example, where more favorable subscription levels have less forbidden fields and/or otherwise have less stringent requirements on groupings and/or which conditions apply to render a field as forbidden to be returned as raw data.

Some or all of this information provided in response to such prompts relating to forbidden fields that cannot have their raw values seen by or returned to end users can be utilized to determine rules 1015 of the forbidden fields ruleset 562 of the corresponding provider's provider ruleset 560. In particular, the forbidden fields grouping 1016 and corresponding parameters 556 for one or more rules 1015 configured by a particular provider can be automatically populated by the analytics system 110 as designated in the corresponding user input to GUI 245. Alternatively, the forbidden fields grouping 1016 for one or more rules 1015 can be automatically determined by the analytics system as a deterministic function of one or more of the parameters 556.

Figure 10C:
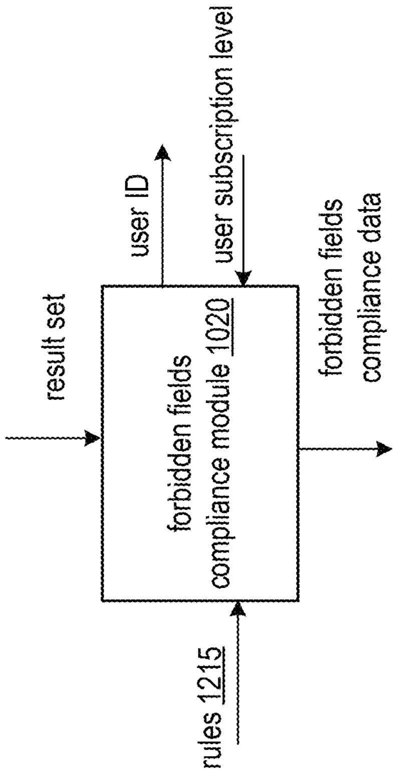
FIGS. 10C-10D are schematic block diagrams of a forbidden fields compliance module in accordance with various embodiments of the present invention.
Figure 10D:
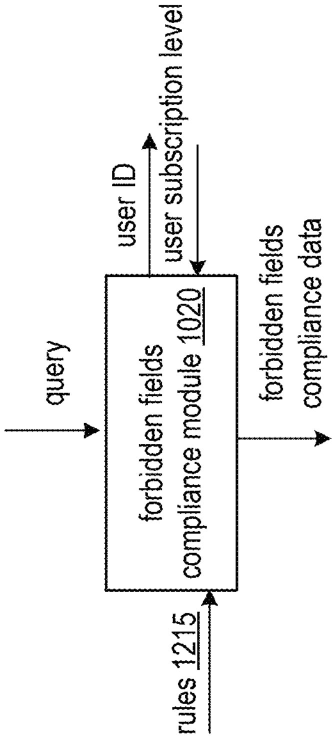

FIGS. 10C-10D illustrate example embodiments of a forbidden fields compliance module, which can be implemented utilizing the query processing system 114 to determine whether compliance with rules 1015 of the forbidden fields ruleset 562 is achieved. FIG. 10C illustrates a forbidden fields compliance module 1020 that is implemented utilizing the runtime compliance module 625 and/or is otherwise implemented after a result set for a given query is determined. The forbidden fields compliance module 1020 can receive result set data and/or can receive information indicating the fields included in a result set as raw values.

While FIG. 10C depicts implementation of the forbidden fields compliance module 1020 as being implemented during and/or after execution of the query, in most cases, the information regarding whether forbidden fields will be included in the result set returned by the query is determinable given the query itself. For example, the fields indicated in a SELECT clause of a SQL query can be indicative of which set of fields will be returned, for example, unless the result set is empty. Thus, it can be more favorable to perform such checks for forbidden fields prior to execution to the query via the analytics system 110 and/or via the user device 140 as discussed in conjunction with FIGS. 7A-7E. Such an embodiment is illustrated in FIG. 10D, which illustrates a forbidden fields compliance module 1020 that is implemented utilizing the pre-execution compliance module 610 and/or is otherwise implemented prior to execution of a given query. The forbidden fields compliance module 1020 can receive the query to determine the fields requested to be included in a result set as raw values.

In either implementation of the forbidden fields compliance module 1020 by the runtime compliance module 625 or pre-execution compliance module 610, the forbidden fields compliance module 1020 can compare the fields included in the result set and/or the fields requested to be included in the returned result set, respectively, to the forbidden fields groupings 1016 of one or more applicable rules 1015 to generate forbidden fields compliance data indicating whether compliance with rules 1015 is achieved. In particular, the forbidden fields compliance module 1020 can determine whether the fields in the result set includes the single field or entire set of fields indicated in a forbidden fields grouping 1016 for only a single rule 1015 and/or multiple rules 1015 corresponding to a proper subset of rules in ruleset 566 determined to be applicable to the result set based on the parameters 556. If the result set does not include the full set of fields indicated in any forbidden fields grouping 1016 for any applicable rules, the forbidden fields compliance data can indicate compliance. If the result set does include the full set of fields indicated in the forbidden fields grouping 1016 for at least one applicable rule, the forbidden fields compliance data can indicate non-compliance. The runtime compliance module 625 can consolidate this forbidden fields compliance data with other compliance data generated as discussed herein to generate the runtime compliance data for given result set data. Similarly, the pre-execution compliance module 610 can consolidate this forbidden fields compliance data with other compliance data generated as discussed herein to generate the runtime compliance data for a given query.

In some cases, the forbidden fields compliance module 1020 can generate the compliance data by determining whether the raw values accessed in by the query undergo aggregation prior to being returned by the query. If no aggregation is performed on raw values of fields accessed in the query, indicated by the forbidden fields grouping, the compliance data can indicate non-compliance based on this lack of aggregation. If aggregation is performed on raw values of fields accessed in the query, indicated by the forbidden fields grouping, the compliance data can indicate compliance based on this application of upon raw values of forbidden fields.

The various parameters for a given query or result set that correspond to parameters 556 can automatically be determined by the forbidden fields compliance module 1020 based on the language in the query itself, based on the result set itself, based on intermediate results included in other result set data, and/or based on information retrieved from the provider management system 420 and/or user management system 440 for given provider IDs and/or user IDs extracted from the query and/or result set data. For example, as illustrated in FIGS. 10C and 10D, the user subscription level can be retrieved by the forbidden fields compliance module 1020 by utilizing the user ID extracted from the query and/or otherwise determined to correspond to the end user that requested the query.

The forbidden fields compliance module 1020 can utilize these determined parameters for the given query and/or result set to retrieve applicable rules from the ruleset 562, to access applicable rules in a locally stored ruleset 562 and/or to otherwise filter the ruleset 562 to select only a subset of rules that are applicable based on parameters 556 as discussed in conjunction with FIGS. 5C and/or FIGS. 6B-6E. Alternatively or in addition, the forbidden fields compliance module 1020 can otherwise determine features of the query and/or result set that correspond to parameters 556 to determine whether some or all rules 1015 are applicable, where a rule is only applicable if every parameter 556 matches or otherwise compares favorably to the corresponding features of the query and/or result set. Thus, the forbidden fields compliance module 1020 can determine non-compliance of a particular rule 1015 if and only if every parameter 556 compares favorably to the corresponding features of the query and/or result set, and further if the fields returned in the result set as raw data include every field included in the corresponding forbidden fields grouping 1016 listed for the rule.

For example, the forbidden fields compliance module 1020 can determine the applicable provider ID and/or subscription level of a given query and/or result set. The forbidden fields compliance module 1020 can query the ruleset 562 for rules 1015 with a forbidden fields grouping that is a subset of a determined set of fields returned for records in the result set as raw data, as well as some or all of: a provider ID that matches the provider ID for the given query and/or result set; and/or a subscription level that matches the subscription level of the user that generated the query. If no results in ruleset 562 are found or returned, the forbidden fields compliance module 1020 can conclude that the query and/or result set complied with every rule in the ruleset 562, and the forbidden fields compliance data can indicate compliance. If one or more rules in the ruleset 562 are returned, the forbidden fields compliance module 1020 can conclude that the query and/or result set did not comply with these returned rules, and the forbidden fields compliance data can indicate non-compliance. Alternatively, additional evaluation can be performed based on the returned rules from ruleset 562 as required before a conclusion of non-compliance is made.

In some embodiments, a rule can indicate that no raw data for any fields can be returned. For example, an aggregation may be required to be performed on any records being utilized by a particular provider or by any provider, where only the outputs of aggregations can be returned. This can be favorable in ensuring that end users can never see or receive raw data to ensure this data remains private and/or to ensure the end user is not able to re-license or otherwise share this raw data with other end users. In some cases, this mechanism can be enforced automatically by the query processing system 114, where every field is thus automatically designated as a forbidden field for a particular provider and/or all providers in the ruleset 562. In such cases, the forbidden fields compliance module 1020 can simply determine whether any field of any record is returned as raw data in generating the compliance data, and/or can determine whether or not an appropriate aggregation or other processing to obfuscate raw data is performed on result sets generated in execution of the query.

Figure 11A:
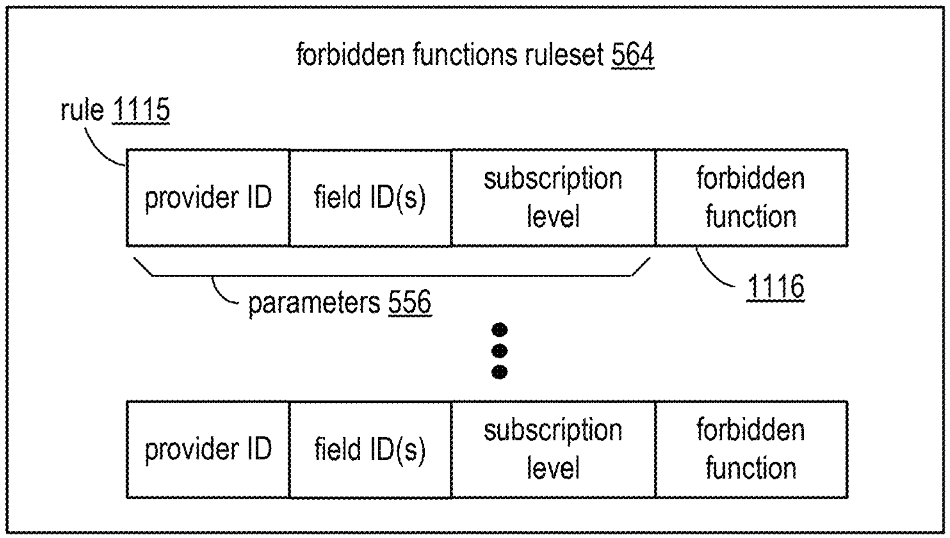
FIG. 11A illustrates an example embodiment of a forbidden functions ruleset in accordance with various embodiments of the present invention.
Figure 11B:
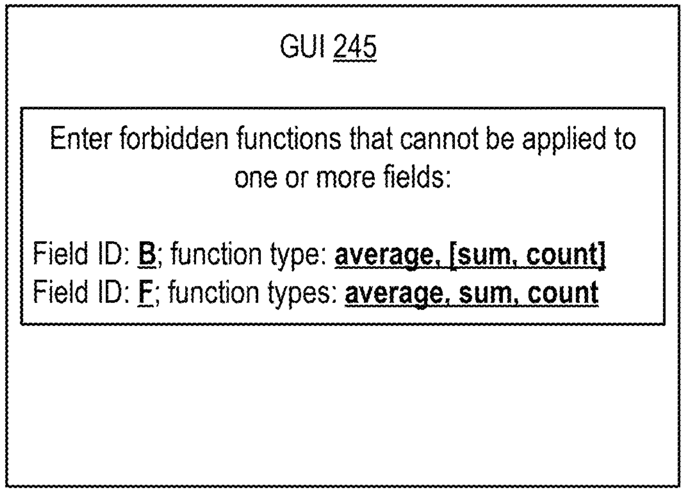
FIG. 11B illustrates an example embodiment of GUI displayed via a provider device in accordance with various embodiments of the present invention.
Figure 11C:
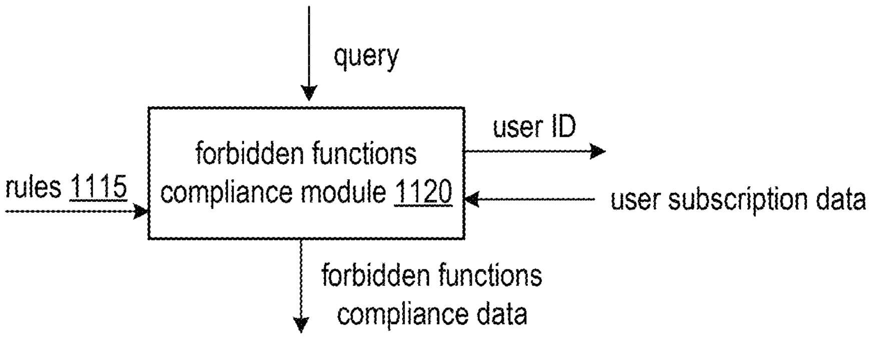
FIG. 11C is a schematic block diagram of a forbidden functions compliance module in accordance with various embodiments of the present invention.

FIGS. 11A-11C relate to customization and enforcement of rules of a forbidden functions ruleset 564, which designate functions that cannot be performed in queries and/or function output that cannot be returned to end users. The customization and enforcement of forbidden functions as discussed in conjunction with FIGS. 11A-11C present favorable improvements to existing technologies for licensing data and/or maintaining anonymity of data by restricting use of particular functions based on various, configurable criteria.

Enforcement of a forbidden functions ruleset can serve to enhance the functionality discussed with regards to enforcement of a forbidden fields ruleset. In particular, the forbidden functions ruleset can further limit the usage of sensitive fields and/or groupings of fields that may already be indicated as forbidden fields ruleset by further forbidding the usage of certain aggregations or other processing upon these forbidden fields. This can further enhance the enforcement of privacy restrictions to ensure anonymity of data is maintained. Alternatively or in addition, enforcement of a forbidden functions ruleset can coincide with data licensing preferences, for example, by allowing usage of functions corresponding to more sophisticated analytics and/or more valuable insights delivered to the end user for only users with higher level subscriptions. Alternatively or in addition, enforcement of a forbidden functions ruleset can serve to preserve resources of the analytics system utilized in performing query functions upon data by invoking limitations upon the performance of functions that require longer time and/or greater processing and/or memory resources of the analytics system to execute.

In particular, different forbidden functions can be customized and enforced for data supplied by different providers. Different forbidden functions can be customized and enforced for data accessed by users at differing subscription levels. Alternatively or in addition, the analytics system 110 can determine forbidden functions for different subscription levels automatically as a function of the cost of the subscription level and/or as a function of the favorability of the subscription level, as well as the value of various functions and/or demand by end user for use of various functions. For example, subscription levels corresponding to a higher recurring payment, higher cost, and/or otherwise more favorable subscription levels can be configured to be allowed usage of functions that provide higher visibility of data, that correspond to more sophisticated analytical functions that provide deeper insights into patterns in the records or into raw data of the records themselves, while these functions may be forbidden for usage by users at less favorable subscription levels. As another example, subscription levels corresponding more favorable subscription levels can be configured to enable output of aggregation functions upon valuable and/or sensitive data fields, such as forbidden fields indicated in the forbidden fields ruleset 562, while users at less favorable subscription levels may be forbidden to aggregate or process these forbidden data fields in any manner. As another example, subscription levels corresponding more favorable subscription levels can be configured to enable usage of aggregation functions that require greater processing resources of the analytics system 110, while users at less favorable subscription levels may only be allowed usage of functions that require fewer processing resources.

Additionally, providers can further configure licensing for different data fields of their records, for example, corresponding to different levels of valuation of different data fields and/or different levels of demand for usage of different data fields. This is achieved by enabling customization of different functions allowed to be applied different fields. Alternatively or in addition, the analytics system 110 can calculate or otherwise determine forbidden functions for different fields automatically as a function of the value of the data included in the field and/or a level of demand for the data included in the field by end users. For example, output of aggregation functions applied to a highly sensitive field may not be allowed to be returned to end users, while output of aggregation functions applied to less sensitive fields may be allowed to be returned to end users.

FIG. 11A presents an embodiment of the forbidden functions ruleset 564, which can include a plurality of rules 1115. Each rule 1115 can indicate a forbidden function 1116, which can indicate one or more particular types of functions and/or one or more function parameters to one or more particular functions that are forbidden for application. This can include a single function, and/or can indicate a grouping of functions that cannot be applied upon the same result set, cannot be applied in a designated order, and/or otherwise cannot be applied in tandem in a query. This can further include an indication of whether the output cannot be returned to the end user but can be utilized as input to further processing in the query, or that the function cannot be applied in the query even for use as an intermediate result. For example, a forbidden function 1116 can indicate an identifier or other information indicating the particular one or more forbidden functions.

Each rule 1115 can further indicate one or more rule parameters 556, denoting the conditions under which this particular forbidden function 1116 is applicable to a given query and/or given result set, as discussed in conjunction with FIG. 5C. For example, the query processing system 114 can determine to retrieve and or utilize a given forbidden function 1116, and/or can otherwise determine a given forbidden function 1116 is applicable to a given query or result set, based on determining that the corresponding parameters 556 compare favorably to corresponding parameters determined by the query processing system 114 for the given query and/or result set.

The parameters 556 of a rule 1115 can include at least one provider ID, denoting which provider from which the rule 1115 was received in a corresponding provider ruleset 560 and/or otherwise denoting the corresponding forbidden function 1116 applies to data supplied by the corresponding at least one provider. The parameters 556 of a rule 1115 can include one or more field ID indicating individual fields and/or field groupings upon which the forbidden function cannot be applied. The parameters 556 of a rule 1115 can include one or more subscription levels, denoting the forbidden function 1116 applies to queries received from users at a corresponding subscription level indicated in the one or more subscription levels. For example, a particular rule 1115 can indicate that the result of an averaging function applied to field C of a set of records supplied by provider X cannot be returned in queries for users at subscription level I.

Some rules 1115 can include fewer parameters 556 and/or can include additional parameters 556 not indicated in FIG. 11A. In some cases, each listed parameter 556 must be met for the corresponding forbidden function 1116 to be retrieved, checked, and/or applied by the query processing system for the given query. In some cases, the query processing system 114 must determine the conditions of each listed parameter 556 of a rule 1115 match or otherwise compare favorably to those of a given query or result set for a determination of non-compliance with rule 1115 to be possible.

In some embodiments, field conditionals such as ranges of acceptable and/or unacceptable raw values or aggregated values for the fields included in the result set unto which the forbidden function is applied can be indicated in the parameters 556 or otherwise apply to the rule. For example, a particular rule 1115 can indicate that an averaging function for records in a result set that include field C is forbidden when any of the records in the result set have a value for field C that is less than 10. Such field conditionals and/or ranges of acceptable and/or unacceptable raw values or aggregated values for other fields of records included in the result set, even if these fields themselves are not included in the result set, can be further indicated as parameters 556. For example, a particular rule 1115 can indicate that an averaging function for records in a result set that include field C, but not field G, is forbidden if the value field G is equal to 'RED' for all records in the set and/or for at least a threshold number of the records.

The GUI 245 can present a prompt to enter forbidden functions that cannot be applied, for example, to one or more fields. In the example illustrated in FIG. 5D, the user indicates that the average function cannot be applied to field B. The user also indicates that the combination of both the sum and count function cannot be applied to field B, as this information could be used in tandem to determine the average. Alternatively, the analytics system 110 could automatically determine that the combination of both the sum and count function cannot be applied to and/or returned for a same set of records that include field B because the user indicates that the average function cannot be applied to field B, based on automatically determining this information in tandem could be utilized by the end user to derive the average. The user also indicates that the average, sum, and count function all cannot be performed on field F.

In other embodiments, the user can indicate whether the forbidden functions are only forbidden if their result is returned as the final result in execution of the query, while other functions are only forbidden if used in intermediate results, and/or used to condition and/or filter results sets. In some embodiments, the user can indicate forbidden functions or operations that cannot be performed, for example, within WHERE clauses of Structured Query Language (SQL) queries, or other filtering mechanisms for filtering result sets that include particular fields and/or for any use. In other embodiments, different subscription levels can have different forbidden functions, for example, where more favorable subscription levels have less forbidden functions and/or otherwise have less stringent forbidden function requirements.

Some or all of this information provided in response to such prompts relating to forbidden fields that cannot have their raw values seen by or returned to end users can be utilized to determine rules 1015 of the forbidden functions ruleset 564 of the corresponding provider's provider ruleset 560. In particular, the forbidden function 1116 and corresponding parameters 556 for one or more rules 1115 configured by a particular provider can be automatically populated by the analytics system 110 as designated in the corresponding user input to GUI 245. Alternatively, the forbidden function 1116 for one or more rules 1115 can be automatically determined by the analytics system as a deterministic function of one or more of the parameters 556.

FIG. 11C illustrates example embodiments of a forbidden fields compliance module, which can be implemented utilizing the query processing system 114 to determine whether compliance with rules 1115 of the forbidden functions ruleset 564 is achieved. FIG. 10C illustrates a forbidden functions compliance module 1120 that is implemented utilizing the pre-execution compliance module 610 and/or is otherwise implemented before a query is executed. The forbidden function compliance module 1120 can receive a query to determine whether one or more functions is called in the query and/or is otherwise requested to be performed in execution of the query.

The forbidden functions compliance module 1120 can compare the functions called in the query to the forbidden function 1116 of one or more applicable rules 1115 to generate forbidden functions compliance data indicating whether compliance with rules 1015 is achieved. In particular, the forbidden functions compliance module 1120 can determine whether the query includes function calls and/or otherwise applies a single function and/or set of functions indicated as a forbidden function 1116 for only a single rule 1115 and/or multiple rules 1115 corresponding to a proper subset of rules in ruleset 566 determined to be applicable to the query based on the parameters 556. If the query does not include calls to functions indicated as a forbidden function 1116 for any applicable rules, the forbidden functions compliance data can indicate compliance. If the query does include calls to functions indicated as a forbidden function 1116 for any applicable rules, the forbidden functions compliance data can indicate non-compliance. The pre-execution compliance module 610 can consolidate this forbidden functions compliance data with other compliance data generated as discussed herein to generate the pre-execution compliance data for given query.

Because the determination for whether a particular forbidden function is called can be determined based on the query itself prior to execution, the forbidden functions compliance module 1120 need not be implemented during and/or after execution. However, in other embodiments, the runtime compliance module 625 can alternatively or additionally implement the forbidden functions compliance module 1120, for example, if one or more rules 1115 indicate particular field conditions that cannot be determined until runtime, and/or if only a runtime compliance module 625 is implemented by the analytics system 110. In such cases, the forbidden functions compliance module 1120 can determine whether a particular function was called to generate a result set and/or is going to be applied for a given result set generated as a partial result to determine whether compliance with the forbidden functions ruleset 564 is achieved.

The various parameters for a given query and/or result set that correspond to parameters 556 can automatically be determined by the forbidden function compliance module 1120 based on the language in the query itself, based on the result set itself, based on intermediate results included in other result set data, and/or based on information retrieved from the provider management system 420 and/or user management system 440 for given provider IDs and/or user IDs extracted from the query and/or result set data. For example, as illustrated in FIG. 11C, the user subscription level can be retrieved by the forbidden functions compliance module 1120 by utilizing the user ID extracted from the query and/or otherwise determined to correspond to the end user that requested the query.

The forbidden functions compliance module 1120 can utilize these determined parameters for the given query and/or result set to retrieve applicable rules from the ruleset 564, to access applicable rules in a locally stored ruleset 564 and/or to otherwise filter the ruleset 564 to select only a subset of rules that are applicable based on parameters 556 as discussed in conjunction with FIGS. 5C and/or FIGS. 6B-6E. Alternatively or in addition, the forbidden functions compliance module 1120 can otherwise determine features of the query and/or result set that correspond to parameters 556 to determine whether some or all rules 1115 are applicable, where a rule is only applicable if every parameter 556 matches or otherwise compares favorably to the corresponding features of the query and/or result set. Thus, the forbidden functions compliance module 1120 can determine non-compliance with a particular rule 1115 if and only if every parameter 556 compares favorably to the corresponding features of the query and/or result set, and further if the functions called in the query include one or more functions indicated as the forbidden function 1116 listed for the rule.

For example, the forbidden functions compliance module 1120 can determine the applicable provider ID and/or subscription level of a given query and/or result set. The forbidden functions compliance module 1120 can further determine one or more fields for records to be utilized as input one or more functions called in the query. The forbidden functions compliance module 1120 can query the ruleset 564 for rules 1115 with a forbidden function that matches any of the functions included in the query, as well as some or all of: a provider ID that matches the provider ID for the given query and/or result set; one or more field IDs that match the field ID for fields upon which the function called in the query is applied; and/or a subscription level that matches the subscription level of the user that generated the query. If no results in ruleset 564 are found or returned, the forbidden functions compliance module 1120 can conclude that the query and/or result set complied with every rule in the ruleset 564, and the forbidden functions compliance data can indicate compliance. If one or more rules in the ruleset 564 are returned, the forbidden functions compliance module 1120 can conclude that the query and/or result set did not comply with these returned rules, and the forbidden functions compliance data can indicate non-compliance. Alternatively, additional evaluation can be performed based on the returned rules from ruleset 564 as required before a conclusion of non-compliance is made.

FIGS. 12A-12D relate to customization and enforcement of rules of a maximum result set size ruleset 566, which designate a maximum number of records that can be included in result sets. The customization and enforcement of maximum sizes of result sets as discussed in conjunction with FIGS. 12A-12D present favorable improvements to existing technologies for licensing data by limiting access to records based on various, configurable criteria.

Enforcement of a maximum result set size ruleset can enhance data licensing restrictions, for example, by allowing access to and/or aggregation upon greater amounts of data for only users with higher level subscriptions, and/or by restricting access to too much data to any end user. Alternatively or in addition, enforcement of a maximum result set size ruleset can serve to preserve resources of the analytics system utilized in transmitting large volumes of data to end users and/or in performing query functions upon large volumes of data by invoking limitations upon the amount of data that can be sent to a user in a result set and/or the amount of data that can be utilized as input to particular functions and/or further processing.

In particular, different maximums can be customized and enforced for data supplied by different providers. Different maximums can be customized and enforced for data accessed by users at differing subscription levels. Alternatively or in addition, the analytics system 110 can calculate or otherwise determine maximum result set sizes for different subscription levels automatically as a function of the cost of the subscription level and/or as a function of the favorability of the subscription level. For example, subscription levels corresponding to a higher recurring payment, higher cost, and/or otherwise more favorable subscription levels can be configured with higher maximums that those configured for less favorable subscription levels to enhance the experience for the users at increasingly more favorable subscription levels.

Additionally, providers can further configure licensing for different data fields of their records, for example, corresponding to different levels of valuation of different data fields and/or different levels of demand for usage of different data fields. This is achieved by enabling customization of different maximums for access to different fields, different numbers of fields, and/or different combinations of fields. Alternatively or in addition, the analytics system 110 can calculate or otherwise determine maximum result set sizes for different fields automatically as a function of the value of the data included in the field, the number of fields, and/or a level of demand for the data included in the field by end users. For example, a higher maximum can be configured for result sets that include a greater number of fields and/or that include particular fields of a lower value, while a lower maximum can be configured for result sets that include a smaller number of fields and/or that include particular fields of a higher value to impose greater limits on access to the higher valued data.

Furthermore, providers can further control licensing of data based on whether it is returned to end users as raw values or utilized as an intermediate step in performing a query. This is achieved by enabling customization of different maximums for final result sets returned to end users and intermediate result sets utilized in execution the query, for example, as input to one or more particular aggregation functions. Alternatively or in addition, the analytics system 110 can calculate or otherwise determine maximum result set sizes for types of result sets automatically as a function of the level of aggregation that will be applied to the result set. For example, a lower maximum can be configured for results sets that are returned to the end user as raw data while a higher maximum can be configured for result sets that are utilized as input to aggregation functions. This can be favorable in cases where access to raw data of a set of records is deemed more valuable and/or requires greater bandwidth than access to results of aggregations performed on a set of records.

In some cases, the maximums can be configured by the provider and/or automatically based on bandwidth restrictions and/or processing restrictions, where maximums are set such that the volume of data that can be transmitted and/or utilized in performing an aggregation is within reason for the analytics system 110 to function properly without its resources becoming exhausted. This can further be a function of the type of data and/or number of bytes utilized for different fields, where lower maximums are set for fields that include multimedia data and/or otherwise richer data, and higher maximums are set for fields that include primitive data types or otherwise less less-rich data.

Figure 12A:
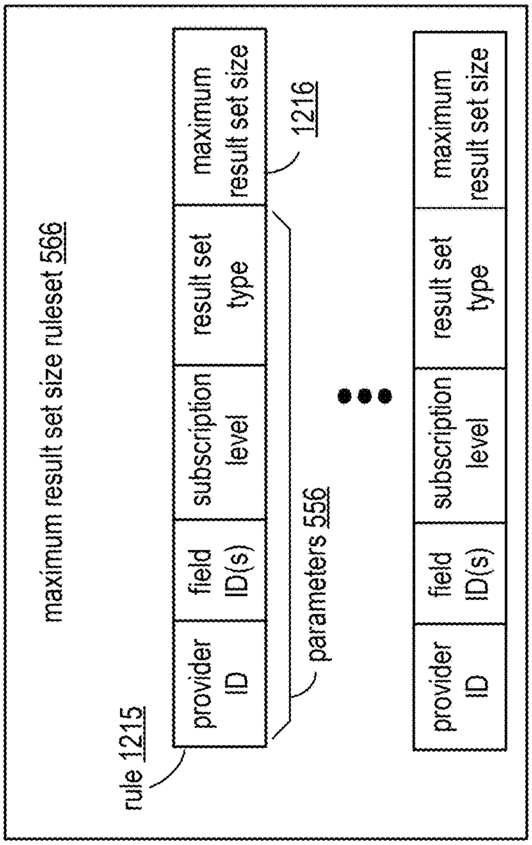
FIG. 12A illustrates an example embodiment of a maximum result set size ruleset in accordance with various embodiments of the present invention.

FIG. 12A presents an embodiment of the maximum result set size ruleset 566, which can include a plurality of rules 1215. Each rule 1215 can indicate a maximum result set size 1216 to be enforced by the query processing system 114 for result sets of queries received by the query processing system 114. For example, the maximum result set size 1216 can indicate a value that corresponding to the maximum allowable number of records in a result set, where result sets with a number of records that exceeds this value are non-compliant with this rule. Each rule 1215 can further indicate one or more rule parameters 556, denoting the conditions under which this particular maximum result set size 1216 is applicable to a given query and/or given result set, as discussed in conjunction with FIG. 5C. For example, the query processing system 114 can determine to retrieve and or utilize a given maximum result set size 1216, and/or can otherwise determine a given maximum result set size 1216 is applicable to a given query or result set, based on determining that the corresponding parameters 556 compare favorably to corresponding parameters determined by the query processing system 114 for the given query and/or result set.

The parameters 556 of a rule 1215 can include at least one provider ID, denoting which provider from which the rule 1215 was received in a corresponding provider ruleset 560 and/or otherwise denoting the corresponding maximum result set size 1216 applies to data supplied by the corresponding at least one provider. The parameters 556 of a rule 1215 can include one or more particular field IDs and/or groupings of field IDs, denoting the corresponding maximum result set size 1216 applies to result sets that include one or more of the particular field IDs and/or one or more of the groupings of field IDs. The parameters 556 of a rule 1215 can include one or more subscription levels, denoting the maximum result set size 1216 applies to queries received from users at a corresponding subscription level indicated in the one or more subscription levels. The parameters 556 of a rule 1215 can include a result set type, denoting whether the corresponding maximum result set size 1216 applies to result sets to be returned by the query as the final result, whether this maximum applies to result sets that are used in an aggregation, and/or whether this maximum applies to result sets that are otherwise intermediate results sets generated in executing the query. For example, a particular rule 1215 can indicate that records returned in queries that include the values for field C can include a maximum of 500 records supplied by provider X for users at subscription level I.

In some embodiments, field conditionals such as ranges of acceptable and/or unacceptable raw values or aggregated values for the fields included in the result set unto which the maximum size applies can be indicated in the parameters 556 or otherwise apply to the rule. For example, a particular rule 1215 can indicate that records in a result set that include field C can include a maximum of 500 records where the value field C is between 50 and 100. Such field conditionals and/or ranges of acceptable and/or unacceptable raw values or aggregated values for other fields of records included in the result set, even if these fields themselves are not included in the result set, can be further indicated as parameters 556. For example, a particular rule 1215 can indicate that records in a result set that include field C, but not field G, can include a maximum of 500 records where the value field G is equal to 'BLUE', 'GREEN' or 'YELLOW.'

Some rules 1215 can include fewer parameters 556 and/or can include additional parameters 556 not indicated in FIG. 12A. In some cases, each listed parameter 556 must be met for the corresponding maximum result set size 1216 to be retrieved, checked, and/or applied by the query processing system for the given query. In some cases, the query processing system 114 must determine the conditions of each listed parameter 556 of a rule 1215 match or otherwise compare favorably to those of a given query or result set for a determination of non-compliance with rule 1215 to be possible.

Figure 12B:
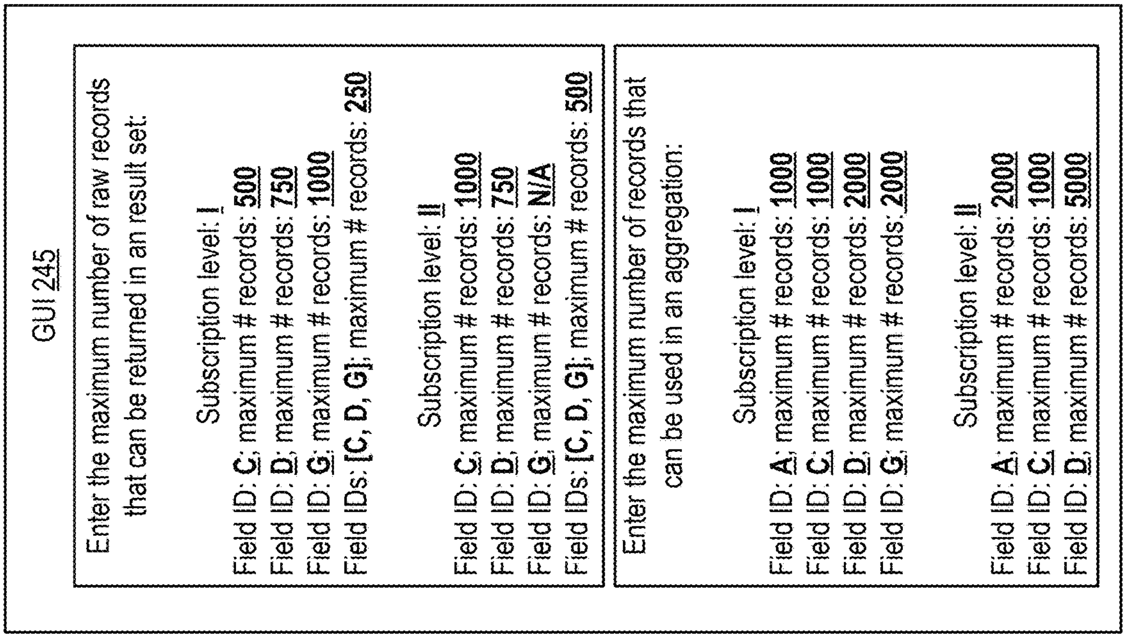
FIG. 12B illustrates an example embodiment of GUI displayed via a provider device in accordance with various embodiments of the present invention.

FIG. 12B illustrates an example embodiment for a GUI 245 enabling configuration of maximum result set sizes 1216 and/or corresponding parameters 556 for one or more rules 1215 of the maximum result set size ruleset 566. The GUI 245 can present a prompt to enter the maximum number of records that can be returned in a result set. In the example illustrated in FIG. 12B, the user indicates that, for end users at subscription level I: the number of returned records returned cannot exceed 500 records if they include field A; the number of returned records returned cannot exceed 750 records if they include field D; the number of returned records cannot exceed 1000 records if they include field G; and the number of returned records cannot exceed 250 records if they include all of Fields C, D, and G. The user further indicates that, for end users at subscription level II: the number of returned records returned cannot exceed 1000 records if they include field A; the number of returned records returned cannot exceed 750 records if they include field D; the number of returned records has no maximum if they include field G; and the number of returned records cannot exceed 500 records if they include all of Fields C, D, and G. In other embodiments, a maximum number of returned records can be set by the user, regardless of which fields are included and/or regardless of subscription level.

In this example, subscription level II can correspond to a more favorable subscription level than subscription level I, as more results can be returned at subscription level II than subscription level I. In some embodiments, subscription level II, as a result of being more favorable, may correspond to a higher recurring payment or other cost paid by the end user than subscription level I. Note that the user did not enter a maximum numbers of records for results that include fields A, B, or F, as the user may have indicated that raw values for these fields can never be returned as discussed in conjunction with FIG. 10B. Also note that some fields, such as field D, may have a same maximum number of fields regardless of subscription level. Furthermore, these rules can be applied in tandem to ensure the lowest maximum is applied when records that include multiple fields with listed maximums are returned. For example, a result set of records that include both field C and field G cannot exceed 500 records if the user is at subscription level I because the maximum for field C is lowest and is therefore applied. This tandem application of multiple rules can be implemented via the rule hierarchy of FIGS. 16A-16F. In some cases, this tandem relationship is inherently applied, as any results that include more than 500 records that include field C will be determined to be not-complied with, regardless of whether they include other fields with different maximums.

The GUI 245 can alternatively or additionally present a prompt to enter the maximum number of records that can be utilized in an aggregation. In the example illustrated in FIG. 5D, the user indicates that, for end users at subscription level I: the number of records utilized in an aggregation cannot exceed 1000 records if aggregated over field A; the number of records utilized in an aggregation cannot exceed 1000 records if aggregated over field C; the number of records utilized in an aggregation cannot exceed 2000 records if aggregated over field D, and the number of returned records cannot exceed 2000 records if aggregated over field G. The user further indicates that, for end users at the more favorable subscription level II: the number of records utilized in an aggregation cannot exceed 2000 records if aggregated over field A; the number of records utilized in an aggregation cannot exceed 1000 records if aggregated over field C; and number of records utilized in an aggregation cannot exceed 5000 records if aggregated over field D. The lack of inclusion of field G can indicate, for example, that no maximum is applied to aggregations over field G for end users at subscription level II. In other embodiments, a maximum number of records utilized in aggregations can be set by the user, regardless of which fields the aggregation is performed upon and/or regardless of subscription level. In other embodiments, the user can set different maximums for different types of aggregation functions.

Some or all of this information provided in response to such prompts relating to maximum number of records to utilized in aggregations can be utilized to determine rules 1215 of the maximum result set size ruleset 566 of the corresponding provider's provider ruleset 560, for example, relating specifically to maximum result set sizes utilized as intermediate result sets upon which aggregations are performed. In particular, the maximum result set size 1216 and corresponding parameters 556 for one or more rules 1215 configured by a particular provider can be automatically populated by the analytics system 110 as designated in the corresponding user input to GUI 245. Alternatively, the maximum result set size 1216 for one or more rules 1215 can be automatically determined by the analytics system as a deterministic function of one or more of the parameters 556.

Figure 12C:
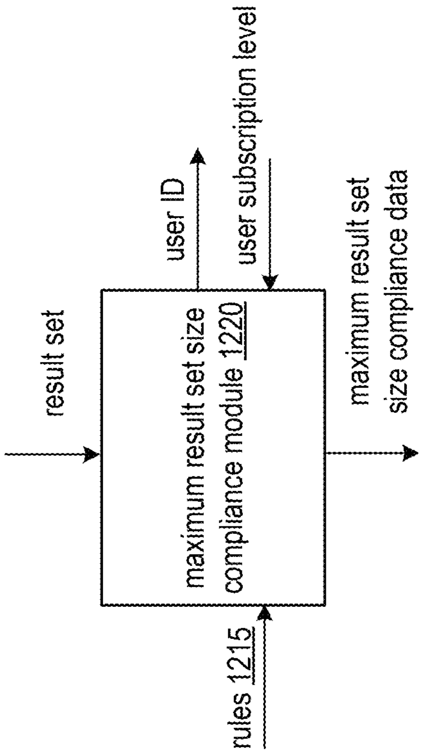
FIGS. 12C-12D are schematic block diagrams of a maximum result set size compliance module in accordance with various embodiments of the present invention.
Figure 12D:
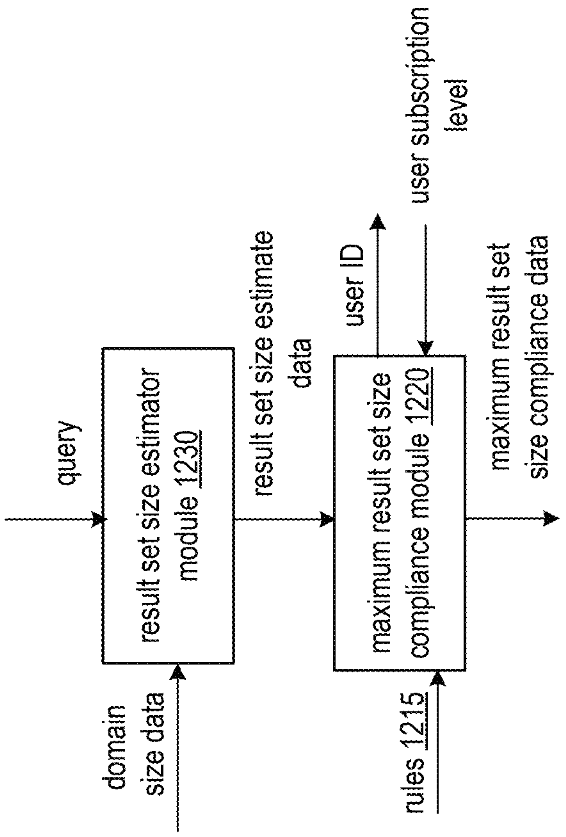

FIGS. 12C-12D illustrate example embodiments of a maximum result set size compliance module, which can be implemented utilizing the query processing system 114 to determine whether compliance with rules 1215 of the maximum result set size ruleset 566 is achieved. FIG. 12C illustrates a maximum result set size compliance module 1220 that is implemented utilizing the runtime compliance module 625 and/or is otherwise implemented after an intermediate and/or final result set for a given query is determined. The maximum result set size compliance module 1220 can receive result set data and/or can receive information indicating the size of a result set. The maximum result set size compliance module 1220 can compare the size of the result set to the maximum result set size 1216 of one or more applicable rules 1215 to generate maximum result set compliance data indicating whether compliance with rules 1215 is achieved. In particular, the maximum result set size compliance module 1220 can determine whether the size of the result set exceeds the maximum size for only a single rule 1215 and/or multiple rules 1215 corresponding to a proper subset of rules in ruleset 566 determined to be applicable to the result set based on the parameters 556. If the result set does not exceed the maximum size for any applicable rules, the maximum result set compliance data can indicate compliance. If the result set does exceed the maximum size for at least one applicable rule, the maximum result set compliance data can indicate non-compliance. The runtime compliance module 625 can consolidate this maximum result set size compliance data with other compliance data generated as discussed herein to generate the runtime compliance data for given result set data.

In some embodiments, the maximum result set size compliance module 1220 is exclusively implemented during and/or after execution of the query, as the size of a result set may not be determinable until the query is executed. However, in some embodiments, a maximum result set size compliance module 1220 can be implemented utilizing the pre-execution compliance module 610 and/or can otherwise be implemented prior to execution of the query based on estimates for the result set size. Such an embodiment is illustrated in FIG. 12D. In particular, a result set size estimator module 1230 can be implemented in conjunction with the maximum result set size compliance module 1220, for example, by utilizing the query processing system 114 and/or by utilizing a user device 140 that implements a pre-execution compliance module 610 as discussed in conjunction with FIGS. 7A-7E.

The result set size estimator module 1230 can receive domain size data, for example, based on the query. The domain size data can indicate a current and/or recent size of a table that is indicated in the query to generate the result set of interest, and/or a current and/or recently determined total number or records supplied by a provider indicated in the query to generate the result set of interest. The domain size data can indicate a current and/or recent size of a table that is indicated in the query to generate the result set of interest, and/or a current and/or recently determined total number or records supplied by a provider indicated in the query to generate the result set of interest. Alternatively or in addition, the domain size data can indicate an estimate for a number of records that would be returned in the result set based on recent queries filtered on the same or similar criteria to generate result sets that were cached by the analytics system 110, and/or based on a known and/or estimated number and/or fraction of records that meet filtering criteria indicated in the query to generate the result set. This can be utilized by the result set size estimator module 1230, in conjunction with filtering criteria included in the given query, to generate result set size estimate data and/or other information regarding an estimated and/or maximum possible result set size of the result set requested in the query.

In some embodiments, the result sets and/or information regarding the results of some or all queries performed in response to query requests received by user devices, and/or otherwise being occasionally called in predetermined time intervals to produce result set size data that can be utilized by the result size estimator module, can be cached locally by the query processing system and/or can be stored result set data included in entries 455 of the database usage log 454 as discussed previously. In such cases, result set data can be queried from query logging system 450 by the result set size estimator module 1230. In particular, entries 455 with query data compares favorably to the given query can be determined to have result set data over a same or similar domain as the given query. The query data can be determined to compare favorably if it invoked the same or similar filtering parameters to generate a final result set or intermediate result set indicated in its result set data, if it invoked the same or similar WHERE clause to generate a final result set or intermediate result set indicated in its result set data, and/or if it otherwise is determined to have requested a set of records from a same table, applying the same or similar filtering criteria as the given query. Furthermore, to ensure that this information for prior queries is still relevant, as the database may be constantly changing as new entries are received in data streams from providers, a single entry or subset of applicable entries 455 can be selected if they corresponding to a most recent entry and/or an entry that is no older than a predefined threshold amount can be utilized to generate the estimated result set size data. For example, the result set size estimator module 1230 can query the query logging system 450 for result set data of entries 455 with corresponding timestamps that are more recent than a predetermined recency threshold and/or that have query data indicating access to a same table as the given query utilizing the same and/or similar filtering parameters. The sizes of result sets in the received result set data can then be utilized to generate the estimated result set size.

In some cases, a ceiling estimated result set size can be determined based on the result set sizes of other queries with less stringent filtering parameters. For example, suppose filtering parameters of a given query are known to produce a result set that is a proper subset of another result set due to being filtered by a proper subset of the filtering parameters of the given query and/or otherwise filtered less stringently than the given query. In particular, if the given query applies a set of five filtering parameters, a previous query that applied exactly four of those filtering parameters can be expected to have produced a result set that was larger than if all five filtering parameters were applied, given the size of the database did not grow too drastically in between.

Similarly, a floor estimated result set size can be determined in the opposite fashion, where floor result set sizes are determined based on result sets for previous queries with more stringent filtering parameters. For example, another previous query that applied all five filtering parameters of the given query, and further applied a sixth filtering parameter can be expected to have produced a result set that was smaller than if only the 5 filtering parameters were applied, given the size of the database did not shrink too drastically in between. While such ceiling and floor estimates should be used by the result set size estimator module 1230 with caution, they can be useful in bounding the estimated result set size, where the result set size estimate data indicates a range instead of or in addition to a particular estimated value.

In some cases, such a range can determined for a given estimate that is determined based on results of a previous query, based on an expected amount of growth of the database since the time the previous query was performed. In particular a confidence interval and/or amount of padding applied to the given estimate to generate such bound can be a direct function of the amount of time since this previous query was performed. In some cases, the estimate can be bounded from above and below by such an amount, where the estimate lies in the middle of this determined range. Alternatively, as the database may only grow with time if entries are not removed and/or do not expire from usage with time, the estimate may only be bounded from above as a direct function of this amount of time, and/or this calculated amount of padding can be added to the estimated value itself to shift the value of the estimate upwards based on the amount of newly added data.

This result set size estimate data can be inputted to the maximum result set size compliance module 1220 for processing in a similar fashion as discussed in FIG. 12C. For example, if the result set size estimate data indicates that the size of an entire table of records being queried to generate the result set has fewer total records than a maximum result set size for a rule 1215 determined to apply to the given query, this rule can be determined to be adhered to, as it would be impossible for the result set to include more records than currently included in the entire table. As another example, if result set size estimate data indicates an estimate (for example, generated based on the table size, filtering criteria, and/or cached sizes from similar result sets) that is far greater than the maximum result set size 1216 indicated for an applicable rule 1215 and/or that is greater than the maximum result set size 1216 indicated for an applicable rule 1215 by at least a predetermined threshold amount, the rule can be determined to not be adhered to and/or the maximum result set size compliance data can indicate that non-compliance is expected. For example, in embodiments where the pre-execution compliance module 610 is executed utilizing user device 140, the GUI 345 can indicate that given query is expected to fail adherence to this rule based on the determined result set size estimate data, and/or can prompt the user to edit their query as a result.

As another example, if result set size estimate data indicates an estimate that does not exceed the maximum result set size 1216 and/or that exceeds the maximum result set size 1216 by less than the predetermined threshold amount, the maximum result set size compliance data can indicate pre-execution compliance is reached, where the actual result set size resulting from execution is checked by implementing the maximum result set size compliance module 1220 via the runtime execution module 625 as illustrated in FIG. 12C. In embodiments where the pre-execution compliance module 610 is executed utilizing user device 140, the GUI 345 can indicate that given query is expected to adherence to this rule based on the determined result set size estimate data, and/or can prompt the user to submit their query as a result.

The various parameters for a given query or result set that correspond to parameters 556 can automatically be determined by the maximum result set size compliance module 1220 based on the language in the query itself, based on the result set itself, based on intermediate results included in other result set data, and/or based on information retrieved from the provider management system 420 and/or user management system 440 for given provider IDs and/or user IDs extracted from the query and/or result set data. For example, as illustrated in FIGS. 12C and 12D, the user subscription level can be retrieved by the maximum result set size compliance module 1220 by utilizing the user ID extracted from the query and/or otherwise determined to correspond to the end user that requested the query.

The maximum result set size compliance module 1220 can utilize these determined parameters for the given query and/or result set to retrieve applicable rules from the ruleset 566, to access applicable rules in a locally stored ruleset 566, and/or to otherwise filter the ruleset 566 to select only a subset of rules that are applicable based on parameters 556 as discussed in conjunction with FIGS. 5C and/or FIGS. 6B-6E. Alternatively or in addition, the maximum result set size compliance module 1220 can otherwise determine features of the query and/or result set that correspond to parameters 556 to determine whether some or all rules 1215 are applicable, where a rule is only applicable if every parameter 556 matches or otherwise compares favorably to the corresponding features of the query and/or result set. Thus, the maximum result set size compliance module 1220 can determine non-compliance of a particular rule 1215 if and only if every parameter 556 compares favorably to the corresponding features of the query and/or result set, and further if the size of the given result set exceeds the maximum result set size 1216 listed for the rule.

For example, the maximum result set size compliance module 1220 can determine the applicable provider ID, field ID, subscription level, result set type, and/or result set size of a given query and/or result set. The maximum result set size compliance module 1220 can query the ruleset 566 for rules 1215 with a maximum result set size that falls below the result set size of the given query, as well as some or all of: a provider ID that matches the provider ID for the given query and/or result set; with field IDs that matches the field IDs for included in the given query and/or result set, a subscription level that matches the subscription level of the user that generated the query, and/or result set type that matches the result set type of the given result set. If no results in ruleset 566 are found or returned, the maximum result set size compliance module 1220 can conclude that the query and/or result set complied with every rule in the ruleset 566, and the maximum result set size compliance data can indicate compliance. If one or more rules in the ruleset 566 are returned, the maximum result set size compliance module 1220 can conclude that the query and/or result set did not comply with these returned rules, and the maximum result set size compliance data can indicate non-compliance. Alternatively, additional evaluation can be performed based on the returned rules from ruleset 568 as required before a conclusion of non-compliance is made.

In some embodiments, a provider's configuration of the maximum number of records included in a result set relates only to the number of records in the result set which they supplied. For example, consider a rule for provider X indicating a result set can contain no more than 500 records. This can be further configured in one of two way: provider X can indicate a result set that includes at least one of their records can contain no more than 500 records total, regardless of which provider supplied the other records in the result set; or provider X can indicate that a result set can include more than 500 records, so long as no more than 500 records in this result set were supplied by provider X. While a provider can configure their rules in either of these means, a provider may elect to utilize the second rule to enforce the most control over their own data. In such cases where providers provide rules 1215 specifying to the number of their own records that can be included in a result set, the maximum result set size compliance module 1220 can first subdivide a given result set into a plurality of result sets by provider and/or can otherwise determine the number of records in the result set supplied by each provider. Rather than checking the size of the result set itself, maximum result set sizes 1216 set by different providers can each be compared to the number of records in the result set supplied by the corresponding provider.

Consider an example where provider X indicates the maximum of their records that can be included in a result set is 100, and if provider Y indicates the maximum of their records that can be included in a result set is 200. A maximum result set size compliance module 1220 can determine that a result set of 300 records includes 150 records provided by provider X and 150 records provided by provider Y. The maximum result set size compliance module 1220 can thus determine that the result set complies with provider Y's maximum of 200 records, but does not comply with provider X's maximum of 100 records, and thus the result set is not compliant.

FIGS. 13A-13D relate to customization and enforcement of rules of the minimum result set size ruleset 568, which designate a minimum number of records that can be included in result sets utilized in aggregations. The customization and enforcement of minimum sizes of these intermediate result sets as discussed in conjunction with FIGS. 13A-13D present favorable improvements to existing technologies for licensing data while ensuring anonymity is maintained by enforcing use of at least a sufficient number of records when performing aggregations.

Enforcement of a minimum result set size ruleset can serve to enhance the functionality discussed with regards to enforcement of a forbidden fields ruleset and/or the forbidden functions ruleset. In particular, the minimum result set size ruleset can further limit the usage of sensitive fields and/or groupings of fields that may already be indicated as forbidden fields ruleset by further forbidding the usage of certain aggregations or other processing upon records that include these forbidden fields when these result sets are not of a large enough size. This can be preferable in cases where outright forbidding aggregations upon these fields as discussed in conjunction with the forbidden functions ruleset is deemed unreasonable, yet output of aggregations can still pose privacy concerns when applied to a small enough number of records.

In particular, different minimums can be customized and enforced for data supplied by different providers. Different minimums can be customized and enforced for data accessed by users at differing subscription levels. Alternatively or in addition, the analytics system 110 can calculate or otherwise determine minimum result set sizes for different subscription levels automatically as a function of the cost of the subscription level and/or as a function of the favorability of the subscription level. For example, subscription levels corresponding to a higher recurring payment, higher cost, and/or otherwise more favorable subscription levels can be configured with lower minimums that those configured for less favorable subscription levels to enhance the experience for the users at increasingly more favorable subscription levels. Alternatively, as the motivation for the minimum result set size ruleset 568 may be for maintaining anonymity and/or adhering to regulatory requirements relating to data privacy, rather than controlling licensing usage as discussed with regards to the minimum result set size ruleset 568, in some embodiments, the same minimum is applied regardless of user subscription level.

Additionally, providers can further configure minimum result set sizes for aggregations applied for different data fields of their records, for example, corresponding to different levels of valuation of different data fields, different levels of privacy of different data fields, and/or different ease of identity matching achievable by utilizing different data fields. This is achieved by enabling customization of different minimums for access to different fields, different numbers of fields, and/or different combinations of fields. Alternatively or in addition, the analytics system 110 can calculate or otherwise determine minimums result set sizes for different fields automatically as a function of number of fields, a level of sensitivity of the data included in the field, and/or a level of susceptibility that data provided in the field can enabling identity matching. For example, a higher minimum can be configured for result sets that include a greater number of fields and/or that include particular fields that include more sensitive data and/or data that is more susceptible for enabling identity matching, while a lower minimum can be configured for result sets that include a smaller number of fields and/or that include particular fields that that include less sensitive data and/or data that is less susceptible for enabling identity matching.

Furthermore, providers can further enhance privacy of data based on the type of aggregation that is performed on the result set in the query. This is achieved by enabling customization of different minimums for different types of aggregations applied to the in execution the query, for example, as input to one or more particular aggregation functions. Alternatively or in addition, the analytics system 110 can calculate or otherwise determine minimum result set sizes for different types of aggregation functions and/or numbers of aggregations functions performed on the result set automatically as a function of the level of anonymity and/or obfuscation the aggregation provides. For example, a higher minimum can be configured for results sets that undergo averaging functions, while a lower minimum can be configured for result sets that undergo counting functions, as the averaging functions can provide greater insight into the raw values of particular records in the result set.

Figure 13B:
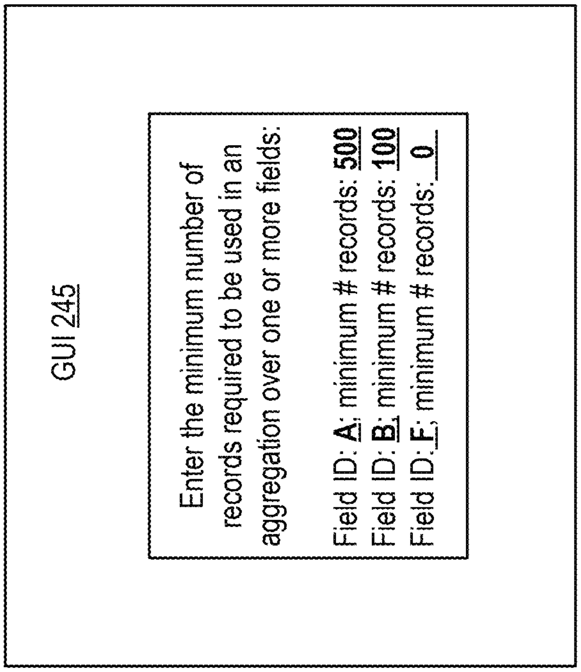
FIG. 13B illustrates an example embodiment of GUI displayed via a provider device in accordance with various embodiments of the present invention.
Figure 13A:
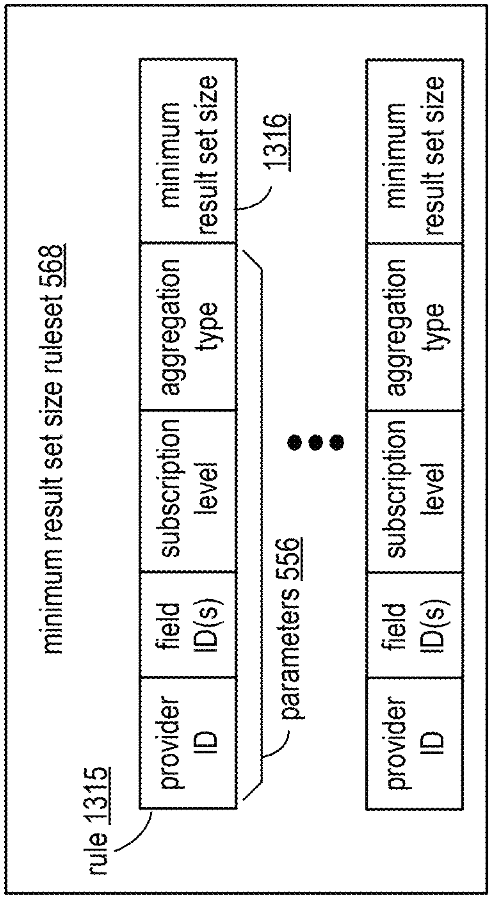
FIG. 13A illustrates an example embodiment of a minimum result set size ruleset in accordance with various embodiments of the present invention.

FIG. 13A presents an embodiment of the minimum result set size ruleset 568, which can include a plurality of rules 1315. Each rule 1315 can indicate a minimum result set size 1316 to be enforced by the query processing system 114 for result sets of queries received by the query processing system 114. For example, the minimum result set size 1316 can indicate a value that corresponding to the minimum allowable number of records in a result set, where result sets with a number of records that exceeds this value are non-compliant with this rule. Each rule 1315 can further indicate one or more rule parameters 556, denoting the conditions under which this particular minimum result set size 1316 is applicable to a given query and/or given result set, as discussed in conjunction with FIG. 5C. For example, the query processing system 114 can determine to retrieve and or utilize a given minimum result set size 1316, and/or can otherwise determine a given minimum result set size 1316 is applicable to a given query or result set, based on determining that the corresponding parameters 556 compare favorably to corresponding parameters determined by the query processing system 114 for the given query and/or result set.

The parameters 556 of a rule 1315 can include at least one provider ID, denoting which provider from which the rule 1315 was received in a corresponding provider ruleset 560 and/or otherwise denoting the corresponding minimum result set size 1316 applies to data supplied by the corresponding at least one provider. The parameters 556 of a rule 1315 can include one or more particular field IDs and/or groupings of field IDs, denoting the corresponding minimum result set size 1316 applies to result sets that include one or more of the particular field IDs and/or one or more of the groupings of field IDs, and/or applies to result sets where an aggregation is performed upon the corresponding field ID or grouping of field IDs. The parameters 556 of a rule 1315 can include one or more subscription levels, denoting the minimum result set size 1316 applies to queries received from users at a corresponding subscription level indicated in the one or more subscription levels. The parameters 556 of a rule 1315 can include one or more aggregation types, denoting the minimum result set size 1316 applies to result sets of queries where the corresponding type of aggregation performed on the result set in execution of the query. For example, a particular rule 1315 can indicate that a set records of that include the values for field A and are utilized in an averaging function must include a minimum of 500 records supplied by provider X for users at subscription level I.

Some rules 1315 can include fewer parameters 556 and/or can include additional parameters 556 not indicated in FIG. 13A. In some cases, each listed parameter 556 must be met for the corresponding minimum result set size 1316 to be retrieved, checked, and/or applied by the query processing system for the given query. In some cases, the query processing system 114 must determine the conditions of each listed parameter 556 of a rule 1315 match or otherwise compare favorably to those of a given query or result set for a determination of non-compliance with rule 1315 to be possible.

In some embodiments, field conditionals such as ranges of acceptable and/or unacceptable raw values or aggregated values for the fields included in the result set unto which the minimum size applies can be indicated in the parameters 556 or otherwise apply to the rule. For example, a particular rule 1315 can indicate that records in a result set that include field C must include a minimum of 100 records if the average value of field C is between 50 and 100. Such field conditionals and/or ranges of acceptable and/or unacceptable raw values or aggregated values for other fields of records included in the result set, even if these fields themselves are not included in the result set, can be further indicated as parameters 556. For example, a particular rule 1315 can indicate that records in a result set that include field C, but not field G, must include a minimum of 100 records if the value field G is equal to 'RED.'

FIG. 13B illustrates an example embodiment for a GUI 245 enabling configuration of minimum result set sizes 1316 and/or corresponding parameters 556 for one or more rules 1315 of the minimum result set size ruleset 568. The GUI 245 can present a prompt to enter a minimum number of records that can be used in an aggregation function for one or more particular fields and/or combinations of fields. In the example illustrated in FIG. 13B, the user indicates that aggregations performed on field A requires at least 500 records, that aggregations performed on field B requires at least 100 records, and that aggregations performed on F have no minimum requirement. Note that fields A, B, and F are configured as a forbidden fields that cannot be returned as raw data in this example as illustrated in FIG. 10B, but their data can be processed and returned in aggregations. In this example, minimum result set sizes for other fields are not configured because they are allowed to be returned as raw data. In other embodiments, other fields that are not denoted as forbidden fields can still have minimum result set sizes for aggregations configured as well, for example, for aggregations performed on one or more fields in a forbidden grouping of fields.

In other embodiments, the user can indicate a same minimum to be applied all records, regardless of field the aggregation is performed upon. In other embodiments, the user can indicate different minimums for different types of aggregation functions. For example, different minimums for different fields can be set for a sum function, a count function, an average function, a minimum function, a maximum function, and/or other types of aggregation functions. While the minimum number of records may be selected for privacy reasons that apply regardless of an end user's subscription level, in other embodiments, the user can indicate different minimums for different subscription levels.

Some or all of this information provided in response to such prompts relating to minimum number of records that can be utilized in aggregations can be utilized to determine rules 1315 of the minimum result set size ruleset 568 of the corresponding provider's provider ruleset 560. In particular, the minimum result set size 1316 and corresponding parameters 556 for one or more rules 1315 configured by a particular provider can be automatically populated by the analytics system 110 as designated in the corresponding user input to GUI 245. Alternatively, the minimum result set size 1316 for one or more rules 1315 can be automatically determined by the analytics system as a deterministic function of one or more of the parameters 556.

Figure 13C:
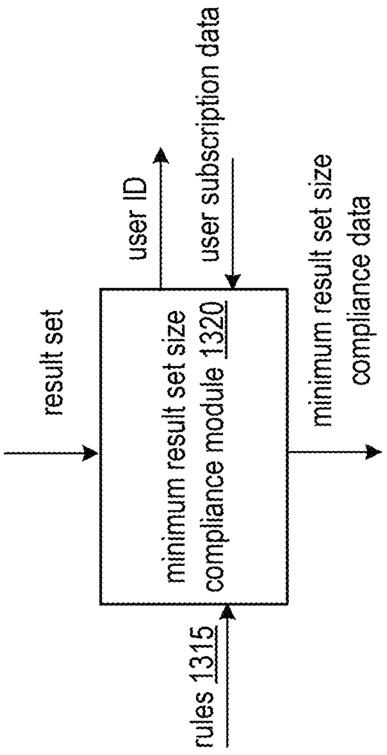
FIGS. 13C-13D are schematic block diagrams of a minimum result set size compliance module in accordance with various embodiments of the present invention.
Figure 13D:
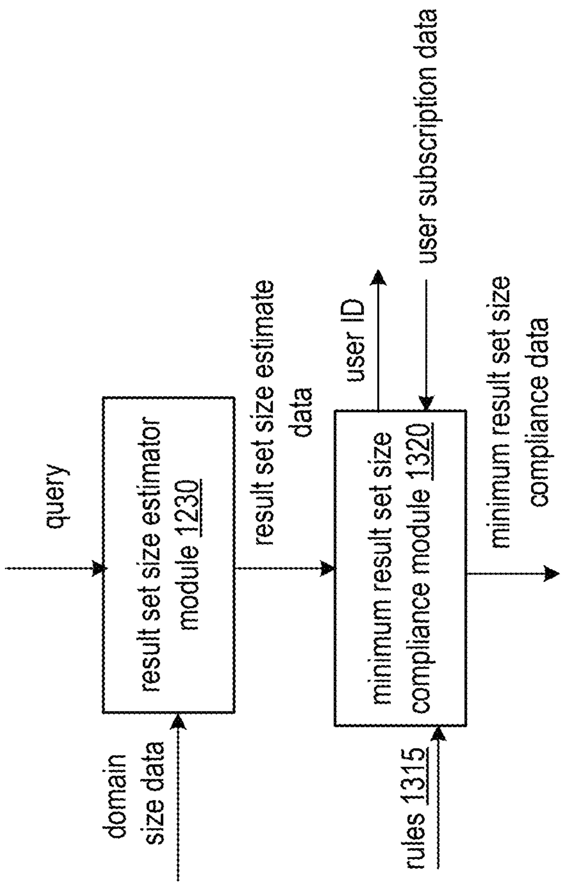

FIGS. 13C-13D illustrate example embodiments of a minimum result set size compliance module, which can be implemented utilizing the query processing system 114 to determine whether compliance with rules 1215 of the maximum result set size ruleset 566 is achieved. FIG. 13C illustrates a minimum result set size compliance module 1320 that is implemented utilizing the runtime compliance module 625 and/or is otherwise implemented after an intermediate result set for a given query is determined. The minimum result set size compliance module 1320 can receive result set data and/or can receive information indicating the size of a result set. This can be received prior to performing the aggregation on the result set, for example, as a partial result as discussed in conjunction with FIGS. 6F and 6G, and/or can be received once execution of the query is complete. The minimum result set size compliance module 1320 can compare the size of the result set to the minimum result set size 1316 of one or more applicable rules 1315 to generate maximum result set compliance data indicating whether compliance with rules 1315 is achieved. In particular, the minimum result set size compliance module 1320 can determine whether the size of the result set exceeds the maximum size for only a single rule 1315 and/or multiple rules 1315 corresponding to a proper subset of rules in ruleset 566 determined to be applicable to the result set based on the parameters 556. If the result set does not fall below the minimum size for any applicable rules, the minimum result set compliance data can indicate compliance. If the result set does fall below the minimum size for at least one applicable rule, the minimum result set compliance data can indicate non-compliance. The runtime compliance module 625 can consolidate this minimum result set size compliance data with other compliance data generated as discussed herein to generate the runtime compliance data for given result set data.

In some embodiments, the minimum result set size compliance module 1320 is exclusively implemented during and/or after execution of the query, as the size of a result set may not be determinable until the query is executed. However, in some embodiments, a minimum result set size compliance module 1320 can be implemented utilizing the pre-execution compliance module 610 and/or can otherwise be implemented prior to execution of the query based on estimates for the result set size. Such an embodiment is illustrated in FIG. 13D. In particular, a result set size estimator module 1230 can be implemented in conjunction with the minimum result set size compliance module 1320, for example, by utilizing the query processing system 114 and/or by utilizing a user device 140 that implements a pre-execution compliance module 610 as discussed in conjunction with FIGS. 7A-7E. The result set size estimator module 1230 can utilize the same type of domain data and/or can otherwise operate in a same or similar fashion as discussed in conjunction with FIG. 12D to generate result set size estimate data for the intermediate result set prior to execution of the aggregation.

This result set size estimate data can be inputted to the minimum result set size compliance module 1320 for processing in a similar fashion as discussed in FIG. 13C. For example, if result set size estimate data indicates an estimate (for example, generated based on the table size, filtering criteria, and/or cached sizes from similar result sets) that is far less than the minimum result set size 1316 indicated for an applicable rule 1315 and/or that is less than the minimum result set size 1316 indicated for an applicable rule 1315 by at least a predetermined threshold amount, the rule can be determined to not be adhered to and/or the minimum result set size compliance data can indicate that non-compliance is expected and/or can prompt the user to edit their query as a result. For example, in embodiments where the pre-execution compliance module 610 is executed utilizing user device 140, the GUI 345 can indicate that given query is expected to fail adherence to this rule based on the determined result set size estimate data.

As another example, if result set size estimate data indicates an estimate that does not fall below the minimum result set size 1316 and/or that falls below the minimum result set size 1316 by less than the predetermined threshold amount, the minimum result set size compliance data can indicate pre-execution compliance is reached, where the actual result set size resulting from execution is checked by implementing the minimum result set size compliance module 1320 via the runtime execution module 625 as illustrated in FIG. 13C. In embodiments where the pre-execution compliance module 610 is executed utilizing user device 140, the GUI 345 can indicate that given query is expected to adherence to this rule based on the determined result set size estimate data, and/or can prompt the user to submit their query as a result.

The various parameters for a given query or result set that correspond to parameters 556 can automatically be determined by the minimum result set size compliance module 1320 based on the language in the query itself, based on the result set itself, based on intermediate results included in other result set data, and/or based on information retrieved from the provider management system 420 and/or user management system 440 for given provider IDs and/or user IDs extracted from the query and/or result set data. For example, as illustrated in FIGS. 13C and 13D, the user subscription level can be retrieved by the minimum result set size compliance module 1320 by utilizing the user ID extracted from the query and/or otherwise determined to correspond to the end user that requested the query.

The minimum result set size compliance module 1320 can utilize these determined parameters for the given query and/or result set to retrieve applicable rules from the ruleset 568, to access applicable rules in a locally stored ruleset 568, and/or to otherwise filter the ruleset 568 to select only a subset of rules that are applicable based on parameters 556 as discussed in conjunction with FIGS. 5C and/or FIGS. 6B-6E. Alternatively or in addition, the minimum result set size compliance module 1320 can otherwise determine features of the query and/or result set that correspond to parameters 556 to determine whether some or all rules 1315 are applicable, where a rule is only applicable if every parameter 556 matches or otherwise compares favorably to the corresponding features of the query and/or result set. Thus, the minimum result set size compliance module 1320 can determine non-compliance of a particular rule 1315 if and only if every parameter 556 compares favorably to the corresponding features of the query and/or result set, and further if the size of the given result set falls below the minimum result set size 1316 listed for the rule.

For example, the minimum result set size compliance module 1320 can determine the applicable provider ID, field ID, subscription level, aggregation type, and/or result set size of a given query and/or result set. The minimum result set size compliance module 1320 can query the ruleset 566 for rules 1215 with a minimum result set size that exceeds the result set size of the given query, as well as some or all of: a provider ID that matches the provider ID for the given query and/or result set; with field IDs that matches the field IDs for included in the given query and/or result set, a subscription level that matches the subscription level of the user that generated the query, and/or an aggregation type that matches the type of aggregation applied to the given result set. If no results in ruleset 568 are found or returned, the minimum result set size compliance module 1320 can conclude that the query and/or result set complied with every rule in the ruleset 568, and the minimum result set size compliance data can indicate compliance. If one or more rules in the ruleset 568 are returned, the minimum result set size compliance module 1320 can conclude that the query and/or result set did not comply with these returned rules, and the minimum result set size compliance data can indicate non-compliance. Alternatively, additional evaluation can be performed based on the returned rules from ruleset 568 as required before a conclusion of non-compliance is made.

In some embodiments, a provider's configuration of the minimum number of records included in a result set relates only to the number of records in the result set which they supplied. For example, consider a rule for provider X indicating a result set being aggregated must contain at least 500 records. This can be further configured in one of two ways: provider X can indicate a result set that includes at least one of their records must contain at least 500 records provided by provider X, regardless of which provider supplied the other records in the result set; or provider X can indicate that a result set can include less than 500 records provided by provider X, so long the total number of records in the set is at least 500 records. While a provider can configure their rules in either of these means, a provider may elect to utilize the second rule to maintain minimum privacy requirements, or may elect to utilize the first rule to maximize the privacy of their own data.

In such cases where providers provide rules 1315 specifying the minimum number of records provided by the individual providers that must be included in a result set, the minimum result set size compliance module 1320 can first subdivide a given result set into a plurality of result sets by provider and/or can otherwise determine the number of records in the result set supplied by each provider. Rather than checking the size of the result set itself, minimum result set sizes 1316 set by different providers can each be compared to the number of records in the result set supplied by the corresponding provider.

Consider an example where provider X indicates the minimum of their records that can be included in a result set is 50, and provider Y indicates the minimum of their records that can be included in a result set is 30. A minimum result set size compliance module 1320 can determine that a result set of 60 records includes 30 records provided by provider X and 30 records provided by provider Y. The minimum result set size compliance module 1320 can thus determine that the result set complies with provider Y's minimum of 30 records, but does not comply with provider X's minimum of 50 records, and thus the result set is not compliant. Alternatively, if the rule for provider X indicates a minimum of 50 records in total, this result set of 60 records would also comply with provider X's rule.

FIGS. 14A-14E relate to customization and enforcement of rules of a temporal access limits ruleset 570, which can impose limits for the amount of data, queries, and/or fields that an end user can utilize within a given timeframe and/or over time in total. The customization and enforcement of maximum sizes of result sets as discussed in conjunction with FIGS. 14A-14E present favorable improvements to existing technologies for licensing data by tracking access to records over time and imposing limitations to the access of records over time based on various, configurable criteria.

Enforcement of a temporal access limits ruleset can enhance the functionality of the maximum result set size ruleset by further enhance data licensing restrictions. In particular, as the maximum result set size ruleset imposes limitations on the amount of data that a user can access for a particular query, a malicious user could surpass the rules invoked by the maximum result set size ruleset by, for example, subdividing their query into multiple independent queries for different, distinct sets of records filtered by distinct criteria that do not exceed result set size maximums individually. These distinct sets of records could then be ultimately combined into a single set that includes records meeting all of the criteria desired by the user, where this single set would have exceeded the maximum result set size requirements if requested in a single query. Tracking each user's access to records over time and utilizing a user's historical database accesses can be utilized to ensure a user does not receive and/or utilize more than a reasonable allotment of data within a particular timeframe and/or in an indefinite time period.

Enforcement of a temporal access limits ruleset can enhance data licensing, for example, by allowing a greater number of queries, access to a greater number of records, and/or access to a greater number of record fields by users with higher level subscriptions, and/or by restricting access to too much data over time to any end user. Alternatively or in addition, enforcement of a temporal access limits ruleset can serve to preserve resources of the analytics system utilized in performing many query functions and/or returning many result sets to users in a small span of time by invoking limitations upon the how many queries can be performed by each user and/or how much data can be transmitted to users within a particular timeframe.

In particular, different maximum number of queries, records, and/or fields within a particular timeframe can be customized and enforced for data supplied by different providers. Different maximum number of queries, records, and/or fields within a particular timeframe can be customized and enforced for data accessed by users at differing subscription levels. Alternatively or in addition, the analytics system 110 can calculate or otherwise determine different maximum number of queries, records, and/or fields within a fixed time window length, and/or can calculate or otherwise determine a time window length for fixed maximum numbers of queries, records, and/or fields as a function of cost and/or favorability of subscription level. For example, subscription levels corresponding to a higher recurring payment, higher cost, and/or otherwise more favorable subscription levels can be configured to perform a greater number of queries and/or access greater amounts of data within a same or longer time window than users at lower subscription levels to enhance the experience for the users at increasingly more favorable subscription levels.

Additionally, providers can further configure this temporal-based licensing for different data fields of their records, for example, corresponding to different levels of valuation of different data fields and/or different levels of demand for usage of different data fields. This is achieved by enabling customization of different maximum numbers of queries and/or number of records for different fields and/or combinations of fields within a particular timeframe. Alternatively or in addition, the analytics system 110 can calculate or otherwise determine maximum numbers of queries and/or maximum numbers of records within a fixed timeframe for different fields, and/or can determine a timeframe length for a fixed maximum numbers of queries and/or fixed maximum numbers of records, automatically as a function of the value of the data included in the field and/or a level of demand for the data included in the field by end users. For example, a higher maximum number of queries, a higher maximum number of records, and/or a longer time window can be configured for particular fields of a lower value, while lower maximums and/or a shorter time window can be configured for particular fields of a higher value to invoke greater limitations on access to more valuable data.

Furthermore, providers can further control licensing of data based on whether it is returned to end users as raw values or utilized as an intermediate step in performing a query. This can further include indicating what type of query function can be applied to the data. This is achieved by enabling customization of different maximums and/or time window lengths for usage of data via different types of aggregations and/or as raw data. Alternatively or in addition, the analytics system 110 can calculate or otherwise determine maximum number of queries, records and/or fields for a fixed timeframe that utilize and/or undergo processing via types of functions automatically as a function of the level of aggregation and/or obfuscation that will be applied to the result set; as a function of the level of sophistication and/or analytics insights the function provides; and/or as a function of the amount of resources required to perform the particular function. For example, users may be allowed to perform more queries and/or access more records within a timeframe if results are aggregated, if the level of sophistication of analytical results is lower, and/or if the amount of resources required to perform the resources is lower, while fewer queries may be allowed to be executed and/or fewer records may be accessible if result sets are returned as raw data, if they involve functions that correspond to higher levels of analytical sophistication is utilized in the corresponding function, and/or if the functions require greater resources.

Figure 14B:
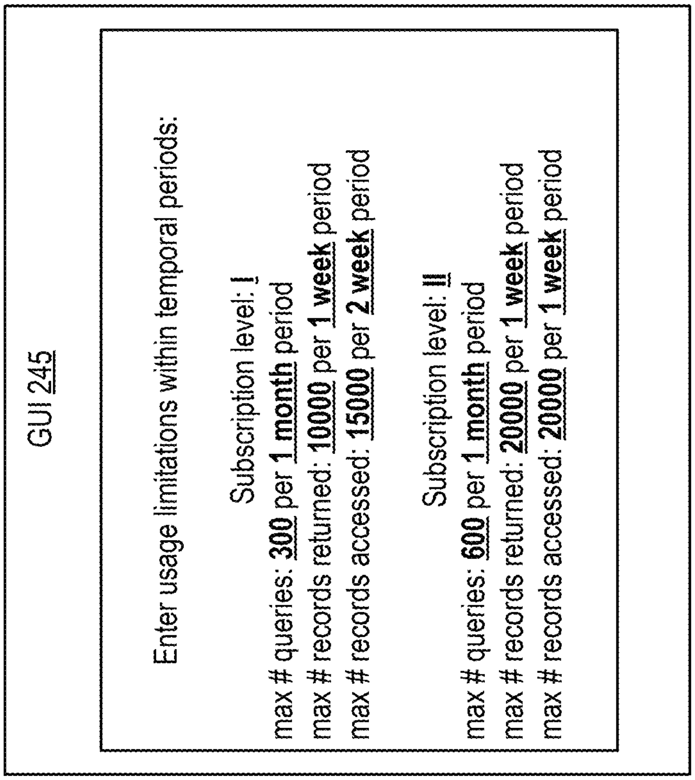
FIG. 14B illustrates an example embodiment of GUI displayed via a provider device in accordance with various embodiments of the present invention.
Figure 14A:
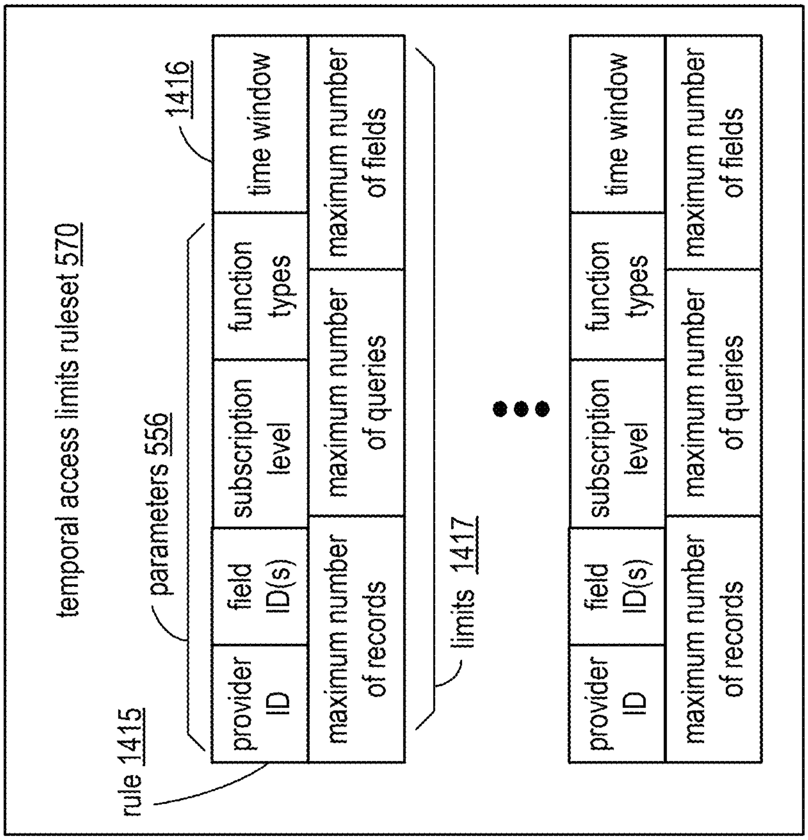
FIG. 14A illustrates an example embodiment of a temporal access limits ruleset in accordance with various embodiments of the present invention.

FIG. 14A presents an embodiment of the temporal access limits ruleset 570, which can include a plurality of rules 1415. Each rule 1415 can indicate a time window 1416, along with at least one corresponding limit 1417, which can include at least one of: a maximum number of records, a maximum number of queries, and/or a maximum number of fields to be enforced by the query processing system 114 in accordance with the time window for queries received by the query processing system 114 by different users over time. Time window 1416 can indicate a length for a sliding time window, for example, where the rule is invoked within a length of time indicated by the time window ending at the current time, such as within the last 48 hours. Alternatively or in addition, time window 1416 can indicate a recurring period of time that repeats at a fixed time regardless of the current time, for example, where the time window resets at the beginning of each day or each month. This configuration can be favorable in cases where subscriptions are paid and/or are in effect for a corresponding, recurring period. For example, the time window 1416 can indicate the rule is invoked for all queries in the current month, where users are subscribed to a monthly subscription plan with recurring monthly payments. As another example, the time window 1416 can otherwise indicate any start and/or end point for the time window and duration to indicate when and/or for how long the time window is in effect. In some cases, there is no time window, and the corresponding limits 1417 are imposed indefinitely, where the maximums can never be exceeded across any length of time.

The maximum number of records of limits 1417 can correspond to a number of distinct records and/or a total number of records, even if some of these records correspond to the same record. The maximum number of queries of limits 1417 can correspond to a number of transactions, partial queries extracted from each received query request, and/or individual query functions performed against the database system 112. For example, a query request received from a user can include multiple queries applied towards this maximum. The maximum number of fields of limits 1417 can correspond to a maximum number of fields of same or different records in the same or different table that can be accessed.

Each rule 1415 can further indicate one or more rule parameters 556, denoting the conditions under which the one or more particular limits 1417 for the given time window 1416 are applicable for a given query and/or given result set, as discussed in conjunction with FIG. 5C. For example, the query processing system 114 can determine to retrieve and or utilize one or more limits 1417 and/or corresponding time windows 1416, and/or can otherwise determine given limits 1417 and/or corresponding time windows 1416 are applicable to a given query or result set, based on determining that the corresponding parameters 556 compare favorably to corresponding parameters determined by the query processing system 114 for the given query and/or result set. In particular, a limit 1417 and/or corresponding time windows 1416 can be checked by the query processing system 114 when a given query and/or given result set is determined to definitely and/or potentially increase the running total number of records, running total number of queries, and/or running total number of fields tracked for the user within the time window, for example, for the corresponding provider.

The parameters 556 of a rule 1415 can include at least one provider ID, denoting which provider from which the rule 1415 was received in a corresponding provider ruleset 560 and/or otherwise denoting the limits 1417 and/or time window 1416 applies to data supplied by the corresponding at least one provider. The parameters 556 of a rule 1415 can include one or more particular field IDs and/or groupings of field IDs, denoting the limits 1417 and/or time window 1416 applies usage of the particular field IDs and/or one or more of the groupings of field IDs. The parameters 556 of a rule 1415 can include one or more subscription levels, denoting the limits 1417 and/or time window 1416 applies to queries received from users at a corresponding subscription level indicated in the one or more subscription levels. The parameters 556 of a rule 1415 can include a function type, denoting which type of functions apply to the limits 1417 for the time window 1416 and/or indicating whether the limits 1417 for the time window 1416 apply to queries and/or records returned to the user as raw values, or whether the limits 1417 for the time window 1416 apply to queries and/or records utilized in particular aggregation function, where the output returned to the user is based on the result of the particular aggregation function. For example, a particular rule 1415 can indicate that no more than 500 queries within the last 7 days can include aggregation functions upon field C for records supplied by provider X for users at subscription level I. As another example, a particular rule 1415 can indicate that no more than 500 records that include the combination of fields C and D and that are supplied by provider X can be returned as raw data to a user at subscription level I within the month of October.

In some embodiments, field conditionals such as ranges of acceptable and/or unacceptable raw values or aggregated values for the fields included in result sets unto which the limits 1417 apply within the time window 1416 can be indicated in the parameters 556 or otherwise apply to the rule. Such field conditionals and/or ranges of acceptable and/or unacceptable raw values or aggregated values for other fields of records included in result sets unto which the limits 1417 apply within the time window 1416, even if these fields themselves are not included in the result set, can be further indicated as parameters 556. These field conditionals can be applied in a similar fashion as discussed with regards to the maximum result set size ruleset.

Some rules 1515 can include fewer parameters 556 and/or fewer limits 1417, and/or can include additional parameters 556 and/or additional limits 1417 not indicated in FIG. 14A. In some cases, each listed parameter 556 must be met for the corresponding limit and/or time window to be retrieved, checked, and/or applied by the query processing system for the given query. In some cases, the query processing system 114 must determine the conditions of each listed parameter 556 of a rule 1415 match or otherwise compare favorably to those of a given query or result set for a determination of non-compliance with rule 1415 to be possible.

As discussed thus far, a rule 1415 can impose the limits 1417 for a particular user, where any user of the system cannot exceed the respective limits 1417 within the time window 1416 as set for their respective subscription level. However, in other embodiments, a rule 1415 can impose limits 1417 across all usage within the timeframe, regardless of user. For example, the maximum number of records can correspond to the total number of distinct records accessed in total by all end users of the analytics system 110 within time window 1416 and/or in history, and/or the maximum number of queries can correspond to the total number of queries requested and/or performed in total for all end users of the analytics system 110 within time window 1416 and/or in history. This can be preferred by providers to ensure that multiple malicious users cannot consolidate data and/or to ensure that their data is otherwise not overly accessed. This can also be implemented by regulating entities and/or administrators of the analytics system to ensure the system is not performing too many queries in total and/or that de-privatization of data is not possible over multiple users.

FIG. 14B illustrates an example embodiment for a GUI 245 enabling configuration of limits 1417 imposed for time windows 1416 and/or corresponding parameters 556 for one or more rules 1415 of the temporal access limits ruleset 570. The GUI 245 can present a prompt to enter usage limitations for users at subscription levels I. In the example illustrated in FIG. 14B, the user indicates that, for any end user at subscription level I: no more than 300 queries can be performed within any 1 month period, that no more than 10000 records can be returned as raw data within any 1 week period, and/or that no more than 15000 records can be accessed in execution of queries within any 2 week period. The user further indicates that, for any end user at subscription level II: no more than 600 queries can be performed within any 1 month period, that no more than 20000 records can be returned as raw data within any 1 week period, and/or that no more than 20000 records can be accessed in execution of queries within any 1 week period.

In this example, subscription level II can correspond to a more favorable subscription level than subscription level I, as more records can be returned and/or accessed at subscription level II than subscription level I per unit time. In some embodiments, subscription level II, as a result of being more favorable, may correspond to a higher recurring payment or other cost paid by the end user than subscription level I. In other embodiments, the user can further configure particular fields and/or particular types of functions to which each of these rules applies, and/or can configure maximum number of fields accessible within a particular time window.

Some or all of this information provided in response to such prompts relating to usage limits over time can be utilized to determine rules 1415 of the temporal access limits ruleset 570 of the corresponding provider's provider ruleset 560. In particular, the time window 1416, limits 1417, and corresponding parameters 556 for one or more rules 1415 configured by a particular provider can be automatically populated by the analytics system 110 as designated in the corresponding user input to GUI 245. Alternatively, the time window 1416 and/or limits 1417 for one or more rules 1415 can be automatically determined by the analytics system as a deterministic function of one or more of the parameters 556.

Figure 14C:
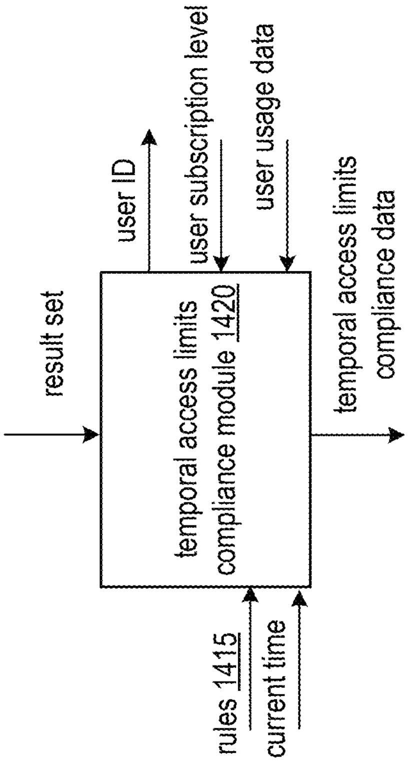
FIGS. 14C-14E are schematic block diagrams of a temporal access limits compliance module in accordance with various embodiments of the present invention.
Figure 14D:
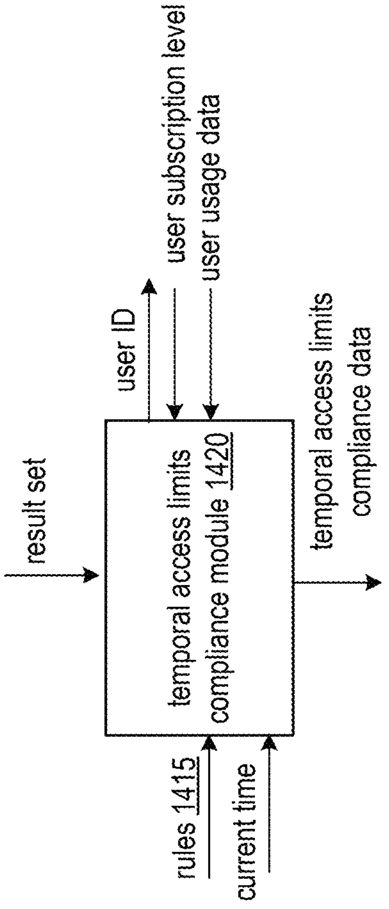
Figure 14E:
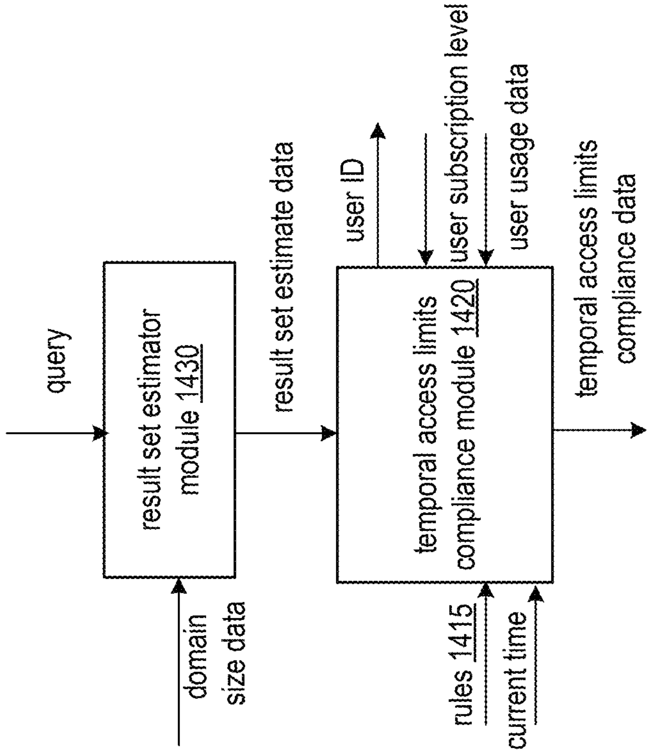

FIGS. 14C-14E illustrate example embodiments of a temporal access limits compliance module 1420, which can be implemented utilizing the query processing system 114 to determine whether compliance with rules 1415 of the temporal access limits ruleset 570 is achieved. FIG. 14C illustrates a temporal access limits compliance module 1420 that is implemented utilizing the runtime compliance module 625 and/or is otherwise implemented after an intermediate and/or final result set for a given query is determined. FIG. 14D illustrates a temporal access limits compliance module 1420 that is implemented utilizing the pre-execution compliance module 610 and/or is otherwise prior to execution of a given query. FIG. 14E illustrates a temporal access limits compliance module 1420 that is implemented utilizing the pre-execution compliance module 625 and/or is otherwise prior to execution of a given query by utilizing estimated result set size data generated by a result set estimator module 1430, which can be implemented utilizing the result set size estimator module 1230 and/or can utilize the same type of domain data and/or can otherwise operate in a similar fashion as discussed in conjunction with FIGS. 12D and 13D to provide information regarding the expected result set given the domain size data. In some cases, the result set estimator module 1430 can provide further information as relevant to the temporal access limits compliance module 1420 beyond the result set beyond size alone. Such information can similarly be estimated as discussed in conjunction with the result set size estimator module 1230 based on the domain data, for example, based on any corresponding information supplied in result set data determined for previous queries.

The temporal access limits compliance module 1420 of FIGS. 14C, 14D, and/or 14E can filter ruleset 570 and/or otherwise determine applicable rules based on determining parameters for a given query and/or result set, and by determining a subset of rules 1415 with parameters 556 that compare favorably to the given query and/or result set. This step can be performed in a same and/or similar fashion as previously discussed herein, for example with regards to the maximum result set size compliance module 1220 and/or minimum result set size compliance module 1320, by utilizing the provider ID determined to supply data accessed in the query, fields IDs determined to be accessed in the query, function types for functions determined to be performed in the query, and/or a user subscription level for a user determined to have sent the query request.

For a given query and/or result set, the temporal access limits compliance module 1420 can receive result set data and/or can receive information indicating the number of records included in the result set, number fields included within a result set, and/or number of queries performed to produce the result set. This information can be utilized to generate a potential total number of records, potential total number of fields, and/or potential total number of queries. In particular, the determined number of records included in the result set can be summed with a current running total number of records determined for the corresponding user and/or provider within one or more time windows 1416 of one or more rules 1415, for example, determined by the temporal access limits compliance module 1420 to be applicable to the given query and/or result set, to generate one or more potential total number of records for the one or more time windows 1416. This one or more potential total number of records can each be compared to a maximum number of records indicated in a rule 1415 for the corresponding provider and/or time window 1416 for which the corresponding potential total number of records was determined. If a potential total number of records exceeds the maximum number of records for the corresponding rule 1415, the temporal access limits compliance module 1420 can generate temporal access limit compliance data indicating non-compliance. If each potential total number of records does not exceed the maximum number of records for the corresponding rule 1415, the temporal access limits compliance module 1420 can generate temporal access limit compliance data indicating compliance.

Similarly, the determined number of fields included in the result set can be summed with a current running total number of fields determined for the corresponding user and/or provider within one or more time windows 1416 of one or more rules 1415, for example, determined by the temporal access limits compliance module 1420 to be applicable to the given query and/or result set, to generate one or more potential total number of fields for the one or more time windows 1416. This one or more potential total number of fields can each be compared to a maximum number of fields indicated in a rule 1415 for the corresponding provider and/or time window 1416 for which the corresponding potential total number of fields was determined. If a potential total number of fields exceeds the maximum number of fields for the corresponding rule 1415, the temporal access limits compliance module 1420 can generate temporal access limit compliance data indicating non-compliance. If each potential total number of fields does not exceed the maximum number of fields for the corresponding rule 1415, the temporal access limits compliance module 1420 can generate temporal access limit compliance data indicating compliance.

Similarly, a single query and/or the determined number of queries included in the query request can be summed with a current running total number of queries determined for the corresponding user and/or provider within one or more time windows 1416 of one or more rules 1415, for example, determined by the temporal access limits compliance module 1420 to be applicable to the given query and/or result set, to generate one or more potential total number of queries for the one or more time windows 1416. This one or more potential total number of queries can each be compared to a maximum number of queries indicated in a rule 1415 for the corresponding provider and/or time window 1416 for which the corresponding potential total number of queries was determined. If a potential total number of queries exceeds the maximum number of queries for the corresponding rule 1415, the temporal access limits compliance module 1420 can generate temporal access limit compliance data indicating non-compliance. If each potential total number of queries does not exceed the maximum number of queries for the corresponding rule 1415, the temporal access limits compliance module 1420 can generate temporal access limit compliance data indicating compliance.

To determine these running totals for number of records, fields, and/or queries within a time window 1416 for a particular rule 1415 for a given user and/or given provider extracted from a given query and/or result set, the temporal access limits compliance module 1420 can further utilize user usage data to determine the number of records accessed by a user within a particular time window 1416, to determine the number of queries performed by a user within a particular time window 1416, and/or to determine the number of fields accessed by the user within the particular time window 1416. In some cases, this user usage data is retrieved from the query logging system 450, for example, where the query logging system 450 sends query data and/or result set data of one or more entries 455 to the temporal access limits compliance module 1420. In some cases, the temporal access limits compliance module 1420 can indicate the time window 1416 for a particular rule 1415, the user ID for the requesting user, and/or the provider ID for the requesting provider in the request sent to the query logging system, and the query logging system 450 can send a count for the number of corresponding entries to the temporal access limits compliance module 1420 and/or can send the result set data and/or query data for the corresponding entries to the temporal access limits compliance module 1420 for further processing.

Determining and/or indicating the bounds of a particular time window 1416 can include receiving the current time, determining the current time, and/or extracting a timestamp associated with the given query. A time window length indicated in time window 1416 can be subtracted from this determined current time and/or timestamp to determine an age threshold for queries relevant to the corresponding rule. Alternatively, this age threshold can be directly indicated by time window 1416, for example, as the beginning of the current month and/or known start of a current subscription period. The request to the query logging system 450 can indicate only entries that with timestamps that are more recent than this age threshold be returned, and/or can otherwise filter entries based on this age threshold.

The count and/or number of entries returned by the query logging system 450 can be utilized by the temporal access limits compliance module 1420 to determine the running total number queries performed by the user upon data for the particular provider within the corresponding time window 1416. Alternatively, the result set data for each entry 455 can indicate a number of partial queries, which can be summed across all of the entries 455 to determine the running total number of partial queries performed for the user upon data for the particular provider, if the corresponding maximum number of queries corresponds to such partial queries.

Furthermore, the result set data for each entry 455 can further indicate a number of records, and/or can indicate a plurality of record identifiers for records returned and/or accessed. This information across all queries by the user within the time window can be summed or otherwise consolidated temporal access limits compliance module 1420 to determine the running total number of records accessed by the user within the time window 1416. For example, the result set sizes for all entries 455 for the user corresponding to records of a particular provider within the time window can be summed to determine the running total number of records. Alternatively, the total number of distinct records supplied by a particular provider accessed by the user with timestamps within the time window can be consolidated, where the number of distinct records indicated across all the entries 455 for the user and provider with timestamps within the time window are counted to determine the running total number of records.

Furthermore, the result set data and/or query data for each entry can indicate field identifiers, and the number of distinct field identifiers for the same and/or different type of records can be counted across all entries 455 for the user and provider within the time window to determine the running total number of fields accessed by the user for the provider within the time window.

In some cases, rather than locally processing these received entries 455, the request to the query logging system can instruct the query logging system 450 to calculate some or all of these running totals itself for the relevant entries, for example, by executing a SQL query generated by the temporal access limits compliance module 1420 to count the relevant entries, relevant result sets, and/or relevant number of fields, where these counts are returned by the query logging system and indicate the current total number of queries, records, and/or fields.

In some embodiments, the request to the query logging system can further filter entries based on the parameters 556 indicated by a given rule 1415 being evaluated by the temporal access limits compliance module 1420 for compliance. For example, the request can indicate that only entries 455 with result sets that include a particular field ID indicated in the parameters 556 for a corresponding rule be counted and/or returned and/or that only entries with queries that included aggregation functions upon a particular field be counted and/or returned. Alternatively, the temporal access limits compliance module 1420 can apply the parameters 556 for one or more particular rules 1415 to locally filter the entries 455 received from the query logging system 450 to determine one or more proper subsets of entries with result set data and/or query data that compares favorably to the parameters 556 for one or more particular rules 1415, and can count entries, records, and/or fields within these proper subsets filtered by parameters 556 accordingly.

In other embodiments, rather than computing these sums for each query and/or result set that invoked a corresponding applicable rule 1415, the analytics system 110 can track such running totals for a user within time windows indicated by rules 1415, standardized time windows applicable to some or all rules 1415, time windows corresponding to the user's subscription data that dictates their subscription level, and/or in total over time. These tracked running totals can be stored, for example, in user profile database 444 as record usage data of entries 445. In such embodiments, these running totals are automatically updated for a given user in their entry 445 in response to execution of a query for the user by the analytics system 110. Alternatively or in addition, the temporal access limits compliance module 1420 can cache its running totals, and as each new query is checked for the corresponding rule, if compliance is achieved and the query is thus executed and/or the result set is thus returned to the user, the cached running total can be automatically updated to reflect the calculated potential total that is now indicative of the true total with the execution of the query and/or returning of the result set to the user.

In cases where the temporal access limits compliance module 1420 is implemented as pre-execution compliance module 610, such running totals and/or other user usage data can be accessed prior to any execution to determine that one or more maximums has already been reached, and thus result set estimates and/or actual result sets are not necessary. For example, if the maximum number of queries has already been reached for a given user, the query is not executed. Similarly, if the maximum number of fields has already been reached for a given user and new fields are requested in the query, the query is not executed. Some or all of this information can be tracked locally by user device 140, for example, where queries transmitted and/or executed are tracked over time and stored locally, and/or where records and/or fields received in result sets received as query responses are tracked over time and stored locally. This local tracking can be utilized to provide the user usage data locally, enabling some or all of the functionality of a temporal access limits compliance module 1420 being implemented on a user device 140 to be performed without retrieving user usage data from the analytics system 110.

FIGS. 15A-15D relate to customization and enforcement of rules of a record-based access limits ruleset 572, which can impose limits for the usage of the same records within a given timeframe and/or over time in total. The customization and enforcement of maximum sizes of result sets as discussed in conjunction with FIGS. 15A-15D present favorable improvements to existing technologies for licensing data and/or maintaining anonymity of data by tracking access and/or usage of individual records over time, and by imposing limitations to the access of the same records over time based on various, configurable criteria.

Enforcement of a record-based access limits ruleset can enable more stringent privacy regulation, for example, by ensuring a same record cannot be accessed too many times and/or be utilized in too many different ways in such as fashion that would enable identify matching and/or otherwise reduce and/or eliminate anonymity regarding one or more records. In such embodiments, rather than imposing a temporal limit, number of and/or types of queries that can be applied to the same record and/or multiple records with particular matching fields is restricted for the purpose of preventing identity matching. In some cases, these restrictions are invoked for individual users to ensure the same user cannot de-privatize data. Alternatively, these restrictions can be invoked across all users or for defined sets of multiple users to prevent malicious users from consolidating their data, such as multiple fields of the same record that are restricted and/or multiple records with one or more matching fields that are restricted. In some cases, this can enhance the functionality of the forbidden fields ruleset 562 discussed in conjunction with FIGS. 10A-10D by ensuring that forbidden fields groupings are not accessed across multiple different queries that, evaluated in isolation, would comply with forbidden fields rulesets, but where a set of fields for the same record that corresponds to a forbidden field is derivable across the multiple queries.

Alternatively or in addition, enforcement of a record-based access limits ruleset can enhance licensing of data by providers, for example, by enforcing periods of time in which data can be used and/or by restricting over-usage of the same sets of records by individual users. For example, particular time windows upon which the same individual records or set of records can be used can be configured and enforced for users, and can be more or less stringent for users at differing subscription levels. In particular, individual records and/or sets of records can be available for a greater number of queries and/or a greater length of time. This can enhance the functionality of the temporal access limits ruleset 570 discussed in conjunction with FIGS. 14A-14E by specifically limiting how much a user can access the same records, for example, to ensure that only most favorable subscription users are allowed to perform the higher number of queries with more sophisticated types of functions upon the same data over time, enabling greater analytical insights for these most favorable subscription users, while lower subscription users are only enabled low numbers of queries with basic functions upon same sets of data. Similarly, invoking longer time periods for usage of the same data by higher subscription users can enable more analysis to be performed by these users. These features can be particularly useful in embodiments where raw data is never accessible by end users, as their ability to access perform analytics on particular sets of data records is entirely limited by the rules invoked by such a record-based access limits ruleset for their subscription level.

Figure 15A:
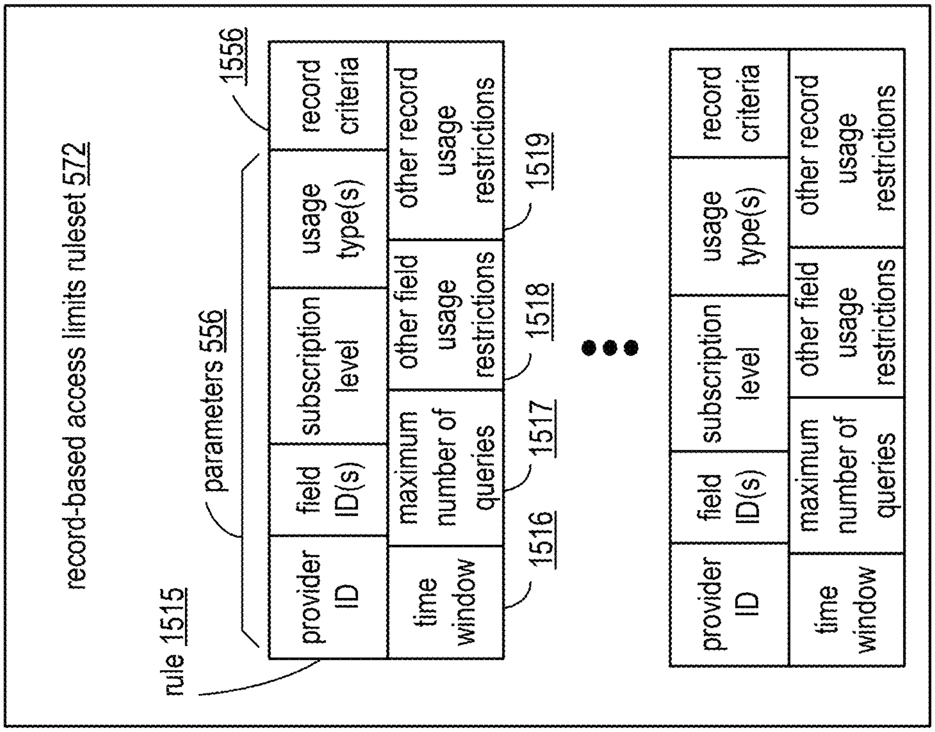
FIG. 15A illustrates an example embodiment of a record-based access limits ruleset in accordance with various embodiments of the present invention.

FIG. 15A presents an embodiment of the record-based access limits ruleset 572, which can include a plurality of rules 1515. Some or all rules 1515 can indicate a time window 1516. Time window 1516 can be implemented in the same and/or similar fashion as time window 1416. For example, time window 1516 can indicate a length for a sliding time window, for example, where the rule is invoked within a length of time indicated by the time window ending at the current time, such as within the last 48 hours. Alternatively or in addition, time window 1516 can indicate a recurring period of time that repeats at a fixed time regardless of the current time, for example, where the time window resets at the beginning of each day or each month. This configuration can be favorable in cases where subscriptions are paid and/or are in effect for a corresponding, recurring period. For example, the time window 1516 can indicate the rule is invoked for all queries in the current month, where users are subscribed to a monthly subscription plan with recurring monthly payments. As another example, the time window 1516 can otherwise indicate any start and/or end point for the time window and duration to indicate when and/or for how long the time window is in effect. The time window 1516 can otherwise indicate a time limit imposed on usage of records to which rule 1515 applies.

Alternatively or in addition, some or all rules 1515 can indicate a maximum number of queries 1517. The maximum number of queries 1517 can correspond to a number of transactions, partial queries extracted from each received query request, and/or individual query functions performed against the database system 112. In some cases, the maximum number of queries 1517 otherwise indicates a limit imposed on an amount of usage of records to which rule 1515 applies.

Each rule 1515 can further indicate one or more rule parameters 556, denoting the conditions under which the given time window 1516 is applicable and/or the given maximum number of queries is applicable for a given query and/or given result set, as discussed in conjunction with FIG. 5C. For example, the query processing system 114 can determine to retrieve and or utilize one or more time windows 1516 and/or one or more maximum number of queries 1517 and/or can otherwise determine a given time window 1516 and/or maximum number of queries 1517 is applicable to a given query or result set, based on determining that the corresponding parameters 556 compare favorably to corresponding parameters determined by the query processing system 114 for the given query and/or result set. In particular, a time window 1516 and/or maximum number of queries 1517 can be checked by the query processing system 114 when a given query and/or given result set is determined to involve and/or return a particular record and/or some or all of a particular set of records to which a corresponding rule 1515 applies.

The parameters 556 of a rule 1515 can include at least one provider ID, denoting which provider from which the rule 1515 was received in a corresponding provider ruleset 560 and/or otherwise denoting the maximum number of queries 1517 and/or time window 1516 applies to records supplied by the corresponding at least one provider. The parameters 556 of a rule 1515 can include one or more particular field IDs and/or groupings of field IDs, denoting the time window 1516 and/or maximum number of queries 1517 applies usage of the particular field IDs and/or one or more of the groupings of field IDs of a particular record. The parameters 556 of a rule 1515 can include one or more subscription levels, denoting the time window 1516 and/or maximum number of queries 1517 applies to queries received from users at a corresponding subscription level indicated in the one or more subscription levels. The parameters 556 of a rule 1515 can include a usage type, denoting which type of functions apply to the limits 1417 for the time window 1416 and/or indicating whether the limits 1417 for the time window 1416 apply to queries and/or records returned to the user as raw values or whether the limits 1417 for the time window 1416 apply to queries and/or records utilized in particular aggregation function, where the output returned to the user is based on the result of the particular aggregation function. This can also indicate whether corresponding the fields can be utilized as filtering parameters, for example, in a WHERE clause of the query.

A rule 1515 can further include record criteria 1556, indicating whether the rule 1515 applies to a particular record. This record criteria 1556 can be considered a further parameter of the query and/or result set itself, for example, where a rule 1515 is applicable to a given query and/or result set if it includes at least one record that meets the record criteria 1556 of the rule 1515. The record criteria can indicate age limits and/or bounds of the record, where the rule applies only to records within a given age range. The record criteria 1556 can indicate the rule applies to records of a particular type, such as records included within a particular table, records that include one or more particular fields, and/or records whose data was collected by a particular data collection device. The record criteria can indicate one or more record identifiers, indicating the rule applies only to records with identifiers that match an identifier indicated in the record criteria. While the provider ID is indicated separately in FIG. 15A, the provider ID can also be considered record criteria, indicating that the rule applies to records supplied by a particular provider.

In some cases, only such record criteria 1556 is indicated in a rule 1515, where other parameters 556 indicating parameters for queries performed upon these records are optionally not included, and thus the rule is applied to any usage of the records meeting the record criteria. Alternatively, no record criteria 1556 is indicated in a rule 1515, where the rule is applied to usage of any records in queries and/or result sets meeting the parameters 556.

The record criteria and/or other information indicated in rule 1515 can indicate whether the rule applies to individual records meeting the record criteria, for example, where usage of individual records is tracked over time to determine whether or not the corresponding rule 1515 is adhered to. In such cases, usage of each particular record meeting the record criteria may not be allowed to exceed the maximum number of queries 1517 and/or may not be able to be used outside the indicated time window 1516.

Alternatively, the rule can apply to all records indicated in a particular set of records indicated by the record criteria, such as records of a particular table; records collected by the same data collection device; records with one or more matching values in one or more particular fields; records with timestamps within a particular age range; records returned to a user in a same result set of a previous query; records in a same result set utilized in an aggregation of a previous query; records with record identifiers in a same set of record identifiers; and/or otherwise identified groups of records that are indicated in the record criteria. In such embodiments, the tracking of records can apply collectively to all records within these same identified sets, for example, where usage of multiple particular records within a same one of these indicated sets of records cannot exceed the maximum number of queries. In particular, if the maximum number of queries 1517 is set to 100 for a particular set of records, if a particular record in the set of records has been accessed in 20 queries, but 100 queries have already been run utilizing different records in this particular set of records, that particular record can no longer be accessed even though it has only been accessed 20 times itself. Similarly, the time window 1516 can apply to all records within such a set, where any of the records in the identified set can only be accessed within the time window and/or can only be accessed in a number of queries indicated by maximum number of queries 1517 within the particular time window 1516.

In some cases, only a maximum number of queries is denoted in a rule 1515, and a time window 1516 is not included. In such cases, the rule can correspond to maximum total usage of the particular records meeting the record criteria 1556 and/or for queries meeting parameters 556. For example, a particular record or particular group of records may be accessible for only the maximum number of queries and/or in a maximum number of distinct ways, across any span of time, to aid in prevention of identity matching. For example, a particular rule 1515 can indicate that records provided by provider X that include field C can only be utilized in a maximum of 20 aggregations, and/or can only be returned once as raw values. Such rules can be applicable across all users or identified sets of users to prevent malicious users from consolidating records received to perform identity matching in tandem. For example, users located in the same geographic region, affiliated with the same company, and/or otherwise identified in the same group may not collectively be allowed more than the maximum number of queries upon individual records and/or any records within the same groups of records. In such cases, holistic usage of records can be tracked and/or determined across all user and/or usage of records across such a particular set of identified users can be tracked and/or determined. Alternatively, such rules can be applied on a user-by-user basis, where individual users are allowed to perform up to the maximum number of their own queries upon the data, given these queries meet parameters 556. For example, a particular rule 1515 can indicate that each individual user is allowed up to 20 of their own aggregations upon records provided by provider X that include field C and/or is allowed one access to these records returned as raw data.

In such cases where restrictions are imposed due to de-privatizations concerns for particular records, alternatively or in addition to imposing a maximum number of queries 1517, more specific limitations can be indicated in the rule 1515 that restrict how records can be used across multiple queries. In some cases, forbidden field groups can be configured as discussed in conjunction with FIGS. 10A-10D, and these forbidden field groups can be enforced for same records across multiple queries by the same user or different users. For example, the fields that have been accessed and/or have been returned to a particular user and/or to any user as raw data over time can be tracked and/or determined. Such information regarding forbidden fields groupings that are applicable for a same user, same group of users, and/or all users can be indicated in the rule 1515 as other field usage restrictions 1518.

In particular, if one or more field IDs are indicated for the rule 1515 as parameters 556, indicating that the rule applies to records that involve one of these field IDs or all of these field IDs, the other field usage restrictions 1518 can indicate one or more other fields of the record that must not have been previously accessed and/or returned for the rule to be adhered to. For example, the union of the set of field IDs indicated as parameters 556 and the set of additional field IDs indicated in the other field usage restrictions 1518 can yield a forbidden fields grouping. Queries that, when executed, do not return or utilize all necessary fields for any record to which a rule 1515 is applicable that render the entirety of any forbidden fields groupings will comply with such rules. Queries that, when executed, will return or utilize all necessary fields for at least one record to which a rule 1515 is applicable that render the entirety of at least one forbidden fields groupings will not comply with such rules.

Consider a case where a proper subset of a forbidden fields grouping indicated in the other field usage restrictions has already been returned and/or utilized by the same user and/or by any user for a particular record. Suppose a given query involves utilization of or returning of one or more additional fields of this particular record. If these additional fields, in union with the proper subset of the forbidden fields grouping yields at least the entirety of the forbidden fields grouping, the query and/or result set the includes these additional fields of the particular records can be determined to be non-compliant and execution of the query and/or returning of these additional fields to the requesting user can be foregone by the query processing system 114.

In some embodiments, field conditionals such as ranges of acceptable and/or unacceptable raw values or aggregated values for other fields not utilized in the query, but previously utilized in different queries, can be indicated in the other field usage restrictions 1518, indicating particular conditions the other fields must meet for the corresponding other field usage restrictions to apply. Such field conditionals and/or ranges of acceptable and/or unacceptable raw values or aggregated values can be set for other fields of records not utilized in previous queries or the current query, but still pertaining to fields of the same record utilized in the current query or a previous query. These field conditionals can be applied in a similar fashion as discussed with regards to the forbidden fields ruleset 562 by enforcing the field conditionals for forbidden fields groupings across multiple queries.

In some cases, enforcing forbidden fields groupings over time for records individually is not sufficient in preventing identity matching, as identity matching can involve utilization of multiple records that are related to gain insights for a particular person and/or to otherwise deduce private information given multiple related records. Alternatively or in addition, access to many similar records may induce privacy concerns, for example, if they all correspond to a same person, a same mobile device, a same vehicle, a same mailing address, a same company and/or other same entity that may have data multiple records of the same or different type that in tandem supply private information.

In cases where identity matching or additional privacy matters due to access to multiple related records is of concern, some rules 1515 can invoke additional restrictions for usage of a set of related records and/or that otherwise restrict usage based on past usage of other particular records. In particular, access sets of records with matching values for a particular field, and/or for each of a set of particular fields, can be rendered forbidden for some or all individual users, across particular sets of users, and/or across all users. Some rules 1515 can indicate a maximum number of records and/or a distinct set of different types of records that can be returned to users over time and/or that can be utilized in queries over time. For example, the rules 1515 can indicate that no more than 15 records can be returned to a user if they have a matching mailing address field. In such cases, such rule can apply even if the mailing address field is not accessed and/or utilized in the query, where only other fields of these records with the matching mailing address field are being accessed.

As another example, suppose the database contains records supplied by a car company that identify addresses of people that are owners of cars, records supplied by a credit card company that identify people that identify addresses of people that are customers of the credit card company, and records supplied by a telecommunications company that all contain identifying identify people that identify addresses of people that subscribe to a telecommunication service provided by the telecommunications company. A rule 1515 can indicate that if a single record of the car company and/or if at least a threshold number of records of the car company with a matching person identifier are accessed by an end user, then no records, or up to a threshold number of records, supplied by the credit card company with the same person identifier as these one or more records supplied by the car company can be accessed. As another example, a rule 1515 can indicate that if records with matching person identifiers are accessed by the same end user from any two of these three data providers, no records can be accessed from the remaining third one of these three data providers that also identify the same person.

Such limitations invoked by previous accesses to other records supplied by the same or different provider can be indicated as other records usage restrictions 1519 of a particular rule 1515. In particular, if a particular record meets record criteria 1556 and/or the query meets the parameters 556, a record being accessed in the query can be evaluated for compliance with the rule 1515 based on determining whether previous access to other records by the same or different user are deemed forbidden by the other record usage requirements. In particular, particular field IDs or field groupings accessed for different records previously, record criteria for these other records, number of other records accessed that meet particular criteria, time frames in which these records were accessed, user IDs or types of users that performed the previous access, and/or other criteria can be denoted that, when met by the previous accesses logged in the database usage log 454, render non-compliance with the corresponding the rule 1515.

In some cases, a maximum number of queries 1517 and time window 1516 can both be indicated for a particular rule. In such cases, the indicated maximum number of queries 1517 can be applied to the particular time window 1516 in the same or similar fashion as discussed in conjunction with the temporal access limits ruleset 570, where the rule is specific to same records meeting the record criteria and/or any records within the same group. For example, a particular rule 1515 can indicate that any particular record supplied by provider X can be utilized in no more than 50 queries in a given month.

In such embodiments where a time window 1516 is indicated, a given time frame can be fixed, where a given record can only be accessed in to the maximum number of queries, which all need to take place within the fixed time window. For example, records meeting particular criteria can only be accessible for a fixed time frame, such as a given month. Alternatively, any particular record, once accessed by a user for the first time, is then only available to the user for the length of the time window, where the time window for a particular record starts with the first access of the particular record. In such cases, any further access can be prohibited outside the time frame, even if the user never reached the maximum number of usages. This can be further useful in preventing de-privatization and/or identity matching by not only limiting the number of times a user can access a particular record, but by further limiting the total amount of time the record is available to the user for use.

Alternatively, the time window can correspond to a recurring time frame, where record usage tracking can reset as a new time window begins. In particular, the resetting of record tracking for particular records by a particular for a new time window can be enabled in conjunction with a user renewing their subscription for the new time window. For example, usage of a same record can be again acceptable for up to a maximum of 50 queries by a user in the current month, even if the user had already used this record in the maximum number of 50 queries in the previous month. Such embodiments can be ideal for records where identity matching is not possible and/or is not of concern, and thus where unlimited usage of a record by a user does not pose privacy concerns. In particular, this can encourage users to renew their subscription plan in future time frames so they again can continue usage of the same data records, for example, after reaching their maximum usage within a given month, to further the insights possible for these records.

In some cases, only a time window 1516 is denoted in a rule 1515, and a maximum number of queries or other amount of usages is not included. In such cases, the rule can correspond to a "rental period" for licensing of particular records meeting the record criteria 1556 and/or for queries meeting parameters 556. For example, a particular end user may be granted an unlimited number of queries and/or unlimited access to a set of records denoted in the record criteria so long as this access falls within the time window. For example, a particular rule 1515 can indicate that records provided by provider X where field C is greater than 100 can only be accessed by users at subscription level I in the month of July, while users at more favorable subscription level II are granted access to these records provided in the month of June for the remainder of the calendar year.

The time window can reset with each recurring time window as discussed above, for example, as a user continues to pay for their subscription, enabling unlimited access of data records as the user continues paying for their subscription. Alternatively, the time window for a particular record or set of records can similarly begin with the first access to the particular record or set of records, where access to a particular record or set of records is unlimited for the length of time specified by the time frame, but where the user is prohibited from further access of the particular record or set of records once this length of time has elapsed. Alternatively, the time window for a particular record can be otherwise fixed, for example, where particular records meeting particular criteria is only available for use within a particular month. For example, these particular records meeting the record criteria, can "expire" from future usage by users, where the usage of such records will only ever be available to a given user within the specified time window, and/or where the amount of time that a given record is available for usage increases with more favorable subscription levels.

One example of conditioning the fixed time window on record criteria is in scenarios where the age of a record is utilized to dictate its lifetime of usage. In such cases, the time window 1516 for a particular record can be a function of the timestamp or other indication of age of the record itself. For example, a rule 1515 can indicate that particular records provided by a particular provider, and/or particular usage of records by users at particular subscription levels, is available only within a fixed of time from the time in which the record was recorded in the database system 112. For example, a rule 1515 can indicate provider X's records are available to users at subscription level I for one month after they are added to the database, that provider X's records are available to users at more favorable subscription level II for six months after they are added to the database, and that provider X's records are available to users at most favorable subscription level III for an indefinite period of time after being added to the database. As another example, a rule 1515 can indicate provider X's records are available to be returned as raw data for 2 days after being added to the database, but can be utilized in aggregation for 2 weeks after being added to the database. This can be useful in cases where historical data is deemed more valuable, as access to data spanning a longer period of time can be more useful in generating analytical insights than access to data spanning shorter time spans.

Such mechanisms of restricting some or all types access to records by some or all users for data once these records have aged beyond a specified amount can be useful not only for licensing purposes, but also in increasing performance of the analytics system. For example, older records that require less access can be stored in less efficient long term storage for only periodic access, for example, by the highest paying subscribers, while newer data allowed to be accessed by more users in more types of queries can be stored in faster, more efficient storage, later being moved automatically to slower storage as it ages. This mechanism for efficiently storing records used less frequently and/or by less users can also be performed for other types of record criteria 1556 that more stringently prohibit access to certain types and/or groups of records, where the more stringently regulated groups of records can be automatically stored in the slower storage than less stringently regulated groups of records in response.

Alternatively or in addition to restricting access to older records, the most recent records can be deemed the most valuable, and may be thus accessible for more immediate access only to users at the highest paying subscription levels. As a particular example, higher level subscription users can be granted access data records within an hour of being recorded, where lower paying subscription levels may need to wait a longer amount of time such as a week to access these records, and thus are only granted access to data that is at least a week old at any given time. These restrictions for different subscription levels can similarly be indicated in the time window 1516 and/or record criteria 1556.

In some cases, age restrictions for different records can be indicated in the other records usage restrictions 1519, for example, to enforce maximum and/or minimum time spans for multiple records with one or more matching fields and/or for multiple records that are otherwise grouped and/or deemed as related record. For example, access to a location field for multiple records for a same vehicle within a short time span can indicate detailed information about a vehicle's location, which can be utilized by a malicious user to deduce private information regarding the route of a particular person's commute and/or to otherwise trace a private route. In such cases, users may be prohibited from accessing more than a threshold number of records with one or more matching fields if they all have timestamps that span a length of time that falls below a threshold minimum time span. Such a threshold minimum time span can denote the minimum amount of time for which two or more records with particular matching fields must be separated to be utilized and/or returned. One or more of these threshold minimum time spans can be included in the other records usage restrictions 1519.

Similarly, access to records with one or more matching fields and/or that are otherwise related may be prohibited if they span a time frame that is too large. For example, gaining insights into short term whereabouts or other logged conditions for a particular person may be allowed, while accessing such information over longer spans of time could provide too much insight into private information. In such cases, users may be prohibited from accessing more than a threshold number of records with one or more matching fields if they all have timestamps that span a length of time that exceeds a threshold maximum time span. Such a threshold maximum time span can denote the maximum amount of time for which two or more records with particular matching fields can be separated to be utilized and/or returned. One or more of these threshold maximum time spans can be included in the other records usage restrictions 1519.

Some rules 1515 can include fewer parameters 556 and/or can optionally not include one or more of the time window 1516, the maximum number of queries 1517, the other field usage restrictions 1518 and/or the other records usage restrictions 1519. Some rules 1515 can include additional parameters 556 and/or other usage limitations not indicated in FIG. 15A. In some cases, each listed parameter 556 must be met for the corresponding time window 1516, maximum number of queries 1517, the other field usage restrictions 1518, and/or the other records usage restrictions 1519 to be retrieved, checked, and/or applied by the query processing system for the given query. In some cases, the query processing system 114 must determine the conditions of each listed parameter 556 of a rule 1515 match or otherwise compare favorably to those of a given query or result set for a determination of non-compliance with rule 1515 to be possible. In some cases, the query processing system 114 must additionally determine that tracked information for previously processed queries indicate some or all conditions of the other field usage restrictions 1518 have been previously met for a determination of non-compliance with rule 1515 to be possible. In some cases, the query processing system 114 must determine that tracked information for previously processed queries indicate some or all conditions of the other records usage restrictions 1519 have been previously met for a determination of non-compliance with rule 1515 to be possible.

Figure 15B:
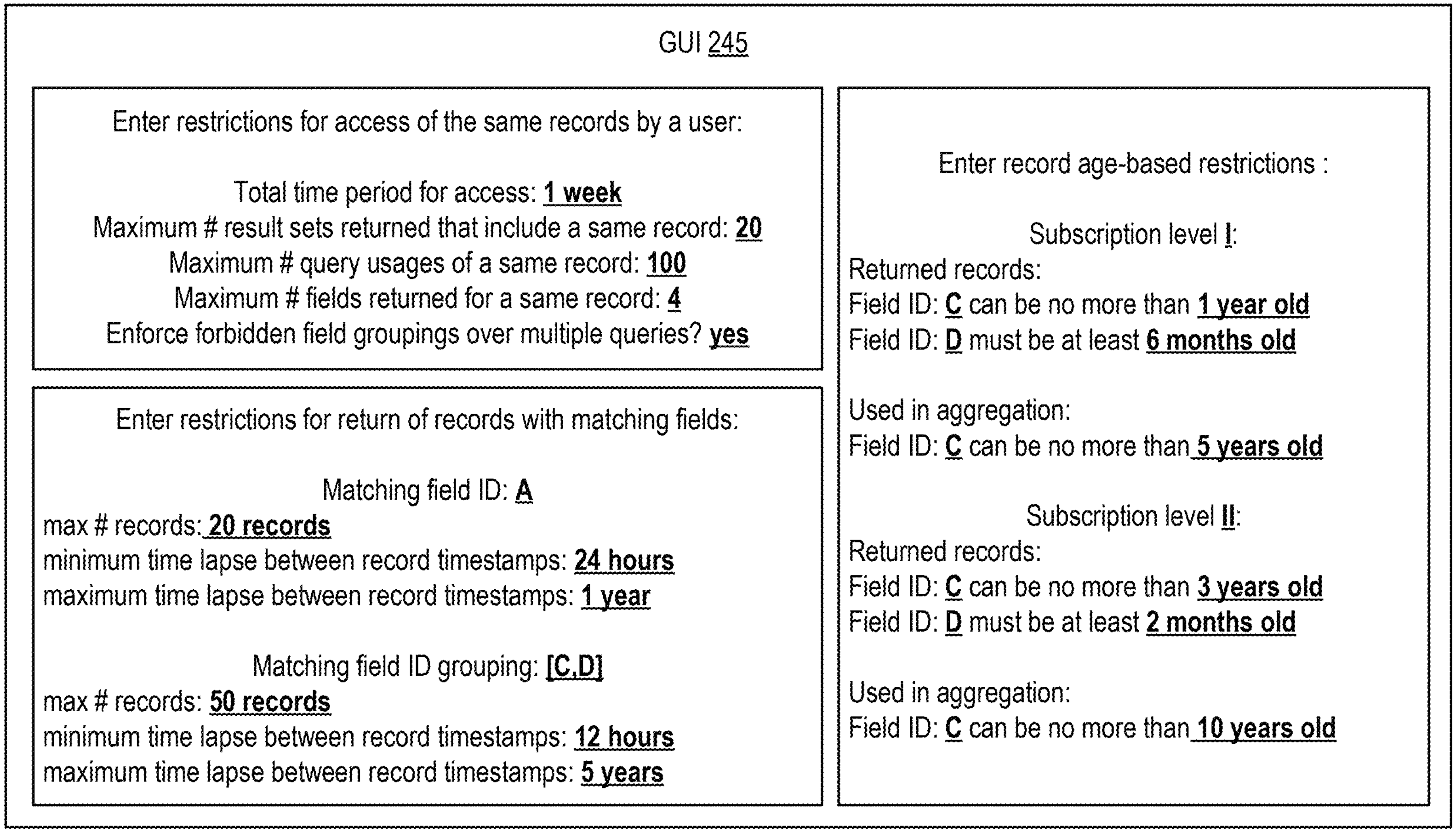
FIG. 15B illustrates an example embodiment of GUI displayed via a provider device in accordance with various embodiments of the present invention.

FIG. 15B illustrates an example embodiment for a GUI 245 enabling configuration of time windows 1516, maximum number of queries 1517, other field usage restrictions

1518, other records usage restrictions 1519, and/or corresponding parameters 556 for one or more rules 1515 of the record-based access limits ruleset 572. The GUI 245 can present a prompt to enter access restrictions for access of the same record. In the example illustrated in FIG. 14B, the user indicates that a same record cannot be accessed multiple times by an end user within a time period that spans longer than 1 week. The user further indicates that a particular record cannot be returned to an end user in more than 20 result sets. The user further indicates that a same record cannot be utilized in any fashion, such as in aggregations, for more than 100 queries performed for an end user. The user further indicates that values of no more than 4 distinct fields of a same record can be returned to an end user. The user further indicates that forbidden fields groupings, for example, as entered in conjunction with GUI 245 illustrated in FIG. 10B, be enforced over multiple queries performed by the same end user. While not illustrated in FIG. 15B, the user can further indicate different values for some or all corresponding rules 1515 for end users at different subscription levels. Alternatively, these restrictions may be motivated by privacy concerns, and thus the same requirements may be enforced for end users at all subscription levels.

The GUI 245 can present a prompt to enter access restrictions specific to age of particular records being accessed. While not depicted, the user can similarly enter other record criteria 1556 indicating particular types of records for which various access rules are applied. As illustrated in FIG. 10B, the user enters age-based restrictions for records returned for end users at subscription level I. In particular, if the value of field C of a record is returned, this record can be no more than 1 year old. If the value of field D of a record is returned, this record must be at least 6 months old. For queries by end users at subscription level I that utilize field C of records in aggregation, these records can be no more than 5 years old.

The user further indicates that, for end users at subscription level II, if the value of field C of a record is returned, this record can be no more than 3 years old. If the value of field D of a record is returned, this record must be at least 2 months old. For queries by end users at subscription level II that utilize field C of records in aggregation, these records can be no more than 10 years old. For example, the subscription level II can correspond to a more favorable subscription level than subscription level I, and thus greater age ranges of records are configured for access by end users at subscription level II than those at subscription level I, as illustrated in FIG. 10B.

The GUI 245 can present a prompt to enter restrictions for returning of records that have matching fields. The user indicates that no more than 20 records with matching values for field A can be returned to an end user. The user indicates that at least 24 hours must have elapsed between any two records returned to an end user if they have matching values for field A. The user indicates that no more than 1 year can have elapsed between any two records returned to an end user if they have matching values for field A. These restrictions can correspond to records in which field A is returned to the end user. Alternatively, these restrictions can correspond to records in which any set of fields that do not necessarily include field A are returned to an end user. In some cases, different restrictions can be imposed for the usage of records with matching field A depending on which field and/or set of fields of the record are returned to the user, and/or depending on whether or not field A is one of the fields returned.

The user further indicates that no more than 50 records with matching values for both fields C and D can be returned to an end user. The user indicates that at least 12 hours must have elapsed between any two records returned to an end user if they have matching values for both fields C and D. The user indicates that no more than 5 years can have elapsed between any two records returned to an end user if they have matching values for both fields C and D. Note that these restrictions for records with matching values for both fields C and D are less stringent than those for field A. These tighter restrictions may be configured based on the values of field A containing more sensitive information and/or being more susceptible to identity matching than the combination of fields C and D.

The GUI 245 can present a prompt to enter record age restrictions indicating maximum age of records that can be returned in result sets or used in aggregations. In the example illustrated in FIG. 15B, the user indicates that, for subscription level I, a record with field C returned as a raw value can be no more than 1 year old, and a record with field D returned as a raw value can be no more than 6 months old. If a record is used in an aggregation applied to field C, the record can be no more than 5 years old. For the more favorable subscription level II, a record with field C returned as a raw value can be no more than 3 years old, and a record with field D returned as a raw value can be no more than 2 years old. If a record is used in an aggregation applied to field C, the record can be no more than 10 years old.

In some embodiments, such as the example provided in FIG. 15B, older records are less accessible and/or the requirements for age are otherwise more stringent when the raw value of a field is returned, and older records are more accessible and/or the requirements for age are otherwise less stringent when field of a records is merely utilized in an aggregation. Similarly, as illustrated in FIG. 15B, the requirements for age can be more stringent for less favorable subscription levels. In other embodiments, minimum age restrictions can alternatively or additionally be applied for records returned or otherwise utilized in queries. In other embodiments, a same age restriction can be set regardless of which fields are returned or which fields are utilized in an aggregation. In other embodiments, age restrictions can be applied to other usages of records in a query in addition to use in aggregation or being returned as raw values. In other embodiments, age restrictions can be set for usage in different types of aggregation functions.

Some or all of this information provided in response to such prompts relating to record-based access limits over time can be utilized to determine rules 1515 of the record-based access limits ruleset 572 of the corresponding provider's provider ruleset 560. In particular, the time window 1516, maximum number of queries 1517, other field usage restrictions 1518, other records usage restrictions 1519, corresponding parameters 556, and/or corresponding record criteria 1556 for one or more rules 1515 configured by a particular provider can be automatically populated by the analytics system 110 as designated in the corresponding user input to GUI 245. Alternatively, the time window 1516 and/or maximum number of queries 1517 for one or more rules 1415 can be automatically determined by the analytics system as a deterministic function of one or more of the parameters 556 and/or record criteria 1556, and/or as a deterministic function of the other records usage restrictions 1519 and/or other field usage restrictions 1518.

Figure 15D:
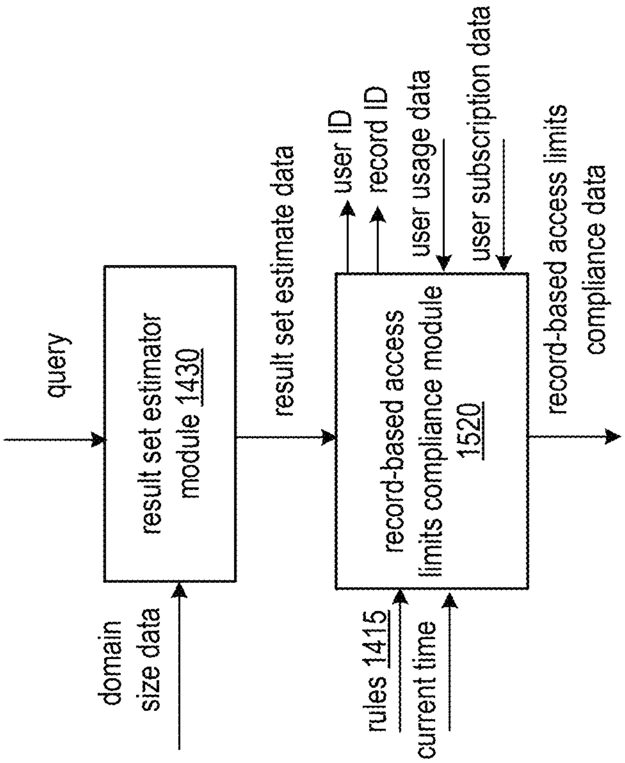
FIGS. 15C-15D are schematic block diagrams of a record-based access limits compliance module in accordance with various embodiments of the present invention.
Figure 15C:
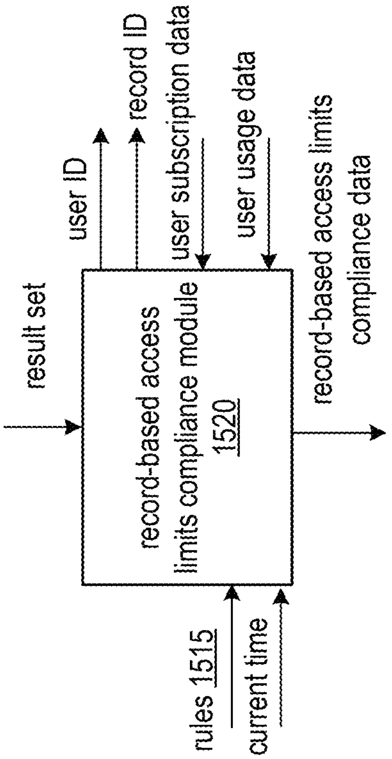

FIGS. 15C-15D illustrate example embodiments of a record-based access limits compliance module 1520, which can be implemented utilizing the query processing system 114 to determine whether compliance with rules 1515 of the record-based access limits ruleset 572 is achieved. FIG. 15C illustrates a record-based access limits compliance module 1520 that is implemented utilizing the runtime compliance module 625 and/or is otherwise implemented after an intermediate and/or final result set for a given query is determined. FIG. 15D illustrates a record-based access limits compliance module 1520 that is implemented utilizing the pre-execution compliance module 610 and/or is otherwise prior to execution of a given query, for example, by utilizing estimated result set data generated by the result set estimator module 1430, which can operate in a similar fashion as discussed in conjunction with FIGS. 14D-14E to provide information regarding the expected result set given the domain size data. In some cases, the result set estimator module 1430 can provide further information as relevant to the record-based access limits compliance module 1520, such particular record identifiers for records expected to be included in result sets, for example, based on inclusion in previous result sets generated for the same or similar queries. Such information can similarly be estimated as discussed in conjunction with the result set size estimator module 1230 based on the domain data, for example, based on any corresponding information supplied in result set data determined for previous queries.

The record-based access limits compliance module 1520 of FIGS. 15C and/or 15D can filter ruleset 572 and/or otherwise determine applicable rules based on determining parameters for a given query and/or result set, and by determining a subset of rules 1515 with parameters 556 that compare favorably to the given query and/or result set. This step can be performed in a same and/or similar fashion as previously discussed herein, for example with regards to the forbidden fields compliance module 1020, forbidden functions compliance module 1120, maximum result set size compliance module 1220, and/or minimum result set size compliance module 1320, by utilizing the provider ID determined to supply data accessed in the query, fields IDs determined to be accessed in the query, function types for functions determined to be performed in the query and/or other usage information regarding whether the result set is returned to the user or utilized as input to an aggregation, and/or a user subscription level for a user determined to have sent the query request.

For a given query and/or result set, the record-based access limits compliance module 1520 can receive result set data and/or can receive information indicating which particular records are included in the result set. For example, the result set can indicate a list of record identifiers for the records included in the result set. This list of record identifiers can be compared to tracked usage of these records over time to determine whether applicable rules 1515 are complied with.

In cases where result set estimate data generated by the result set estimator module 1430 is utilized as input to a record-based access limits compliance module 1520 as illustrated in 15D, the result set estimate data can indicate record identifiers for records estimated to be included in the result set of the given query and/or known to be included in the result set of the given query. In particular these record identifiers can be estimated or determined to be included in the result set for an intermediate result or final result of the given query based on having been included in result sets of the same or similar queries performed previously, and/or having been included in result sets of the same or similar queries performed within a predetermined recent timeframe. In some cases, these record identifiers can be determined based on having been included in result sets of the queries performed with the same filtering requirements or with more stringent filtering requirements than the given query. As this would cause the previous query to generate a result set corresponding to a proper subset of records that would be included in a corresponding result set of the given query, any record included in such a previous query can be deduced to be included in the result set of the current query. In some cases, these record identifiers are further filtered by the record-based access limits compliance module 1520 based on record age requirements of the given query comparing unfavorably to timestamps of these identified records, for example, due to the lapse in time between the current time and the time of execution of the previous query.

The set of record identifiers indicated in the actual result set and/or indicated in the result set estimate data received by the record-based access limits compliance module 1520 can be filtered based on determination of whether any of the applicable rules 1515 are invoked for each particular record. This determination of whether any rules are applicable to a particular record can be determined based on comparing the record to the corresponding record criteria 1556, where records that do not compare favorably to record criteria 1556 for any applicable rules 1515 are removed from the set of records, as they are not applicable to any of the applicable rules 1515. Removal of such records by the record-based access limits compliance module 1520 results in generation of a filtered, applicable set of records for which at least one applicable rule 1515 applies.

In some cases, the record identifier alone will not be indicative of whether the record compares favorably to the record criteria, and corresponding information regarding the record must be fetched from the database system 112 and/or another memory that stores information regarding the records. For example, the database system 112 can be queried to determine corresponding criteria for the particular records in the set, such as the provider ID for the provider that supplied the record, the timestamp and/or other age information indicating when the record was recorded, and/or other information about the record as relevant to record criteria 1556 of one or more rules 1515 as discussed herein.

For each of the applicable set of records, ones of the applicable rules 1515 that has record criteria the record meets can then be evaluated. For example, the time window 1516 for rule 1515 determined to be applicable to the query based on parameters 556 and/or determined to be applicable to at least one record in the result set based on record criteria 1556 can be evaluated to determine whether or not access of the record is currently allowed. In some cases, the rule 1515 can indicate that the time frame in which access to a particular record was allowed has expired, for example, based on the current time falling outside the time window 1516. For example, this can be based on the whether or not the record is currently available for access as a function of the age of the record.

Evaluation of a record's adherence to some rules 1515 can require retrieval of information regarding previous accesses of the record by the same user and/or by any user. For example, the usage data corresponding to each of these records can be retrieved from the query logging system 450, given the record identifiers for these records. The database usage log 454 can be queried for entries 445 with result set data that indicate any of the record identifiers included the set of records of the given result set. If a particular rule 1515 being evaluated indicates restrictions specific to each user individually, the record-based access limits compliance module can determine historical usage of the record by the given user by querying the database usage log 454 for entries 445 with result set data that indicate any of the record identifiers included the set of records of the given result set, and that also correspond to queries requested by the end user with the user ID corresponding to the end user that requested the given query. If a particular rule 1515 being evaluated indicates a time window 1516 in which a total amount of access is restricted, the record-based access limits compliance module can determine historical usage of the record by the given user by querying the database usage log 454 for entries 445 with result set data that indicate any of the record identifiers included the set of records of the given result set, and that also correspond to queries with timestamps within the time window 1516.

Alternatively, accesses to particular records can be tracked and cached locally by the query processing system 114. For example, the record-based access limits compliance module 1520 can update a tracked number of accesses or other information regarding historical access to a particular record each time a query that accesses the particular record is executed, for example, as a result of the record-based access limits compliance module 1520 determining compliance data for the query that indicates compliance based on evaluation of this locally tracked information regarding historical access to this particular record, prior to updating of this tracked information.

This usage information can be utilized to determine whether execution of the query would render a maximum number of queries for usage of a given record will be reached when the query is executed. For example, the number of queries involving the record that have already been performed by the particular end user that requested the query can be counted and/or otherwise determined based on tracked access of the record by the particular user. This number of queries can be counted and/or determined for a corresponding time window 1516, if applicable to the rule 1515, and/or can be determined for all historical access if no time window 1516 is indicated. The number of queries can be compared to the maximum number of queries for the corresponding rule 1515 to determine whether the maximum number of queries has been reached. If the maximum usage for the record has already been reached via previous queries, the record-based compliance data can indicate the record's non-compliance with this rule. If the maximum usage for the record has not already been reached via previous queries, the record-based compliance data can indicate the record's compliance with this rule.

The usage data received for a particular record can further be utilized to determine whether fields being returned and/or utilized in the current query for a particular record adhere other field usage restrictions 1518 of an applicable rule 1515, based on previous usage of other fields of this record by the same user or different users. In particular, the fields that were returned to the user and/or utilized in previous aggregations for a given record can be determined based on its usage data, as this information can be included in result set data and/or query data for entries 455 retrieved from the database usage log 454. This can be utilized to determine whether the fields of a particular record that will be returned and/or utilized in the current query, in union with the fields previously returned to the same user and/or utilized by the same user in previous queries, render the entirety of a forbidden fields grouping indicated by a particular rule 1515 and/or by a forbidden fields grouping 1016 of the forbidden fields ruleset 562. If so, the record can be determined to be non-compliant with the rule. Otherwise, the record can be determined to be compliant with the rule.

The usage data received for a particular record can be utilized to determine whether the other records usage restrictions 1519 of an applicable rule 1515 would restrict usage and/or returning of the given record. In particular matching fields and/or other criteria utilized to determine related records can be utilized to retrieve additional usage data for usage by the same user and/or other users of any applicable records with the indicated matching fields and/or that otherwise are related. These other records can be identified, for example, via a query to the database usage log 454. In particular, if the other records usage restrictions 1519 indicate restrictions regarding records with matching values for particular field or set of fields, the value of this particular field or set of fields can be extracted from the given record, and can be indicated in a request to the query logging system 450. This request can further indicate the user, time restrictions determined based on a time window 1516 of the rule, and/or other filtering parameters to filter query entries and/or filter particular records, as determined based on the corresponding rule 1515. The query logging system 450 can determine which set of entries correspond to the same user, have timestamps within the timeframe, and/or adhere to other filtering parameters. The query logging system 450 can further determine whether any of the result set data for any of these set of entries include records with the same value for the particular field and/or set of fields indicated in the request sent by the record-based access limits compliance module 1520. If so, the corresponding entries and/or particular record identifiers with matching fields can be returned accordingly. In other embodiments, other tracking of usage of related records over time can be utilized by the record-based access limits compliance module 1520 to determine usage of relevant records indicated by the other records usage restrictions 1519.

The record-based access limits compliance module 1520 can then determine whether the execution and/or returning of the result set of the given query would render noncompliance based on the other record usage restrictions. For example, if a threshold number of records with matching fields with a given have already been returned to the user within the specified time frame, the given record can be determined to be non-compliant with the corresponding rule.

If every record for which a rule 1515 is invoked complies with the rule, the rule 1515 can be determined to be complied with for the given query as a whole, and the record-based access limits compliance data generated by the record-based access limits compliance module 1520 can indicate the query's compliance with this rule. If at least one record for which such a rule 1515 is invoked does not comply with the rule, the rule 1515 can be determined to be not complied with for the given query as a whole, and the record-based access limits compliance data generated by the record-based access limits compliance module 1520 can indicate the query's non-compliance with this rule. The record-based access limits compliance module 1520 can further indicate in the record-based access limits compliance data whether every applicable rule 1515 was complied with to indicate whether a given query and/or result set complies with the record-based access limits ruleset 572 as a whole.

In some cases where some records in the result set comply with all of the rules 1515 and others do not comply with at least one of the rules 1515, the query processing system can optionally utilize and/or return a filtered result set that includes only the records that complied with every applicable rule 1515. In such cases, the end user can receive a notification that some records were not returned and/or not utilized, and the notification can optionally indicate how many records were not included and/or can optionally indicate identifiers and/or record criteria regarding the particular records were not returned and/or not utilized.

FIGS. 16A-16F illustrate embodiments that utilize a rule hierarchy 1620. The rule hierarchy 1620 can be utilized by the query processing system 114 to consolidate the application of various rules of the ruleset 550 discussed herein, and/or to dictate how and/or when the various rules discussed herein will be applied. The rule hierarchy 1620 be configured to dictate mechanisms for use by the query processing system 114 to segregate application of different types of rules as discussed in accordance with other embodiments herein; to separately evaluate different partial results and/or different subsets of a same result set as discussed in accordance with other embodiments herein; to evaluate some rules prior to execution and some rules after execution as discussed in accordance with other embodiments herein; to apply rules only when their filtering parameters compare favorably to a given query and/or result set as discussed in accordance with other embodiments herein; to only allow configuration and/or application of rules if they are stricter than a predefined ruleset configured by an administrator and/or regulatory entity as discussed in accordance with other embodiments herein; to apply multiple rules for different providers that supplied records in same result set in tandem as discussed in accordance with other embodiments herein; to apply multiple rules for different fields included in a same result set in tandem as discussed in accordance with other embodiments herein; and/or to otherwise dictate an optimal application of the ruleset and/or to resolve conflicts between conflicting rules in the ruleset.

Figure 16A:
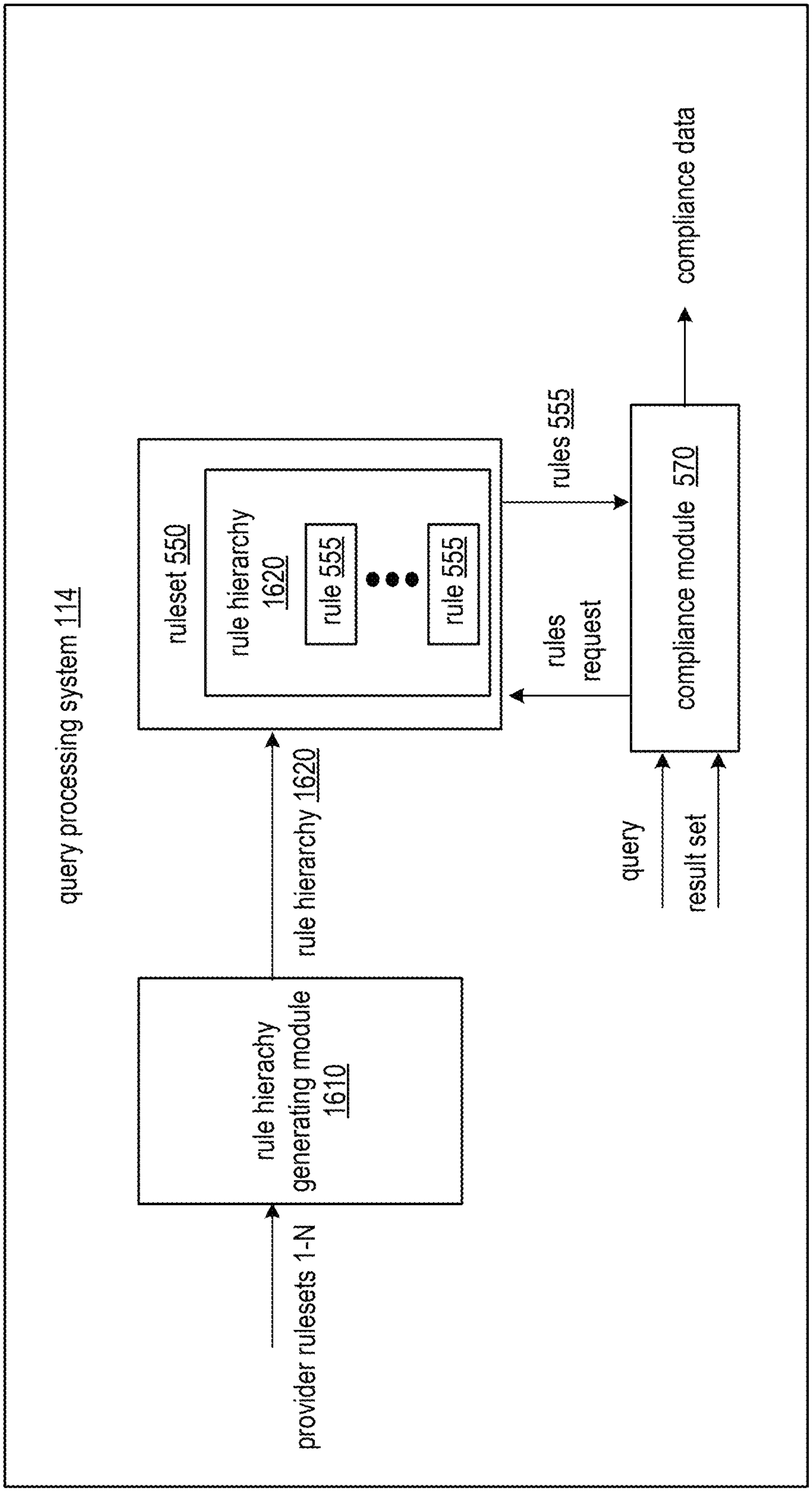
FIG. 16A is a schematic block diagrams of a query processing module that utilizes a rule hierarchy in accordance with various embodiments of the present invention.

As illustrated in FIG. 16A, the query processing system 114 and/or other analytics subsystem 405 can implement a rule hierarchy generating module 1610 that is operable to automatically configure the rule hierarchy 1620. For example, the rule hierarchy generating module 1610 can utilize the processing module 410 and/or memory module 412 of the query processing system 114. As illustrated in FIG. 16A, provider rulesets 1-N and/or any rules 555 determined by the analytics system can be received by the rule hierarchy generating module to generate a rule hierarchy 1620. The resulting rule hierarchy 1620 can be accessed by the compliance module 580 and/or by any of the particular compliance modules discussed herein. For example, for a given query and/or result set, the compliance module 580 can request and/or determine, based on the rule hierarchy 1620, a set of rules to be applied; an ordering of the set of rules to be applied in sequence; and/or an indication one or more subsets of the set of rules to be applied that can be processed in parallel and/or in any order. A determined subset of rules that apply to a particular query and/or result set, and/or all rules 555, can be applied by the compliance module in accordance with the rule hierarchy 1620 to generate the compliance data.

Figure 16B:
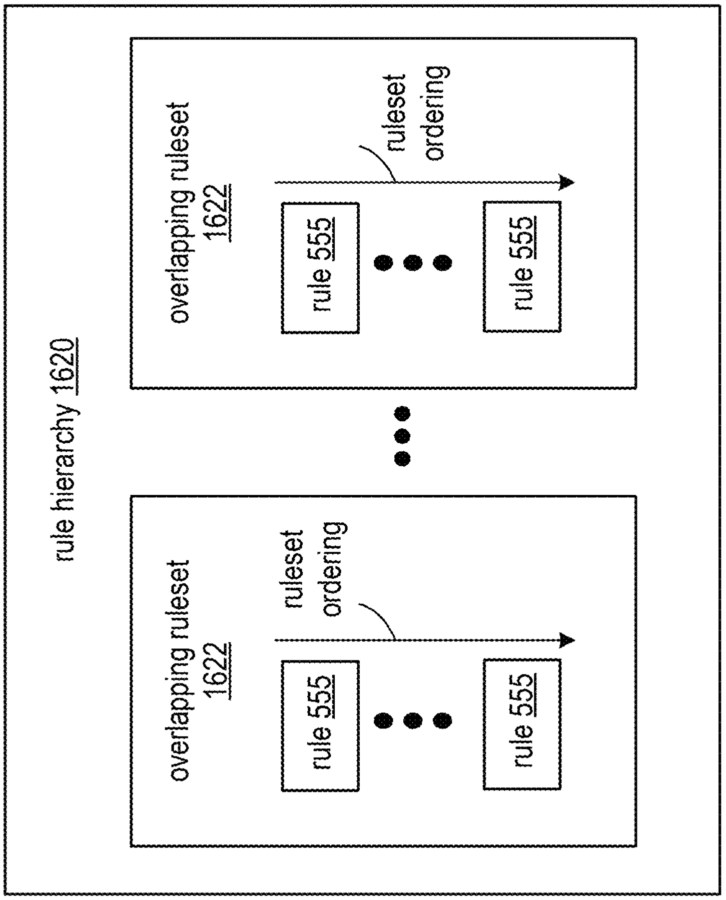
FIG. 16B illustrates an example embodiment of a rule hierarchy in accordance with various embodiments of the present invention.

FIG. 16B illustrates an example of a rule hierarchy 1620. The rule hierarchy 1620 can indicate a plurality of overlapping rulesets 1622, where each rule in an overlapping ruleset 1622 is determined to overlap with and/or influence some or all other rules in the overlapping ruleset 1622. The rule hierarchy generating module 1610 can determine these overlapping rulesets based on determining distinct subsets of rules in the ruleset 550 that have overlapping criteria for compliance and/or non-compliance.

A particular rule in a particular overlapping ruleset can have at least one overlapping non-compliance condition with at least one other rule in the same overlapping ruleset, where the at least one overlapping non-compliance condition is possible to be determined for a single query and/or single result set, and if determined, causes non-compliance with the particular rule, as well as non-compliance with the at least one other rule. For example, a first rule can indicate that field A is a forbidden field, and a second rule can indicate that fields C and D are in a forbidden field grouping. Any records returned that include fields A, C, and D render both the first rule and second rule as non-compliant. However, there are many other conditions that would render non-compliance with the first rule, including any query that returns field A, regardless of whether C and D are returned. Similarly, there are many other conditions that would render non-compliance with the second rule, including any query that returns both fields C and D, regardless of whether field A is returned.

A particular rule in a particular overlapping ruleset can have at least one overlapping compliance requirement with at least one other rule in the same overlapping ruleset, where the at least one overlapping compliance requirement is possible to be determined for a single query and/or single result set, and if determined, causes compliance with the particular rule, as well as compliance with the at least one other rule. For example, if a first rule requires a minimum of 100 records be included in an aggregation and a second rule requires a maximum of 200 records be included in an aggregation, the overlapping compliance requirement is the result set having between 100 and 200 records, where compliance is achieved for the first and second rule if this requirement is met. As another example, an overlapping compliance requirement for two rules can correspond to particular parameters 556 that a single query could compare favorably to, where a query having these parameters would render both rules as non-applicable based on both having different parameters 556 from the particular parameters, and thus having these particular parameters 556 the would cause the query to comply with both rules.

Figure 16C:
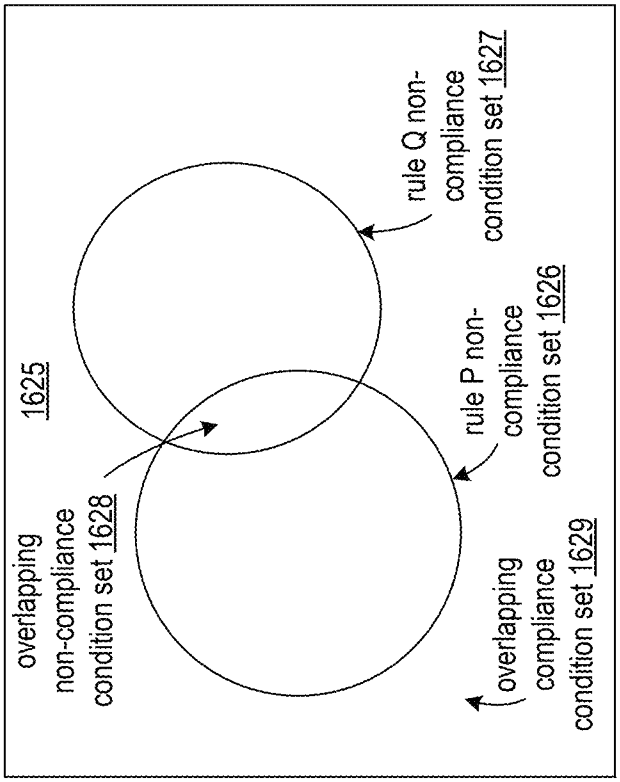
FIG. 16C illustrates an example embodiment of rules with overlapping non-compliance conditions in accordance with various embodiments of the present invention.

FIG. 16C illustrates an example of two rules such that have overlapping conditions that render non-compliance and that further have overlapping conditions that render compliance. FIG. 16C presents a Venn diagram 1625 that depicts the set of possible conditions for non-compliance for a rule P and for a rule Q by a non-compliance condition set 1626 for rule P and a non-compliance condition set 1627 for rule Q. There are some conditions that render con-compliance for rule P and Q individually. However, an overlapping set of conditions for non-compliance corresponding to the intersection all of rule P and Qs respective sets for non-compliance. This is depicted in the Venn diagram 1625 as overlapping non-compliance condition set 1628. Furthermore, P and Q can have a set of overlapping conditions that render compliance, which is depicted as the space outside both of P's and Q's respective non-compliance condition sets 1626 and 1627 in Venn diagram 1625 as overlapping compliance condition set 1629. In some cases, one or more particular compliance requirements dictating a query will be complaint with both P and Q can correspond to some or all of this set space for this overlapping compliance condition set 1629. In other cases, two rules may only have overlapping non-compliance condition sets 1628 and/or may only have overlapping compliance requirements 1629.

In such cases, the rule hierarchy 1620 can store and/or indicate data regarding these overlapping non-compliance conditions and/or overlapping compliance requirements for pairs of rules and/or sets of three or more rules in the overlapping ruleset. In such cases, when a rule is applied, any particular overlapping non-compliance conditions and/or overlapping non-compliance conditions can be checked for the given query and/or result set and indicated in the compliance data for the rule. Alternatively, a separate check can be applied, for example, before applying the rules with same overlapping non-compliance conditions and/or overlapping compliance requirements, to check for the overlapping non-compliance conditions and/or overlapping compliance requirements themselves.

In either case, when the given query and/or result set is determined to have the particular overlapping non-compliance condition in applying a rule or the separate check, compliance data can automatically be generated for the corresponding pair and/or set of rules to indicate the given query does not comply with all of these rules in the pair and/or set without needing to determine compliance for each rule in the pair and/or set individually. Similarly, when the given query and/or result set is determined to have the particular overlapping compliance requirement in applying a rule or the separate check, compliance data can automatically be generated for the corresponding pair and/or set of rules to indicate the given query complies with all of these rules in the pair and/or set without needing to determine compliance for each rule in the pair and/or set individually. If the check indicates the particular overlapping non-compliance conditions and/or overlapping compliance requirements are not met by the given query and/or result set, the rules can proceed to be applied individually, as their compliance data cannot be collectively generated in this case.

In some cases, a pair and/or set in the set of overlapping rules can include one rule with a non-compliance condition that overlaps with another rule's compliance requirement. In such cases, such an overlapping condition can similarly be stored and/or indicated in the rule hierarchy 1620, and these overlapping conditions can similarly be checked in a separate check before applying the rules and/or can be checked in generating compliance data for a rule in the set. When the overlapping condition is determined to be met, compliance and/or non-compliance for each rule, as indicated by this condition, can similarly be generated automatically as compliance data for each rule in this set.

Furthermore, any two rules in different overlapping rulesets 1622 are determined to be placed in the different overlapping rulesets 1622 by the rule hierarchy generating module 1610 based on not influencing one another, based on having entirely independent conditions for compliance and/or non-compliance, based on not have overlapping criteria for compliance and/or non-compliance, and/or based on applying to queries, result sets, and/or records with distinct parameters and/or criteria. For example, different overlapping rulesets 1622 can each apply to rules for data provided by each provider of a set of different providers, rules for users at each subscription level of a set of different subscription levels, rules for each one or more fields of a set of distinct field groupings, rules for each function type of a set of distinct functions types, and/or rules for each record type of a set of distinct record types.

Such separate rulesets can be further useful in quickly identifying the distinct set of rules that apply to a particular query. For example, applying the rule hierarchy to a given query can include determining a single overlapping ruleset 1622 with only the rules that apply to the given query based on all having the same parameters, and/or based on having all of the rules that apply to the query based on including all of the rules with this same set of parameters. Alternatively, multiple and/or all overlapping rulesets can be applied to a given query.

In some cases, the compliance modules 1-R for the set of providers 1-R of FIGS. 9A and 9B can each be implemented as overlapping rulesets 1622 and/or rules within compliance modules 1-R can be ordered utilizing techniques to order rules within overlapping rulesets 1622. However, there may be rules of different provider rulesets that overlap and/or influence each other, and thus overlapping rulesets 1622 can include rules supplied by different providers.

The rules determined in a same overlapping subset can be ordered, for example, based on an ordering for application of the overlapping rules determined by the rule hierarchy generating module 1610. In such cases, rules within a particular overlapping ruleset 1622 can be applied in sequence, with respect to the other rules in the same overlapping rulesets 1622. However, each overlapping ruleset can be applied in parallel and/or in any order. Alternatively, an ordering can be further indicated for the application of each overlapping ruleset to dictate a full sequential ordering all of the rules 555. Similarly, if there is only a single overlapping ruleset, a full sequential ordering ruleset can similarly be dictated for the full ruleset 550. In some cases, the ordering can be conditioned on compliance data of previously applied rules, such as whether the compliance data indicates compliance or non-compliance, where a first next rule is applied when a previous rule's compliance data indicates compliance, and where a different next rule is applied when the previous rule's compliance data indicates non-compliance.

Figure 16D:
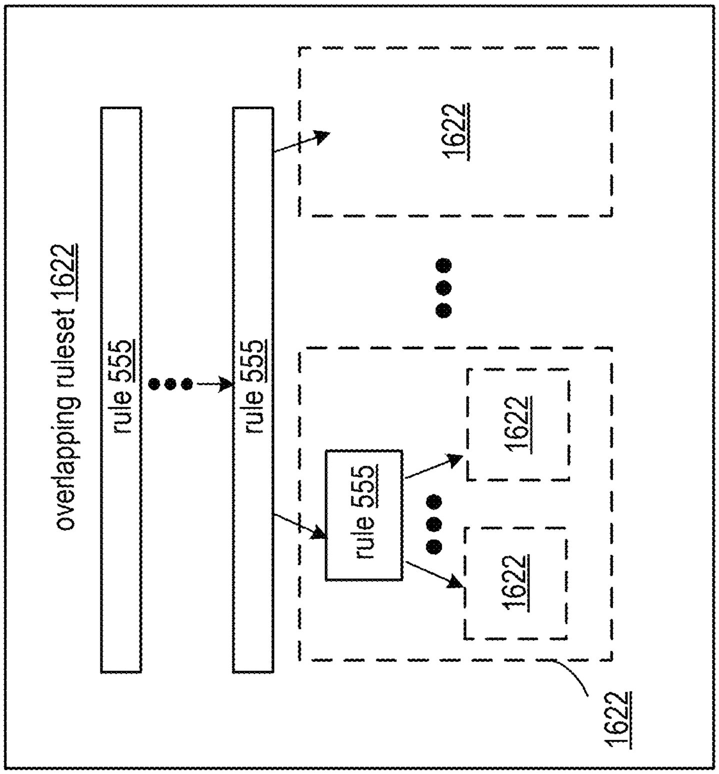
FIG. 16D illustrates an example embodiment of an overlapping ruleset of a rule hierarchy in accordance with various embodiments of the present invention.

In some cases, overlapping rulesets can contain nested overlapping rulesets, where nested overlapping rulesets within a same overlapping ruleset can be applied in parallel and/or any order. Such an embodiment is illustrated in FIG. 16D. In particular, an ordering of rules can be applied within an overlapping ruleset 1622. Once particular rules are reached, subsequent rules can be grouped into multiple nested overlapping rulesets 1622 that can be applied in any order and/or in parallel themselves.

In some cases, an ordering determined for a particular overlapping ruleset 1622 can be based on shortening and/or otherwise optimizing the path to determining non-compliance. This can be ideal in cases it is not necessary to generate compliance data for every applicable rule, and where the compliance module 580 can forego the evaluation of any remaining rules as soon as one rule is determined to have compliance data indicating non-compliance, as this single rule being non-compliance dictates that the query as a whole is non-compliant. In particular, the time and/or processing recourses necessary to determine the compliance data can be optimized by employing an optimal ordering in this fashion.

In such cases, the ordering of the rules in an overlapping ruleset 1622, and/or overall, can be determined based on, for example, a historical rate of non-compliance, for example indicated based on compliance data for previous queries in the database usage log 454; an expected rate of non-compliance; and/or an automatically determined strictness score for each of the corresponding set of rules. In particular, ones of the rules highest historical rates of non-compliance, highest expected rates of non-compliance, and/or highest strictest strictness scores can be applied first, in response to being determined to be most likely to result in non-compliance. Ones of the rules corresponding to lower historical rates of non-compliance, lower expected rates of non-compliance, and/or less-strict strictness scores can be subsequently applied, with rules that are deemed less likely to result in non-compliance being subsequently applied in the ordering. Application of such an ordering can further increase efficiency by increasing the probability that non-compliance will be determined via the application of fewer rules.

Alternatively or in addition, the ordering can be based on leveraging rules whose compliance data can influence and/or dictate the compliance data of other rules for a given query and/or result set. This can be ideal in embodiments where compliance data is generated for all rules and/or all applicable rules, regardless of whether non-compliance is already determined for the query based on non-compliance with a previously applied rule, such as embodiments where audit logs are generated based on compliance data for each of a provider's rules over time. In particular, if less rules need to be applied individually for compliance data across all rules to be ultimately determined, the time and/or processing recourses necessary to determine the compliance data can still be improved by employing such an optimal ordering.

Determining an ordering that leverages rules with compliance data that influences each other can include determining rules included in more pairs or sets of rules with overlapping non-compliance conditions and/or overlapping compliance requirements, and/or included in a single set that includes many rules with the same overlapping non-compliance conditions and/or overlapping compliance requirements. Such rules can be performed earlier in the ordering than rules with the potential of influencing less outcomes of other compliance data, such a rules fewer overlapping non-compliance conditions and/or overlapping compliance requirements and/or rules included in smaller sets of rules with a same overlapping non-compliance conditions and/or overlapping compliance requirements.

This can further include determining which overlapping non-compliance conditions and/or overlapping compliance requirements have higher likelihoods of occurrence, for example, where a probability of occurrence can be determined based on tracked historical occurrences of these overlapping non-compliance conditions and/or overlapping compliance requirements based on indication of whether these conditions and/or requirements occurred for previous queries and/or result sets in entries of the database usage log 454. Overlapping non-compliance conditions and/or overlapping compliance requirements with higher rates of occurrence can be checked earlier in the ordering and/or a rule with higher-likelihood overlapping non-compliance conditions and/or overlapping compliance requirements can be applied earlier.

Furthermore, the ordering can be a function of the likelihood of the overlapping non-compliance conditions and/or overlapping compliance requirements occurring, as well as the number of rules whose compliance data can be determined in tandem when a corresponding overlapping non-compliance condition and/or overlapping compliance requirement occurs. A weighted sum of the likelihood of occurrence, and the number of rules whose compliance data is automatically determined when the occurrence is determined, can be computed for each overlapping non-compliance condition and/or overlapping compliance requirement, where overlapping non-compliance conditions and/or overlapping compliance requirements with higher sums are checked in the ordering of rules before overlapping non-compliance conditions and/or overlapping compliance requirements with lower sums. For example, a particular overlapping non-compliance condition and/or overlapping compliance requirement with a very low probability of occurrence can thus be applied later in the ordering, despite influencing a high number of rules. Similarly, a particular overlapping non-compliance condition and/or overlapping compliance requirement that impacts a low number or rules can similarly be applied later in the ordering, despite this overlapping non-compliance condition and/or overlapping compliance requirement being determined to occur with a relatively high probability.

In some cases, the ordering can be applied to maximize a number of rules whose compliance data can be automatically determined as a function of the compliance data of previously applied rules for any condition leading to non-compliance and/or compliance. FIG. 16E illustrates an example of two rules X and Y with such dependent compliance data. FIG. 16E presents a Venn diagram 1630 that depicts the set of possible conditions for non-compliance for a rule R and for a rule S by a non-compliance condition set 1631 for rule R and a non-compliance condition set 1632 for rule S. When any conditions the set of possible non-compliance conditions are met for rule R or rule S, non-compliance would be determined for that rule R or rule S, respectively. As depicted in the Venn diagram in this example, the entire set of conditions that renders non-compliance for rule S is a proper subset of the conditions that would render rule R as non-compliant. Thus, if rule S is determined to be not-complied with by a given query and/or result set, non-compliance can be automatically determined for rule R as well, without the need to separately evaluate rule R. It can therefore be advantageous to check rule S for non-compliance before rule R in the ordering, as the compliance data for rule R can automatically be generated to indicate non-compliance when the compliance data determined for rule S indicates non-compliance.

For example, rule R can indicate a forbidden fields grouping of fields C and D. Rule S can indicate that the forbidden fields grouping of fields C, D, and E. Every case that does not comply with rule S further leads to non-compliance with rule R, as the inclusion of all of the fields C, D, and E requires the inclusion of all of the fields in the set of only C and D. Note that this relationship may be further dependent on rule R and rule S indicating a same set of parameters, where rule R and rule S are applied to the same types of queries, on the same types of data, and/or the same types of end users. Further note that if the rule S is instead determined to be complied with, such a rule R still needs to be checked for non-compliance.

Similarly, for such cases where non-compliance of such a rule S automatically dictates non-compliance of such a rule R, the reverse condition can also hold: rule R, when complied with, can automatically render rule S as being complied with. In particular, the conditions that fall outside of rule R's non-compliance conditions set 1631 indicate conditions that would cause rule R to be complied with, and the conditions that fall outside rule S's non-compliance conditions set 1632 indicate conditions that would cause rule S to be complied with. In the given example, if a query complies with rule R's forbidden fields grouping of fields C and D it will certainly comply with rule S's forbidden fields grouping of fields C, D, and E. Note that if rule R is instead not complied with, such a rule S still needs to be checked separately for compliance.

It can therefore be similarly advantageous to check rule R for compliance before rule S in the ordering, as the compliance data for rule S can automatically be generated to indicate compliance when the compliance data determined for rule R indicates compliance. Thus, there are advantages to applying such overlapping rules in either order: applying rule R before the rule S allows compliance data for rule S to be automatically generated if and only if the rule R is determined to be complied with, while applying the rule S before the rule R allows compliance data for the rule R to be automatically generated if and only if rule S is determined to be not-complied with.

Therefore, additional information can be utilized by the rule hierarchy generating module 1610 to determine whether it is more optimal to apply rule R before rule S, or vice versa. For example, suppose compliance data for a first number of rules can be determined automatically when rule S is not complied with, and a second number of rules can be determined automatically when rule R is complied with. For example, the first number of rules can correspond to a set of rules that, like rule R, similarly have non-compliance condition sets that include the entirety of rule S's non-compliance condition set 1632. Similarly, the second number of rules can correspond to a set of rules that, like rule R, have non-compliance condition sets are, in their entirely, included within rule P's non-compliance condition set 1631. If the first number of rules is larger than second number of rules, rule S can be applied first, as it has the potential to automatically dictate the compliance data for a greater number of rules in this case. If the second number of rules is larger than first number of rules, rule R can be applied first, as it has the potential to automatically dictate the compliance data for a greater number of rules in this case.

Another means the rule hierarchy generating module 1610 can employ in determining whether it is more optimal to apply rule R before rule S can include determining whether it is more likely that rule R will be complied with or that rule S will be not-complied with, for example, based evaluating the usage data of the query logging system 450 to determine historical compliance with rule R over time and/or historical non-compliance with rule S over time.

Figure 16F:
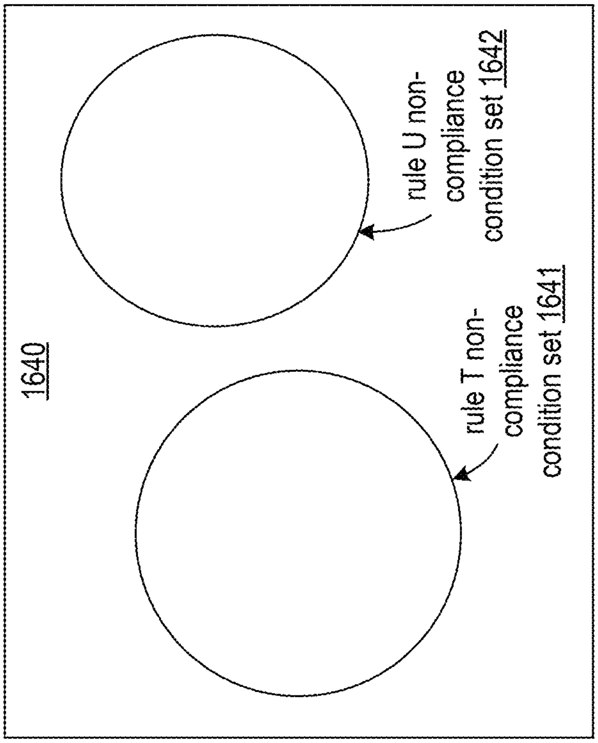
FIG. 16F illustrates an example embodiment of conflicting rules in accordance with various embodiments of the present invention.
Figure 16E:
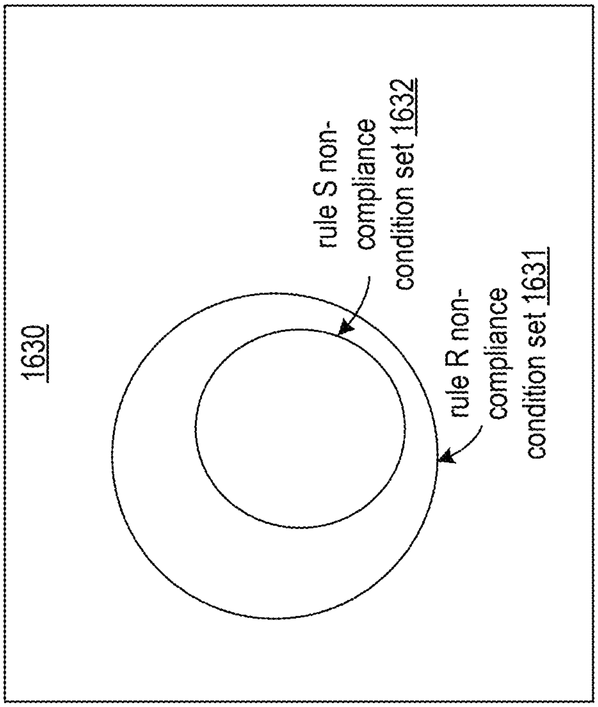
FIG. 16E illustrates an example embodiment of overlapping rules in accordance with various embodiments of the present invention.

FIG. 16F illustrates another example of two rules R and S with dependent compliance data. FIG. 16F presents a Venn diagram 1640 that depicts the set of possible conditions for non-compliance for a rule T and for a rule U by a non-compliance condition set 1641 for rule T and a non-compliance condition set 1642 for rule U. When any conditions the set of possible non-compliance conditions are met for rule T or rule U, non-compliance would be determined for that rule T or rule U, respectively. As depicted in the Venn diagram in this example, the entire set of conditions that renders non-compliance for rule T is completely distinct from the entire set of conditions that would render rule U as non-compliant. Thus, if rule T is determined to be not-complied with by a given query and/or result set, compliance can be automatically determined for rule U, without the need to separately evaluate rule U. If rule T is determined to be complied with by a given query and/or result set, non-compliance can be automatically determined for rule U, without the need to separately evaluate rule U. The opposite of rule U's compliance data can similarly be utilized to automatically determine the compliance data for rule T.

In particular, compliance data for rule T is always deterministic as the opposite of the compliance data for rule U. The rule hierarchy could be generated to apply only one of the rules R or S, for example, based which one's compliance data has the potential and/or likelihood of influencing compliance data for a greater number of other rules, where the rule that is not applied automatically has its compliance data indicated as the opposite of the compliance data generated for the applied rule. Such an example of this case includes a rule T that indicates aggregations must be performed on a minimum of 500 records, while rule U indicates that aggregations cannot be performed on more than 300 records. Any compliance with rule T requires non-compliance with rule U, and vice versa. Thus, rules R and S depict an example of a set of conflicting rules.

In some cases, applying conflicting rules such as rules R and S is not ideal and/or not realistic, as it is impossible for compliance to be reached by any query with parameters that invoke rules R and S. In such embodiments, the rule hierarchy generating module 1610 can automatically determine such pairs of conflicting rules and/or sets of three or more conflicting rules, where compliance is impossible in cases where they are both and/or all applied. The rule hierarchy generating module 1610 can further determine an ordering of the rules in the pair and/or set to determine which rule supersedes the other conflicting rules. For example, the ordering can be determined based on an ordering of providers, where rules configured by and/or corresponding to more favorably ordered providers can be determined to supersede rules configured by and/or corresponding to less favorably ordered providers. As another example, the ordering can be determined based on whether the rule is related to privacy or licensing, for example, where rules determined to invoke stricter privacy restrictions are determined to supersede rules that invoke less strict privacy restrictions and/or no privacy restrictions. For example, the rule T that indicates aggregations must be performed on a minimum of 500 records can supersede rule U that indicates that aggregations cannot be performed on more than 300 records in response to this rule T invoking stricter privacy requirements.

In some embodiments, some or all rules can be set by administrators of the analytics system 110 and/or can be determined by regulatory entities responsible for setting and/or enforcing laws and/or overarching restrictions relating to privacy, storage, and/or usage of the data in database system 112. Rules can be received by administrators or regulating entities as their own rulesets, generated via their own provider devices 230 or other devices, via interaction with the same or different GUI 245. Administrators and/or regulating entities can have their own provider profile data in the provider management system 420, despite the not administrators and/or regulating entities supplying data themselves. Their respective rulesets can otherwise be indicated as provider rulesets 560 and/or overarching rules 555. While ordinary data providers may not be allowed to configure rules that apply to other data provider's records, the rulesets determined by administrators and/or regulating entities can apply to data supplied by a subset of particular providers and/or to all providers.

In such cases, rules set by the administrators and/or can be determined by regulatory entities can automatically supersede conflicting rules set by data providers. For example, the rule T that indicates aggregations must be performed on a minimum of 500 records may have been set by a regulating entity based on privacy requirements for all records in the system can be automatically determined to supersede the rule U that indicates that aggregations cannot be performed on more than 300 records, based on rule U being set by a particular data provider for records that they supplied based on licensing requirements.

If a rule U is superseded by another conflicting rule T, this rule U can be removed from the ruleset 550 by the rule hierarchy generating module 1610 automatically. Alternatively, this rule U can be amended automatically to render at least one possible condition where compliance can be achieved for both rule T and amended rule U. For example, rule U can be amended to indicate that aggregations cannot be performed on more than 550 records, where compliance is possible for aggregations performed on between 500 and 550 of the provider's records.

In some embodiments, a rule conflict error can be sent to a provider device corresponding to the provider that supplied the ruleset containing a rule that was superseded, indicating that their rule conflicts with a superseding rule and thus will not be applied. The GUI can display a prompt for the provider to amend their rule in response to the provider device receiving indication that this rule was superseded, and the user can enter an amended rule to the GUI 245 in response. The GUI 245 can display the superseding rule and/or the rule provided by the provider that conflicts with the superseding rule. The GUI 245 indicate possible edits to the current rule to guide the user in providing a rule that does not conflict with the superseding rule. For example, the GUI 245 can indicate that if the user edits their rule to indicate a maximum that is greater than or equal to 500, their rule will be possible to be complied with for set of their records between 500 records and their maximum.

The amended rule can be transmitted to the analytics system for processing by the rule hierarchy generating module 1610 to determine if this rule conflicts and/or to re-generate the rule hierarchy 1620 to include the amended rule. Alternatively, the user can indicate that they do not wish to amend their rule, and that they wish for the current rule to remain in place. For example, rules R and S can both be applied, and any query that meets the parameters of both R and S will not be complied with. In particular, if the user still wishes for aggregations to never be performed on more than 300 of their records, they can elect to keep the rule in place, even with the knowledge that aggregations upon their records meeting the corresponding parameters of rule U can never be performed.

In some embodiments, a provider can amend other rules in their rulesets over time and/or can remove rules and/or add rules to their rulesets. For example, in response to receiving an audit log and viewing an audit log via GUI 245 that indicates unfavorably low rates or unfavorably high rates of compliance with a particular rule, the user can be prompted to and/or can otherwise elect to amend the rule. For example, the provider may wish to amend a rule to increase the usage of their data by end users and/or ease the usage of data by end users to ensure users continue to subscribe to desired subscription levels. Alternatively or in addition, the provider may wish to amend a rule to increase privacy requirements based on determining end users are capable of identity matching and/or de-privatizing records given current rules.

Thus, in some embodiments, updated rulesets for providers 1-N can be received over time, new rulesets for new data providers to the analytics system 110 can be received over time, and/or updated regulatory requirements based on updated privacy laws and/or other updated regulatory restrictions can be received over time. The rule hierarchy generating module 1610 can therefore generate updated rule hierarchies 1620 overtime by processing new rules and/or the entirety of the most current ruleset 550 periodically, in predetermined time intervals, in response to receiving at least a threshold number of new rules, and/or in response to a request received from an administrator.

Figure 17:
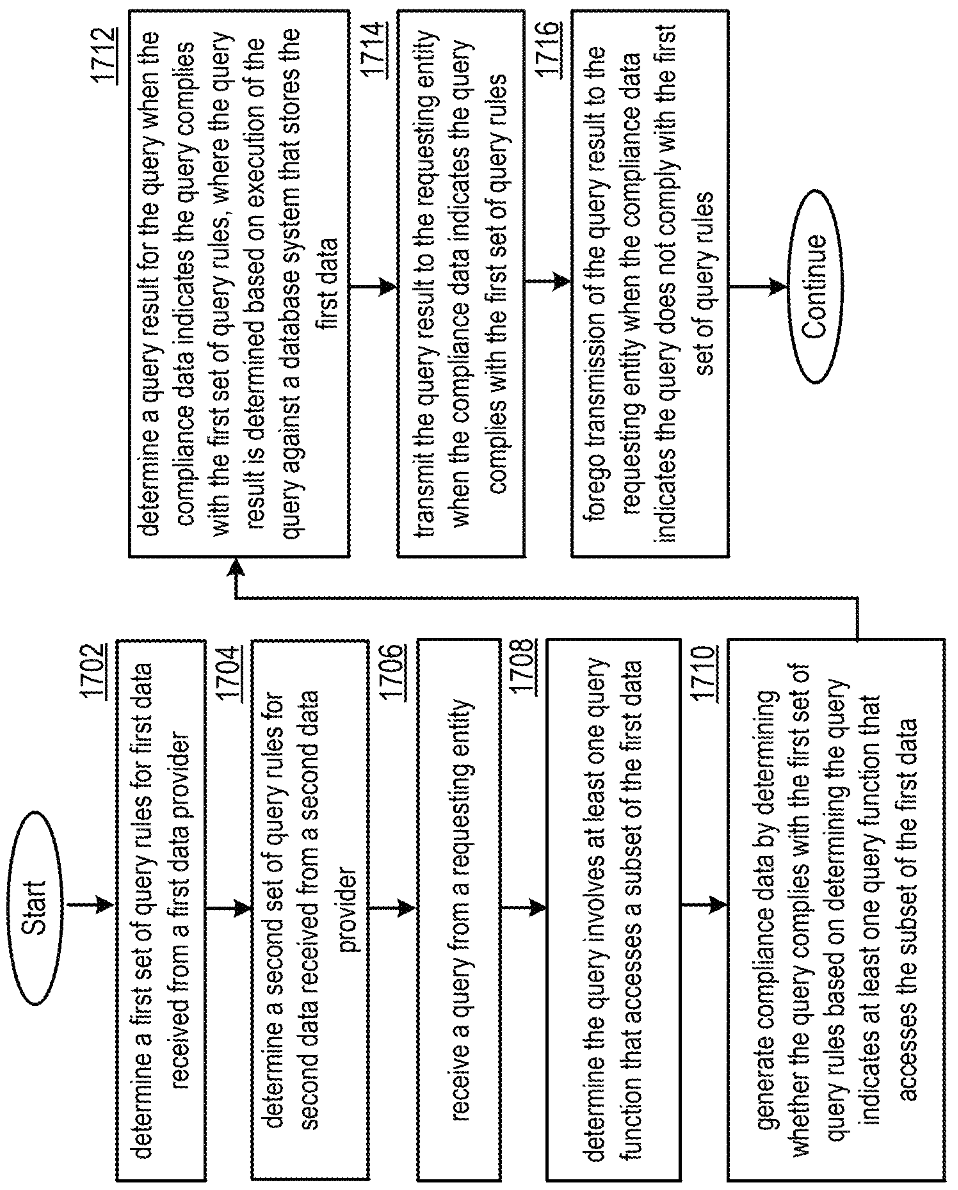
FIG. 17 is a logic diagram illustrating an example of a method of enforcing sets of query rules supplied by a plurality of different providers.

FIG. 17 presents a method for execution by a query processing system 114, by a pre-execution compliance module 610, by a runtime compliance module 625, and/or for execution by another processing module of the analytics system 110 that executes executable instructions stored via a memory module. For example, the method of FIG. 17 can be performed by the pre-execution compliance module 610 and/or a runtime compliance module 625 of a query processing system 114 as discussed in conjunction with FIGS. 9A-9C and/or in conjunction with other functionality of the query processing system 114 discussed herein. Some or all of the steps involved in application of individual compliance modules as illustrated in FIGS. 19-24, for example, to generate compliance data, can be utilized by the method of FIG. 17.

Step 1702 includes determining a first set of query rules for first data received from a first data provider. Step 1704 includes determining a second set of query rules for second data received from a second data provider. For example, a plurality of sets of query rules that includes the first set of query rules and the second set of query rules can be determined for a corresponding plurality of data providers. Some or all of the plurality of sets of query rules can be determined based on being received from a corresponding plurality of provider devices 230. The first set of query rules can be generated by and/or received from a first provider device 230 corresponding to the first data provider, and/or the second set of query rules can be generated by and/or received from a second provider device 230 corresponding to the second data provider. For example, the first set of query rules and/or the second set of query rules can each correspond to a provider ruleset received from corresponding provider devices 230. The first set of query rules can be configured via user input to GUI 245 of the first provider device, and/or the second set of query rules can be configured via user input to GUI 245 of the second provider device.

Step 1706 includes receiving a query from a requesting entity. For example, the requesting entity can generate and/or relay a query request that includes the query, where the query request is generated via a user device 140 based on user input to GUI 345 by an end user. Step 1708 includes determining the query involves at least one query function that accesses a subset of the first data. The method can further include determining whether or not the query involves access to any subset of the second data. For example, a ruleset determination module 910 can be applied to determine a proper subset of the plurality of data providers whose rules are invoked by the query, to determine a proper subset of the plurality of data providers that supplied data returned by the query, and/or to determine a proper subset of the plurality of data providers that supplied data utilized in execution of the query.

This determination can be made prior to any execution of the query. The determination can be based on tables and/or records called by the query, where the tables and/or records are utilized to determine one or more data providers that supplied data to the tables and/or records. Alternatively or in addition, the method can further include executing the at least one query function of the query against the database system prior to determining the query involves at least one query function that accesses a subset of the first data. For example, a result set generated by executing the at least one query function can be evaluated to determine the query involves access to the first data, and/or to further determine whether the query involves access to the second data. This result set can correspond to a final result set and/or an intermediate result set, for example, where remaining query functions indicated by the query are to be performed on the intermediate result set to generate the final result of the query.

Step 1710 includes generating compliance data by determining whether the query complies with the first set of query rules, based on determining the query indicates at least one query function that accesses the subset of the first data. Generating the compliance data can include determining whether each one of the first set of query rules is complied with by the query and/or by a result set generated based on executing at least one query function of the query.

In some embodiments, generating the compliance data for the first set of query rules includes determining one or more parameters for the received query and/or the result set, and further includes filtering the rules in first set of query rules based on one determining a proper subset of the first set of query rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, particular fields and/or functions indicated the query, whether the determined result set is being returned as the final result of the query, record criteria for records involved in the query, and/or one or more types of functions applied to the determined result set of the query. In some cases, the compliance data is generated by applying a rule of the first set of query rules only when the rule determined to apply to the query and/or the result set. In some embodiments, the compliance data is generated to indicate compliance for a rule, without applying the rule, when the rule is determined not to apply to the query and/or result set.

The method performs steps 1712 and 1714 when the compliance data indicates the query complies with the first set of query rules, where step 1716 is not performed. Step 1710 includes determining a query result for the query. The query result is determined based on execution of the query against a database system that stores the first data. For example, the query result can include a result set already generated in executing the query to generate the compliance data. Alternatively, if a result set evaluated was an intermediate result, the query result can be generated based on execution of remaining partial queries, such as at least one aggregation, upon this result set. Alternatively, if no execution of the query has yet been performed, the entirety of the query can be executed to generate the query result. Step 1714 includes transmitting the query result to the requesting entity.

The method does not perform steps 1712 and 1714 when the compliance data indicates the query does not comply with the first set of query rules, where the method continues from step 1710 to perform step 1716. Step 1716 includes foregoing transmission of the query result to the requesting entity. If the execution of the query is not complete and/or has not been initiated, the method can further include foregoing initiation and/or completion of execution of the query, such as foregoing applying an aggregation function to a result set, when the compliance data indicates the query does not comply with the first set of query rules.

For example, the result set is not transmitted and/or is not generated via further execution of the query unless the generated compliance data for the query and/or result set indicates the query and/or result set complies with every rule in the first set of query rules and/or that the result set complies with every one of a proper subset of rules in the first set of query rules that were determined to be applicable based on one or more corresponding query parameters. If at least one rule in the set of first rules is determined not to be complied with by the query and/or result set of the query, the result set for the query is not transmitted to the end user and/or is not further processed to generate the final query result. In some cases, the method includes generating an error message for transmission to the requesting entity in response to the compliance data indicating non-compliance with one or more rules.

Alternatively, if the method of FIG. 17 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the first set of query rules and/or that the query complies with every one of a proper subset of rules in the first set of query rules that were determined to be applicable based on the one or more corresponding query parameters. A query response is received from the analytics system 110 in response, based on the execution of the query. The query response can be displayed to the end user via GUI 345.

In some cases, the query is determined to involve data supplied by multiple providers, such as data supplied by both the first data provider and the second data provider. In such cases, each set of rules for each provider determined to supply data involved in the query is evaluated to generate the compliance data. For example, consider the case where a proper subset of the plurality of data providers determined to supply data involved in the query includes the first data provider and the second data provider, but no other data providers of the plurality of data providers. The method can further include evaluating every rule in both the first set of query rules and in the second set of query rules for compliance by the query and/or result set. In such cases, the result set is not transmitted and/or is not generated via further execution of the query unless the generated compliance data for the query and/or result set indicates the query and/or result set complies with every rule in the first set of query rules and the second set of query rules, and/or that the result set and/or query complies with every one of a proper subset of rules in a union of the first set of query rules and second set of query rules that were determined to be applicable based on one or more corresponding query parameters. If at least one rule in the first set of rules or second set of rules is determined not to be complied with by the query and/or result set of the query, the result set for the query is not transmitted to the end user and/or is not further processed to generate the final query result.

If the proper subset of the plurality of data providers determined to supply data involved in the query includes the first data provider and not the second data provider, the compliance data can be generated without applying the second set of query rules supplied the second data provider. For example, the ruleset determination module can filter the second set of query rules from consideration in response to determining the query does not involve data supplied by the second data provider.

In various embodiments, the method includes receiving a second query from the same or different requesting entity. The method further includes determining the second query involves at least one query function that accesses a subset of the second data, and determining the second query does not involves any accesses to any of the first data. The method includes generating second compliance data for the second by determining whether the query complies with each of the second set of query rules based on determining the query indicates at least one query function that accesses the subset of the second data. The second compliance data can be generated without determining whether the query complies with any of the first set of query rules based on determining the query does not involve accesses to the first data and/or based on determining the query only involves access to data supplied by the second data provider. When the second compliance data indicates the second query complies with every one of the second set of query rules, a query result for the second query can be determined based on execution of the second query against a database system that stores the second data, and this query result can be transmitted to the requesting entity. When the second compliance data indicates the second query does not complies with at least one of second set of query rules, the method can include foregoing transmission of the query result for the second query to the requesting entity.

In various embodiments, a query processing system 114 includes a memory module that includes at least one memory and a processing module that includes at least one processor. The memory module stores operational instructions that, when executed by a processing module of the query processing system 114, cause the query processing system 114 to determine a first set of query rules for first data received from a first data provider, to determine a second set of query rules for second data received from a second data provider, to receive a query from a requesting entity, and/or to determine that the query involves at least one query function that accesses a subset of the first data. The execution of the operational instructions by the processing module further causes the query processing system 114 to generate compliance data by determining whether the query complies with the first set of query rules based on determining the query indicates at least one query function that accesses the subset of the first data. The execution of the operational instructions by the processing module further causes the query processing system 114 to determine a query result for the query based on execution of the query against a database system that stores the first data and/or to transmitting the query result to the requesting entity when the compliance data indicates the query complies with the first set of query rules. The execution of the operational instructions by the processing module further causes the query processing system 114 to forego transmission of the query result to the requesting entity when the compliance data indicates the query does not comply with the first set of query rules and/or the processing module otherwise does not further process the query when the compliance data indicates the query does not comply with the first set of query rules.

In various embodiments, a non-transitory computer readable storage medium includes at least one memory section that stores operational instructions that, when executed by a processing module that includes a processor and a memory, causes the processing module to determine a first set of query rules for first data received from a first data provider, to determine a second set of query rules for second data received from a second data provider, to receive a query from a requesting entity, and/or to determine that the query involves at least one query function that accesses a subset of the first data. The execution of the operational instructions by the processing module further causes the processing module to generate compliance data by determining whether the query complies with the first set of query rules based on determining the query indicates at least one query function that accesses the subset of the first data. The execution of the operational instructions by the processing module further causes the processing module determine a query result for the query based on execution of the query against a database system that stores the first data and/or to transmitting the query result to the requesting entity when the compliance data indicates the query complies with the first set of query rules. The execution of the operational instructions by the processing module further causes the processing module to forego transmission of the query result to the requesting entity when the compliance data indicates the query does not comply with the first set of query rules and/or the processing module otherwise does not further process the query when the compliance data indicates the query does not comply with the first set of query rules.

Figure 18A:
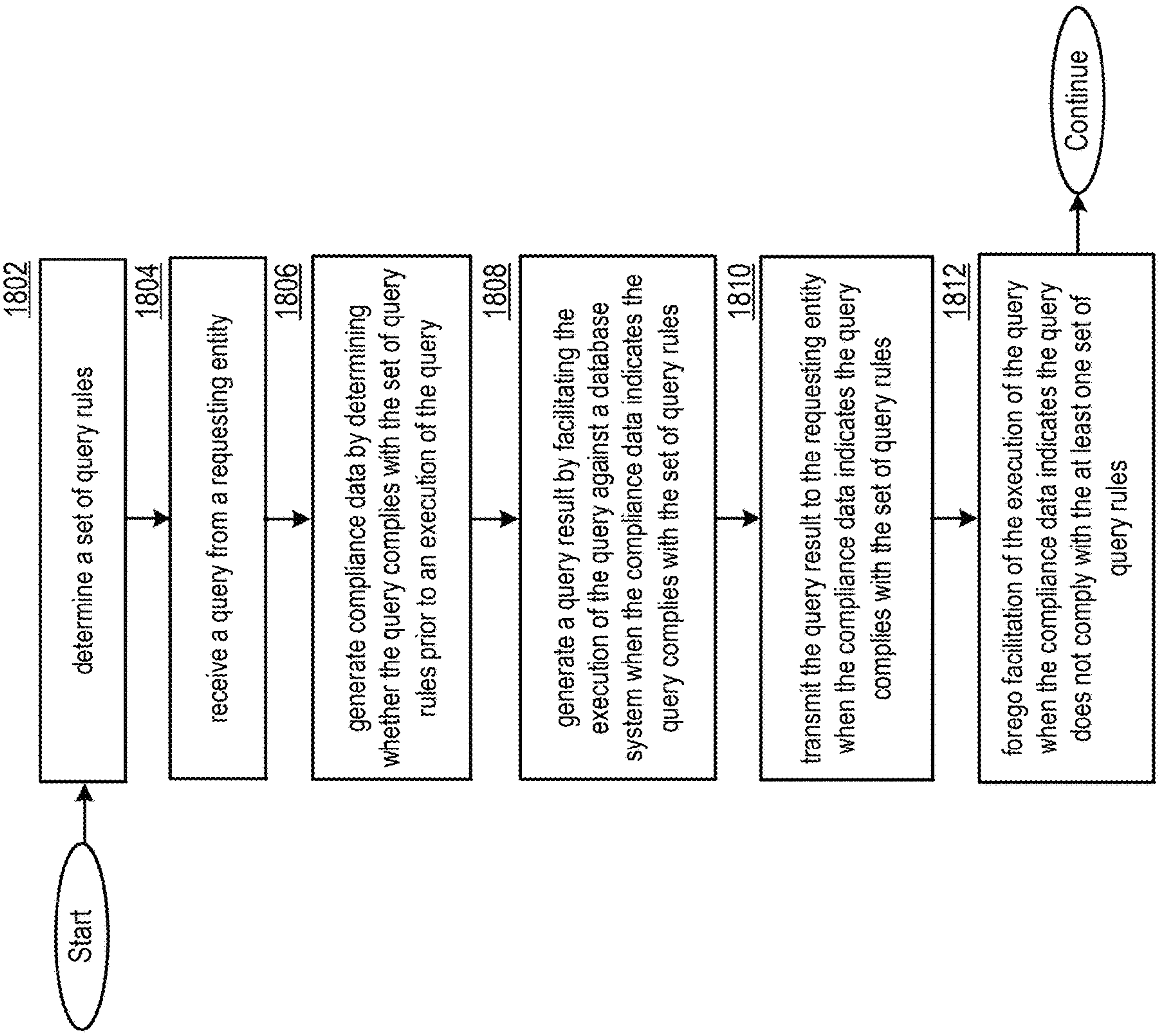
FIG. 18A is a logic diagram illustrating an example of a method of enforcing a set of rules for a query prior to execution of the query.

FIG. 18A presents a method for execution by a pre-execution compliance module 610, by a query processing system 114, by a user device 140 in conjunction with execution of the user application data 325, and/or for execution by another processing module of the analytics system 110 that executes executable instructions stored via a memory module. For example, the method of FIG. 18A can be performed by the pre-execution compliance module 610 as discussed in conjunction with FIGS. 6A, 6B, and/or 6D; as discussed in conjunction with FIGS. 7A-7E; and/or in conjunction with other functionality of the pre-execution compliance module 610 discussed herein.

Step 1802 includes determining a set of query rules. The set of query rules can include one or more provider rulesets received from one or more provider devices 230, and/or one or more rules in the set of query rules can be configured via user input to GUI 245. Step 1804 includes receiving a query from a requesting entity. For example, the requesting entity can generate and/or relay a query request that includes the query, where the query request is generated via a user device 140 based on user input to GUI 345 by an end user.

Step 1806 includes generating compliance data by determining whether the query complies with the set of query rules prior to an execution of the query. For example, the set of query rules can correspond to a pre-execution ruleset of rules where compliance can be determined based on the language or other features of the query itself. In particular, the set of query rules can include one or more rules of the forbidden fields ruleset 562 where the method includes determining one or more fields indicated the query, where query indicates the raw values of the one or more fields in one or more records determined in a result set of the query are to be returned in execution of the query and/or are to be aggregated upon in execution of the query. The method can further include generating the compliance data by determining whether these determined fields match any particular forbidden fields indicated by the forbidden fields ruleset 562 and/or includes the entirety of a set of fields indicated in a forbidden fields grouping of the forbidden fields ruleset 562.

Alternatively or in addition, the set of query rules can include one or more rules of the forbidden functions ruleset 564 where the method includes determining one or more functions in the query that are requested to performed in execution of the query, and where the method further includes generating the compliance data by determining whether any functions performed in the query match any particular forbidden functions indicated in the forbidden functions ruleset 564.

In some embodiments, generating the compliance data includes determining one or more parameters for the received query, and further includes filtering the set of query rules based on one determining a proper subset of the set of rules that apply to the received query based on determining whether one or more query parameters 556 of each rule in the set of query rules match or otherwise compare favorably these determined parameters for the received query. These query parameters can include the subscription level of an end user that generated the query, the provider that supplied records requested in the query, and/or particular fields and/or functions indicated the query.

When the compliance data indicates that the query complies the set of query rules, step 1808 and step 1810 are performed, and step 1812 is not performed. Step 1808 includes generating a query result by facilitating the execution of the query against a database system. Step 1810 includes transmitting the query result to the requesting entity. When the compliance data indicates that the query does not comply with at least one of the set of query rules, step 1808 and step 1810 are not performed, and the method advances from step 1806 to step 1812. Step 1812 includes foregoing facilitation of the execution of the query.

For example, the query is not executed and transmitted unless the generated compliance data for the query indicates the query complies with every rule in the set of query rules and/or that the query complies with every one of a proper subset of rules in the set of query rules that were determined to be applicable based on one or more corresponding query parameters. If at least one rule in the set of rules, such as one applicable rule in the proper subset of rules, is determined not to be complied with by the query, the query is therefore not executed and no result set resulting from execution of the query is transmitted to the end user. In some cases, the method includes generating an error message for transmission to the requesting entity in response to the compliance data indicating non-compliance with at least one rule in the set of query rules.

In various embodiments, if the compliance data indicates compliance and the query is executed, the method further includes applying a second set of query rules corresponding to a runtime execution ruleset, as illustrated in FIG. 6A. In such cases, the result set outputted by execution of the query is only transmitted to the requesting entity if the result set is determined to comply with all of the rules in the second set of query rules.

In various embodiments, a first query that indicates a first set of fields be returned for a set of records is received. A second query that indicates a second set of fields be returned for the same or different set of records is also received. Compliance data for the first query indicates the first query complies with a rule in the set of rules based on the first set of fields not including the entirety of fields indicated by a forbidden fields grouping of the rule. Compliance data for the second query indicates the second query does not comply with this rule based on the second set of fields including the entirety of fields indicated by the forbidden fields grouping of the rule.

In various embodiments, a query is received from a first requesting entity corresponding to a first end user at a first subscription level. The same or different query is received from a second requesting entity corresponding to a second end user at a second subscription level. Compliance data for the query received from the first requesting entity indicates the query complies with a rule in the set of rules based on the first end user being determined to be subscribed to the first subscription level. Compliance data for the query received from the second requesting entity indicates the second query does not comply with this rule based on the second end user being determined to be subscribed to the second subscription level. In particular, the rule can indicate this query is allowed for users at the first subscription level, but not the second subscription level, in response to the first subscription level being more favorable than the second subscription level.

In various embodiments, a first query requesting a result set of records supplied by a first data provider is received. A second query requesting a result set of records supplied by a second data provider is received. The set of rules can include a first rule corresponding to data supplied by the first data provider and a second rule corresponding to data supplied by the second data provider. Compliance data for the first query is generated based on comparing the first query to the first rule based on determining records supplied by the first data provider are requested in the first query. Compliance data for the second query is generated based on comparing the second query to the second rule based on determining records supplied by the second data provider are requested in the second query. In some cases, the first rule is not applied to the second query and/or is determined to be complied with by the second query in response to determining records of the first data provider are not requested by the second query. In some cases, the second rule is not applied to the first query and/or is determined to be complied with by the first query in response to determining records of the second data provider are not requested by the first query.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules, to receive a query from a requesting entity, and/or to generate compliance data by determining whether the query complies with the set of query rules prior to an execution of the query. When the compliance data indicates the query complies with the set of query rules, the execution of the operational instructions by the processing module further causes the query processing system 114 to generate a query result by facilitating the execution of the query against a database system, and/or to transmit the query result to the requesting entity. When the compliance data indicates the query does not comply with the at least one set of query rules, the execution of the operational instructions by the processing module further causes the query processing system 114 to forego facilitation of the execution of the query, and/or the query processing system 114 otherwise does not generate the query result by facilitating the execution of the query against a database system in when the compliance data indicates the query does not comply with the at least one set of query rules.

In various embodiments, a non-transitory computer readable storage medium includes at least one memory section that stores operational instructions that, when executed by a processing module that includes a processor and a memory, causes the processing module to determine a set of query rules, to receive a query from a requesting entity, and/or to generate compliance data by determining whether the query complies with the set of query rules prior to an execution of the query. When the compliance data indicates the query complies with the set of query rules, the execution of the operational instructions by the processing module further causes the processing module to generate a query result by facilitating the execution of the query against a database system, and/or to transmit the query result to the requesting entity. When the compliance data indicates the query does not comply with the at least one set of query rules, the execution of the operational instructions by the processing module further causes the processing module to forego facilitation of the execution of the query, and/or the processing module otherwise does not generate the query result by facilitating the execution of the query against a database system in when the compliance data indicates the query does not comply with the at least one set of query rules.

Alternatively, if the method of FIG. 18A is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

Figure 18B:
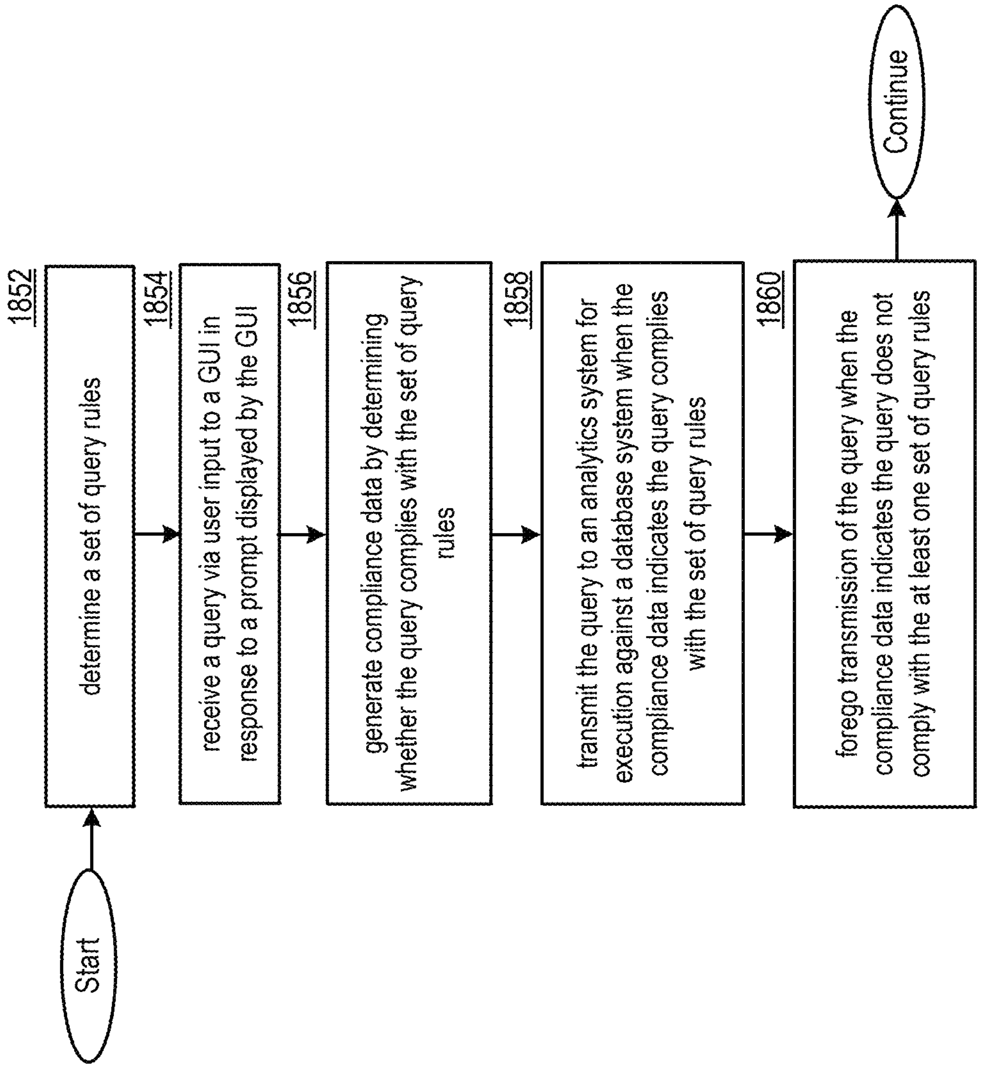
FIG. 18B is a logic diagram illustrating an example of a method of enforcing a set of rules for a query prior to execution of the query.

For example the user device 140 can execute the steps of FIG. 18B via execution of operational instructions stored by a memory module of the user device 140 via a processing module of the user device 140. Step 1852 includes determining a set of query rules. For example, the query rules can be received from the analytics system. Step 1854 includes receiving a query via user input to a GUI, such as GUI 345, in response to a prompt displayed by the GUI. Step 1856 includes generating compliance data by determining whether the query complies with the set of query rules. This can be performed in a same fashion performed in step 1806 of FIG. 18A. Step 1858 includes transmitting the query to an analytics system for execution against a database system when the compliance data indicates the query complies with the set of query rules. For example, the analytics system can facilitate execution of the query and can transmit the query result to the user device in response for display by the user device 140 via the GUI. Step 1860 includes foregoing transmission of the query when the compliance data indicates the query does not comply with the at least one set of query rules. The GUI can display an error when the compliance data indicates the query does not comply with the at least one set of query rules. Alternatively or in addition, the GUI can prompt the user to amend their query, where the method of FIG. 18B repeats for a new query entered by the user in response to the prompt to amend the query.

In various embodiments, a user device 140 includes at least one memory section that stores operational instructions that, when executed by a processing module that includes a processor and a memory, causes the user device to determine a set of query rules, to receive a query via user input to a GUI in response to a prompt displayed by the GUI, and/or to generate compliance data by determining whether the query complies with the set of query rules. When the compliance data indicates the query complies with the set of query rules, the execution of the operational instructions by the processing module further causes the user device 140 to transmit the query to an analytics system for execution against a database system. When the compliance data indicates the query does not comply with the at least one set of query rules, the execution of the operational instructions by the processing module further causes the user device 140 to forego transmission of the query and/or to display an error message via the GUI.

In various embodiments, a non-transitory computer readable storage medium includes at least one memory section that stores operational instructions that, when executed by a processing module that includes a processor and a memory, causes the processing module to determine a set of query rules, to receive a query via user input to a GUI in response to a prompt displayed by the GUI, and/or to generate compliance data by determining whether the query complies with the set of query rules. When the compliance data indicates the query complies with the set of query rules, the execution of the operational instructions by the processing module further causes the processing module to transmit the query to an analytics system for execution against a database system. When the compliance data indicates the query does not comply with the at least one set of query rules, the execution of the operational instructions by the processing module further causes the processing module to forego transmission of the query and/or to display an error message via the GUI.

Figure 19:
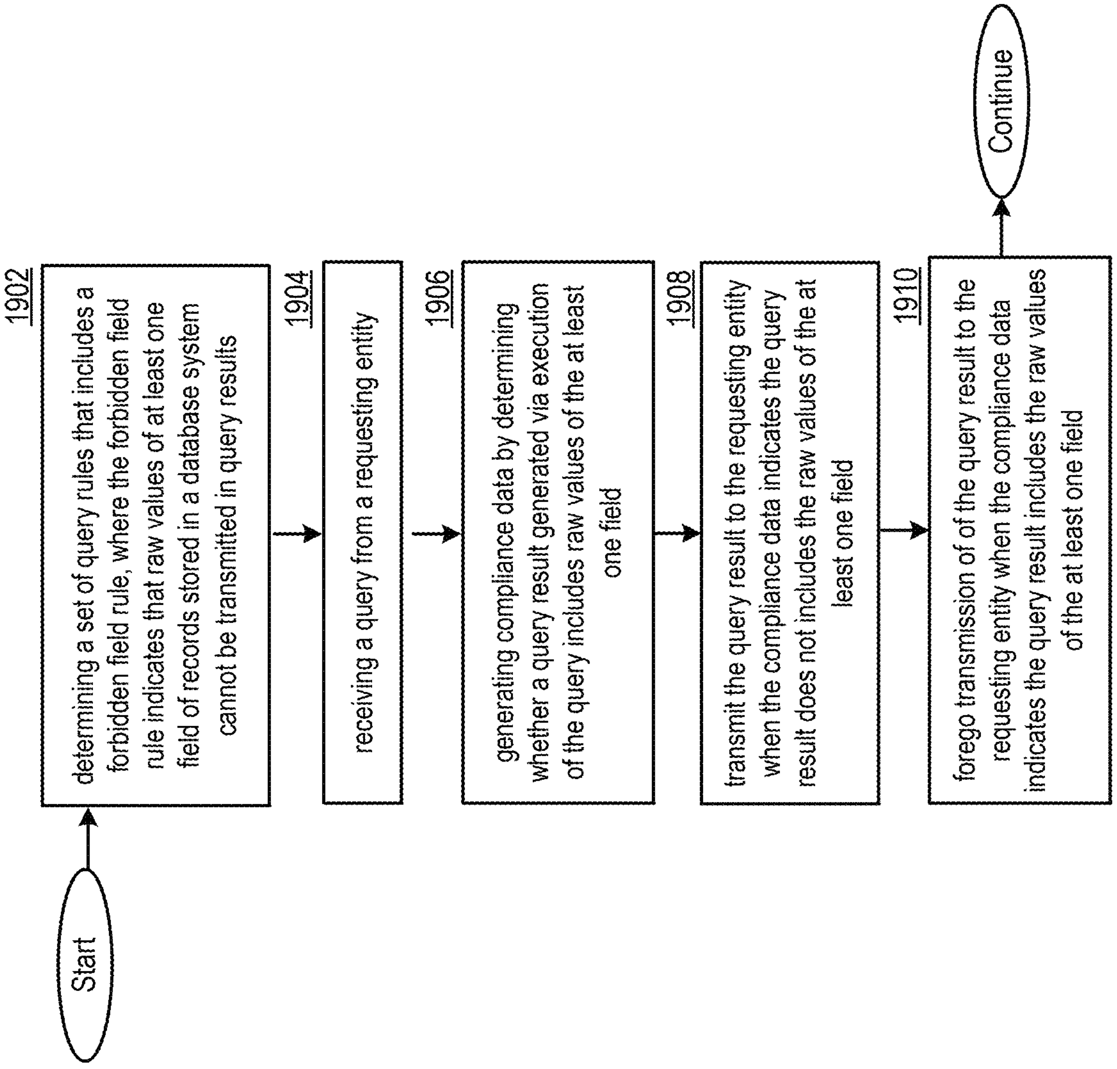
FIG. 19 is a logic diagram illustrating an example of a method of enforcing a forbidden field rule.

FIG. 19 presents a method for execution by a pre-execution compliance module 610, by a forbidden fields compliance module 1020, by a query processing system 114, by a user device 140 in conjunction with execution of the user application data 325, and/or for execution by another processing module of the analytics system 110 that executes executable instructions stored via a memory module. For example, the method of FIG. 19 can be performed by the forbidden fields compliance module 1020 as discussed in conjunction with FIGS. 10A-10D and/or in conjunction with other functionality of the forbidden fields compliance module 1020 discussed herein.

Step 1902 includes determining a set of query rules that includes a forbidden fields rule. The set of query rules can include one or more provider rulesets received from one or more provider devices 230, and/or one or more rules in the set of query rules can be configured via user input to GUI 245. The forbidden fields rule can be a rule 1015 of the forbidden fields ruleset 562. The set of query rules can include multiple rules 1015 of the forbidden fields ruleset 562. The forbidden fields rule can indicate that raw values of at least one field of records stored in a database system cannot be transmitted in query results. In some cases, forbidden fields rule can indicate that raw values for any field cannot be transmitted in query results. In some cases, forbidden fields rule can indicate that an aggregation must be performed on raw data, where only the results of the aggregation can be transmitted in query. In some cases, the forbidden fields rule can indicate that raw values for records provided by a particular provider cannot be transmitted in query results. In some cases, the forbidden fields rule can indicate that raw values for each field in a particular set of fields of the same record cannot be transmitted in query results. In some cases, the forbidden fields rule can indicate that raw values for at least one field are allowed to be transmitted in query results.

Step 1904 includes receiving a query from a requesting entity. For example, the requesting entity can generate and/or relay a query request that includes the query, where the query request is generated via a user device 140 based on user input to GUI 345 by an end user. Step 1906 includes generating compliance data by determining whether a query result generated via execution of the query includes raw values of the at least one field. This compliance data can be generated prior to this execution to generate the query result. Generating this compliance data can include determining whether an aggregation is performed on raw values of the at least one field being accessed in the query. This can include evaluating the query itself and determining the query requests raw values of the at least one field be returned. This can include executing the query, and then evaluating the result set to determine whether raw values of at least one field are included in the result set.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, and/or particular fields and/or functions indicated the query. In some cases, the compliance data for the forbidden fields rule is generated by evaluating whether the at least one field is returned as a raw value only when the forbidden fields rule is determined to apply to the query. In some embodiments, the compliance data for the minimum result set size rule is generated to indicate compliance, without performing this evaluation, when the forbidden fields rule is determined not to apply to the query.

The method performs step 1908 when the compliance data indicates the query result does not include the raw values of the at least one field, where step 1910 is not performed. Step 1908 includes transmitting the query result to the requesting entity. In some cases, the method further includes facilitating execution of the query to generate the query result when the compliance data indicates the query result will not include the raw values of the at least one field. Alternatively, if the result set was already generated via execution of the query, where the result set was evaluated to generate the compliance data, this result set can be utilized to generate the query result when the compliance data indicates the query result does not include the raw values of the at least one field.

The method performs steps 1910 when the compliance data indicates the query result includes the raw values of the at least one field, where step 1908 is not performed. Step 1910 includes foregoing transmission of the query. In some cases, the method further includes foregoing facilitating execution of the query to generate the query when the compliance data indicates the query result will includes the raw values of the at least one field, if the compliance data is generated prior to execution of the query.

For example, the query is not executed and/or a result set of an already executed query is not transmitted unless the generated compliance data for the query indicates the query complies with every rule in the set of query rules and/or that the query complies with every one of a proper subset of rules in the set of query rules that were determined to be applicable based on one or more corresponding query parameters. If at least one rule in the set of rules, such as the forbidden fields rule, is determined not to be complied with by the query, the query is therefore not executed and/or a result set resulting from execution the query to generate the compliance data for the query is not transmitted to the end user. In some cases, the method includes generating an error message for transmission to the requesting entity in response to the compliance data indicating non-compliance with the forbidden fields rule.

Alternatively, if the method of FIG. 19 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

In various embodiments, a first query is received that indicates raw values of at least one field be returned for a set of records. A second query is received that indicates at least one aggregation be performed on all raw values accessed in the query. Compliance data for the first query indicates the first query does not comply with the forbidden fields rule based on the first query being determined to request return of a raw value. Compliance data for the second query indicates the second query does comply with the forbidden fields rule based on the query being determined to return only aggregations performed on raw values, and thus not returning any raw values of any fields.

In various embodiments, a first query that indicates a first set of fields be returned for a set of records is received. A second query that indicates a second set of fields be returned for the same or different set of records is also received. Compliance data for the first query indicates the first query complies with the forbidden fields rule based on the first set of fields not including the entirety of fields indicated by a forbidden fields grouping of the forbidden fields rule. Compliance data for the second query indicates the second query does not comply with the forbidden fields rule based on the second set of fields including the entirety of fields indicated by the forbidden fields grouping of the forbidden fields rule.

In various embodiments, the forbidden fields rule indicates a proper subset of subscription levels to which it applies. A query is received from a first requesting entity corresponding to a first end user at a first subscription level. The same or different query is received from a second requesting entity corresponding to a second end user at a second subscription level. Compliance data for the query received from the first requesting entity indicates the query complies with the forbidden fields rule based on the first end user being determined to be subscribed to the first subscription level. Compliance data for the query received from the second requesting entity indicates the second query does not comply with the forbidden fields rule based on the second end user being determined to be subscribed to the second subscription level. In particular, the forbidden fields rule can indicate access to raw values of the at least one field is allowed for users at the first subscription level, but not the second subscription level, in response to the first subscription level being more favorable than the second subscription level.

In various embodiments, a first query requesting raw values of records supplied by a first data provider is received. A second query requesting raw values of records supplied by a second data provider is received. The set of rules can include a first forbidden fields rule corresponding to data supplied by the first data provider and a second forbidden fields rule corresponding to data supplied by the second data provider. Compliance data for the first query is generated based on comparing the first query to the first forbidden fields rule based on determining records supplied by the first data provider are requested in the first query. Compliance data for the second query is generated based on comparing the second query to the second forbidden fields rule based on determining records supplied by the second data provider are requested in the second query. In some cases, the first forbidden fields rule is not applied to the second query and/or is determined to be complied with by the second query in response to determining records of the first data provider are not requested by the second query. In some cases, the second forbidden fields rule is not applied to the first query and/or is determined to be complied with by the first query in response to determining records of the second data provider are not requested by the first query.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a forbidden fields rule, where the forbidden fields rule indicates that raw values of at least one field of records stored in a database system cannot be transmitted in query results. The execution of the operational instructions by the processing module further causes the query processing system 114 to receive a query from a requesting entity, and/or to generate compliance data by determining whether a query result generated via execution of the query includes raw values of the at least one field. The execution of the operational instructions by the processing module further causes the query processing system 114 to transmit the query result to the requesting entity when the compliance data indicates the query result does not include the raw values of the at least one field. The execution of the operational instructions by the processing module further causes the query processing system 114 to forego transmission of the query result to the requesting entity when the compliance data indicates the query result includes the raw values of the at least one field, and/or the processing module otherwise does not transmit the requested raw values of the at least one field to the to the requesting entity when compliance data indicates the query result includes the raw values of the at least one field.

In various embodiments, a non-transitory computer readable storage medium includes at least one memory section that stores operational instructions that, when executed by a processing module that includes a processor and a memory, causes the processing module to determine a set of query rules that includes a forbidden fields rule, where the forbidden fields rule indicates that raw values of at least one field of records stored in a database system cannot be transmitted in query results. The execution of the operational instructions by the processing module further causes the processing module to receive a query from a requesting entity, and/or to generate compliance data by determining whether a query result generated via execution of the query includes raw values of the at least one field. The execution of the operational instructions by the processing module further causes the processing module to transmit the query result to the requesting entity when the compliance data indicates the query result does not include the raw values of the at least one field. The execution of the operational instructions by the processing module further causes the processing module to forego transmission of the query result to the requesting entity when the compliance data indicates the query result includes the raw values of the at least one field, and/or the processing module otherwise does not transmit the requested raw values of the at least one field to the to the requesting entity when compliance data indicates the query result includes the raw values of the at least one field.

Figure 20:
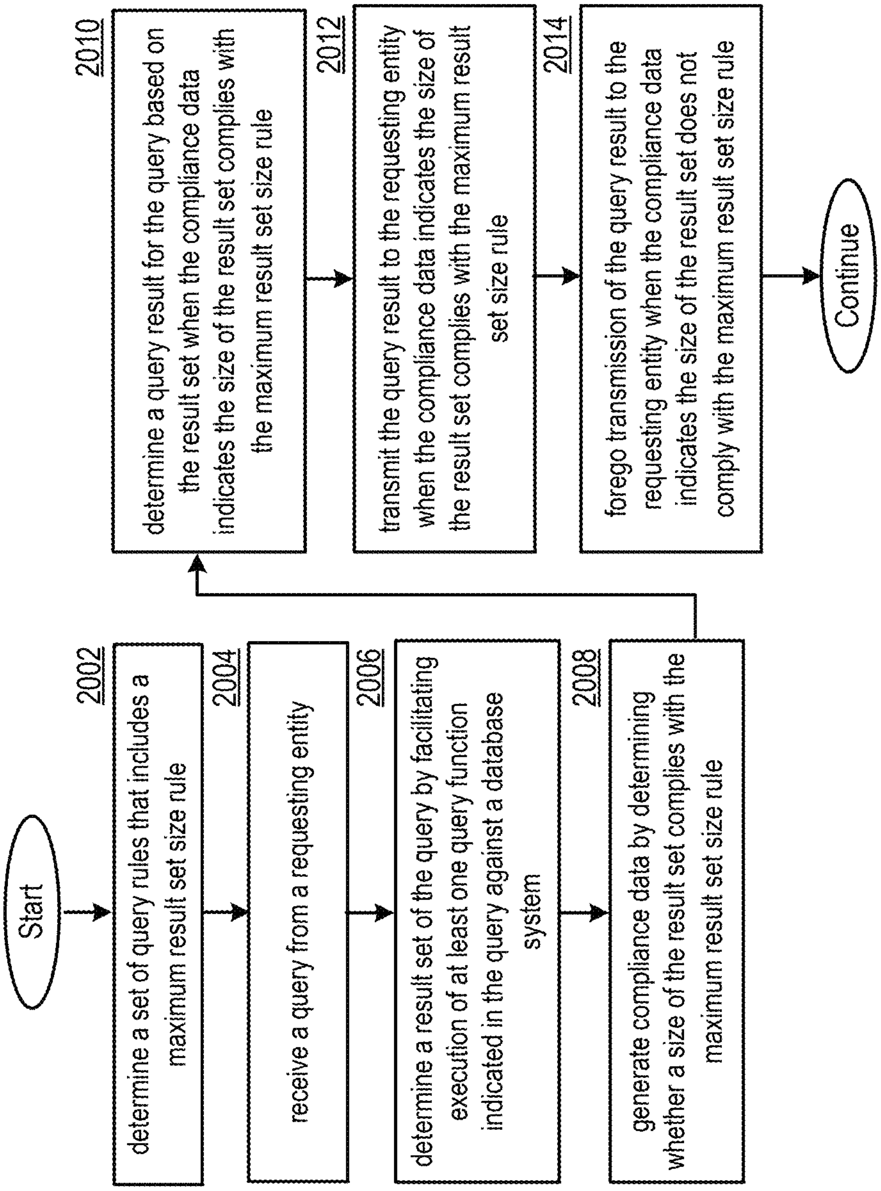
FIG. 20 is a logic diagram illustrating an example of a method of enforcing a maximum result set size rule.

FIG. 20 presents a method for execution by a maximum result set size compliance module 1220, by a runtime compliance module 625, by a query processing system 114, and/or for execution by another processing module of the analytics system 110 that executes executable instructions stored via a memory module. For example, the method of FIG. 20 can be performed by the maximum result set size compliance module 1220 as discussed in conjunction with FIGS. 12A-12D and/or in conjunction with other functionality of the maximum result set size compliance module 1220 discussed herein.

Step 2002 includes determining a set of query rules that includes a maximum result set size rule. The set of query rules can include one or more provider rulesets received from one or more provider devices 230, and/or one or more rules in the set of query rules can be configured via user input to GUI 245. The maximum result set size rule can be a rule 1215 of the maximum result set size ruleset 566. The set of query rules can include multiple rules 1215 of the maximum result set size ruleset 566.

In some cases, the maximum result set size rule can indicate that result sets with more than an indicated maximum number of records cannot be transmitted in query results. In some cases, the maximum result set size rule can indicate that the rule applies to intermediate result sets that will be utilized as input to a particular query function such as any aggregation function and/or a particular type of aggregation function. In some cases, the maximum result set size rule can indicate that the rule applies to end users at a particular subscription level and/or to records supplied by a particular provider. In some cases, the maximum result set size rule can indicate that the rule applies to result sets that contain a particular field, at least a particular number of fields, and/or a particular grouping of multiple fields.

Step 2004 includes receiving a query from a requesting entity. For example, the requesting entity can generate and/or relay a query request that includes the query, where the query request is generated via a user device 140 based on user input to GUI 345 by an end user. Step 2006 includes determining a result set of the query by facilitating execution of at least one query function indicated in the query against a database system. Step 2008 includes generating compliance data by determining whether a size of the result set complies with the maximum result set size rule. For example, the compliance data can indicate the size of the result set complies with the maximum result set size rule when the size of the result set is less than or equal to a maximum result set size indicated by the maximum result set size rule, and the compliance data can indicate the size of the result set does not comply with the maximum result set size rule when the size of the result set is greater than a maximum result set size indicated by the maximum result set size rule. Alternatively, the method can include generating a result set size estimate based on the query and/or based on result sets for previously executed queries, without facilitating execution of the received query of step 2006. In such cases, the result set size estimate is utilized to generate the compliance data.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data for the maximum result set size rule is generated by comparing a size of the result set to a maximum result set size indicated by the minimum result set size rule only when the minimum result set size rule is determined to apply to the query and/or the result set. In some embodiments, the compliance data for the maximum result set size rule is generated to indicate compliance, without performing this comparison, when the maximum result set size rule is determined not to apply to the query and/or result set.

The method performs steps 2010 and 2012 when the compliance data indicates the size of the result set complies with the maximum result set size rule, where step 2014 is not performed. Step 2010 includes determining a query result for the query based on the result set. For example, the query result can indicate the result set itself. Alternatively, if the result set is an intermediate result, the query result can be generated based on execution of remaining partial queries, such as at least one aggregation, upon the result set. Step 2012 includes transmitting the query result to the requesting entity.

The method does not perform steps 2010 and 2012 when the compliance data indicates the size of the result set does not comply with the maximum result set size rule, where the method continues from step 2008 to perform step 2014. Step 2014 includes foregoing transmission of the query result to the requesting entity. If the execution of the query was not performed and/or is not complete, the method can further include foregoing completion of execution of the query when the compliance data indicates the size of the result set does not comply with the maximum result set size rule.

For example, the result set is not transmitted and/or is not generated via further execution of the query unless the generated compliance data for the result set indicates the result set complies with every rule in the set of query rules and/or that the result set complies with every one of a proper subset of rules in the set of query rules that were determined to be applicable based on one or more corresponding query parameters. If at least one rule in the set of rules, such as the maximum result set size rule, is determined not to be complied with by the result set of the query, the result set for the query is not transmitted to the end user and/or is not further processed to generate the final query result. In some cases, the method includes generating an error message for transmission to the requesting entity in response to the compliance data indicating non-compliance with the maximum result set size rule.

Alternatively, if the method of FIG. 20 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

In various embodiments, a first result set is generated for a first query that is received. A second result set is generated for a second query that is received. Compliance data for the first query indicates the first query does not comply with the maximum result set size rule based on the size of the first result set exceeding a maximum threshold indicated by the maximum result set size rule. Compliance data for the second query indicates the second query does comply with the maximum result set size rule based on the size of the second result set not exceeding the maximum threshold indicated by the maximum result set size rule.

In various embodiments, a first maximum result set size rule applies to users at a first subscription level and indicates a first maximum threshold. A second maximum result set size rule applies to users at a second subscription level and indicates a second maximum threshold. For example, the first maximum threshold is greater than the second maximum threshold in response to the first subscription level being more favorable than the second subscription level. A query is received from a first requesting entity corresponding to a first end user at the first subscription level, and a first result set is generated based on execution of this query. The same or different query is received from a second requesting entity corresponding to a second end user at the second subscription level, and a second result set is generated based on execution of this query. For example, the first result set and second result set can each have a size that is less than the first maximum threshold and that is greater than the second maximum threshold.

The first maximum result set size rule is determined to apply to the first result set, and the second maximum result set size rule is determined to not apply to the first result set, based on determining the corresponding query was received from a requesting entity at the first subscription level. Compliance data for the first result set indicates the query complies with the first maximum result set size rule based on the first end user being determined to be subscribed to the first subscription level and further based on the size of the first result set being less than the first maximum threshold.

The second maximum result set size rule is applied to the second result set, and the first maximum result set size rule is determined to not apply to the second result set, based on determining the corresponding query was received from a requesting entity at the second subscription level. Compliance data for the second result set indicates the second result set does not comply with the second maximum result set size rule based on the second end user being determined to be subscribed to the second subscription level and further based on the size of the second result set being greater than the second maximum threshold.

In various embodiments, a first result set that includes records supplied by a first data provider is generated by executing a first query. A second result set that includes records supplied by a second data provider is generated by executing a second query. The set of rules can include a first maximum result set size rule corresponding to data supplied by the first data provider and a second maximum result set size rule corresponding to data supplied by the second data provider. The first maximum result set size rule and the second maximum result set size rule can indicate different maximum thresholds. Compliance data for the first result set is generated based on comparing the first result set to the first maximum result set size rule based on determining records supplied by the first data provider are included in the first result set. Compliance data for the second result set is generated based on comparing the second result set to the second maximum result set size rule based on determining records supplied by the second data provider are included in the second result set. In some cases, the first maximum result set size rule is not applied to the second result set and/or is determined to be complied with by the second result set in response to determining records of the first data provider are not included in the second result set. In some cases, the second maximum result set size rule is not applied to the first result set and/or is determined to be complied with by the first result set in response to determining records of the second data provider are not included in the first result set.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a maximum result set size rule, to receive a query from a requesting entity, to determine a result set of the query by facilitating execution of at least one query function indicated in the query against a database system, and/or to generate compliance data by determining whether a size of the result set complies with the maximum result set size rule. The execution of the operational instructions by the processing module further causes the query processing system 114 to determine a query result for the query based on the result set and/or transmit the query result to the requesting entity when the compliance data indicates the size of the result set complies with the maximum result set size rule. The execution of the operational instructions by the processing module further causes the query processing system 114 to forego transmission of the query result to the requesting entity when the compliance data indicates the size of the result set does not comply with the maximum result set size rule, and/or the processing module otherwise does not further process and/or transmit the result set to the requesting entity when the compliance data indicates the size of the result set does not comply with the maximum result set size rule.

In various embodiments, a non-transitory computer readable storage medium includes at least one memory section that stores operational instructions that, when executed by a processing module that includes a processor and a memory, causes the processing module to determine a set of query rules that includes a maximum result set size rule, to receive a query from a requesting entity, to determine a result set of the query by facilitating execution of at least one query function indicated in the query against a database system, and/or to generate compliance data by determining whether a size of the result set complies with the maximum result set size rule. The execution of the operational instructions by the processing module further causes the processing module to determine a query result for the query based on the result set and/or transmit the query result to the requesting entity when the compliance data indicates the size of the result set complies with the maximum result set size rule. The execution of the operational instructions by the processing module further causes the processing module to forego transmission of the query result to the requesting entity when the compliance data indicates the size of the result set does not comply with the maximum result set size rule, and/or the processing module otherwise does not further process and/or transmit the result set to the requesting entity when the compliance data indicates the size of the result set does not comply with the maximum result set size rule.

Figure 21:
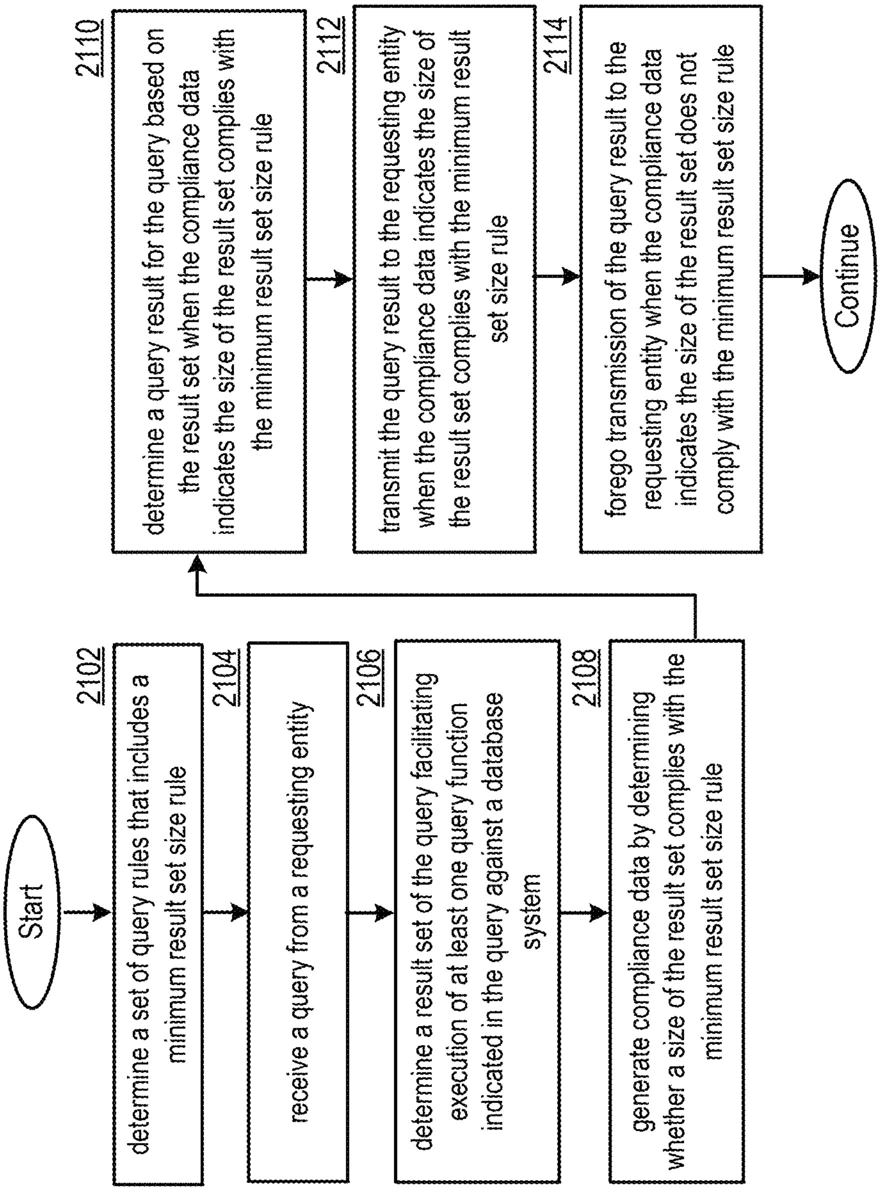
FIG. 21 is a logic diagram illustrating an example of a method of enforcing a minimum result set size rule.

FIG. 21 presents a method for execution by a minimum result set size compliance module 1320, by a runtime compliance module 625, by a query processing system 114, and/or for execution by another processing module of the analytics system 110 that executes executable instructions stored via a memory module. For example, the method of FIG. 21 can be performed by the minimum result set size compliance module 1320 as discussed in conjunction with FIGS. 13A-13D and/or in conjunction with other functionality of the minimum result set size compliance module 1320 discussed herein.

Step 2102 includes determining a set of query rules that includes a minimum result set size rule. The set of query rules can include one or more provider rulesets received from one or more provider devices 230, and/or one or more rules in the set of query rules can be configured via user input to GUI 245. The minimum result set size rule can be a rule 1315 of the minimum result set size ruleset 568. The set of query rules can include multiple rules 1315 of the minimum result set size ruleset 568.

In some cases, the minimum result set size rule can indicate that result sets with less than an indicated minimum number of records cannot be utilized to generate query results. In some cases, the minimum result set size rule can indicate that the rule applies to intermediate result sets that will be utilized as input to a particular query function such as any aggregation function and/or a particular type of aggregation function. In some cases, the minimum result set size rule can indicate that the rule applies to end users at a particular subscription level and/or to records supplied by a particular provider. In some cases, the minimum result set size rule can indicate that the rule applies to result sets that contain a particular field, at least a particular number of fields, and/or a particular grouping of multiple fields.

Step 2104 includes receiving a query from a requesting entity. For example, the requesting entity can generate and/or relay a query request that includes the query, where the query request is generated via a user device 140 based on user input to GUI 345 by an end user. Step 2106 includes determining a result set of the query by facilitating execution of at least one query function indicated in the query against a database system. Step 2108 includes generating compliance data by determining whether a size of the result set complies with the minimum result set size rule. For example, the compliance data can indicate the size of the result set complies with the minimum result set size rule when the size of the result set is greater than or equal to a minimum result set size indicated by the minimum result set size rule, and the compliance data can indicate the size of the result set does not comply with the minimum result set size rule when the size of the result set is greater than a minimum result set size indicated by the minimum result set size rule. Alternatively, the method can include generating a result set size estimate based on the query and/or based on result sets for previously executed queries, without facilitating execution of the received query of step 2106. In such cases, the result set size estimate is utilized to generate the compliance data.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data for the minimum result set size rule is generated by comparing a size of the result set to a minimum result set size indicated by the minimum result set size rule only when the minimum result set size rule is determined to apply to the query and/or the result set. In some embodiments, the compliance data for the minimum result set size rule is generated to indicate compliance, without performing this comparison, when the minimum result set size rule is determined not to apply to the query and/or result set.

The method performs steps 2110 and 2112 when the compliance data indicates the size of the result set complies with the minimum result set size rule, where step 2014 is not performed. Step 2110 includes determining a query result for the query based on the result set. For example, if the result set is an intermediate result, the query result can be generated based on execution of remaining partial queries, such as at least one aggregation, upon this result set. Step 2112 includes transmitting the query result to the requesting entity.

The method does not perform steps 2110 and 2112 when the compliance data indicates the size of the result set does not comply with the minimum result set size rule, where the method continues from step 2108 to perform step 2114. Step 2114 includes foregoing transmission of the query result to the requesting entity. If the execution of the query was not performed and/or is not complete, the method can further include foregoing completion of execution of the query, such as foregoing applying an aggregation function to the result set, when the compliance data indicates the size of the result set does not comply with the minimum result set size rule.

For example, the result set is not transmitted and/or is not generated via further execution of the query unless the generated compliance data for the result set indicates the result set complies with every rule in the set of query rules and/or that the result set complies with every one of a proper subset of rules in the set of query rules that were determined to be applicable based on one or more corresponding query parameters. If at least one rule in the set of rules, such as the minimum result set size rule, is determined not to be complied with by the result set of the query, the result set for the query is not transmitted to the end user and/or is not further processed to generate the final query result. In some cases, the method includes generating an error message for transmission to the requesting entity in response to the compliance data indicating non-compliance with the minimum result set size rule.

Alternatively, if the method of FIG. 21 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

In various embodiments, a first result set is generated for a first query that is received. A second result set is generated for a second query that is received. Compliance data for the first query indicates the first query does not comply with the minimum result set size rule based on the size of the first result set falling below a minimum threshold indicated by the minimum result set size rule. Compliance data for the second query indicates the second query does comply with the minimum result set size rule based on the size of the second result set not falling below the minimum threshold indicated by the minimum result set size rule.

In various embodiments, a first minimum result set size rule applies to users at a first subscription level and indicates a first minimum threshold. A second minimum result set size rule applies to users at a second subscription level and indicates a second minimum threshold. For example, the first minimum threshold is less than the second minimum threshold in response to the first subscription level being more favorable than the second subscription level. A query is received from a first requesting entity corresponding to a first end user at the first subscription level, and a first result set is generated based on execution of this query. The same or different query is received from a second requesting entity corresponding to a second end user at the second subscription level, and a second result set is generated based on execution of this query. For example, the first result set and second result set can each have a size that is greater than the first minimum threshold and that is less than the second minimum threshold.

The first minimum result set size rule is determined to apply to the first result set, and the second minimum result set size rule is determined to not apply to the first result set, based on determining the corresponding query was received from a requesting entity at the first subscription level. Compliance data for the first result set indicates the query complies with the first minimum result set size rule based on the first end user being determined to be subscribed to the first subscription level and further based on the size of the first result set being greater than the first minimum threshold.

The second minimum result set size rule is applied to the second result set, and the first minimum result set size rule is determined to not apply to the second result set, based on determining the corresponding query was received from a requesting entity at the second subscription level. Compliance data for the second result set indicates the second result set does not comply with the second minimum result set size rule based on the second end user being determined to be subscribed to the second subscription level and further based on the size of the second result set being less than the second minimum threshold.

In various embodiments, a first minimum result set size rule indicates a first minimum threshold and applies to results sets utilized as input to a first type of aggregation function, and a second minimum result set size rule indicates a second minimum threshold and applies to results sets utilized as input to a second type of aggregation function. For example, the first minimum threshold is less than the second minimum threshold in response to the first type of aggregation function providing more obfuscation than the second type of aggregation function. A first query is received that indicates the first type of aggregation be performed on an intermediate result set, and a first result set corresponding to the intermediate result set is generated based on execution of at least one query function of this query. A second query is received that indicates the second type of aggregation be performed on a same or different intermediate result set, and a second result set corresponding to the intermediate result set is generated based on execution of at least one query function of this second query. For example, a size of the first result set and the second result set is greater than the first minimum but less than the second minimum threshold.

The first minimum result set size rule is determined to apply to the first result set, and the second minimum result set size rule is determined to not apply to the first result set, based on determining the first result set is to be utilized as input to the first type of aggregation function. Compliance data for the first result set indicates the first query complies with the first minimum result set size rule based on the first result set being determined to be utilized as input to the first type of aggregation function and further based on the size of the first result set being greater than the first minimum threshold.

The second minimum result set size rule is applied to the second result set, and the first minimum result set size rule is determined to not apply to the second result set, based on determining the second result set is to be utilized as input to the second type of aggregation function. Compliance data for the second result set indicates the second result set does not comply with the second minimum result set size rule based on the second result set being determined to be utilized as input to the second type of aggregation function and further based on the size of the second result set being less than the second minimum threshold.

In various embodiments, the set of query rules indicates a forbidden fields rule indicating at least one field whose raw values cannot be included in query results. The minimum result set size rule can indicate the at least one field, where the minimum result set size rule applies to result sets with records that include the raw values for the at least one field. In some embodiments, some or all fields that are indicated by a forbidden fields rule are further indicated in minimum result set size rules, where the minimum result set size rules apply to result sets with records that include the raw values for these forbidden fields.

In various embodiments, a first result set that includes records supplied by a first data provider is generated by executing a first query. A second result set that includes records supplied by a second data provider is generated by executing a second query. The set of rules can include a first minimum result set size rule corresponding to data supplied by the first data provider and a second minimum result set size rule corresponding to data supplied by the second data provider. The first minimum result set size rule and the second minimum result set size rule can indicate different minimum thresholds. Compliance data for the first result set is generated based on comparing the first result set to the first minimum result set size rule based on determining records supplied by the first data provider are included in the first result set. Compliance data for the second result set is generated based on comparing the second result set to the second minimum result set size rule based on determining records supplied by the second data provider are included in the second result set. In some cases, the first minimum result set size rule is not applied to the second result set and/or is determined to be complied with by the second result set in response to determining records of the first data provider are not included in the second result set. In some cases, the second minimum result set size rule is not applied to the first result set and/or is determined to be complied with by the first result set in response to determining records of the second data provider are not included in the first result set.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a minimum result set size rule, to receive a query from a requesting entity, to determine a result set of the query by facilitating execution of at least one query function indicated in the query against a database system, and/or to generate compliance data by determining whether a size of the result set complies with the minimum result set size rule. The execution of the operational instructions by the processing module further causes the query processing system 114 to determine a query result for the query based on the result set and/or transmit the query result to the requesting entity when the compliance data indicates the size of the result set complies with the minimum result set size rule. The execution of the operational instructions by the processing module further causes the query processing system 114 to forego transmission of the query result to the requesting entity when the compliance data indicates the size of the result set does not comply with the minimum result set size rule, and/or the processing module otherwise does not further process the result set when the compliance data indicates the size of the result set does not comply with the minimum result set size rule.

In various embodiments, a non-transitory computer readable storage medium includes at least one memory section that stores operational instructions that, when executed by a processing module that includes a processor and a memory, causes the processing module to determine a set of query rules that includes a minimum result set size rule, to receive a query from a requesting entity, to determine a result set of the query by facilitating execution of at least one query function indicated in the query against a database system, and/or to generate compliance data by determining whether a size of the result set complies with the minimum result set size rule. The execution of the operational instructions by the processing module further causes the processing module to determine a query result for the query based on the result set and/or transmit the query result to the requesting entity when the compliance data indicates the size of the result set complies with the minimum result set size rule. The execution of the operational instructions by the processing module further causes the processing module to forego transmission of the query result to the requesting entity when the compliance data indicates the size of the result set does not comply with the minimum result set size rule, and/or the processing module otherwise does not further process the result set when the compliance data indicates the size of the result set does not comply with the minimum result set size rule.

Figure 22:
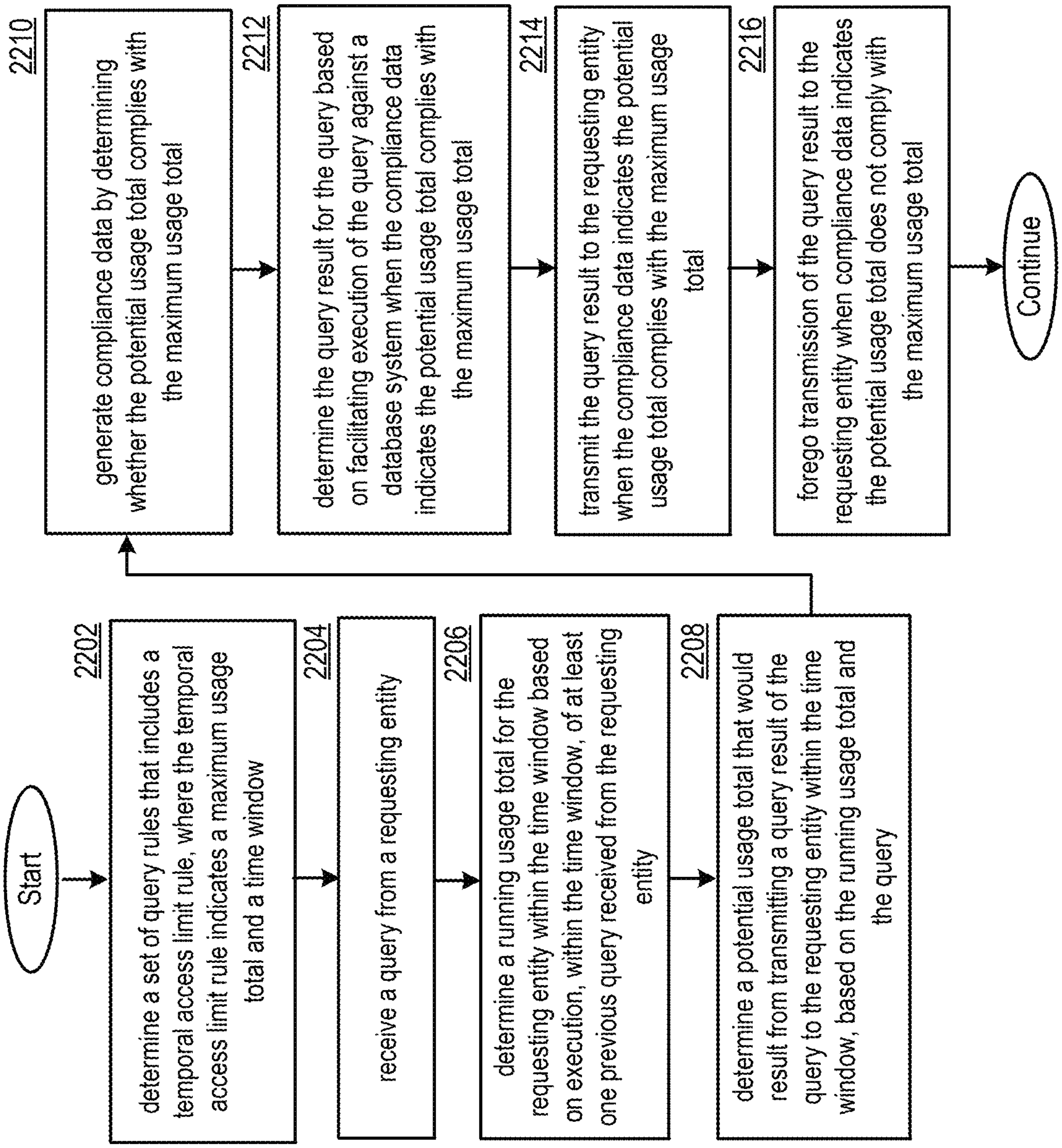
FIG. 22 is a logic diagram illustrating an example of a method of enforcing a temporal access limit rule.

FIG. 22 presents a method for execution by a temporal access limits compliance module 1420, by a pre-execution compliance module 610, by a runtime compliance module 625, by a query processing system 114, and/or for execution by another processing module of the analytics system 110 that executes executable instructions stored via a memory module. For example, the method of FIG. 22 can be performed by the temporal access limits compliance module 1420 as discussed in conjunction with FIGS. 14A-14E and/or in conjunction with other functionality of the temporal access limits compliance module 1420 discussed herein.

Step 2202 includes determining a set of query rules that includes a temporal access limit rule. The set of query rules can include one or more provider rulesets received from one or more provider devices 230, and/or one or more rules in the set of query rules can be configured via user input to GUI 245. The temporal access limit rule can be a rule 1415 of the temporal access limits ruleset 570. The set of query rules can include multiple rules 1415 of the temporal access limits ruleset 570.

The temporal access limit rule can indicate a maximum usage total and a time window. The maximum usage total can indicate a maximum number of fields, a maximum number of queries, and/or a maximum number of records that can be accessed within the time window. The time window can indicate a length of time that the maximum usage total applies. The time window can indicate a fixed start and/or end point. For example, the time window can correspond to the time window of a corresponding subscription period. Alternatively, the time window can end at a current time, corresponding to a time that a query is received and/or to schedule for execution.

In some cases, the temporal access limit rule can indicate that query results cannot be transmitted to the requesting entity for queries that, if executed in full with their query result transmitted to the end user, would cause the maximum usage total to be exceeded within the time window. In some cases, the temporal access limit rule can indicate that the rule applies to end users at a particular subscription level and/or to records supplied by a particular provider. In some cases, the temporal access limit rule can indicate that the rule applies to result sets that contain a particular field, at least a particular number of fields, and/or a particular grouping of multiple fields. In some cases, the temporal access limit rule can indicate that the rule applies to queries that include performance of a particular function such as a particular aggregation function.

Step 2204 includes receiving a query from a requesting entity. For example, the requesting entity can generate and/or relay a query request that includes the query, where the query request is generated via a user device 140 based on user input to GUI 345 by an end user.

Step 2206 includes determining a running usage total for the requesting entity within the time window based on execution, within the time window, of at least one previous query received from the requesting entity. In some embodiments, the method further includes processing previous queries for the requesting entity, for example, where each query is processed by performing some or all of the steps of the method of FIG. 22. The method can include tracking queries performed for the requesting entity within the time window and/or over time, for example, in a query logging system 450 and/or user management system 440. The method can include tracking records returned to and/or accessed by the requesting entity within the time window and/or over time, for example, in a query logging system 450 and/or user management system 440. This tracking of queries and/or records can be utilized to count and/or otherwise determine the number of queries performed for the requesting entity and/or the number of records returned to and/or accessed by the requesting entity within the time window, prior to execution of the received query. For example, the method can include determining the running usage total for the requesting entity by querying the query logging system 450 and/or user management system 440 for previous queries and/or result sets of the requesting entity within the time window, where previous queries and/or records of previous result sets are received in response, and/or where a number of previous queries and/or number of records returned and/or accessed are received in response.

Step 2208 includes determining a potential usage total that would result from transmitting a query result of the query to the requesting entity within the time window, based on the running usage total and the query. For example, the number of previous queries can be incremented by one to determine a potential number of queries, where the potential usage total indicates the potential number of queries. As another example, at least one query function of the query can be executed to determine a result set for the query, and a number of previously returned and/or accessed records indicated by the running usage total can be incremented by the size of the result set to generate a potential usage total corresponding to a number of records. As another example, at least one query function of the query can be executed to determine a result set for the query, and a total number of distinct records can be determined as a number of records in a union of the set of records in the result set with a set of previous records accessed by the requesting entity and/or returned to the requesting entity, for example, determined in step 2206.

Step 2210 includes generating compliance data by determining whether the potential usage total complies with the maximum usage total. For example, the compliance data can indicate the query and/or result set complies with the temporal access limit rule when the potential usage total does not exceed the maximum usage total, and can indicate non-compliance when the potential usage total does exceed the maximum usage total. In particular, the compliance data can indicate the query and/or result set complies with the temporal access limit rule when the potential number of queries and/or number of records determined in step 2208 does not exceed a maximum number of queries and/or maximum number of records, respectively.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data for the temporal access limit rule is generated by determining the running usage total and/or potential usage total only when the temporal access limit rule is determined to apply to the query and/or the result set. In some embodiments, the compliance data for the temporal access limit rule is generated to indicate compliance, without determining the running usage total and/or potential usage total, when the temporal access limit rule is determined not to apply to the query and/or result set.

The method performs steps 2212 and 2214 when the compliance data indicates the potential usage total complies with the maximum usage total, where step 2216 is not performed. Step 2212 includes determining the query result for the query based on facilitating execution of the query against a database system. For example, the query result can include the result set, if the query was already generated to produce the result set. Alternatively, if the result set being evaluated is an intermediate result, the query result can be generated based on execution of remaining partial queries, such as at least one aggregation, upon this result set. As another example, if the query has not yet been executed, the query can be executed to generate the query result. Step 2214 includes transmitting the query result to the requesting entity.

The method does not perform steps 2212 and 2214 when the compliance data indicates the potential usage total does not comply with the maximum usage total, where the method continues from step 2210 to perform step 2216. Step 2216 includes foregoing transmission of the query result to the requesting entity. If the execution of the query was not performed and/or is not complete, the method can further include foregoing initiation and/or completion of execution of the query, such as foregoing applying an aggregation function to the result set, when compliance data indicates the potential usage total does not comply with the maximum usage total.

For example, the result set is not transmitted and/or is not generated via further execution of the query unless the generated compliance data for the query and/or result set indicates the query and/or result set complies with every rule in the set of query rules and/or that the result set complies with every one of a proper subset of rules in the set of query rules that were determined to be applicable based on one or more corresponding query parameters. If at least one rule in the set of rules, such as the temporal access limits rule, is determined not to be complied with by the query and/or result set of the query, the result set for the query is not transmitted to the end user and/or is not further processed to generate the final query result. In some cases, the method includes generating an error message for transmission to the requesting entity in response to the compliance data indicating non-compliance with the temporal access limits rule.

Alternatively, if the method of FIG. 22 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

When the compliance data indicates the potential usage total complies with the maximum usage total, the method can further include generating a new entry to be sent to the query logging system 450. The new entry can indicate result set data of the query and/or query data for the query. Alternatively or in addition, the method can further include updating a locally stored running usage total for the requesting entity in response to transmitting the query result, for example, where the running usage total is incremented by one if the running usage total corresponds to a total number of queries and/or where the running usage total is incremented by the size of the result set and/or number of new records accessed by the user in the result set. In particular, the locally stored running usage total can be updated as the potential usage total determined in step 2208, as this potential usage total becomes the new running usage total when the query is executed and/or when the query result is transmitted to the requesting entity. The method can further include receiving another query from the requesting entity, within the time window, after executing the query and transmitting the query result. The method can further include determining second running usage data for the requesting entity in response to receiving the other query, which can be different from the running usage data determined in step 2206 as a result of the query being executed and/or the query result being transmitted to the requesting entity. For example, the locally stored running usage total for the requesting entity can be utilized and/or the query logging system 450 can be queried, where a response from the query logging system 450 indicated the new entry and/or is based on the new entry.

Similarly, when the compliance data indicates the potential usage total does not comply with the maximum usage total, the method can further include foregoing updating of the locally stored running usage total for the requesting entity and/or can further include forgoing generating of a new entry for the query based on the query result not being transmitted to the requesting entity. Alternatively, a new entry for the query can be generated and transmitted to the query logging system 450, where the new entry indicates the result set of the query result was not sent to the requesting entity. This new entry can further indicate whether the query was executed to generate the compliance data, and the entry can further include result set data for the query if the query was executed, even when none of the result set data was transmitted in a query result to the requesting entity.

In various embodiments, a first query is received from a first requesting entity and a second query is received from a second requesting entity. A first running usage total for the time window is generated for the first requesting entity and a second running usage total for the time window is generated for the second requesting entity. A first potential usage total for the time window is generated for the first requesting entity based on the first running usage total and the first query. A second potential usage total for the time window is generated for the second requesting entity based on the second running usage total and the second query. Compliance data for the first query indicates the first query does not comply with the temporal access limit rule based on the first potential usage total exceeding the maximum usage total. Compliance data for the second query indicates the second query does comply with the temporal access limit rule based on the second potential usage total not exceeding the maximum usage total.

In various embodiments, a first temporal access limit rule applies to users at a first subscription level and indicates a first maximum usage total and a first time window. A second first temporal access limit rule applies to users at a second subscription level and indicates a second maximum usage total and a second time window, which can be the same or different from the first time window. For example, the first time window and the second time window are the same and correspond to a recurring subscription periods for the first subscription level and the second subscription level. Furthermore, the first maximum usage total can be greater than the second maximum usage total in response to the first subscription level being more favorable than the second subscription level.

A first query is received from a first requesting entity corresponding to a first end user at the first subscription level. A same or different second query is received from a second requesting entity corresponding to a second end user at the second subscription level. A first potential usage total is generated for the first user based on the first query and second potential usage total is generated for the second user based on the second query. For example, the first potential usage total and second potential usage total can each be less than the first maximum usage total and can each be greater than the second maximum usage total.

The first temporal access limit rule is determined to apply to the first query, and the second temporal access limit rule is determined to not apply to the first query, based on determining the first query was received from a requesting entity at the first subscription level. Compliance data for the first query indicates the first query complies with the first temporal access limit rule based on the first end user being determined to be subscribed to the first subscription level and further based on the first potential usage total not exceeding the first maximum usage total.

The second temporal access limit rule determined to apply to the second query, and the first temporal access limit rule is determined to not apply to the second query, based on determining the second query was received from a requesting entity at the second subscription level. Compliance data for the second query indicates the second query does not comply with the second temporal access limit rule based on the second end user being determined to be subscribed to the second subscription level and further based on the second potential usage total exceeding the second maximum usage total.

In various embodiments, a first query is received by a requesting entity that involves access to records supplied by a first data provider. A second result set is received from the same requesting entity that involves access to records supplied by a second data provider. The set of rules can include a first temporal access limit rule corresponding to data supplied by the first data provider and a second temporal access limit rule corresponding to data supplied by the second data provider. The first temporal access limit rule and the second temporal access limit rule can indicate different time windows and/or different maximum usage totals. A first running usage total is generated for the requesting entity based only on previous queries that accessed records supplied by the first data provider in response to determining the first query involves access to records supplied by the first data provider. In some cases, the first running usage total is generated to indicate a first number of records accessed by the requesting entity in the time window, where only records supplied by the first data provider are considered in determining the first number of records. A second running usage total is generated for the requesting entity based only on previous queries that accessed records supplied by the second data provider in response to determining the second query involves access to records supplied by the second data provider. In some cases, the second running usage total is generated to indicate a second number of records accessed by the requesting entity in the time window, where only records supplied by the second data provider are considered in determining the second number of records.

A first potential usage total is generated based on the first query and the first running usage total. A second potential usage total is generated based on the second query and the second running usage total. Compliance data for the first query is generated based on comparing the first potential usage total potential to the maximum usage total indicated by the first temporal access limit rule based on determining records supplied by the first data provider are involved in the first query. Compliance data for the second query is generated based on comparing the second potential usage total potential to the maximum usage total indicated by the second temporal access limit rule based on determining records supplied by the second data provider are involved in the second query. In some cases, the first temporal access limit rule is not applied to the second query and/or is determined to be complied with by the second query in response to determining records of the first data provider are not involved in the second query. In some cases, the second temporal access limit rule is not applied to the first query and/or is determined to be complied with by the first query in response to determining records of the second data provider are not involved in the first query.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a temporal access limit rule, where the temporal access limit rule indicates a maximum usage total and a time window. The execution of the operational instructions by the processing module further causes the query processing system 114 to receive a query from a requesting entity, determine a running usage total for the requesting entity within the time window based on execution, within the time window, of at least one previous query received from the requesting entity, to determine a potential usage total that would result from transmitting a query result of the query to the requesting entity within the time window, based on the running usage total and the query and/or to generate compliance data by determining whether the potential usage total complies with the maximum usage total. The execution of the operational instructions by the processing module further causes the query processing system 114 to determine the query result for the query based on facilitating execution of the query against a database system and/or transmit the query result to the requesting entity when the compliance data indicates the potential usage total complies with the maximum usage total. The execution of the operational instructions by the processing module further causes the query processing system 114 to forego transmission of the query result to the requesting entity when the compliance data indicates the potential usage total does not comply with the maximum usage total, and/or the processing module otherwise does not further process the query when the compliance data indicates the potential usage total does not comply with the maximum usage total.

In various embodiments, a non-transitory computer readable storage medium includes at least one memory section that stores operational instructions that, when executed by a processing module that includes a processor and a memory, causes the processing module to determine a set of query rules that includes a temporal access limit rule, where the temporal access limit rule indicates a maximum usage total and a time window. The execution of the operational instructions by the processing module further causes the processing module to receive a query from a requesting entity, determine a running usage total for the requesting entity within the time window based on execution, within the time window, of at least one previous query received from the requesting entity, to determine a potential usage total that would result from transmitting a query result of the query to the requesting entity within the time window, based on the running usage total and the query and/or to generate compliance data by determining whether the potential usage total complies with the maximum usage total. The execution of the operational instructions by the processing module further causes the processing module to determine the query result for the query based on facilitating execution of the query against a database system and/or transmit the query result to the requesting entity when the compliance data indicates the potential usage total complies with the maximum usage total. The execution of the operational instructions by the processing module further causes the processing module to forego transmission of the query result to the requesting entity when the compliance data indicates the potential usage total does not comply with the maximum usage total, and/or the processing module otherwise does not further process the query when the compliance data indicates the potential usage total does not comply with the maximum usage total.

Figure 23:
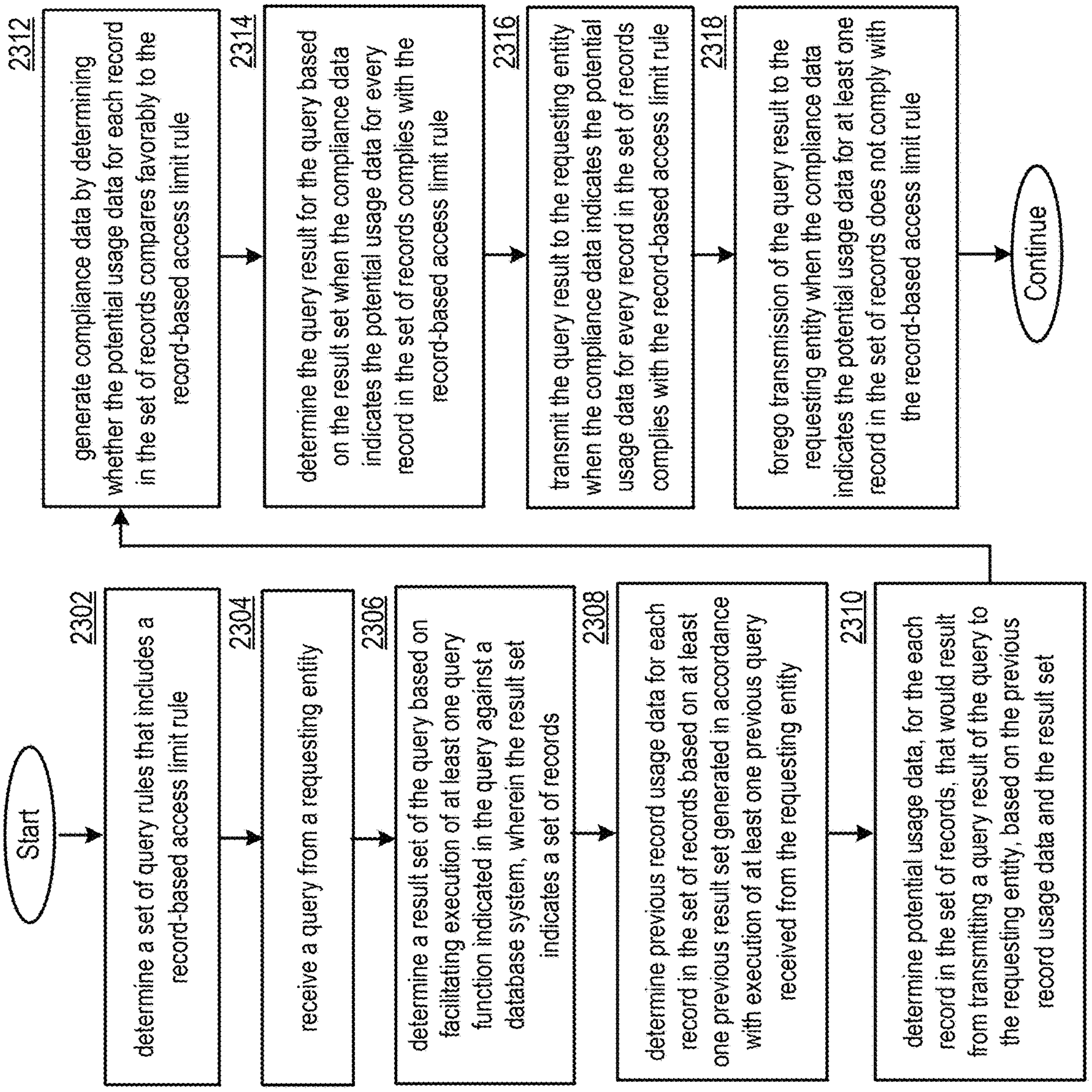
FIG. 23 is a logic diagram illustrating an example of a method of enforcing a record-based access limit rule.

FIG. 23 presents a method for execution by a record-based access limits compliance module 1520, by a pre-execution compliance module 610, by a runtime compliance module 625, by a query processing system 114, and/or for execution by another processing module of the analytics system 110 that executes executable instructions stored via a memory module. For example, the method of FIG. 23 can be performed by the record-based access limits compliance module 1520 as discussed in conjunction with FIGS. 15A-15D and/or in conjunction with other functionality of the record-based access limits compliance module 1520 discussed herein.

Step 2302 includes determining a set of query rules that includes determining a set of query rules that includes a record-based access limit rule. The set of query rules can include one or more provider rulesets received from one or more provider devices 230, and/or one or more rules in the set of query rules can be configured via user input to GUI 245. The record-based access limit rule can be a rule 1515 of the record-based access limits ruleset 572. The set of query rules can include multiple rules 1515 of the record-based access limits ruleset 572.

The record-based access limit rule can indicate a maximum number of times same record can be returned in a query result or utilized in execution of queries by a same requesting entity, and/or a set of fields that cannot be all returned to a same requesting entity for a same record and/or cannot all be utilized in execution of queries by a same requesting entity. The record-based access limit rule can indicate usage restrictions that apply to other records if a given record is involved in a query. These usage restrictions that apply to other records can indicate a maximum number of different records that can be returned and utilized by a same requesting entity if they have a same value, and/or values within a same predefined set and/or range, for one or more particular fields indicated by the record-based access limit rule. These usage restrictions that apply to other records can indicate a set of fields that cannot all be returned and/or utilized by a same requesting entity across a set of different records if the records in the set of different records have a same value, and/or values within a same predefined set and/or range, for one or more particular fields indicated by the record-based access limit rule.

The record-based access limit rule can indicate that query results cannot be transmitted to the requesting entity for queries that do not comply with the record-based access limit rule. In some cases, the record-based access limit rule can indicate that the rule applies to end users at a particular subscription level and/or to records supplied by a particular provider. In some cases, the record-based access limit rule can indicate that the rule applies only to records that meet particular record criteria, such as records of a particular type, records that include a particular field, and/or records that fall within a particular age range. In some cases, the record-based access limit rule can indicate that the rule applies when the query result contains a value of, and/or contains an aggregation performed upon, a particular field, at least a particular number of fields, and/or a particular grouping of multiple fields. In some cases, the record-based access limit rule can indicate that the rule applies to queries that include performance of a particular function such as a particular aggregation function on the records to which the record-based access limit rule applies.

Step 2304 includes receiving a query from a requesting entity. For example, the requesting entity can generate and/or relay a query request that includes the query, where the query request is generated via a user device 140 based on user input to GUI 345 by an end user. Step 2306 includes determining a result set of the query based on facilitating execution of at least one query function indicated in the query against a database system. The result set can indicate a set of records. The result set can correspond to a final result of the query and/or an intermediate result of the query, for example, where completion of the query involves performing an aggregation on the set of records.

Step 2308 includes determining previous record usage data for each record in the set of records based on at least one previous result set generated in accordance with execution of at least one previous query received from the requesting entity. In some embodiments, the method further includes processing previous queries for the requesting entity, for example, where each query is processed by performing some or all of the steps of the method of FIG. 23. The method can include tracking records returned by and/or utilized in queries performed for the requesting entity over time, for example, in a query logging system 450 and/or user management system 440.

This tracking of records can be utilized to determine and/or otherwise determine identifiers of the set of records previously returned to and/or utilized in previous queries for the requesting entity and/or identifiers of one or more particular fields of some or all records in the set of records previously returned to and/or utilized in previous queries. This tracking of records can be utilized to count and/or determine how many times and/or which set of fields of the records have been utilized by and/or returned to the requesting entity. This tracking of records can be utilized to track usage of sets of different records with matching values for one or more fields indicated by the record-based access limit rule, which can be utilized to determine a number of different records with the one or more matching values for the one or more fields that have been used and/or returned, and/or to determine a set of fields for each set different records that have been used and/or returned. For example, the method can include determining previous record usage data for the requesting entity by querying the query logging system 450 and/or user management system 440 for previous result sets of the requesting entity, for example, that meet the record criteria, where previous records of previous result sets are received in response, and/or where identifiers of previously utilized records received in response.

Step 2310 includes determining, for each record in the set of records, potential usage data that would result from completing execution of the query and/or transmitting a query result of the query to the requesting entity, based on the previous record usage data for each record and the result set. For example, the number of usages of each record indicated by the potential usage data can be incremented by one based on their inclusion in the result set to determine a potential number of usages of each record, where the potential usage total indicates the potential number of usages of each record. As another example, the set of fields used of each record indicated by the potential usage data can be updated to indicate any additional fields for each record that are included in the result set to generate a potential set of fields, where the potential usage total indicates the potential set of fields. As another example, one or more sets of records with matching values for a same one or more fields indicated by the potential usage data can be updated to indicate any additional records in the result set with this matching value for the one or more fields to generate one or more potential sets of records with matching field values, where the potential usage total indicates the one or more potential sets of records with matching field values.

Step 2312 includes generating compliance data by determining whether the potential usage data for each record in the set of records compares favorably to the record-based access limit rule. Generating the compliance data can include comparing the potential number of usages determined for each record to a maximum record usage total indicated by the record-based access limit rule, where a record complies with the record-based access limit rule when its potential number of usages does not exceed the maximum record usage total.

Alternatively or in addition, generating the compliance data can include comparing the potential set of fields for each record to a maximum number of fields total indicated by the record-based access limit rule and/or to a set of forbidden fields indicated by the record-based access limit rule, where a record complies with the record-based access limit rule when the potential set of fields does not include all of the set of forbidden fields and/or when the when a number of fields in the potential set of fields does not exceed the maximum number of fields total.

Alternatively or in addition, generating the compliance data can include comparing the sizes of potential sets of records with matching field values to a maximum number of records with the matching field value indicated by the record-based access limit rule for the particular one or more fields with the matching field values, where potential sets of records with matching field values comply with the record-based access limit rule when their sizes each do not exceed the maximum number of records with the matching field value for the particular one or more fields.

Alternatively or in addition, generating the compliance data can include comparing the potential set of fields utilized for each potential set of records with matching field values to a forbidden fields grouping indicated by the record-based access limit rule for the particular one or more fields with the matching field values, where potential sets of records with matching field values comply with the record-based access limit rule when each potential set of fields utilized does not include every one of the fields indicated in the forbidden fields grouping.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data for the record-based access limit rule is generated by determining the result set and/or the potential record usage data only when the temporal access limit rule is determined to apply to the query and/or the result set. In some embodiments, the compliance data for the record-based access limit rule is generated to indicate compliance, without determining the determining the result set and/or the potential record usage data, when the record-based access limit rule is determined not to apply to the query and/or result set.

In some embodiments, generating the compliance data includes comparing each record in the result set to the record criteria of the record-based access limit rule. In some cases, the compliance data for a particular record in the result set is generated by determining the previous record usage data and/or potential record usage data only when the particular record is determined to compare favorably to the record criteria. In some embodiments, the compliance data for a particular record is generated to indicate compliance with the record-based access limit rule, without determining the previous record usage data and/or potential record usage data, when the particular record is determined to compare unfavorably to the record criteria. For example, previous record usage data, potential record usage data, and/or compliance data is only determined for a proper subset of records in the result set that are determined to compare favorably to the record criteria.

The method performs steps 2314 and 2316 when the compliance data indicates the potential usage data for every record in the set of records complies with the record-based access limit rule, where step 2318 is not performed. Step 2314 includes determining the query result for the query based on the result set. For example, the query result can include the result set. Alternatively, if the result set being evaluated is an intermediate result, the query result can be generated based on execution of remaining partial queries, such as at least one aggregation, upon this result set. Step 2316 includes transmitting the query result to the requesting entity.

The method does not perform steps 2314 and 2316 when the compliance data indicates the potential usage data for at least one record in the set of records does not comply with the record-based access limit rule, where the method continues from step 2312 to perform step 2318. Step 2318 includes foregoing transmission of the query result to the requesting entity. If the execution of the query is not complete, the method can further include foregoing completion of execution of the query, such as foregoing applying an aggregation function to the result set, when the compliance data indicates the potential usage data for at least one record in the set of records does not comply with the record-based access limit rule.

For example, the result set is not transmitted and/or is not generated via further execution of the query unless the generated compliance data for the query and/or result set indicates the query and/or result set complies with every rule in the set of query rules and/or that the result set complies with every one of a proper subset of rules in the set of query rules that were determined to be applicable based on one or more corresponding query parameters. If at least one rule in the set of rules, such as the record-based access limit rule, is determined not to be complied with by the query and/or result set of the query, the result set for the query is not transmitted to the end user and/or is not further processed to generate the final query result. In some cases, the method includes generating an error message for transmission to the requesting entity in response to the compliance data indicating non-compliance with the record-based access limit rule.

Alternatively, if the method of FIG. 23 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

When the compliance data indicates the potential usage data for every record in the set of records complies with the record-based access limit rule, the method can further include generating a new entry to be sent to the query logging system 450. The new entry can indicate result set data of the query and/or query data for the query. Alternatively or in addition, the method can further include updating locally stored previous record usage data for some or all records in the set of records for the requesting entity in response to transmitting the query result, for example, where the previous record usage totals is incremented by one if the previous record usage data corresponds to a total number of usages of the record and/or where the a set of fields and/or set of records with matching records indicated by the previous record usage totals are updated based on the result set. In particular, the locally stored previous record usage data for some or all records can be updated as the potential record usage data for the some or all records determined in step 2310, as the potential record usage data for each record becomes the new previous record usage data for the corresponding record when the query is executed and/or when the query result is transmitted to the requesting entity.

The method can further include receiving another query from the requesting entity, after executing the query and transmitting the query result. The method can further include determining second previous record usage data for records in the result set generated based on the other query, for the requesting entity, in response to receiving the other query. The second previous record usage data can be different from the previous record usage data determined in step 2308 as a result of the query being executed and/or the query result being transmitted to the requesting entity. For example, the locally previous record usage data for the requesting entity can be utilized and/or the query logging system 450 can be queried, where a response from the query logging system 450 indicated the new entry and/or is based on the new entry.

Similarly, when the compliance data indicates the potential record usage data for at least one record does not comply with the record-based access limit rule, the method can further include foregoing updating of the locally stored previous record usage data for the requesting entity and/or can further include forgoing generating of a new entry for the query based on the query result not being transmitted to the requesting entity. Alternatively, a new entry for the query can be generated and transmitted to the query logging system 450, where the new entry indicates the result set of the query result was not sent to the requesting entity. This new entry can further indicate whether the query was executed to generate the compliance data, and the entry can further include result set data for the query indicating the result set generated in step 2306, even when none of the result set data was transmitted in a query result to the requesting entity.

In various embodiments, a first record-based access limit rule applies to users at a first subscription level and indicates a first maximum record usage total. A second record-based access limit rule applies to users at a second subscription level and indicates a second maximum record usage total. For example, the first maximum record usage total can be greater than the second maximum record usage total in response to the first subscription level being more favorable than the second subscription level.

A result set is generated for a first query received from a first requesting entity corresponding to a first end user at the first subscription level. A second result set is generated for a same or different second query received from a second requesting entity corresponding to a second end user at the second subscription level. The first result set and the second result set both include a same record. First potential record usage data is generated for a record, indicating a first potential number of usages of the record by the first end user. Second potential record usage data is generated for the record, indicating a second potential number of usages of the record by the first end user. For example, the first potential record usage total and second potential record usage total can each be less than the first maximum record usage total and can each be greater than the second maximum record usage total.

The first record-based access limit rule is determined to apply to the first result set, and the second record-based access limit rule is determined to not apply to the first result set, based on determining the first query was received from a requesting entity at the first subscription level. Compliance data for the record in the first result set indicates the first potential record usage total complies with the first record-based access limit rule based on the first end user being determined to be subscribed to the first subscription level and further based on first potential record usage total not exceeding the first maximum record usage total.

The second temporal access limit rule determined to apply to the second result set, and the first record-based access limit rule is determined to not apply to the second result set, based on determining the second query was received from a requesting entity at the second subscription level. Compliance data for the record in the second result set indicates the second potential record usage total does not comply with the second record-based access limit rule based on the second end user being determined to be subscribed to the second subscription level and further based on the second potential record usage total exceeding the second maximum record usage total.

In various embodiments, the result set includes a first record and a second record, where the first record was supplied by a first data provider and where the second record was supplied by a second data provider. The set of rules can include a first record-based access limit rule corresponding to data supplied by the first data provider and a second record-based access limit rule corresponding to data supplied by the second data provider. The first record-based access limit rule and the second record-based access limit rule be different. A first potential usage total is generated for the first record and the requesting entity, and the second potential usage total is generated for the second record and the requesting entity. Compliance data for the first record is generated based on determining whether the first potential usage record total complies with the first record-based access limit rule based on determining the first record was supplied by the first data provider. Compliance data for the second record is generated based on determining whether the second potential usage record total complies with the second record-based access limit rule based on determining the second record was supplied by the second data provider. In some cases, the first record-based access limit rule is not applied to the second record and/or is determined to be complied with by the second record in response to the second record was not supplied by the first data provider. In some cases, the second record-based access limit rule is not applied to the first record and/or is determined to be complied with by the first record in response to determining the first record was not supplied by the second data provider.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a record-based access limit rule, receive a query from a requesting entity, and determine a result set of the query based on facilitating execution of at least one query function indicated in the query against a database system, where the result set indicates a set of records. The execution of the operational instructions by the processing module further causes the query processing system 114 to determine previous record usage data for each record in the set of records based on at least one previous result set generated in accordance with execution of at least one previous query received from the requesting entity, to determine potential usage data, for the each record in the set of records, that would result from transmitting a query result of the query to the requesting entity, based on the previous record usage data and the result set, and/or to generate compliance data by determining whether the potential usage data for each record in the set of records compares favorably to the record-based access limit rule. The execution of the operational instructions by the processing module further causes the query processing system 114 to determine the query result for the query based on the result set and/or transmit the query result to the requesting entity when the compliance data indicates the potential usage data for every record in the set of records complies with the record-based access limit rule. The execution of the operational instructions by the processing module further causes the query processing system 114 to forego transmission of the query result to the requesting entity when the compliance data indicates the potential usage data for at least one record in the set of records does not comply with the record-based access limit rule, and/or the processing module otherwise does not further process the query when the compliance data indicates the potential usage data for at least one record in the set of records does not comply with the record-based access limit rule.

In various embodiments, a non-transitory computer readable storage medium includes at least one memory section that stores operational instructions that, when executed by a processing module that includes a processor and a memory, causes the processing module to determine a set of query rules that includes a record-based access limit rule, receive a query from a requesting entity, and determine a result set of the query based on facilitating execution of at least one query function indicated in the query against a database system, where the result set indicates a set of records. The execution of the operational instructions by the processing module further causes the processing module to determine previous record usage data for each record in the set of records based on at least one previous result set generated in accordance with execution of at least one previous query received from the requesting entity, to determine potential usage data, for the each record in the set of records, that would result from transmitting a query result of the query to the requesting entity, based on the previous record usage data and the result set, and/or to generate compliance data by determining whether the potential usage data for each record in the set of records compares favorably to the record-based access limit rule. The execution of the operational instructions by the processing module further causes the processing module to determine the query result for the query based on the result set and/or transmit the query result to the requesting entity when the compliance data indicates the potential usage data for every record in the set of records complies with the record-based access limit rule. The execution of the operational instructions by the processing module further causes the processing module to forego transmission of the query result to the requesting entity when the compliance data indicates the potential usage data for at least one record in the set of records does not comply with the record-based access limit rule, and/or the processing module otherwise does not further process the query when the compliance data indicates the potential usage data for at least one record in the set of records does not comply with the record-based access limit rule.

Figure 24:
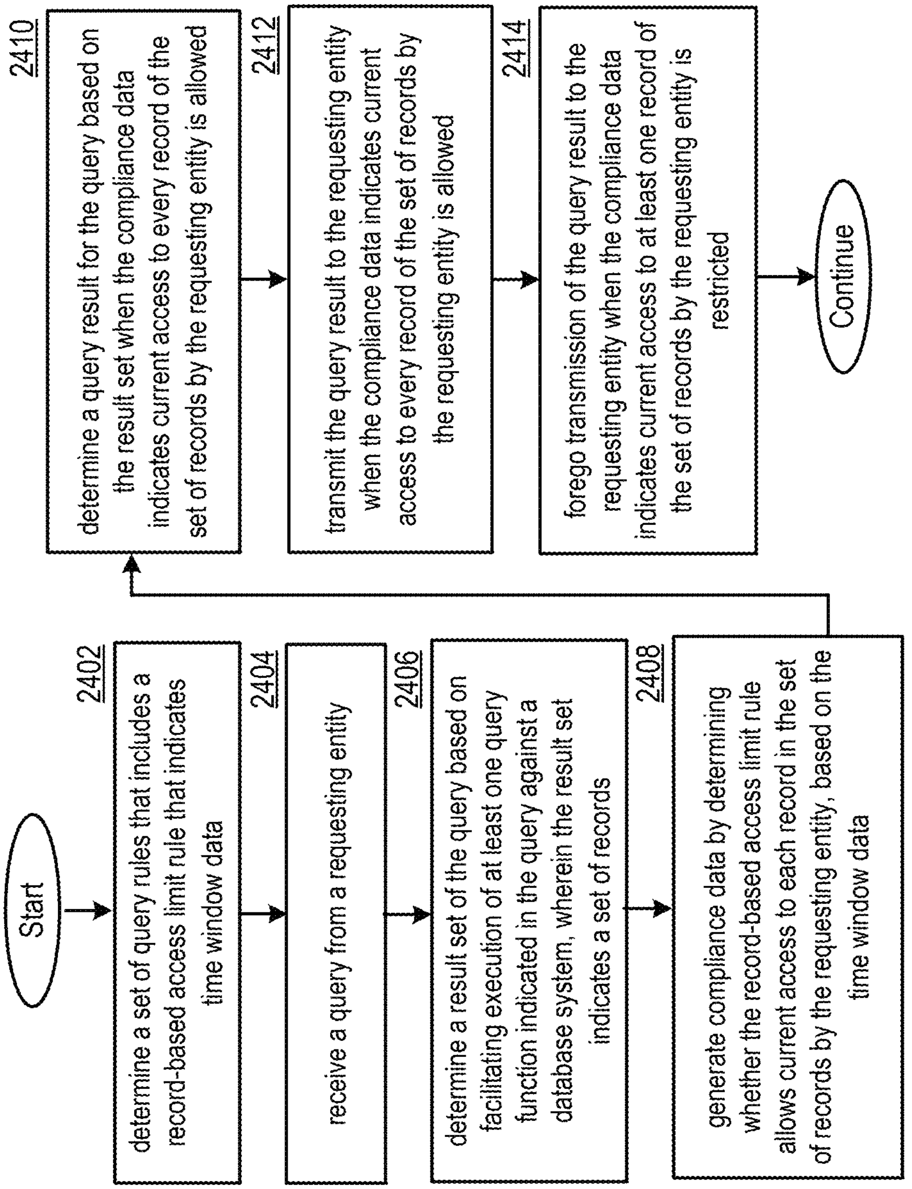
FIG. 24 is a logic diagram illustrating an example of a method of enforcing a record-based access limit rule that indicates time window data.

FIG. 24 presents a method for execution by a record-based access limits compliance module 1520, by a pre-execution compliance module 610, by a runtime compliance module 625, by a query processing system 114, and/or for execution by another processing module of the analytics system 110 that executes executable instructions stored via a memory module. For example, the method of FIG. 24 can be performed by the record-based access limits compliance module 1520 as discussed in conjunction with FIGS. 15A-15D and/or in conjunction with other functionality of the record-based access limits compliance module 1520 discussed herein.

Step 2402 includes determining a set of query rules that includes determining a set of query rules that includes a record-based access limit rule. The set of query rules can include one or more provider rulesets received from one or more provider devices 230, and/or one or more rules in the set of query rules can be configured via user input to GUI 245. The record-based access limit rule can be a rule 1515 of the record-based access limits ruleset 572. The set of query rules can include multiple rules 1515 of the record-based access limits ruleset 572.

The record-based access limit rule can indicate time window data, utilized to indicate whether given records can currently be utilized by and/or returned to the requesting entity. The time window data can indicate a length of a time window and/or a start and/or end point of a time window. For example, the time window can correspond to time period for a corresponding user subscription. The time window data can further include a deterministic function or other information regarding how to determine the length and/or end point of the corresponding time window for a record, given the record. For example, the deterministic function can be a function of the age of the record, where the time window data indicates a record is only available for a period of time as a function of the age. The deterministic function can further be a function of previous usage of the record, for example, where the time window data indicates a record is only available to a requesting entity for a fixed period of time after its first access by the requesting entity. The time window data can further indicate a maximum number of times a same record can be returned in a query result, within the time window, and/or other maximum usage requirements for usage of a same record, within the time window.

The record-based access limit rule can indicate that query results cannot be transmitted to the requesting entity for queries that do not comply with the record-based access limit rule. In some cases, the record-based access limit rule can indicate that the rule applies to end users at a particular subscription level and/or to records supplied by a particular provider. In some cases, the record-based access limit rule can indicate that the rule applies only to records that meet particular record criteria, such as records of a particular type, records that include a particular field, and/or records that fall within a particular age range. In some cases, the record-based access limit rule can indicate that the rule applies when the query result contains a value of, and/or contains an aggregation performed upon, a particular field, at least a particular number of fields, and/or a particular grouping of multiple fields. In some cases, the record-based access limit rule can indicate that the rule applies to queries that include performance of a particular function such as a particular aggregation function on the records to which the record-based access limit rule applies.

Step 2404 includes receiving a query from a requesting entity. For example, the requesting entity can generate and/or relay a query request that includes the query, where the query request is generated via a user device 140 based on user input to GUI 345 by an end user. Step 2406 includes determining a result set of the query based on facilitating execution of at least one query function indicated in the query against a database system. The result set can indicate a set of records. The result set can correspond to a final result of the query and/or an intermediate result of the query, for example, where completion of the query involves performing an aggregation on the set of records.

Step 2408 generating compliance data by generating compliance data by determining whether the record-based access limit rule allows current access to each record in the set of records by the requesting entity, based on the time window data. This can include determining a time window for each record, as indicated by time window data. For example, time window for each record can be determined as a function of the record's age, the user's subscription level, the provider that supplied the record, previous usage determined for the record, the fields of the record being utilized, the type of function being performed on the record, and/or other information. Different records in this same result set can have different time windows for example, based on having different ages, having previous usages by the requesting entity, different providers, and/or otherwise different record criteria. The method can include determining current time, which can be based on time the query was generated and/or received, and/or a time the query is scheduled for execution, given compliance is achieved.

In particular, the compliance data can be generated for each record by determining whether the current time compares falls within and/or otherwise compares favorably to the time window determined for each record in the set of records, where the compliance data indicates that current access to a given record by the requesting entity is allowed only when the determined current time falls within the time window determined for the given record. The compliance data can indicate current access to at least one record of the set of records by the requesting entity is restricted when the determined current time falls outside the time window determined for the given record. In some cases, the compliance data indicates compliance with the record-based access limit rule only when the compliance data indicates current access to every record of the set of records by the requesting entity is allowed.

In some embodiments, generating the compliance data includes determining one or more parameters for the received query and/or the result set, and further includes filtering the set of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data for the record-based access limit rule is generated by determining the result set and/or the potential record usage data only when the temporal access limit rule is determined to apply to the query and/or the result set. In some embodiments, the compliance data for the record-based access limit rule is generated to indicate compliance, without determining the determining the result set and/or the potential record usage data, when the record-based access limit rule is determined not to apply to the query and/or result set.

In some embodiments, generating the compliance data includes comparing each record in the result set to the record criteria of the record-based access limit rule. In some cases, the compliance data for a particular record in the result set is generated by comparing the current time to its time window only when the particular record is determined to compare favorably to the record criteria. In some embodiments, the compliance data for a particular record is generated to indicate compliance with the record-based access limit rule, without determining its time window or comparing the current time to its time window, when the particular record is determined to compare unfavorably to the record criteria. For example, time windows are only determined and evaluated for a proper subset of records in the result set that are determined to compare favorably to the record criteria. In such cases, the compliance data indicates compliance with the record-based access limit rule when the compliance data indicates current access to every record of this proper subset of records by the requesting entity is allowed.

The method performs steps 2410 and 2412 when the compliance data indicates current access to every record of the set of records by the requesting entity is allowed, where step 2414 is not performed. Step 2410 includes determining the query result for the query based on the result set. For example, the query result can include the result set. Alternatively, if the result set being evaluated is an intermediate result, the query result can be generated based on execution of remaining partial queries, such as at least one aggregation, upon this result set. Step 2412 includes transmitting the query result to the requesting entity.

The method does not perform steps 2410 and 2412 when the compliance data indicates current access to at least one record of the set of records by the requesting entity is restricted, where the method continues from step 2408 to perform step 2414. Step 2414 includes foregoing transmission of the query result to the requesting entity. If the execution of the query is not complete, the method can further include foregoing completion of execution of the query, such as foregoing applying an aggregation function to the result set, when the compliance data indicates the potential usage data for at least one record in the set of records does not comply with the record-based access limit rule.

For example, the result set is not transmitted and/or is not generated via further execution of the query unless the generated compliance data for the query and/or result set indicates the query and/or result set complies with every rule in the set of query rules and/or that the result set complies with every one of a proper subset of rules in the set of query rules that were determined to be applicable based on one or more corresponding query parameters. If at least one rule in the set of rules, such as the record-based access limit rule, is determined not to be complied with by the query and/or result set of the query, the result set for the query is not transmitted to the end user and/or is not further processed to generate the final query result. In some cases, the method includes generating an error message for transmission to the requesting entity in response to the compliance data indicating non-compliance with the record-based access limit rule.

Alternatively, if the method of FIG. 24 is implemented by a user device 140 as discussed in conjunction with FIGS. 7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

In various embodiments, the time window for a requesting entity is determined as a function of record usage by the requesting entity. The start of the time window can be determined as a function of the timestamp of the first usage of the record by the requesting entity and/or a most recent usage of the record by the requesting entity. This information can be determined based on querying the query logging system 450 and/or can be locally tracked. For example, this information can be generated as previous record usage data as discussed in conjunction with step 2308. The start of the time window can be set to the timestamp of the first access and/or most recent access. For example, a record is available for a fixed total amount of time indicated by a predetermined length of the time window in the time window data, starting from its first access by the requesting entity.

In various embodiments, the result set includes a first record and a second record, where the first record has a first timestamp of first access by the requesting entity that is more recent than a second timestamp of first access by the requesting entity for the second record. The time windows determined for the first and second record based on the time window data of the record-based access limit rule can be based on applying the same fixed time window length to the first and second record, starting from their first timestamp of first access and second timestamp of first access, respectively. The current time can fall within the time window of the first record, but falls outside the time window of the second record, as a result of first timestamp of first access by the requesting entity being more recent than the second timestamp of first access. The compliance data can indicate record-based access limit rule allows current access to the first record by the requesting entity, but denies current access to the second record by the requesting entity, based on the current time falling within the time window of the first record and falling outside the time window of the second record.

In various embodiments, the time window is determined as a function of record age. The start of the time window can be determined as a function of the age timestamp of the record. For example, the age timestamp can correspond to a time the data was collected by a data collection device and/or the time the record was added to the database system. For example, the start of the time window can be determined as the age timestamp of the record, where the time window begins with the record being added to the database system. As another example, the time window beings at a start time determined by adding a predefined offset indicated in the time window data to the timestamp of the record, where the record is not available until the predefined offset from its age timestamp has elapsed. The length of the time window can be fixed and/or can be a function of the age of the record, for example, where older records are available for a shorter and/or longer length of time than newer records.

In various embodiments, the result set includes a first record and a second record, where the first record has a first age timestamp that is older than a second age timestamp of the second record. The time windows determined for the first and second record based on the time window data of the record-based access limit rule can be based on applying the same fixed time window length to the first and second record, starting from a predetermined offset added to their respective age timestamps. The current time can fall within the time window of the first record, but falls outside the time window of the second record, as a result of the first age timestamp being older the second age timestamp, and further as a result of the current time being after the start of the first time window but before the start of the second time window based on the predetermined offset. The compliance data can indicate record-based access limit rule allows current access to the first record by the requesting entity, but denies current access to the second record by the requesting entity, based on the current time falling within the time window of the first record and falling outside the time window of the second record.

In various embodiments, the length of the time window is determined as a function of at least one of: the type of record being utilized and/or the set of fields of the record being utilized. For example, different types of records and/or different sets of fields can be determined to have different values and/or different demand by end users.

The length of the time window assigned to a record can be a function of value and/or demand of the record. The length of the time window assigned to a record can be a function of value and/or demand of which record type the record is determined to correspond to in a set of record types, where the length of the time window for a first record is longer than the length of the time window for a second record in response to the first record having a record type that is of lower value and/or lower demand than the type of the second record.

The length of the time window assigned to a record can be a function of value and/or demand of the fields being returned and/or accessed. The length of the time window assigned to a record can be a function of value and/or demand of individual fields and/or groupings of fields included in the result set for the record, where the length of the time window for a first record in a first result set is longer than the length of the time window for a second record in a second result set in response to the first records in the first result set having an individual field and/or grouping of fields that is less valuable and/or lower demand than an individual field and/or grouping of fields for the second record in the second result set.

In various embodiments, a first record-based access limit rule applies to users at a first subscription level and indicates a first time window length. A second record-based access limit rule applies to users at a second subscription level and indicates a second first time window length. For example, the first time window length can be greater than the second time window length in response to the first subscription level being more favorable than the second subscription level.

A result set is generated for a first query received from a first requesting entity corresponding to a first end user at the first subscription level. A second result set is generated for a same or different second query received from a second requesting entity corresponding to a second end user at the second subscription level. The first result set and the second result set both include a same record. A first time window with the first time window length is generated for the record in the first result set based on the first end user having the first subscription level. A second time window with the second time window length is generated for the record in the second result set based on the second end user having the second subscription level. The first time window and the second time window can have a same start time. Compliance data for the record in the first result set indicates current access to the record is allowed by the first requesting entity. Compliance data for the record in the second result set indicates current access to the record is not allowed by the second requesting entity. For example, the first requesting entity is allowed access to the record and the second requesting entity is not allowed access to the record based on the length of the first time window being long enough to include the current time, but the length of the second time window not being long enough to include the current time.

The second record-based access limit rule is determined to apply to the second result set, and the first record-based access limit rule is determined to not apply to the second result set, based on determining the second query was received from a requesting entity at the second subscription level. The first record-based access limit rule is determined to apply to the first result set, and the second record-based access limit rule is determined to not apply to the first result set, based on determining the first query was received from a requesting entity at the first subscription level.

In various embodiments, the result set includes a first record and a second record, where the first record was supplied by a first data provider and where the second record was supplied by a second data provider. The set of rules can include a first record-based access limit rule corresponding to data supplied by the first data provider and a second record-based access limit rule corresponding to data supplied by the second data provider. The first record-based access limit rule and the second record-based access limit rule can indicate different time window data. A first time window is generated for the first record based on the time window data indicated by the first record-based access limit rule. A second time window is generated for the second record based on the time window data indicated by the second record-based access limit rule. Compliance data for the first record is generated based on determining whether the current time falls within the first time window. Compliance data for the second record is generated based on determining whether the current time falls within the second time window.

In some cases, the first record-based access limit rule is not applied to the second record and/or is determined to be complied with by the second record in response to the second record was not supplied by the first data provider. In some cases, the second record-based access limit rule is not applied to the first record and/or is determined to be complied with by the first record in response to determining the first record was not supplied by the second data provider.

In various embodiments, a query processing system 114 includes a memory module that includes at least one memory and a processing module that includes at least one processor. The memory module stores operational instructions that, when executed by a processing module of the query processing system 114, cause the query processing system 114 to determine a set of query rules that includes a record-based access limit rule, receive a query from a requesting entity, and/or determine a result set of the query based on facilitating execution of at least one query function indicated in the query against a database system, where the result set indicates a set of records. The execution of the operational instructions by the processing module further causes the query processing system 114 to generating compliance data by determining whether the record-based access limit rule allows current access to each record in the set of records by the requesting entity, based on the time window data. The execution of the operational instructions by the processing module further causes the query processing system 114 to determine a query result for the query based on the result set and/or transmit the query result to the requesting entity when the compliance data indicates current access to every record of the set of records by the requesting entity is allowed. The execution of the operational instructions by the processing module further causes the query processing system 114 to forego transmission of the query result to the requesting entity when the compliance data indicates current access to at least one record of the set of records by the requesting entity is restricted, and/or the processing module otherwise does not further process the query when the compliance data indicates current access to at least one record of the set of records by the requesting entity is restricted.

In various embodiments, a non-transitory computer readable storage medium includes at least one memory section that stores operational instructions that, when executed by a processing module that includes a processor and a memory, causes the processing module to determine a set of query rules that includes a record-based access limit rule, receive a query from a requesting entity, and/or determine a result set of the query based on facilitating execution of at least one query function indicated in the query against a database system, where the result set indicates a set of records. The execution of the operational instructions by the processing module further causes the processing module to generating compliance data by determining whether the record-based access limit rule allows current access to each record in the set of records by the requesting entity, based on the time window data. The execution of the operational instructions by the processing module further causes the processing module to determine a query result for the query based on the result set and/or transmit the query result to the requesting entity when the compliance data indicates current access to every record of the set of records by the requesting entity is allowed. The execution of the operational instructions by the processing module further causes the processing module to forego transmission of the query result to the requesting entity when the compliance data indicates current access to at least one record of the set of records by the requesting entity is restricted, and/or the processing module otherwise does not further process the query when the compliance data indicates current access to at least one record of the set of records by the requesting entity is restricted.

Figure 25:
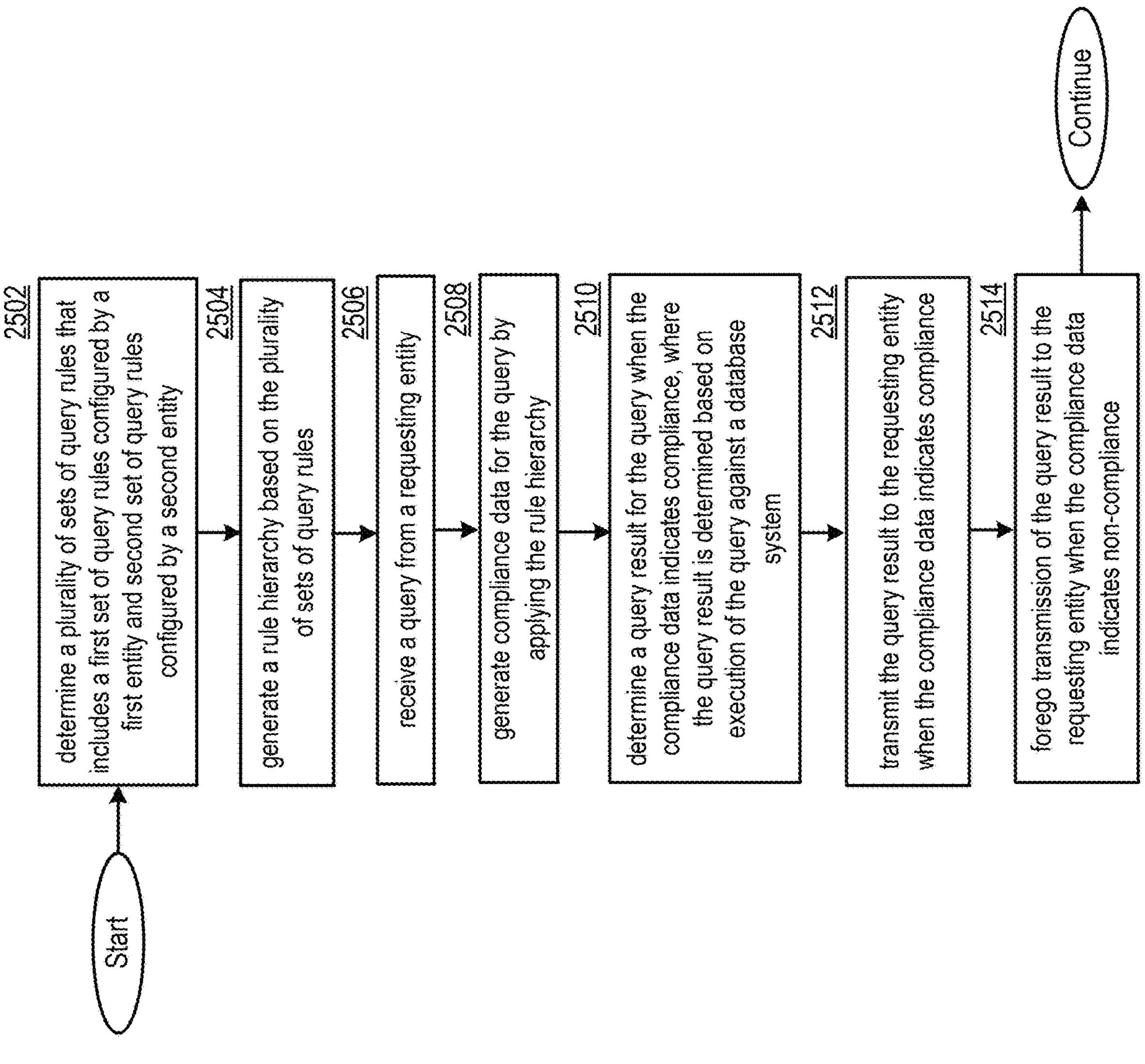
FIG. 25 is a logic diagram illustrating an example of a method of enforcing a set of rules by applying a rule hierarchy.

FIG. 25 presents a method for execution by a query processing system 114, by a pre-execution compliance module 610, by a runtime compliance module 625, and/or for execution by another processing module of the analytics system 110 that executes executable instructions stored via a memory module. For example, the method of FIG. 25 can be performed by the query processing system 114 as discussed in conjunction with FIGS. 16A-16F and/or in conjunction with other functionality of the query processing system 114 discussed herein. Some or all of the steps involved in application of individual compliance modules as illustrated in FIGS. 19-24, for example, to generate compliance data, can be utilized by the method of FIG. 25.

Step 2502 includes determining a plurality of sets of query rules. The plurality of sets of query rules can collectively include a plurality of rules to be applied to incoming queries. Each set of query rules can be generated by and/or received from a different entity. In particular, the plurality of sets of query rules can include a first set of query rules configured by a first entity and second set of query rules configured by a second entity. For example, the first entity and/or the second entity can correspond to data providers. Alternatively or in addition, the first entity and/or the second entity can correspond to regulatory entities and/or administrators of the analytics system 110. For example, the first entity and the second entity can include one data provider and one regulatory entity. Some or all sets of query rules can correspond to a provider ruleset received from one or more provider devices 230, and/or one or more rules in a set of query rules can be configured via user input to GUI 245.

Step 2504 includes generating a rule hierarchy based on plurality of sets of query rules. Generating the rule hierarchy can include determining an optimal ordering for applying rules in each set of query rules and/or determining an optimal ordering for applying all rules in the plurality of sets of query rules. Generating the rule hierarchy can include combining two or more rules. Generating the rule hierarchy can include amending and/or removing at least one rule.

Generating the rule hierarchy can include determining an ordering in which the rules in the plurality of sets of rules should be applied. This can include determining an ordering of the likelihood that each rule will lead to non-compliance, where rules with higher likelihoods of non-compliance are applied first. The likelihoods of non-compliance can be determined based on evaluating previous compliance data, for example, based on accessing and evaluating restriction compliance data of entries 455 of the query logging system 450 to determine which rules were not-complied with most often. This ordering can further be generated differently for different requesting entities, for example, based on determining which particular rules each requesting entity historically did not adhere to more frequently in previous queries. The ordering generated for a particular requesting entity can be applied for incoming queries received from the particular requesting entity.

Generating the rule hierarchy can be based on determining a first set of possible conditions for non-compliance indicated by a first rule of the first set of query rules includes the entirety of a second set of possible non-compliant conditions indicated by a second rule in the second set of query rules as a proper subset of the first set of possible conditions for non-compliance. Generating the rule hierarchy can include indicating that if the first rule is determined to be complied with, compliance with the second rule can automatically be determined without separate evaluation of the second rule. In such cases, the ordering can be generated to indicate that the first rule can be applied first, where the second rule is only applied when compliance data for the first rule indicates non-compliance. In this case, application of second rule could also indicate non-compliance, or could also indicate compliance if the first rule is complied with, and thus still needs to be applied if the first rule is determined to be complied with.

Alternatively, generating the rule hierarchy can include indicating that if the second rule is determined to be not-complied with, non-compliance with the first rule can automatically be determined without separate evaluation of the first rule. In such cases, the ordering can be generated to indicate that the second rule can be applied first, where the first rule is only applied when compliance data for the second rule indicates compliance. In this case, application of first rule could also indicate compliance, or could also indicate non-compliance if the first rule is complied with, and thus still needs to be applied if the first rule is determined to be complied with.

Generating the rule hierarchy can include determining whether non-compliance with the second rule is more likely than compliance with the first rule. This determination can be based on previous usage data retrieved from the query logging system 450 and/or can be based on information received, for example, from a provider device 230. When non-compliance with the second rule is determined to be more likely than compliance with the first rule, the rule hierarchy can indicate application of the second rule first, as the more-likely case of non-compliance would be automatically determined for both rules. When non-compliance with the second rule is determined to be less likely than compliance with the first rule, the rule hierarchy can indicate application of the first rule first, as the more-likely case of compliance would be automatically determined for both rules.

Alternatively, generating the rule hierarchy can include combining the first rule and the second rule in response to determining the first set of possible conditions for non-compliance indicated by the first rule includes the entirety of the second set of possible non-compliant conditions indicated by the second rule. The compliance data can be automatically generated to indicate whether one or both rules is complied with or not-complied with. In particular, the set difference between the first set of possible conditions for non-compliance indicated by the first rule and the second set of possible non-compliant conditions indicated by the second rule can be determined as a difference set. Thus, the difference set and the second set of possible non-compliant conditions are mutually exclusive and collectively exhaustive with regards to the first set of possible non-compliant conditions. Applying the rule combination can include determining whether any conditions in the first set of possible non-compliant conditions are met. If so, non-compliance is determined for the rule combination. Furthermore, applying the rule can further include, when non-compliance is determined, determining whether these determined conditions for non-compliance with the first rule intersect with the second set of possible non-compliant conditions, or both. The compliance data can be generated to indicate whether or not the second set is non-complied with, and thus can indicate compliance data for both the first rule and second rule.

Generating the rule hierarchy can be based on determining that a condition required for compliance indicated by a first rule of the first set of query rules is included in a set of possible conditions for non-compliance indicated by a second rule of the second set of query rules. Generating the rule hierarchy can further include determining the second rule supersedes the first rule based on determining conditions for non-compliance supersede conditions for compliance. Alternatively or in addition, the second rule can be determined to supersede the first rule based on determining the second entity supersedes the first entity in an ordering of a plurality of entities that generated the plurality of sets of query rules. The first rule can be removed in response to determining the second rule supersedes the first rule. Alternatively, the first rule can be amended in response to determining the second rule supersedes the first rule, where an amended first rule is generated based on the set of possible conditions for non-compliance indicated by a second rule. In particular, the amended first rule is generated to include no conditions required for compliance that are included in the set of possible conditions for non-compliance indicated by the second rule, for example, by removing any conditions required for compliance that intersect with the set of possible conditions for non-compliance indicated by the second rule.

Conversely, generating the rule hierarchy can further include be determining the first rule supersedes the first rule based on determining the conditions for compliance supersede the conditions for non-compliance. Alternatively or in addition, the first rule can be determined to supersede the second rule based on determining the first entity supersedes the second entity in the ordering of the plurality of entities that generated the plurality of sets of query rules. The second rule can be removed in response to determining the first rule supersedes the second rule.

Alternatively, the second rule can be amended in response to determining the first rule supersedes the second rule, where an amended second rule is generated in response to determining that every condition for compliance indicated by the first rule is also included in the set of possible conditions for non-compliance for the second rule. In particular, the amended second rule is generated to include possible conditions for non-compliance that are required conditions for compliance by the first rule, for example, by removing conditions from the set of possible conditions for non-compliance from the second rule that intersect with the conditions required for compliance indicated by the first rule.

Generating the rule hierarchy can be based on determining a first subset rules in the plurality of sets of query rules that can be evaluated for compliance prior to execution of a query and determining a second subset of rules in the plurality of sets of query rules that can be evaluated for after execution of a query is commenced. For example, generating the rule hierarchy can include determining the pre-execution ruleset for implementation by a pre-execution compliance module 610, and determining the runtime ruleset for implementation by a runtime compliance module 625. The first subset of rules can include a first at least one rule from the first set of query rules and at least one rule from the second set of query rules. The second subset of rules can include a second at least one rule from the first set of query rules and a second at least one rule from the second set of query rules. The first subset of rules and the second subset of rules can be mutually exclusive and collectively exhaustive with respect to the rules in the plurality of sets of query rules.

Step 2506 includes receiving a query from a requesting entity. For example, the requesting entity can generate and/or relay a query request that includes the query, where the query request is generated via a user device 140 based on user input to GUI 345 by an end user. Step 2508 includes generating compliance data for the query by applying the rule hierarchy. For example, the ordering of rules of the application of rules as indicated by the rule hierarchy can be applied, and/or any amended rules of the rule hierarchy can be applied. In some cases, some or all of the query is executed by executing at least one query function of the query against a database system to determine an intermediate and/or final result set. In such cases, some or all of the rules can be applied to the result set in addition to and/or instead of the query, for example, as indicated by the rule hierarchy.

In some embodiments, generating the compliance data includes determining one or more parameters for the received query and/or the result set, and further includes filtering the rules in the plurality of sets of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data is generated by applying a rule only when the rule determined to apply to the query and/or the result set. In some embodiments, the compliance data is generated to indicate compliance for a rule, applying the rule, when rule is determined not to apply to the query and/or result set.

The method performs steps 2510 and 2512 when the compliance data indicates compliance, where step 2514 is not performed. Step 2510 includes determining the query result for the query, based on execution of the query against a database system. For example, the query result can include a result set already generated in executing the query to generate the compliance data. Alternatively, if a result set evaluated was an intermediate result, the query result can be generated based on execution of remaining partial queries, such as at least one aggregation, upon this result set. Step 2512 includes transmitting the query result to the requesting entity.

The method does not perform steps 2510 and 2512 when the compliance data indicates non-compliance, where the method continues from step 2508 to perform step 2514. Step 2514 includes foregoing transmission of the query result to the requesting entity. If the execution of the query is not complete, the method can further include foregoing completion of execution of the query, such as foregoing applying an aggregation function to a result set, when the compliance data indicates non-compliance.

For example, the result set is not transmitted and/or is not generated via further execution of the query unless the generated compliance data for the query and/or result set indicates the query and/or result set complies with every rule in the set of query rules and/or that the result set complies with every one of a proper subset of rules in the set of query rules that were determined to be applicable based on one or more corresponding query parameters. If at least one rule in the set of rules is determined not to be complied with by the query and/or result set of the query, the result set for the query is not transmitted to the end user and/or is not further processed to generate the final query result. In some cases, the method includes generating an error message for transmission to the requesting entity in response to the compliance data indicating non-compliance with one or more rules.

In some cases, as soon as one rule in the ordering of rules indicates non-compliance, the compliance data is generated to indicate non-compliance, and generation of compliance data for a set of remaining of rules that have not yet been applied is foregone. Thus, an entire set of N rules to be checked for compliance are only applied if the first N−1 rules applied indicate compliance.

Alternatively, if the method of FIG. 25 is implemented by a user device 140 as discussed in conjunction with FIGS.

7A-7E, the method can alternatively include transmitting the query to the analytics system 110 for execution, where the query is only transmitted when compliance data for the query indicates the query complies with every rule in the set of query rules and/or that the query complies with every one of a proper subset of rules in the set of query rules that were determined to be applicable based on the one or more corresponding query parameters. A query response is received from the analytics system 110 in response, based on the execution of the query. The query response can be displayed to the end user via GUI 345.

In various embodiments, a query processing system 114 includes a memory module that includes at least one memory and a processing module that includes at least one processor. The memory module stores operational instructions that, when executed by a processing module of the query processing system 114, cause the query processing system 114 to determine a plurality of sets of query rules, to generate a rule hierarchy based on the plurality of sets of query rules, to receive a query from a requesting entity, and/or to generate compliance data for the query by applying the rule hierarchy. The execution of the operational instructions by the processing module further causes the query processing system 114 to determine a query result for the query based on execution of the query against a database system and/or to transmit the query result to the requesting entity when the compliance data indicates compliance. The execution of the operational instructions by the processing module further causes the query processing system 114 to forego transmission of the query result to the requesting entity when the compliance data indicates non-compliance, and/or the processing module otherwise does not further process the query when the compliance data indicates non-compliance.

In various embodiments, a non-transitory computer readable storage medium includes at least one memory section that stores operational instructions that, when executed by a processing module that includes a processor and a memory, causes the processing module to determine a plurality of sets of query rules, to generate a rule hierarchy based on the plurality of sets of query rules, to receive a query from a requesting entity, and/or to generate compliance data for the query by applying the rule hierarchy. The execution of the operational instructions by the processing module further causes the processing module to determine a query result for the query based on execution of the query against a database system and/or to transmit the query result to the requesting entity when the compliance data indicates compliance. The execution of the operational instructions by the processing module further causes the processing module to forego transmission of the query result to the requesting entity when the compliance data indicates non-compliance, and/or the processing module otherwise does not further process the query when the compliance data indicates non-compliance.

Figure 26:
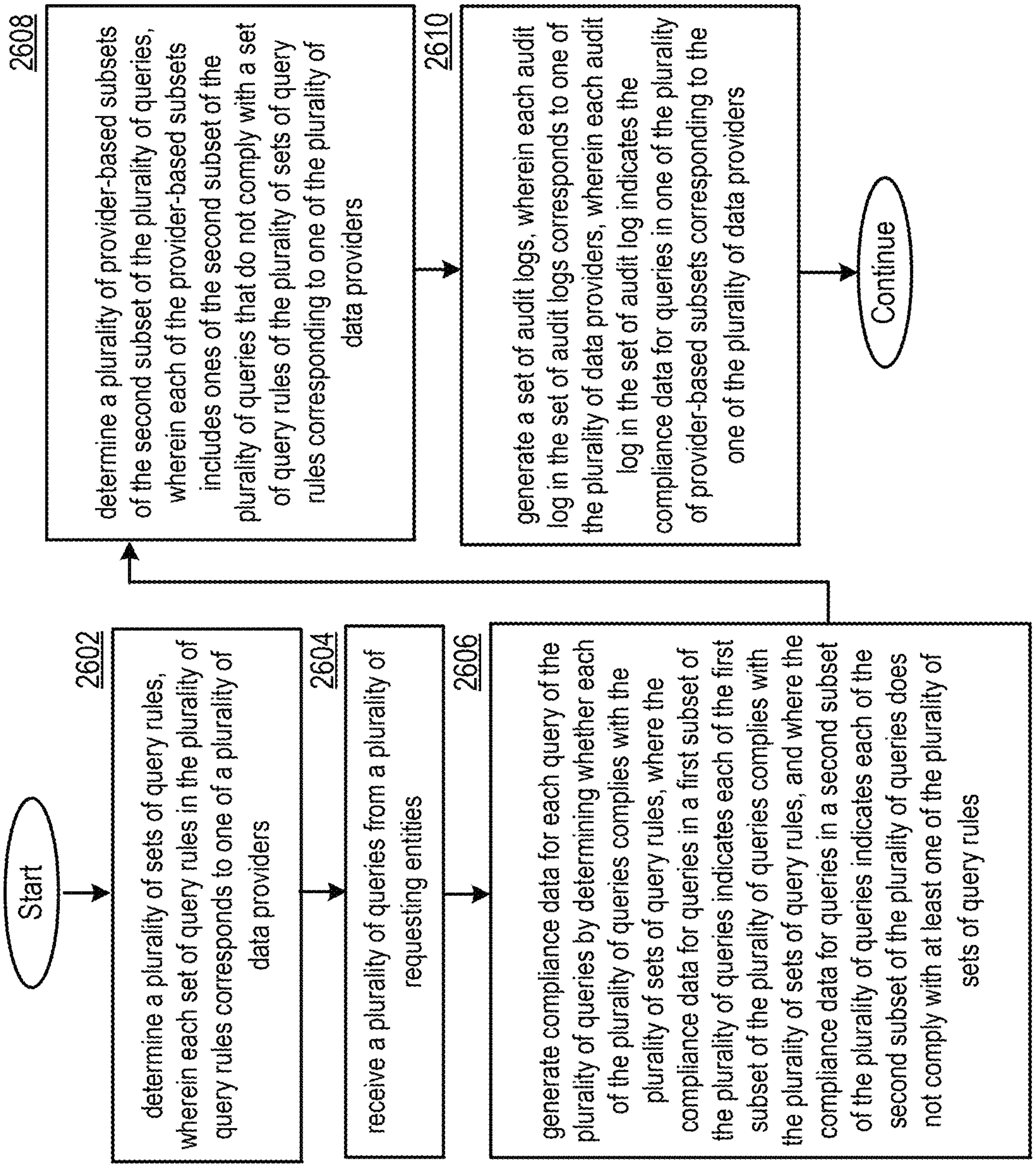
FIG. 26 is a logic diagram illustrating an example of a method of generating audit logs compliance data for a plurality of queries.

FIG. 26 presents a method for execution by an analytics system 110, a query processing system 114, an audit log generating system 460, and/or for execution by another processing module of the analytics system 110 that executes executable instructions stored via a memory module. For example, the method of FIG. 26 can be performed by the analytics system 110 via the audit log generating system 460 as discussed in FIG. 41 and/or via the query processing system 114 as discussed herein. In particular, steps 2602-2606 can be performed by utilizing the query processing system 114, and steps 2608-2610 can be performed by utilizing the audit log generating system 460.

Step 2602 includes determining a plurality of sets of query rules. The plurality of sets of query rules can collectively include a plurality of rules to be applied to incoming queries. Each set of query rules can be generated by and/or received from a different entity. In particular, each of the plurality of sets of query rules can correspond to one of a plurality of data providers. Some or all sets of query rules can correspond to a provider ruleset received from one or more provider devices 230, and/or one or more rules in a set of query rules can be configured via user input to GUI 245

Step 2604 includes receiving a plurality of queries from a plurality of requesting entities. For example, some or all of the plurality of requesting entities can generate and/or relay a query request that includes a corresponding one of the plurality of queries, where each query request is generated via a user device 140 based on user input to GUI 345 by an end user. Step 2606 includes generating compliance data for generating compliance data for each query of the plurality of queries by determining whether each of the plurality of queries complies with the plurality of sets of query rules. For example, the steps of FIGS. 19-24 regarding generating compliance data can be utilized to generate compliance data for different types of rules. In some cases, steps of FIG. 25 can be utilized to generate compliance data based on a rule hierarchy applied for the plurality of sets of rules.

Some of the plurality of queries can comply with all of the plurality of sets of rules, while others of the plurality of queries do not comply with at least one of the plurality of sets of rules. The compliance data for queries in a first subset of the plurality of queries can indicate each of the first subset of the plurality of queries complies with the plurality of sets of query rules. The compliance data for queries in a second subset of the plurality of queries can indicate each query of the second subset of the plurality of queries does not comply with at least one of the plurality of sets of query rules. The method can include determining this first and second subset based on the compliance data generated for each of the plurality of queries. In some cases, the method further includes transmitting query results generated based on execution of the queries to their respective requesting entities for queries in the first subset, and further includes foregoing transmission of query results for queries in the second subset.

In some embodiments, generating the compliance data includes determining one or more parameters for the received query and/or the result set, and further includes filtering the rules in the plurality of sets of query rules based on one determining a proper subset of the set of rules that apply to the received query and/or the result set based on determining whether one or more query parameters 556 of each rule in the set of query rules match or otherwise compare favorably these determined parameters for the received query and/or the result set. These query parameters can include the subscription level of an end user that generated the query, the provider that supplied records requested in the query, particular fields and/or functions indicated the query, whether the determined result set is being returned as the final result of the query, and/or one or more types of functions applied to the determined result set of the query. In some cases, the compliance data is generated by applying a rule only when the rule determined to apply to the query and/or the result set. In some embodiments, the compliance data is generated to indicate compliance for a rule, without applying the rule, when rule is determined not to apply to the query and/or result set.

In particular, the proper subset of rules can include only rules from a proper subset of sets in the plurality of sets of query rules that correspond to providers that supplied records utilized in the query, returned by the query, and/or otherwise applicable to the query. If a provider did not supply records involved in the query, their set of rules is not applied and thus is not included in the proper subset of sets.

The method can continue to step 2608, for example, where the audit log generating system 460 accesses and/or receives the compliance data for the plurality of queries generated by the query processing system 112 to perform step 2608. The audit log generating system can further determine the first subset and the second subset of the plurality of queries based on the compliance data to perform step 2608.

In some embodiments, the compliance data for each query is transmitted by the query processing system to a query logging system 450 in accordance with adding an entry 455 to a database usage log 454 for the query. In such cases, the audit log generating system can query the usage logging system for the compliance data of the entries corresponding to the plurality of queries and/or can otherwise receive the compliance data for the plurality of queries from the query logging system 450.

Step 2608 includes determining a plurality of provider-based subsets of the second subset of the plurality of queries, where each of the provider-based subsets includes ones of the second subset of the plurality of queries that do not comply with a set of query rules of the plurality of sets of query rules corresponding to one of the plurality of data providers.

The plurality of provider-based subsets can be mutually exclusive, for example, when the queries in the second subset each involve records supplied by only one of the plurality of providers. Alternatively, if a query involved records supplied by a set of providers that includes two or more of the plurality of providers, it can be included in two or more corresponding ones of the plurality of provider-based subsets. In some cases, the query that involved records supplied by the set of providers complied with all of the rules for a first subset of the set of providers, but did not comply with at least one rule for each provider in a second subset of the set of providers, where the first subset and the second subset are mutually exclusive and collectively exhaustive with regards to the set of providers. In these cases, the query is only included in the provider-based subsets for the second subset of the set of providers in response to determining that the query failed to comply with at least one rule of a corresponding set of rules for each provider of this second subset of the set of providers with records involved in the query, where the query is not included in the provider-based subsets for the first subset of the set of providers in response to determining that the query complies with all rule of the corresponding set of rules for each provider of the first subset of the set of providers involved in the query.

Step 2610 includes generating a set of audit logs, where each audit log in the set of audit logs corresponds to one of the plurality of data providers, and where each audit log in the set of audit log indicates the compliance data for queries in one of the plurality of provider-based subsets corresponding to the one of the plurality of data providers. The method can further include transmitting each audit log in the set of audit logs to one of a set of provider devices that is determined be associated with the corresponding one of the plurality of data providers. For example an audit log can be displayed by the provider device, having received the audit log, via a GUI 245.

In some cases, an audit log is generated for a provider in response to a request received from a provider device of the corresponding provider. In some cases, an audit log is generated for some or all providers in predefined time intervals based on only the compliance data for queries received and/or processed in the predetermined time interval.

The audit log for each particular data provider can indicate compliance data for every query in the provider-based subset. This can include an indication of which particular one or more rules in the set of query rules corresponding to the provider that the query failed to comply with, and/or can further indicate ones of the rules in the set of query rules a non-compliant query succeeded in complying with. The audit log can further include compliance summary data generated by processing the compliance data, for example, indicating rates of compliance and/or non-compliance for each particular rule in the set of query rules and/or overall rates of compliance and/or non-compliance. The compliance summary data can indicate an ordering of rules in the set of query rules based on their respective highest rates of compliance and/or non-compliance. The compliance summary data can group different types of queries, different subscription levels and/or types of requesting entities, and/or other differing parameters relating to the various queries, and can summarize compliance data separately for these various groupings.

The information provided in the audit log can be configured by the corresponding data provider, for example, based on receiving configuration data from the corresponding provider device 230, generated by the corresponding provider device 230 based on user input to GUI 245. This configuration can indicate which types of information is included in the audit log, such as whether and/or how the compliance data is summarized; a proper subset of rules of the set of query rules of the provider whose compliance data should be included in the audit log; the time span of queries that should be included; and/or how often audit logs for the corresponding data provider should be generated. This configuration data can further indicate other information regarding how the audit log should be formatted.

In such cases, a first audit log in the set of audit logs can include a first type of information and/or can be formatted in accordance with first formatting requirements, and a second audit log in the set of audit logs can include a second type of information and/or can be formatted in accordance with second formatting requirements. The first type of information can be different from the second type of information and/or the first formatting requirements can be different from the second formatting requirements. These differences can be based on different configurations received from provider devices of a first data provider corresponding to the first audit log and a second data provider corresponding to the second audit log.

In some embodiments, only compliance data of these generated provider-based subsets corresponding to a particular data provider is utilized to generate an audit log, where the audit log only includes information regarding queries that failed to comply with the set of query rules of the corresponding data provider. In other embodiments, compliance data of all queries that involved, returned, and/or accessed records supplied by the data provider are utilized to generate the audit log for this data provider. In such embodiments, the audit log for the data provider can indicate which queries were determined to comply with all of the set of query rules and/or which queries were determined to apply and/or or not apply to different ones of the set of query rules, alternatively or in addition to indicating queries that did not comply with at least one of the set of query rules.

In some embodiments, the audit log for each particular data provider only indicates compliance data for the set of query rules of the particular data provider. Consider an example where a query is included in a first provider-based subset and a second provider-based subset, in response to failing to comply with at least one of a first set of query rules of a first data provider corresponding to the first provider-based subset, and also in response to failing to comply with at least one of a second set of query rules of a second data provider corresponding to the second provider-based subset. The audit log for the first data provider is generated to include compliance data indicating the query's compliance some or all of the first set of query rules, and to not include any compliance data indicating the query's compliance with any of the second set of query rules, in response to the audit log being generated for the first data provider and not the second data provider. Similarly, the audit log for the second provider is generated to include compliance data indicating the query's compliance some or all of the second set of query rules, and to not include any compliance data indicating the query's compliance with any of the first set of query rules, in response to the audit log being generated for the second data provider and not the first data provider.

In various embodiments, a query processing system 114 includes a memory module that includes at least one memory and a processing module that includes at least one processor. The memory module stores operational instructions that, when executed by a processing module of the query processing system 114, cause the query processing system 114 to determine a plurality of sets of query rules, where each set of query rules in the plurality of query rules corresponds to one of a plurality of data providers. The execution of the operational instructions by the processing module further causes the query processing system 114 to receive a plurality of queries from a plurality of requesting entities, and to generate compliance data for each query of the plurality of queries by determining whether each of the plurality of queries complies with the plurality of sets of query rules. The compliance data for queries in a first subset of the plurality of queries indicates each of the first subset of the plurality of queries complies with the plurality of sets of query rules, and where the compliance data for queries in a second subset of the plurality of queries indicates each of the second subset of the plurality of queries does not comply with at least one of the plurality of sets of query rules.

An audit log generating system 460 can include the same or different memory module and/or processing module. The memory module stores operational instructions that, when executed by a processing module of the audit log generating system 460, cause the query processing system 114 to receive the compliance data generated by the query processing system 114 and/or to determine a plurality of provider-based subsets of the second subset of the plurality of queries, where each of the provider-based subsets includes ones of the second subset of the plurality of queries that do not comply with a set of query rules of the plurality of sets of query rules corresponding to one of the plurality of data providers. The execution of the operational instructions by the processing module further causes the audit log generating system 460 to generate a set of audit logs, where each audit log in the set of audit logs corresponds to one of the plurality of data providers, and where each audit log in the set of audit log indicates the compliance data for queries in one of the plurality of provider-based subsets corresponding to the one of the plurality of data providers.

In various embodiments, a non-transitory computer readable storage medium includes at least one memory section that stores operational instructions that, when executed by a processing module that includes a processor and a memory, causes the processing module to determine a plurality of sets of query rules, where each set of query rules in the plurality of query rules corresponds to one of a plurality of data providers. The execution of the operational instructions by the processing module further causes the processing module to receive a plurality of queries from a plurality of requesting entities, and to generate compliance data for each query of the plurality of queries by determining whether each of the plurality of queries complies with the plurality of sets of query rules. The compliance data for queries in a first subset of the plurality of queries indicates each of the first subset of the plurality of queries complies with the plurality of sets of query rules, and where the compliance data for queries in a second subset of the plurality of queries indicates each of the second subset of the plurality of queries does not comply with at least one of the plurality of sets of query rules. The execution of the operational instructions by the processing module further causes the processing module to determine a plurality of provider-based subsets of the second subset of the plurality of queries, where each of the provider-based subsets includes ones of the second subset of the plurality of queries that do not comply with a set of query rules of the plurality of sets of query rules corresponding to one of the plurality of data providers. The execution of the operational instructions by the processing module further causes the processing module to generate a set of audit logs, where each audit log in the set of audit logs corresponds to one of the plurality of data providers, and where each audit log in the set of audit log indicates the compliance data for queries in one of the plurality of provider-based subsets corresponding to the one of the plurality of data providers.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A database system comprises:

sets of processing core resources of pluralities of processing core resources of pluralities of computing devices of a plurality of computing device clusters, wherein the sets of processing core resources are operable to:

determine a set of query rules that includes a maximum result set size rule, wherein a first query rule of the set of query rules includes a first maximum result size rule of the maximum result set size rule regarding a first set of processing core resources of the sets of processing core resources;

receive a query from a requesting entity;

determine a size of a result set of the query;

when the size of the result set complies with the maximum result set size rule:

generate a query result for the query based on the result set, wherein the result set is generated based on executing at least one query function indicated in the query against a database system; and transmit the query result to the requesting entity; and when the size of the result set does not comply with the maximum result set size rule:

forego the generating the query result.

2. The database system of claim 1, wherein the query result for the query includes a set of records included in the result set, and wherein the query result is transmitted when a number of records in the set of records compares favorably to a threshold maximum number of records indicated by the maximum result set size rule.

3. The database system of claim 1, wherein, the sets of processing core resources are further operable to generate the result set by:

generating estimated result set size data based on the query indicating an estimate for the size of the result set, wherein determining the size of the result set is based on applying the estimate for the size of the result set.

4. The database system of claim 1, wherein the sets of processing core resources are further operable to generate the result set by: accessing a set of records included in a database table stored by the database system, wherein the result set includes a subset of the set of records included in the database table based on identifying ones of the set of records comparing favorably to filtering parameters indicated in the query.

5. The database system of claim 1, wherein the sets of processing core resources are further operable to determine whether the size of the result set complies with the maximum result set size rule is based on:

determining a number of records included in the result set; and comparing the number of records included in the result set to a threshold maximum number of records indicated by the maximum result set size rule.

6. The database system of claim 1, wherein the query indicates at least one aggregation function be performed upon the result set, wherein the query result for the query includes function output of the at least one aggregation function performed upon a set of records included in the result set, and wherein the function output of the at least one aggregation function is transmitted when a number of records in the set of records compares favorably to a threshold maximum number of records indicated by the maximum result set size rule.

7. A non-transitory computer readable storage medium comprises:

a first memory section that stores operational instructions that, when executed by sets of processing core resources of pluralities of processing core resources of pluralities of computing devices of a plurality of computing device clusters, causes the sets of processing core resources to:

determine a set of query rules that includes a maximum result set size rule, wherein a first query rule of the set of query rules includes a first maximum result size rule of the maximum result set size rule regarding a first set of processing core resources of the sets of processing core resources;

receive a query from a requesting entity;

determine a size of a result set of the query;

when the size of the result set complies with the maximum result set size rule:

generate a query result for the query based on the result set, wherein the result set is generated based on executing at least one query function indicated in the query against a database system; and transmit the query result to the requesting entity; and when the size of the result set does not comply with the maximum result set size rule:

forego the generating the query result.

8. The non-transitory computer readable storage medium of claim 7, wherein the query result for the query includes a set of records included in the result set, and wherein the query result is transmitted when a number of records in the set of records compares favorably to a threshold maximum number of records indicated by the maximum result set size rule.

9. The non-transitory computer readable storage medium of claim 7, wherein the first memory section further stores operational instructions that, when executed by the sets of processing core resources, causes the sets of processing core resources to further generate the result set by:

generating estimated result set size data based on the query indicating an estimate for the size of the result set, wherein determining the size of the result set is based on applying the estimate for the size of the result set.

10. The non-transitory computer readable storage medium of claim 7, wherein the first memory section further stores operational instructions that, when executed by the sets of processing core resources, causes the sets of processing core resources to further generate the result set by:

accessing a set of records included in a database table stored by the database system, wherein the result set includes a subset of the set of records included in the database table based on identifying ones of the set of records comparing favorably to filtering parameters indicated in the query.

11. The non-transitory computer readable storage medium of claim 7, wherein the first memory section further stores operational instructions that, when executed by the sets of processing core resources, causes the sets of processing core resources to determine whether the size of the result set complies with the maximum result size rule based on:

determining a number of records included in the result set; and comparing the number of records included in the result set to a threshold maximum number of records indicated by the maximum result set size rule.

12. The non-transitory computer readable storage medium of claim 7, wherein the query indicates at least one aggregation function be performed upon the result set, wherein the query result for the query includes function output of the at least one aggregation function performed upon a set of records included in the result set, and wherein the function output of the at least one aggregation function is transmitted when a number of records in the set of records compares favorably to a threshold maximum number of records indicated by the maximum result set size rule.

* * * * *